(12) United States Patent
Hayashi

(10) Patent No.: US 8,866,586 B2
(45) Date of Patent: Oct. 21, 2014

(54) AUTHENTICATION SYSTEM

(75) Inventor: Hitoshi Hayashi, Tokyo (JP)

(73) Assignee: IHC Corporation, Tokyo (JP)

(*) Notice: Subject to any disclaimer, the term of this patent is extended or adjusted under 35 U.S.C. 154(b) by 0 days.

(21) Appl. No.: 13/492,122

(22) Filed: Jun. 8, 2012

(65) Prior Publication Data

US 2012/0256725 A1 Oct. 11, 2012

Related U.S. Application Data

(62) Division of application No. 11/886,749, filed as application No. PCT/JP2006/305826 on Mar. 23, 2006, now abandoned.

(30) Foreign Application Priority Data

Mar. 23, 2005 (JP) .................. 2005-083936

(51) Int. Cl.
| | |
|---|---|
| G06Q 20/40 | (2012.01) |
| G06F 21/32 | (2013.01) |
| G07C 9/00 | (2006.01) |
| H04L 29/06 | (2006.01) |
| G07B 15/00 | (2011.01) |

(52) U.S. Cl.
CPC ............ *G06F 21/32* (2013.01); *G07C 9/00087* (2013.01); *H04L 63/0861* (2013.01); *G06F 2221/2111* (2013.01); *G06F 2221/2137* (2013.01); *G06F 2221/2151* (2013.01); *G07B 15/00* (2013.01); *G07C 2209/08* (2013.01); *H04L 63/107* (2013.01)
USPC ....................... 340/5.81; 340/573.1

(58) Field of Classification Search
USPC ............. 340/5.53, 541, 573.1, 5.81; 455/456; 370/227; 380/271; 1/1; 701/409
See application file for complete search history.

(56) References Cited

U.S. PATENT DOCUMENTS

| 5,229,764 A | 7/1993 | Matchett et al. |
| 5,719,918 A * | 2/1998 | Serbetciouglu et al. ...... 380/271 |

(Continued)

FOREIGN PATENT DOCUMENTS

| CN | ZL2006 8 0014278.8 | 3/2006 |
| JP | 2000-040064 | 2/2000 |

(Continued)

OTHER PUBLICATIONS

H. Hayashi et al., "Personal Authentication Using Spatial and Temporal Information Reading the Personal Data", The 13th IEEE International Symposium on Consumer Electronics, pp. 614-618 (2009).

(Continued)

*Primary Examiner* — Steven Lim
*Assistant Examiner* — Kaleria Knox
(74) *Attorney, Agent, or Firm* — Andrew F. Young, Esq.; Lackenbach Siegel, LLP

(57) ABSTRACT

[PROBLEMS] To provide an authentication system improving authentication accuracy of existence of a registered person and easily find an unauthorized act to improve the security in a system by performing authentication using coincidence/non-coincidence of biometrics information and temporal/spatial authentication when performing individual authentication via a network by using electronic information which is easily tampered, easily leaks out, and is easily stolen. [MEANS FOR SOLVING PROBLEMS] An authentication server (1) includes a database for managing individual information on a registered person to be authenticated. Moreover, the authentication server (1) is connected to a plurality of management servers (2) via a communication network and correlates the individual information transmitted from an individual information input device (3) via the management server (2) with the individual information in the database, thereby authenticating the existence of the registered person.

26 Claims, 137 Drawing Sheets

(56) References Cited

U.S. PATENT DOCUMENTS

| | | | |
|---|---|---|---|
| 6,040,783 A * | 3/2000 | Houvener et al. | 340/5.53 |
| 6,218,945 B1 * | 4/2001 | Taylor, Jr. | 340/573.1 |
| 6,233,588 B1 * | 5/2001 | Marchoili et al. | 1/1 |
| RE37,467 E * | 12/2001 | Brasch et al. | 340/541 |
| 2002/0098851 A1 * | 7/2002 | Walczak et al. | 455/456 |
| 2002/0163882 A1 * | 11/2002 | Bornstein et al. | 370/227 |

FOREIGN PATENT DOCUMENTS

| | | |
|---|---|---|
| JP | 2000-57341 | 2/2000 |
| JP | 2000-057341 | 2/2000 |
| JP | 2000-092567 | 3/2000 |
| JP | 2002-064861 | 2/2002 |
| JP | 2004-086560 A | 3/2004 |
| JP | 2004-204629 | 7/2004 |
| JP | 2004204629 | 7/2004 |
| JP | 2005-038111 | 2/2005 |

OTHER PUBLICATIONS

CN 200680014278.8 Notification of the First Office Action mailed May 22, 2009, 7 pages—English, 7 pages—Chinese.

* cited by examiner

Fig.5

Own spatial information database 401

| Terminal number | Date and time of installation | Date and time of installation | Longitude | Latitude | Altitude |
|---|---|---|---|---|---|
| 174-0063-0001 | 2004.2.3 15:28 | IHC Co, Ltd. Identification ID12 | East longitude | Latitude | 150cm above the ground |
| Apartment name | 5-story made of reinforced concrete existing in 1-1, 1-chome, Maeno-cho, Itabashi-ku, Tokyo opular Apartment | | | | |

Related spatial information database 402

| Terminal | Prefecture | City | Town name | Chome | Address number | Sub address number | Terminal kind | Peculiar number |
|---|---|---|---|---|---|---|---|---|
| | Tokyo | Itabashi-ku | Maeno-cho | 2-chome | 1-banchi | 20-go | | |
| | 13 | 21 | 036 | 02 | 01 | 20 | | |
| Elevator | 13210360020120- | | | | | | 160 | 01583 |
| Front entrance | 13210360020120- | | | | | | 160 | 08416 |
| No. 101 entrance | 13210360020120- | | | | | | 160 | 03692 |
| No. 501 entrance | 13210360020120- | | | | | | 160 | 04179 |
| Aggregation type terminal | 13210360015001- | | | | | | 150 | 00001 |
| Aggregation type terminal | 13210360015002- | | | | | | 150 | 00002 |
| System server | 13211000000001- | | | | | | 10 | 00001 |

Fig. 6
Example Top view of first floor of home
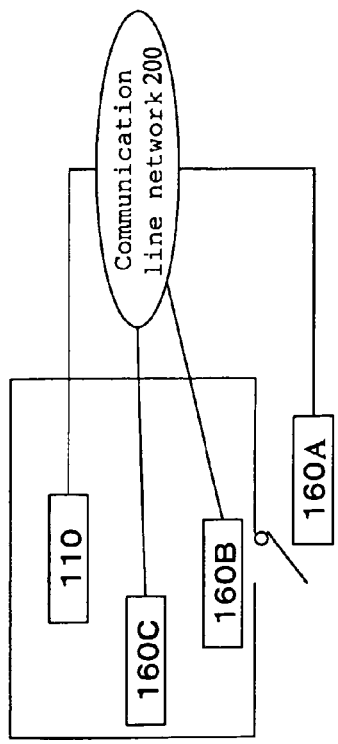
Schematic structural view
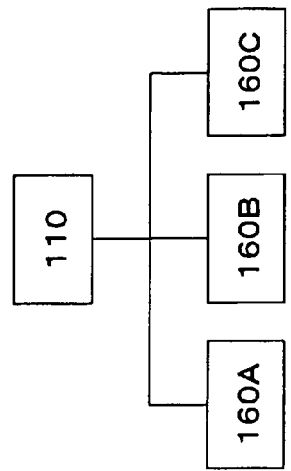
Example Enlarged view of entrance door
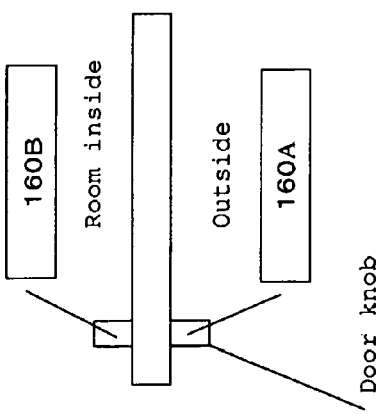

Fig. 7

Example  Installation purposes

| | Principle | | Exemption 1 | | Exemption 2 | |
|---|---|---|---|---|---|---|
| | Purpose and meaning | Action | Purpose and meaning | Action | Purpose and meaning | Action |
| 110 | Management of home inside Authentication of family individual | Authentication Yes or No | Emergency system | | History data storage | |
| 160A | Management of entrance key Recognition of entering the home | Unlocking and locking | Power source management | Room light on | Existence record | Data registration |
| 160B | Management of entrance key Recognition of entering the home | Unlocking and locking | Power source management | Room light off | Existence record | Data registration |
| 160C | Management of room light | Room light on | Management of entrance key Recognition of entering the home | Locking | Existence record | Data registration |

Fig.8

(a) Detailed identification ID

| Terminal | Prefecture | City | Town name | Chome | Address number | Sub address number | Terminal kind | Peculiar number |
|---|---|---|---|---|---|---|---|---|
| | Tokyo | Itabashi-ku | Maeno-cho | X-chome | X-banchi | X-go | | |
| | 13 | 21 | 036 | 02 | 01 | 20 | | |
| Home entrance | 1321036020120— | | | | | | 160 | 00001 |
| Elevator | 1321036020120— | | | | | | 160 | 01583 |
| Front entrance | 1321036020120— | | | | | | 160 | 08416 |

(b) Simple identification ID

| Terminal | Prefecture | City | Town name | Chome | Address number | Sub address number | Terminal kind | Peculiar number |
|---|---|---|---|---|---|---|---|---|
| | Tokyo | Itabashi-ku | Maeno-cho | X-chome | X-banchi | X-go | | |
| | | 21 | 036 | 02 | 01 | 20 | | |
| Home entrance | JT01234— | | | | | | 160 | 00001 |
| Elevator | JT01234— | | | | | | 160 | 01583 |
| Front entrance | JT01234— | | | | | | 160 | 08416 |

Fig. 9

(a) Terminal installation     Position information display     Example 1

| Terminal number | Date and time of installation | Name of installer | Longitude | Latitude | Altitude |
|---|---|---|---|---|---|
| 174-0063-0001 | 2004.2. 3 15:28 | IHC Co, Ltd.<br>OO OO<br>Identification ID 12 | Long.OO°<br>OO´E | Lat.ΔΔ°<br>ΔΔ´N | 150cm above the ground |

Apartment 5-story made of reinforced concrete existing at 1-1, 1-chome, Maeno-cho, Itabashi-ku, Tokyo    Popular name OOApartment    First floor Front entrance door    Road side knob (b) Terminal installation     Position information display     Example 2

| Terminal number | Date and time of installation | Name of installer | Longitude | Latitude | Altitude |
|---|---|---|---|---|---|
| 101-0003-0002 | 2004.3. 6 19:47 | XX Higashi-nihon<br>Kanto Branch OO OO | Long.OO°<br>OO´E | Lat.ΔΔ°<br>ΔΔ´N | 100cm above the ground |

Automatic ticket gate No. 7, Marunouchi Chuoguchi, Tokyo station existing at 1-1, 1-chome, Marunouchi, Chiyoda-ku, Tokyo (c) Terminal installation     Position information display     Example 3

| Terminal number | Date and time of installation | Name of installer | Longitude | Latitude | Altitude |
|---|---|---|---|---|---|
| 267-0037-0003 | 2004.4. 8 13:56 | IHC Co, Ltd.<br>OO OO | Long.OO°<br>OO´E | Lat.ΔΔ°<br>ΔΔ´N | 80cm above the ground |

OO OO    Individual authentication organization ΔΔ    Identification OOOOO

Road side knob, entrance door, first floor, 2-story house made of wood and plaster existing at 25-6, 3-chome, -machi, city, prefecture

Fig. 12

Example 1

| Identification result information | Proceeding action |
|---|---|
| Yes | Sending the unlocking information of electronic management lock |
| No | Sending the operation lock alarm information of the end side terminal 160 |
| Cannot judge | Requesting the action of information reading once again |

Example 2

| Identification result information | Proceeding action |
|---|---|
| Yes | Access to the electronic money management DB |
| No | Sending the operation lock alarm information of the end side terminal 160<br>Automatic report to the police |
| Cannot judge | Requesting the action of information reading once again |

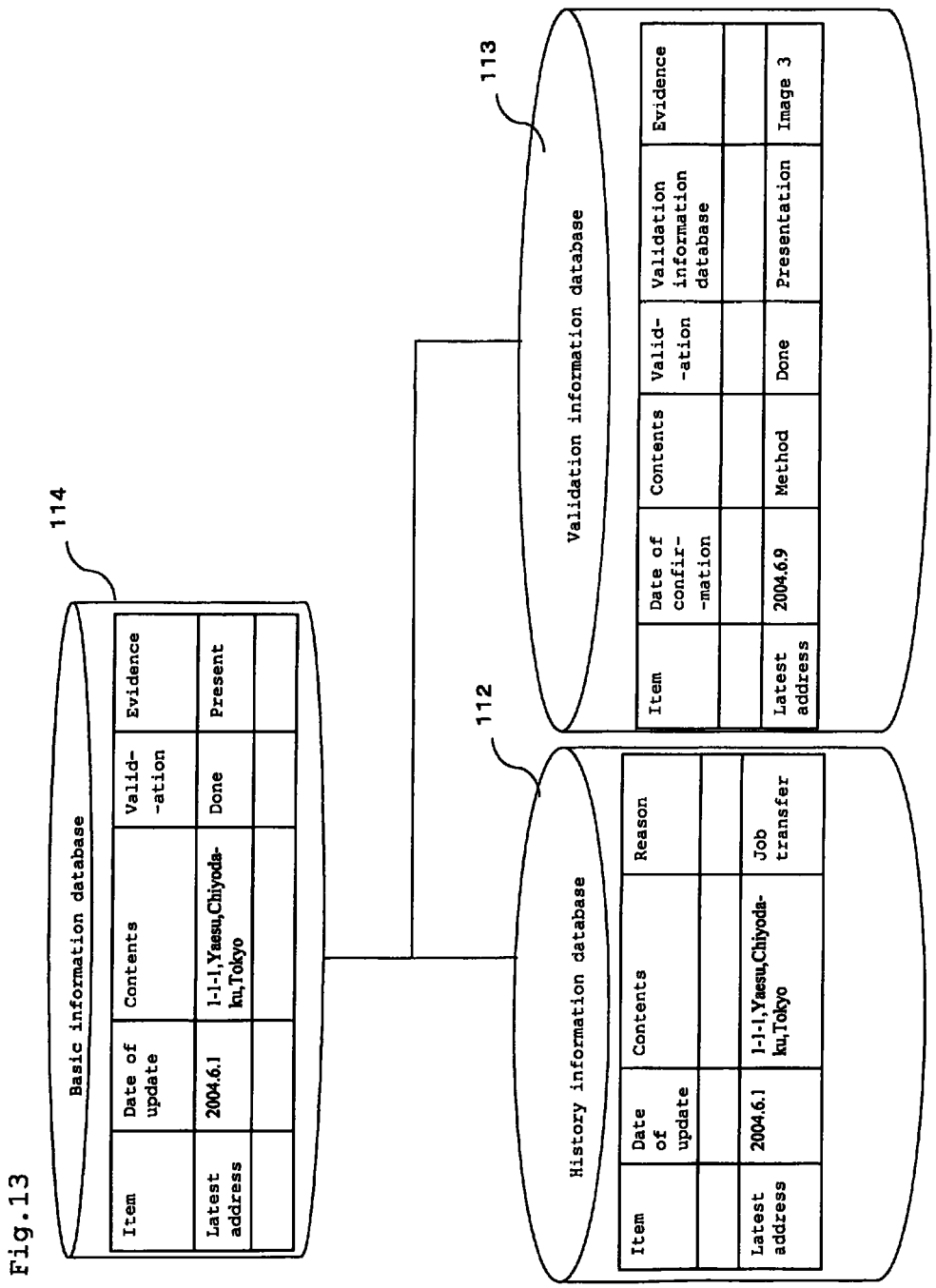

Fig.17

(a) Corresponding structure example

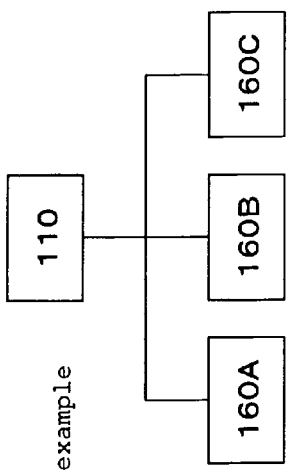

(b) Database 116 display example

| Individual identification ID | Registered person name | Information 1 (160A) | Information 2 (160B) | Information 3 (160C) |
|---|---|---|---|---|
| OOOOOO | OO OO | Left eye iris | Right palm vein | |
| OOOOOO | OO OO | Right eye iris | Right palm vein | Right hand index finger |
| OOOOOO | OO OO | Right eye iris | Left palm vein | |
| OOOOOO | OO OO | Right eye iris | Right palm vein | Left hand index finger |
| OOOOOO | OO OO | Left eye iris | Left palm vein | |
| OOOOOO | OO OO | Right eye iris | Right palm vein | |

Fig.27

Calculation equation    ※ Calculation is made per each information.

Equation 2

| Acquired points 100 | × | Information arising risk =0% 1−0 =1 | × | Validation arising risk Only witness =10% 1−0.1 =0.9 | × | Other risk =0% 1−0 =1 | = | Basic points 90 |

Fig.28

Calculation equation   ※ Calculation is made per each information.

Basic points × Trust evaluation degree (1~0) = Trust evaluation consideration points 1 = ··· = Trust evaluation consideration points 99 = Trust evaluation consideration points 100

Trust evaluation consideration points 1 + ··· + Trust evaluation consideration points 99 + Trust evaluation consideration points 100 = Trust evaluation consideration points

Fig. 29

Equation 3

The above basic points

Basic point 90 × Trust evaluation degree Lawyer 0.95 = Trust evaluation consideration points 85.50

× Trust evaluation degree Teacher 0.8 = Trust evaluation consideration points 72.00

× Trust evaluation degree Company colleague (large company) 0.7 = Trust evaluation consideration points 63.00

× Trust evaluation degree Friend 0.5 = Trust evaluation consideration points 45.00

Fig. 30

| Calculation equation actual example | ※ Calculation is made per each information. |

Tally result

| | First unit | Second unit | Third unit | Last unit | Certain period (6 months) | Previous period (45 days) |
|---|---|---|---|---|---|---|
| Monday AM ① | OOOOOOO-150A | OOOOOOO-150E | OOOOOOO-150H | OOOOOOO-150P | 120 times | 32 times |
| Monday AM ② | OOOOOOO-150A | OOOOOOO-150G | OOOOOOO-150H | OOOOOOO-150R | 30 times | 5 times |
| Monday AM ③ | OOOOOOO-150B | OOOOOOO-150E | OOOOOOO-150H | OOOOOOO-150T | 10 times | 3 times |

Equation 4 ①  Validation base mining rate 0.67 = 120 times ÷ 180 days

Equation 4 ②  Objective destination mining rate 0.71 = 120 times ÷ 45 days

Equation 4 ③
Mining rate 1.06 = 0.71 ÷ 0.67
Mining rate 0.65 = 0.11 ÷ 0.17
Mining rate 1.17 = 0.07 ÷ 0.06
Existence rate 0.96 = 96% = (1.06 + 0.65 + 1.17) ÷ Number of addition = 3 pieces

Fig. 31

Example   Existence rate and use function

| Existence rate % | Principle | | | Concrete example | | |
|---|---|---|---|---|---|---|
| | Meaning | Action | | Overseas travel | | Financial field |
| 85~ | Individual identification Recognition Existence determination | All OK | | Without passport Automatic entry process at boarding gate | | Electronic money Electronic credit Without signature |
| 50~85 | Individual identification Recognition Fear with existence | Partial limitation | | Without passport Automatic entry process at immigration | | Electronic money Electronic credit Without signature |
| 20~50 | Individual identification Recognition Concern with existence | Partial permission | | Without passport Automatic entry process at immigration | | Electronic money Electronic credit Without signature |
| ~20 | Individual identification Unavailable | All NG | | With passport Automatic entry process at immigration | | Cash Credit card |

Fig. 32

Example   Existence rate and use function

| Existence rate | Basic number | Identification | Transmission time |
|---|---|---|---|
| 85~ | 123456789012 | A | A-123456789012 |
| 50~85 | 123456789012 | B | B-123456789012 |
| 20~50 | 123456789012 | C | C-123456789012 |
| ~20 | 123456789012 | D | D-123456789012 |

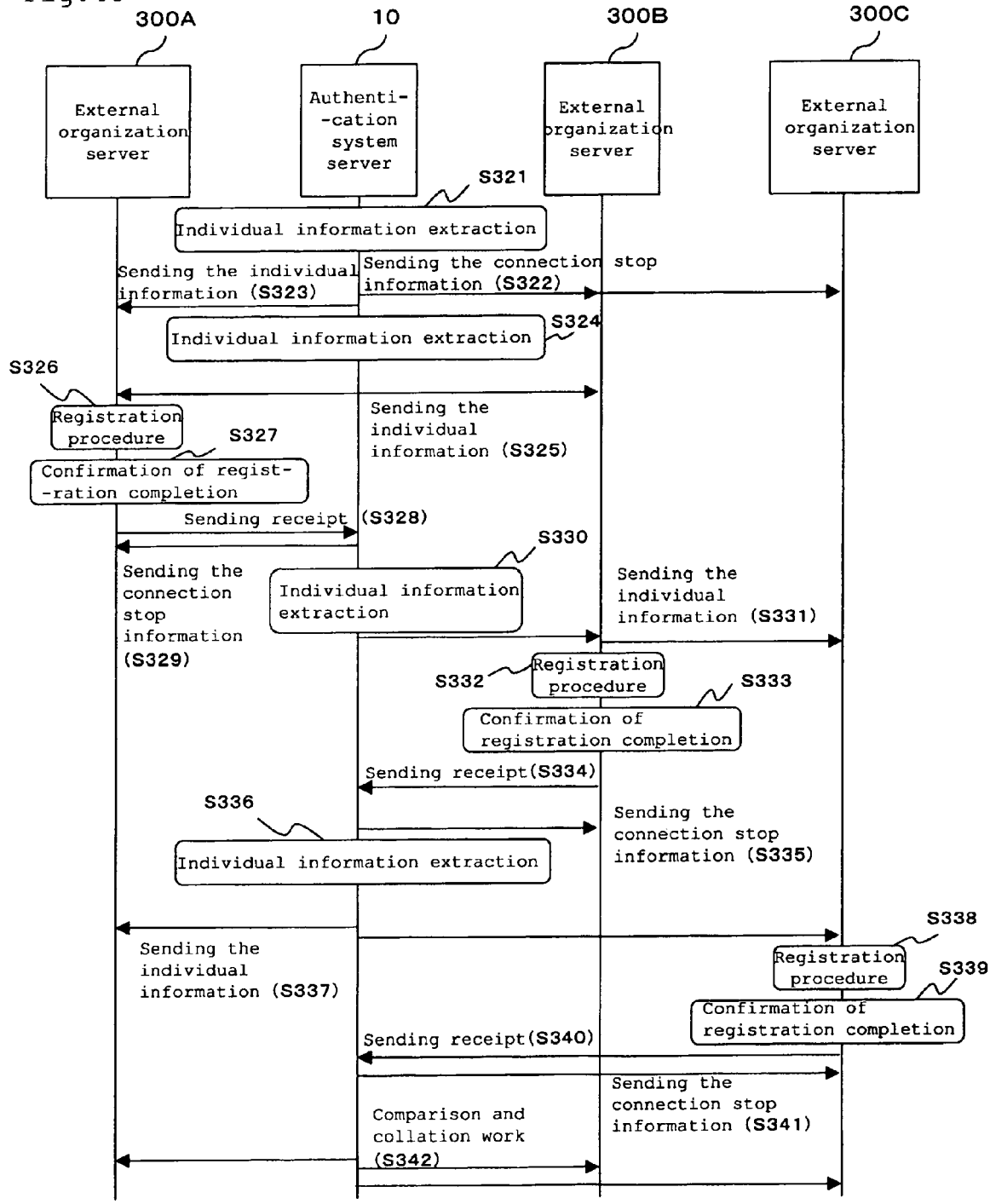

Fig. 49

Example Connection terminal List

Example Case of terminal

| | Access terminal | Address | Terminal name |
|---|---|---|---|
| Highest priority | OOOOOOO-110A | 1-1-X,Maeno-cho,Itabashi-ku,Tokyo | Tokyo Itabashi-ku Maenocho branch office |
| Next priority | OOOOOOO-120A | 1-5-X,Maeno-cho,Itabashi-ku,Tokyo | Tokyo Itabashi-ku Maeno elementary school |
| 1 | OOOOOOO-150D | 1-10-X,Maeno-cho,Itabashi-ku,Tokyo | Tokyo Itabashi-ku Maenocho area server |
| 2 | OOOOOOO-150B | X-X-X,Tokiwadai,Itabashi-ku,Tokyo | Tokyo Itabashi-ku Tokiwadai area server |
| ⎱ | | | |
| ⎱ | | | |
| Emergency | OOOOOOO-150W | X-X,Tenjin,Hakata-ku,Fukuoka-shi,Fukuoka | Fukuoka Fukuoka-shi Hakata-ku Tenjin area server |

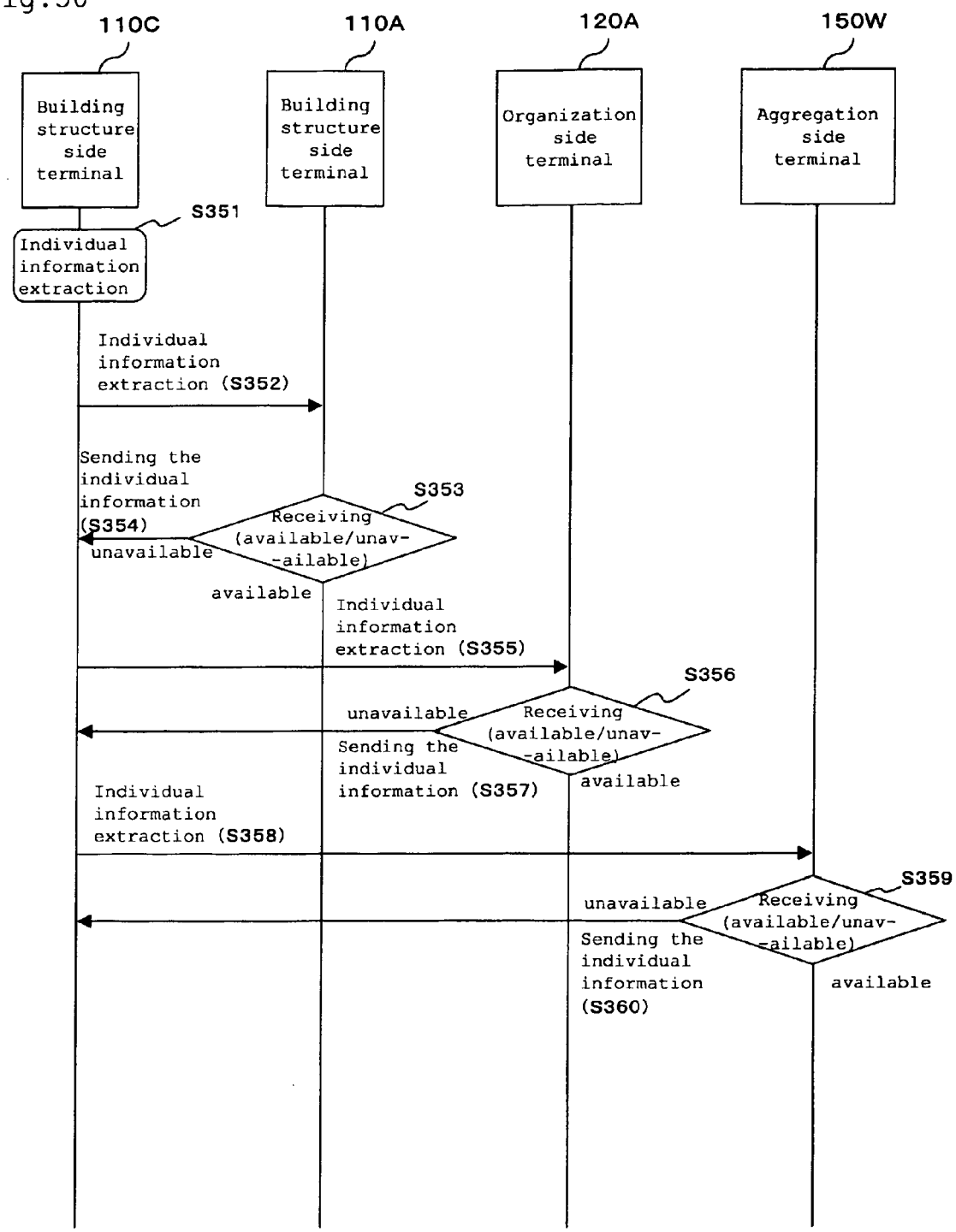

Fig. 51

Example Connection terminal List
Example Case of terminal

| | Access terminal | Address | Terminal name |
|---|---|---|---|
| Highest priority | OOOOOOO-110A | 1-1-X,Maeno-cho,Itabashi-ku,Tokyo | Tokyo Itabashi-ku Maenocho branch office |
| Reflection | OOOOOOO-110K | XX,Imazawa-cho,Gifu-shi,Gifu | Gifu city hall |
| Next priority | OOOOOOO-120A | 1-5-X,Maeno-cho,Itabashi-ku,Tokyo | Tokyo Itabashi-ku Maeno elementary school |
| 1 | OOOOOOO-150D | 1-10-X,Maeno-cho,Itabashi-ku,Tokyo | Tokyo Itabashi-ku Maenocho area server |
| 2 | OOOOOOO-150B | X-X-X,Tokiwadai,Itabashi-ku,Tokyo | Tokyo Itabashi-ku Tokiwadai area server |
| ≀ | | | |
| ≀ | | | |
| Emergency | OOOOOOO-150W | X-X,Tenjin,Hakata-ku,Fukuoka-shi,Fukuoka | Fukuoka Fukuoka-shi Hakata-ku Tenjin area server |

Fig. 55   Example   Virtual housing lot

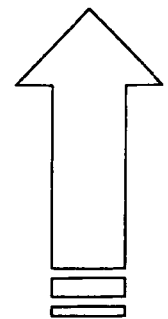
Fig.57

Fig.60
(a)
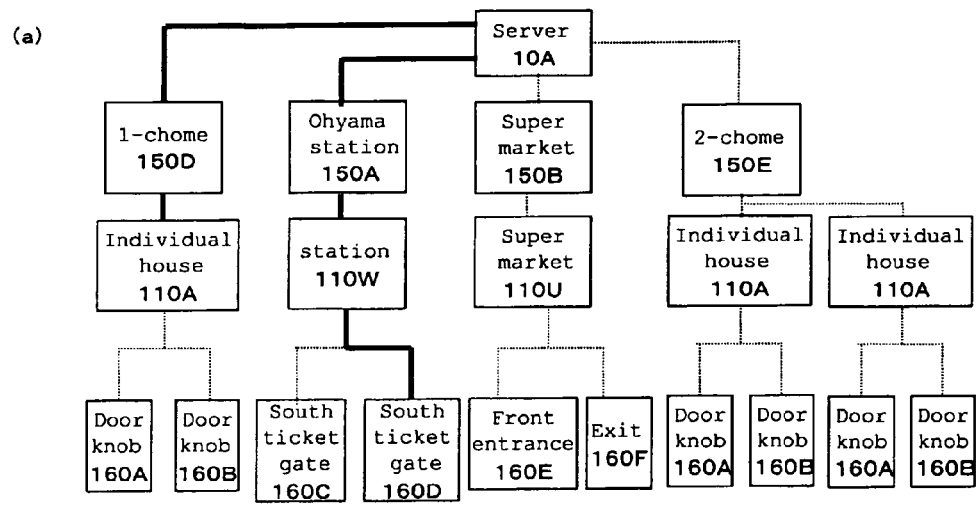
(b)
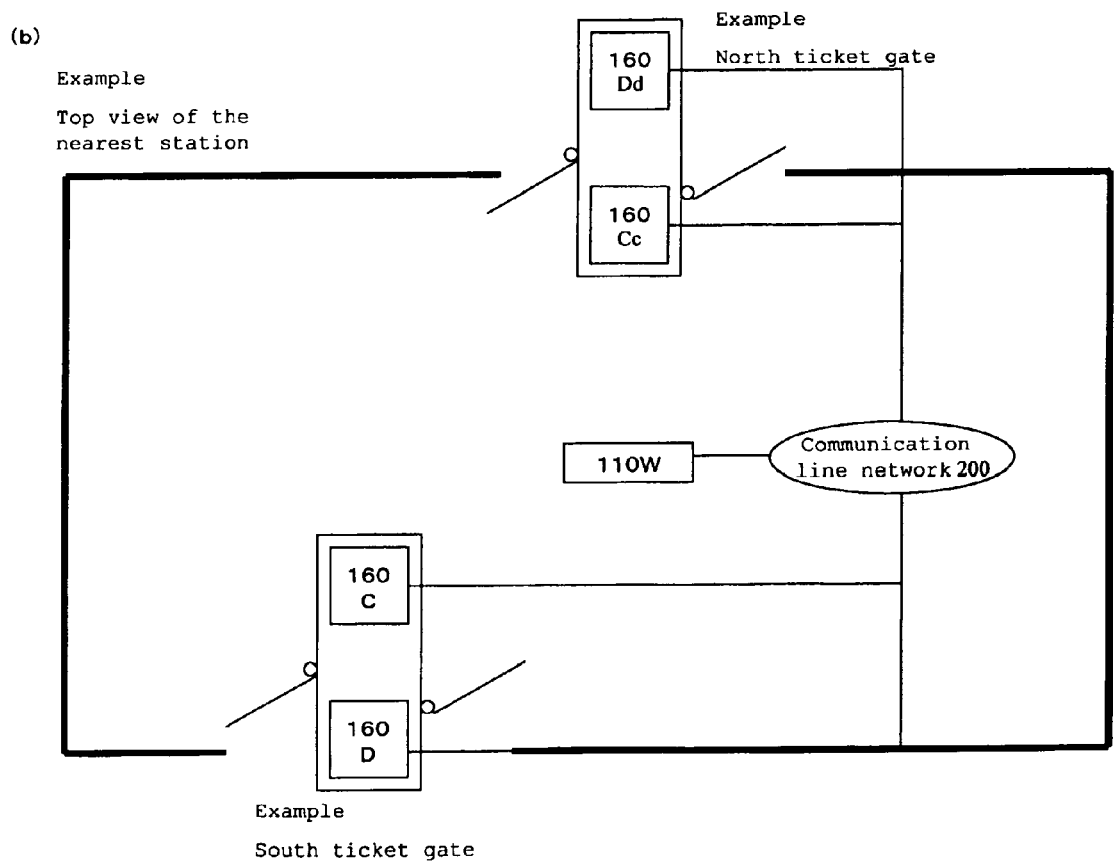
Example
Top view of the nearest station
Example
North ticket gate
Example
South ticket gate Fig. 63  Example  Virtual commutation image
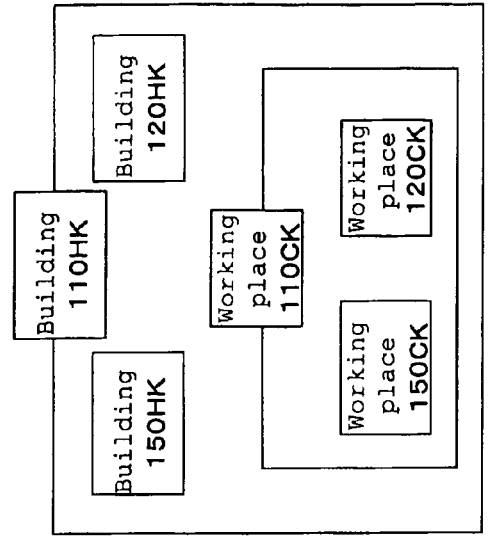
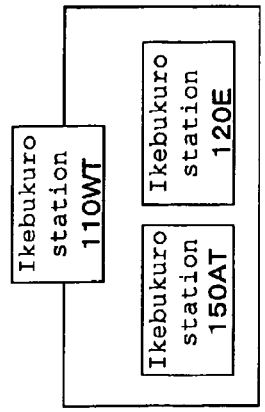
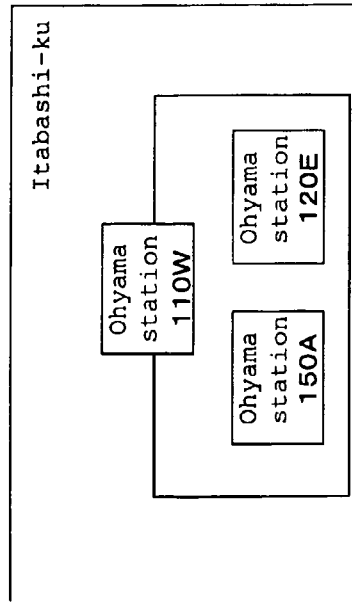

Fig. 66

Example Commutation ticket information List
Example Commutation ticket information

| | Access terminal | Address |
|---|---|---|
| Individual identification ID | OOOOOOOOOO | |
| Main terminal | OOOOOOO-150D | X-X-X,Maeno-cho,Itabashi-ku,Tokyo |
| Commutation area main terminal side | OOOOOOO-110W | X-X,Ohyama-cho,Itabashi-ku,Tokyo |
| Commutation area sub terminal side | OOOOOOO-110WT | X-X-X,Nishi-Ikebukuro,Toshima-ku,Tokyo |
| Ride available period | Start | Period |
| | 2004.8.1 | 2005.1.31 |
| | Other | |
| Individual confirmation information | Right eye iris | Left index finger fingerprint |
| Bank account | OOBank OOBranch | OOOOOO |

Fig. 67

Example Station terminal List

| Station name | Aggregation side terminal | Ticket gate name | Building structure side terminal | End side terminal |
|---|---|---|---|---|
| Ikebukuro | OOOOOOO-150AT | North port | OOOOOOO-110WT | OOOOOOO-160DT |
| Ikebukuro | OOOOOOO-150AT | North port | OOOOOOO-110WT | OOOOOOO-160Dt |
| Ikebukuro | OOOOOOO-150AT | West port | OOOOOOO-110WS | OOOOOOO-160DS |
| Ikebukuro | OOOOOOO-150AT | North port | OOOOOOO-110WS | OOOOOOO-160Ds |
| Ikebukuro | | Compatibility | OOOOOOO-110WT | OOOOOOO-110WS |
| Ikebukuro | | Compatibility | OOOOOOO-110WS | OOOOOOO-110WT |
| Ohyama | OOOOOOO-150A | South port | OOOOOOO-110W | OOOOOOO-160D |
| Ohyama | OOOOOOO-150A | North port | OOOOOOO-110W | OOOOOOO-160Dd |

Fig. 70

Example Inclusion relation List

Large building

○○○Building    Base unit    OOOOOOO-150HZ

| Terminal name | Aggregation side terminal Connection terminal | Installation place | Building structure side terminal | End side terminal |
|---|---|---|---|---|
| Component unit 1F entrance | OOOOOOO-150HK | Front entrance door outside | OOOOOOO-110 HK | OOOOOOO-160HK |
| | | Front entrance door inside | OOOOOOO-110 HK | OOOOOOO-160hK |
| | | Service entrance door outside | OOOOOOO-110 HK | OOOOOOO-160HL |
| | | Service entrance door inside | OOOOOOO-110 HK | OOOOOOO-160hL |
| Component unit Working place | OOOOOOO-150CK | Entrance door outside | OOOOOOO-110 CK | OOOOOOO-160E |
| Component unit 1F lobby | OOOOOOO-150HH | Shaped portion | OOOOOOO-110 HH | OOOOOOO-160HH |
| Component unit Elevator No.1 | OOOOOOO-150HE | Shaped portion | OOOOOOO-110 HE | OOOOOOO-160HE |
| Component unit 2F corridor | OOOOOOO-150HM | Shaped portion | OOOOOOO-110 HM | OOOOOOO-160HM |
| Component unit Roof | OOOOOOO-150HT | Shaped portion | OOOOOOO-110 HT | OOOOOOO-160HT |

Fig. 85

Example  Data mining

| | First unit | Second unit | Third unit | Last unit | Accumulation within period | Contents |
|---|---|---|---|---|---|---|
| Monday AM | OOOOOOO -150A | OOOOOOO -150E | OOOOOOO -150H | OOOOOOO -150P | 150 times | Commutation |
| Monday AM | OOOOOOO -150A | OOOOOOO -150E | OOOOOOO -150K | OOOOOOO -150P | 100 times | Commutation |
| Monday AM | OOOOOOO -150A | OOOOOOO -150G | OOOOOOO -150H | OOOOOOO -150R | 30 times | Business destination |
| Monday AM | OOOOOOO -150A | OOOOOOO -150G | OOOOOOO -150M | OOOOOOO -150R | 20 times | Business destination |
| Monday AM | OOOOOOO -150B | OOOOOOO -150E | OOOOOOO -150H | OOOOOOO -150T | 10 times | Welcoming and sending off |
| Monday AM | OOOOOOO -150B | OOOOOOO -150E | OOOOOOO -150M | OOOOOOO -150T | 5 times | Hospital |
| Monday AM | OOOOOOO -150B | OOOOOOO -150G | OOOOOOO -150H | OOOOOOO -150W | 3 times | School |
| Monday AM | OOOOOOO -150B | OOOOOOO -150G | OOOOOOO -150M | OOOOOOO -150W | 1 times | Travel |

Example
Large building   Building structure
condition figure

Example
Large building   Tenant composite building

Fig. 94

Example
Current position display example 1

| Individual identification ID | Update time | Confirmation unit terminal name | Contents |
|---|---|---|---|
| OOOOOOO | 2004.12.17 06:10:23 | OOOOOOO-110B | Building 1F Entrance |
| | 2004.12.17 06:15:07 | OOOOOOO-110D | Building 1F Tenant D |
| | 2004.12.17 06:21:46 | OOOOOOO-110C | Building 1F Tenant C |
| | 2004.12.17 06:33:38 | OOOOOOO-110E | Building 1F Elevator inside |

Fig.106

Example
Completion notice information

| Individual identification ID | | OOOOOOO |
|---|---|---|
| Main unit | | OOOOOOO-150 |
| Date and time of storage | | 2004.12.17::16:37:14 |
| Information portable device | Name | Cell phone |
| | Type | NTT DoCoMo D504i |
| | Product number | No.OOOOOOO |
| Electronic recording medium | Name | IC chip |
| | Type | Hitachi ABC-IC101 |
| | Product number | No.OOOOOOO |
| Operator of procedure | | OO OO |
| Place of procedure | | In |
| Other | | |

Fig.109

Example Biometrics information Reference table

| Item | Objective code |
|---|---|
| Right thumb fingerprint | 101 |
| Right index finger fingerprint | |
| .. | |
| .. | |
| .. | |
| Right eye iris | 201 |
| .. | |
| Right palm vein | 301 |
| .. | |
| Voice pattern | 401 |
| .. | |

| Item | Objective code |
|---|---|
| Company A | Aaa |
| Company B | Bbb |
| Company C | Ccc |
| | .. |
| | .. |
| | .. |
| | .. |
| | .. |
| Company Z | Zzz |

Fig. 110

Example
Mismatch information

| Individual identification ID | OOOOOOO-160 |
|---|---|
| Base unit | OOOOOOO-150 |
| Date and time of occurrence | 2004. 12. 08::14:23:39 |
| Date and time of judgment | 2004. 12. 08::14:23:46 |
| Mismatch reason | Read information insufficient |
| Use purpose | Electronic money payment |
| User individual identification ID | OOOOOOO |
| Checker individual identification ID | OOOOOOO |
| Cause | User's finger was wet. |
| Re-validation | No problem |
| Date of report | |
| Remarks | It rained, and the finger used to hold an umbrella |
| Other | |

Fig.112

Example
Use limited person registration slip

| Use limited person individual identification ID | OOOOOOO | |
|---|---|---|
| Date of authorization | 2004.12.08::14:23:39 | |
| Date of release | | |
| Reason for limitation | Acquiring other's information by spoofing | |
| Limited contents | System use limitation | Electronic money, without ticket |
| | System use stop | None |
| Base unit | OOOOOOO-150 | |
| Re-validation | No problem | |
| Date of report | | |
| Remarks | 2007.12.07::23:59:59 Limitation until | |
| Other | Incident number: criminal action 2004-OOOO | |

Fig.113

Example
Use limitation standard table

| Action contents | Limitation/stop division | Period |
|---|---|---|
| Unauthorized access | Stop | 1 year after authorization |
| Data change | Limitation | 2 year after authorization |
| Data fabrication | Stop | 1 year after authorization |
| Data theft | Stop | 3 year after authorization |
| Spoofing | | 2 year after authorization |
| Creation and spread of computer virus | Stop | 3 year after authorization |
| Net fraud | Limitation | 2 year after authorization |
| ‥ | | ‥ |
| Extreme slander action | Limitation | 6 months after authorization |
| ‥ | | ‥ |

Fig.136

Example

Home  End side terminal 160A  Connection list

| | Access terminal | Address | Terminal name |
|---|---|---|---|
| Top | OOOOOOO-150A | 1-1-X,Maeno-cho, Itabashi-ku,Tokyo | Tokyo Itabashi-ku Maenocho branch office |
| Reflection | OOOOOOO-110K | XX,Imazawa-cho,Gifu-shi, Gifu | Gifu city hall |
| Next priority | OOOOOOO-120A | 1-5-X,Maeno-cho, Itabashi-ku,Tokyo | Tokyo Itabashi-ku Maeno elementary school |
| 1 | OOOOOOO-130A | 1-10-X, Maeno-cho,Itabashi-ku, Tokyo | Tokyo Itabashi-ku 1 server |
| 2 | OOOOOOO-130B | X-X-X, Tokiwadai,Itabashi-ku, Tokyo | Tokyo Itabashi-ku 2 server |
| Emergency | OOOOOOO-150W | X-X,Tenjin,Hakata-ku, Fukuoka-shi,Fukuoka | Fukuoka Fukuoka-shi Hakata-ku 1 server |

AUTHENTICATION SYSTEM

CROSS-REFERENCE TO RELATED APPLICATIONS

This application is a divisional application of U.S. application Ser. No. 11/886,749, filed on Sep. 20, 2007, now abandoned, which is a U.S. national phase, pursuant to 35 U.S.C. §371, of International Patent Application No. PCT/JP2006/305826, filed on Mar. 3, 2006, which claims the right of priority to Japanese Patent Application No. 2005-083936 filed Mar. 23, 2005.

BACKGROUND OF THE INVENTION

1. Field of the Invention

The present invention relates to an authentication system, in particular to an authentication system for performing collation of individual information of a user and thereby performing authentication.

2. Description of the Related Art

In the prior art, at the moment of important procedures and transactions such as concluding an insurance agreement, opening a bank account, and the like, in order to prove the existence of an individual person, an identification card such as a driver's certificate or an employee ID card has been presented.

Further, along with the development of recent electronic technologies, in the case to use electronic money and the like, individual authentication methods have been mainly performed where an input password is collated, peculiar individual information is read out from a magnetic card or an IC card and collation is performed.

However, in the case of the driver's certificate and employee ID card, they are easily copied or forged, and unauthorized acts using unauthorized identification cards show no sign of significant decline.

Furthermore, in the authentication method using electronic information, the electronic information is easily tampered, leaked out and stolen, and in particular, in the case of authentication via internet, since it is difficult to check up the other side, the vulnerability of the authentication has been undeniable.

In order to prevent such unauthorized authentication acts, in recent years, authentication by biometrics information has been proposed.

This biometrics information means peculiar information inhered to a person biometrically, including fingerprint and vocal print and the like, and since it is the information peculiar to the person that others cannot be have, it has been thought difficult to tamper the biometrics information.

As one of authentication by such electronic information with reinforced security, a crime prevention system using biometrics authentication technology disclosed in Patent Document 1 has been proposed.

In this Patent Document 1, the range of authentication objectives has been expanded, in addition to authentication objectives where users are limited to only selected and registered people, to people who are "unidentified people" to user, and the biometrics information of these authentication objectives is registered into a database, and thereby, when unauthorized acts are performed by the "unidentified people", an appropriate response can be made.

Patent Document 1: Japanese Unexamined Patent Application Publication No. 2005-32051

DISCLOSURE OF THE INVENTION

Problems to be Solved by the Invention

However, even with the individual authentication by the biometrics information with reinforced security, in the authentication system thereof, the biometrics information is converted into electronic information, and sent and received in the same manner as in the prior art, and accordingly, it has been difficult to completely prevent the electronic information from being tampered, leaked out and stolen.

The present invention has been made in consideration of the above problems in the prior art, and accordingly, the object of the present invention is to provide an authentication system for improving authentication accuracy of existence of a registered person and easily find an unauthorized act to improve the security in a system by performing authentication using match/mismatch of biometrics information and temporal/spatial authentication when performing individual authentication via a network by using electronic information that is easily tampered, easily leaks out, and is easily stolen.

Means to Solve the Problems

In order to achieve the above object, according to the present invention, there is provided an authentication system including a plurality of servers each equipped with a database for managing individual information on registered people to be authenticated, and a plurality of information input devices to be operated by the registered people connected to the servers via a communication line network, wherein the information input devices send movement information including information input by the registered people to the servers, and the servers, on receiving the movement information from the information input devices, on the basis of the received movement information, and the individual information in the database, perform authentication of the existence of the registered people.

Further, according to of the present invention, there is provided an authentication system wherein the servers collate the received movement information, and the individual information in the database, and at match of the above, send permission information to permit the information input devices to perform a specified action, to the information input devices, and the information input devices, on receiving the permission information, perform the specified action.

Furthermore, according to the present invention, there is provided an authentication system wherein the movement information includes position information showing the installation position of the information input device of the movement information sending source, temporal information showing the time at which information is input by registered people, and individual identification IDs peculiar to the registered people, and the servers, on receiving a plurality of movement information including identical individual identification IDs, on the basis of the information input place and time of the registered people that the received movement information shows, perform continuous authentication of the existence of the registered people.

Moreover, according to the present invention, there is provided an authentication system wherein the servers and the information input devices send the movement information on the basis of transfer routes of the registered people.

Further, according to the present invention, there is provided an authentication system wherein the information input devices are equipped with a database for managing individual information, and when information is input by the registered people, collate the input information, and the individual information in the database, and at match of the above, perform a specified action.

Furthermore, according to the present invention, there is provided an authentication system wherein the servers include a management server for managing the information input devices collectively in unit of building structure, transfer means, facility, region or organization, and an authentication server equipped with a database for totally managing the information in the database of the management server.

Moreover, according to the present invention, there is provided an authentication system wherein the authentication system has a plurality of units including at least one authentication server and a communication line network for connecting information input devices and terminals, and the authentication server controls rejection of the specified action by the information input devices, in unit of the units.

Further, according to the present invention, there is provided an authentication system wherein the authentication server, on receiving the movement information from the information input device, sends control information for limiting or prohibiting the specified action of the information input device, to the information input devices installed in other units than the unit to which the information input device belongs.

Furthermore, according to the present invention, there is provided an authentication system wherein the authentication server, after receiving the movement information from the information input device, on receiving the movement information including identical individual identification IDs, sent from the information input devices in other units than the unit to which the information input device belongs, sends control information for limiting or prohibiting the specified action by the information input device to the registered people specified by the individual identification IDs, to the information input device.

Moreover, according to the present invention, there is provided an authentication system wherein the authentication server, on receiving the movement information from the information input device, sends control information for deleting the movement information, to the information input devices and the management servers in other units than the unit to which the information input device belongs, to the information input device.

Further, according to the present invention, there is provided an authentication system wherein the authentication server, on receiving the movement information from the information input device, sends control information for limiting or prohibiting the specified action by the information input device, to the information input devices installed in the unit to which the information input device belongs.

Furthermore, according to the present invention, there is provided an authentication system wherein the authentication server accumulates the received movement information, and on receiving the movement information from the information input device, on the basis of the installation positions of those skilled in the art information input devices of the sending source, and the accumulated movement information, forecasts the transfer route of the registered people, and sends control information for performing an execution preparation of a specified action, to the information input devices installed on the forecasted transfer route.

Moreover, according to the present invention, there is provided an authentication system wherein the authentication server, on receiving movement information including information showing destination of transfer means that the registered people use, and receiving the movement information from the information input devices related to the transfer means, sends control information for performing an execution preparation of a specified action, to the information input devices related to the destination.

Further, according to the present invention, there is provided an authentication system wherein the authentication server, on receiving the movement information sent from the information input device installed out of the forecasted transfer route, sends control information for limiting or prohibiting the specified action by the information input device, to the information input device.

Furthermore, according to the present invention, there is provided an authentication system wherein the servers and the information input devices have preset order of sending destinations of received or input information, and at failure of sending the received or input information, send the received or input information to the sending destination of the next order of the failed sending destination.

Moreover, according to the present invention, there is provided an authentication system wherein the authentication action, by collation of the biometrics information of registered people included in the movement information, and the biometrics information managed by the database, authenticates the existence of the registered people.

Further, according to the present invention, there is provided an authentication system wherein the servers convert local identification IDs, and individual identification IDs used in a limited organization.

Furthermore, according to the present invention, there is provided an authentication system wherein the authentication system is managed by a financial organization, and the servers, on receiving the movement information from the information input device, perform authentication on the basis of the received movement information, and at success of the authentication, send permission information to permit the execution of financial transaction or settlement transaction, to the information input device.

Moreover, according to the present invention, there is provided an authentication system wherein the servers, on receiving the movement information from the information input device, perform authentication on the basis of the received movement information, and at success of the authentication, send information to recognize that a public identification card has been presented, to the information input device.

Further, according to the present invention, there is provided an authentication system wherein in the case of a temporal disconnection of network in the authentication system, the information input devices send a signal to check whether connection is available at present to the servers and other information input devices that have been connectable with own device, and establish network with the servers or other information input devices with which connection is available.

Furthermore, according to the present invention, there is provided an authentication system wherein the information input devices store list information showing the servers and other information input devices that are connectable with own device, and on the list information shows connection priority order, and the information input devices, in the case of a temporal disconnection of network in the authentication system, send a signal to check in accordance with the priority order and establish network.

Meanwhile, any combination of the above structural elements, and any structural element and expression of the present invention may be replaced mutually among method, apparatus, authentication system, computer program, recording medium storing computer program and the like, as effective aspects of the present invention.

Effects of the Invention

The authentication system according to the present invention is a system that has a plurality of terminals, and on the basis of individual information of registered people input via the terminals, performs authentication of registered people, wherein in response to physical transfer of registered people, the storage positions of individual information of registered people transfer in the authentication system, and it is difficult for other third party than registered people to identify storage positions of individual information of the registered person, and accordingly, it is possible to prevent the individual information of registered people from being tampered, leaked out and stolen by such a third party, and easily find an unauthorized act to improve the security in a system by performing authentication.

BEST MODE FOR CARRYING OUT THE INVENTION

Basic Principle

FIG. 1 is a figure showing the basic structural principle of an authentication system according to an embodiment of the present invention.

Hereinafter, with reference to this figure, the basic structural principle and the basic action principle of an authentication system according to the present embodiment are explained.

First, the basic structural principle of this authentication system is explained.

As shown in the figure, the authentication system is structured to have an authentication server 1, management servers 2, and individual information input devices 3.

In the authentication server 1, a database for managing individual information of registered people to be authenticated is installed. And, this authentication server 1 is connected to a plurality of management servers via a communication line network, and collates the individual information transmitted from the individual information input devices 3 via management servers 2 with the individual information in the database, thereby authenticates the existence of the registered people.

The management server 2 is an information processor that manages the individual information input devices 3 collectively in unit of specified building structure, organization or region, such as for example home of the registered person, school, Tokyo and the like, and is connected via communication line network with the plurality of individual information input devices 3 collected in the unit.

Further, the management server 2 also has the above database of individual information is installed, and collates the individual information received from the individual information input devices 3 with the individual information in the database, thereby authenticates the existence of the registered people.

The individual information input device 3 is a device installed everywhere in living space of registered people, such as a door, road, or station ticket wicket and the like, and inputs (reads) individual information of registered people such as biometrics information and the like, and sends this individual information to the management server 2.

Next, the basic action principle of this authentication system is explained.

When the registered person touches the individual information input device 3 to input (make the device read) biometrics information such as fingerprint and the like, the individual information input device 3 sends this input biometrics information to the authentication server 1 and the management servers 2, and the authentication server 1 and the management servers 2 collate the transmitted biometrics information, with the biometrics information in the data bases premanaged respectively.

As the result of collation, in the case of match of both of the biometrics information, access to the authentication system by the registered person is permitted, and the individual information input device 3 performs a specified action, and provides specified services to the registered person.

Thus, in the authentication system according to the present embodiment, individual authentication of the registered person is performed, and only when the authentication succeeds, the specified action is made to the registered person, and accordingly it is possible to improve the security of the environment around the registered person.

Further, when the individual information input device 3 reads the biometrics information of the registered person, it sends the read biometrics information together with the installation place of own device and information of reading time to the management servers 2 and the authentication server 1.

The authentication server 1 and the management servers 2 stores information showing the place and the time at which the biometrics information of the registered person is read to own databases respectively, and use the information for the authentication of the existence of the registered person thereafter.

For example, in the case when information showing that biometrics information is read at home at 17:00 is stored in the database, if at 17:05 of the same day, biometrics information of the same registered person is read by the individual information input device 3 at the position 100 km away from the home, and is sent to the management servers 2 and the authentication server 1, the authentication server 1 and the management servers 2 supposes that this biometrics information may have been read illegally, and thereafter, send control information for limiting or prohibiting the actions of opening the door key and the like by the biometrics information of the registered person to the individual information input device 3.

Meanwhile, to the individual information input device 3 too, the above database of individual information may be installed, and in this case, the individual information input device 3 may collate the biometrics information in the database, with the input biometrics information, and perform the individual authentication of the registered person by itself.

Thus, the authentication system performs temporal/spatial authentication, in addition to the match/mismatch of biometrics information, and thereby it is possible to improve the authenticity precision of existence of a registered person.

<Explanations on Basic Structure and Basic Action of Authentication System>

Hereinafter, before explanation of respective embodiments, the basic structure and basic action of the authentication system according to the present embodiment are explained separately in the following items.

Basic structure of the authentication system
Common features of respective terminals structuring the authentication system
Basic information of respective terminals
Structure example of database of respective terminals
Individual authentication processing by terminals (Basic Structure of Authentication System: Entire Structure)

FIG. 2 is a block diagram showing the skeleton framework of the authentication system according to the embodiment of the present invention.

As shown in the figure, the authentication system is structured to have an authentication system server 10 that manages history information of the registered person, a building structure side terminal 110 that totally manages terminals installed in a building structure such as an apartment and the like, an organization side terminal 120 that totally manages terminals installed in an organization such as an administrative organ and the like, an area management side terminal 130 that totally manages terminals installed in an area such as 1-chome, somewhat-cho, a relay side terminal 140 that totally manages terminals not totally controlled by these respective terminals 110, 120, 130 in a mutually complementary manner, an aggregation side terminal 150 that totally manages these respective terminals 110, 120, 130, 140, an end side terminal 160 that is installed in activity range of the registered person and performs authentication of the registered person, and an external organization server 300 that is a backup server of the authentication system server 10, which are connected via a communication line network 200.

These respective terminals are divided according to applications and installation positions and the like, but hereinafter, the expression "respective terminals" means all of these respective terminals 110, 120, 130, 140, 150, 160, unless otherwise specified.

(Basic Structure of Authentication System: Authentication System Server 10)

The authentication system server 10 is a server device that is managed and operated by a management organization for managing individual information of users. This authentication system server 10 has a function to perform authentication of the registered person on the history information, and a database (DB) 11 for recording and managing individual history information of respective users. Details of the management structure in this comprehensive DB 11 are described later herein.

(Basic Structure of Authentication System: External Organization Server 300)

The external organization server 300 is a server device that is managed and operated by other organization than the management organization for managing the authentication system server 10. This external organization server 300 has a function to act for the function of the authentication system server 10, and perform authentication of the registered person, on the basis of the history information, and has a database (DB) 311 for recording and managing or backup storing the history information of each individual. Details of the management structure in this DB 311 are described later herein.

(Basic Structure of Authentication System: Aggregation Side Terminal 150)

To these servers 10, 300, via a communication line network 200 as the network of internet, line communication line network, radio communication line network, terrestrial digital wave, infrared ray and the like, the aggregation side terminal 150 is connected.

This aggregation side terminal 150 is a sub server device installed to connect the authentication system servers 10, 300, the building structure side terminal 100, the organization side terminal 120, the area management side terminal 130 and the relay side terminal 140, via the communication line network 200.

This aggregation side terminal 150 has a function to act for the function of the authentication system server 10, and perform authentication of the user, on the basis of the history information, and has a database (DB) 151 for recording and managing or backup storing the history information of each user. Details of the management structure of this DB 151 are described later herein.

Further, a plurality of aggregation side terminals 150 may be installed between the authentication system server 10 and the building structure side terminal 110, the organization side terminal 120, the area management side terminal 130, the relay side terminal 140. In this case, from viewpoint of connection route, terminals directly connected to the authentication system server 10 are made upper level terminals.

Furthermore, to the aggregation side terminal 150, terminal device for totally managing the end side terminals 160 is connected via the communication line network 200.

As the terminals devices connected to this aggregation side terminal 150, according to the unit of the total management, there are the building structure side terminal 110, the organization side terminal 120, the area management side terminal 130, and the relay side terminal 140.

(Basic Structure of Authentication System: Building Structure Side Terminal 110)

The building structure side terminal 110 is a sub server device installed for totally managing the end side terminals 160 installed in the building structure inside or at the peripheral thereof per building structure. This building structure side terminal 110 has a function to act for the function of the authentication system server 10 or the aggregation side terminal 150, and perform authentication of the user, on the basis of the history information, and has a total database (DB) 111 for recording and managing the history information of each individual. Details of the management structure in this comprehensive DB 111 are described later herein.

Further, the total management unit of the end side terminals 160 by the building structure side terminal 110 may be divided in building structure, and may be structured in unit of school room, independent division unit of apartment, in unit of persons in building group, floor.

For example, as users of the building structure side terminal 110, management organizations of school, apartment, building, hospital, airport, station and the like may be listed up.

(Basic Structure of Authentication System: Organization Side Terminal 120)

The organization side terminal 120 is a sub server device installed for totally managing the end side terminals 160 used by school, company, public organs or optional group and the like using database. This organization side terminal 120 has a function to act for the function of the authentication system server 10 or the aggregation side terminal 150, and perform authentication of the registered person, on the basis of the history information, and has a database (DB) 121 for recording and managing the history information of each individual. Details of the management structure in this DB 121 are described later herein.

For example, as users of the organization side terminal 120, school class, department, entire company or branch/department, local government or government agencies such as Foreign Ministry and the like, hobby circle and the like may be listed up.

Furthermore, when the end side terminals 160 are used in business actions made by various management groups, various transactions or free/charged services, per those various actions, respective transactions or respective services, the end side terminals 160 used therein are divided into groups, and per group, the organization side terminal 120 may totally manage the end side terminals 160.

For example, the organization side terminal 120 that totally manages the end side terminals 160 used in credit services, stores individual information of the registered person concerning the credit services, in each unit of card kinds in credit card issuing company, customer card kinds in shops and the like.

(Basic Structure of Authentication System: Area Management Side Terminal 130)

The area management side terminal 130 is a sub server device installed for totally managing the end side terminals 160 installed per government unit of prefecture, city or town and the like. This area management side terminal 130 has a function to act for the function of the authentication system server 10 or the aggregation side terminal 150, and perform authentication of the registered person, on the basis of the history information, and has a database (DB) 131 for recording and managing the history information of each individual. Details of the management structure in this DB 131 are described later herein.

For example, this area management side terminal 130 totally manages the end side terminals 160 installed in specified areas as shown below.

A specified area entangled by two respectively different longitudes and two respectively different latitudes A specified area specified in circular or rectangular shape with one point on the earth as its central point A specified area specified on the earth in a cone shape with one point in the space as its apex (Basic Structure of Authentication System: Relay Side Terminal 140)

The relay side terminal 140 is a sub server device installed for controlling and managing the end side terminals 160 that are not connected directly with the building side terminal 110, the organization side terminal 120 or the area management side terminal 130. This relay side terminal 140 has a function to act for the function of the authentication system server 10 or the aggregation side terminal 150, and perform authentication of the registered person, on the basis of the history information, and has a database (DB) 141 for recording and managing the history information of each individual. Details of management structure in this DB 141 are described later herein.

However, the authentication system server 10 and the building side terminal 110, the organization side terminal 120, the area management side terminal 130, and the relay side terminal 140 may be connected directly, without intervention of the aggregation side terminal 150 in some cases.

(Basic Structure of Authentication System: End Side Terminal 160)

The end side terminal 160 is an information processor installed in daily activity range of registered person and the like, and building, organization and area where people gather and depart, and has a function to read biometrics information of the registered individuals and information of certificates such as passport and driver's certificate and the like, and perform authentication of rightfulness of the registered person. Accordingly, the end side terminal 160 has also the function as an information input device.

Further, it is preferable that the end side terminal 160 has a function to judge whether certificate is real or false (presence or absence of counterfeit) in reading certificate such as for example passport.

This end side terminal 160, when authentication of Individual information of registered person succeeds, provides various services including use permission of electronic money, opening of key, lighting the illumination, issuing of documents or provision of information and the like. Hereinafter, as the result of authentication, for the registered person to receive various services from this end side terminal 160 and the like is referred to as "to use terminal".

The end side terminal 160 registers the history information showing that this authentication has been made to its own terminal.

Further, the registered person can register its own individual information by use of this end side terminal 160, and can browse the registered individual information and the above history information. Furthermore, the end side terminal 160 has a function to send and receive these registered individual information and history information with other terminals and servers. Moreover, the end side terminal 160 has a function to perform authentication of the registered person on the basis of the history information.

Still further, the end side terminal 160 has a database (comprehensive DB 161) for recording and managing the history information of respective individuals. Details of the management structure in this DB 161 are described later herein.

Furthermore, the authentication system server 10, the building structure side terminal 110, the organization side terminal 120, the area management side terminal 130, the relay side terminal 140, and the aggregation side terminal 150 may not necessarily store the history information received from this end side terminal 160 to the comprehensive DBs 11, 111, 121, 131, 141 or 151, but may store the history information input from input devices such as a keyboard or a scanner or the like directly to the comprehensive DBs 11, 111, 121, 131, 141 or 151.

(Basic Structure of Authentication System: Definitions of Upper Level and Lower Level)

FIG. 3 is a block diagram showing the simplified structure of the authentication system according to the present embodiment. Herein, with reference to the figure, the definitions of the upper level terminal and the lower level terminal in the authentication system are explained.

As shown in the figure, to the authentication system server 10, an aggregation side terminal 150B is connected, and an aggregation side terminal 150A is connected to the aggregation side terminal 150B. Further, to this aggregation side terminal 150A, the building structure side terminal 110 and the organization side terminal 120 are connected. Furthermore, to the building structure side terminal 110 and the organization side terminal 120, a plurality of end side terminals 160 are connected respectively.

In the route connected from such respective terminals to the authentication system server 10, the authentication system server 10 is made the most upper level terminal, and the end side terminal 160 is made the most lower level terminal. With regard to the respective terminals existing on this route, with the terminal concerned as standard, terminals connected to line network connected to the authentication system server 10 side are upper level terminals, and terminals connected to line network connected to the end side terminal 160 side are lower level terminals.

In the example in this figure, the authentication system server 10 is the most upper level terminal, and the end side terminal 160 is the most lower level terminal. Further, with the aggregation side terminal 150A at center, the aggregation side terminal 150B is the upper level terminal, and the building structure side terminal 110 and the organization side terminal 120 are lower level terminals.

Meanwhile, the external organization server 300 is positioned at the upper level of the aggregation side terminal 150, in the same manner as the authentication system server 10.

(Basic Structure of Authentication System: Terminals Added to the Above Structure)

Moreover, the authentication system may be structured to have, in addition to the above structural components, a user terminal 20 for the registered person to browse its own individual information and the like, a browse request side terminal 30 for other people than the registered person to browse the individual information of the registered person, a registration request side terminal 40 for other people than the registered person to register the individual information of the registered person, an existence judgment request side terminal 50 for the person who judges the existence of the registered person by itself to ask for grounds necessary for the judgment to the management organization side, an existence authentication request side terminal 60 to be operated by the person who asks for authentication of existence of the registered person individual to the management organization, an information rightfulness authentication request side terminal 70 to be operated by the person who asks for the judgment of rightfulness of the individual information presented from the registered person to the management organization side, and a confirmation destination side terminal 80 to be operated by issuing organization of identification certificate of the registered person and the like.

The authentication system according to the embodiment of the present invention is structured of the above structural components, however, in the respective embodiments described later herein, the authentication system is selectively structured by the structural components thereof.

Further, the building structure side terminal 110, the organization side terminal 120, the area management side terminal 130, and the relay side terminal 140 are collectively referred to as sub servers hereinafter.

(Common Features of Respective Terminals)

Herein, the features common to the above respective terminals are explained.

(Common Features of Respective Terminals: Storing and Sending the Installation Place Information of Own Terminal)

Each terminal has a database to store spatial information of its own terminal installation and information of peculiar identification of own terminal (hereinafter, own spatial information DB 401), and a database to store spatial information of other terminal installation with close relation with own terminal and peculiar identification of other terminals (hereinafter, related spatial information DB 402).

FIG. 4 is a block diagram of skeleton framework showing an example of the database in the building structure terminal 110.

As shown in the figure, the building structure side terminal 110 manages the comprehensive DB 111, the own spatial information DB 401, and the related spatial information DB 402.

Among these, the comprehensive DB 111 stores individual information handled by the terminal concerned. While on the other hand, the own spatial information DB 401 stores information showing the installation place of the building structure side terminal 110, and the related spatial information DB 402 stores information showing the installation place of terminals connected to the building structure side terminal 110 via network respectively.

Meanwhile, according to information amount, the own spatial information DB 401 and the related spatial information DB 402 may be integrated and an authentication system may be structured.

FIG. 5 is a figure showing an example of information stored in the own spatial information DB 401 and the related spatial information DB 402 in the building structure side terminal 110.

In the related spatial information DB 402, identification information of all the terminals and servers installed in a space (place) is corresponded mutually and is structured integrally.

Further, in this related spatial information DB 402, identification information of this building structure side terminal 110, and identification information of upper level and lower level terminals where information is sent and received with the building structure side terminal 110 are corresponded mutually and managed.

However, in the case where there is room in the information storage amount of this related spatial information DB 402, detailed information may be stored in structure according to the own spatial information DB 401.

Each terminal has a function to send the individual information of the registered person, the authentication result information of individual authentication of the registered person, and the authentication information of the registered person, to the authentication system server 10 and other terminals.

At this moment, each terminal related the sent information to the above own terminal installation position information and terminal identification ID and sends the information.

Thereby, it is possible to easily determine the sending source of information moving in the authentication system. Further, the sent information of the installation position information and terminal identification ID may be used as internet address for easily sending and receiving information.

(Common Features of Respective Terminals: Setting Own Use Purpose)

Further, in addition to the function to perform authentication of the registered person, and send and receive the authentication result and individual information of the registered person, each terminal may have other multiple functions, and may be applied to a plurality of use purposes.

Hereinafter, the cases where each terminal has peculiar functions in addition to sending and receiving information and authentication and the like are explained.

FIG. 6 is a figure showing an image where in the embodiment of the present invention, the building structure side terminal 110 and the end side terminal 160 are installed in a building structure.

In the example shown in the figure, the building structure side terminal 110 is installed in a specified position in the building structure, and the end side terminal 160A, 160B, 160C are installed in respective portions of the building structure.

Among these, the end side terminal 160C is installed in an illumination apparatus, and has a function to manage turning ON/OFF the illumination.

Further, the end side terminal 160A is installed in a door knob out of the entrance, and the end side terminal 160B is installed in the position of a door knob inside of the entrance. These end side terminals 160A, 160B are equipped with a function to manage to lock and unlock the key of the installed door, biometrics information function, and a function to send information to instruct the end side terminal 160C to turn ON/OFF the illumination.

FIG. 7 is a figure showing an example of installation purposes and concrete action of each terminal as the embodiment of the present invention.

As shown in the figure, for example, the end side terminal 160A is installed in a door knob outside of the entrance, and when the registered person enters the building structure and grips the door knob outside of the entrance, it performs authentication, and judges whether to unlock the door key and permit the person to enter the room.

Further, on assumption of the case when the person comes home at night, ON instruction information may be sent to the end side terminal 160C by action of "at home", action to automatically turn on the room light may be additionally set. Furthermore, as other effect, it may be used for showing that the person is at home or around home at reading time, so-called alibi proof.

Thus, by adding a plurality of purposes to one terminal, it is possible to improve the convenience of terminals.

To each terminal, purposes for using the terminal, and the existence meaning of the terminal are defined. Thereby, it is easily made to concretely determine people whose are thought to use the terminal and the number of people.

Further, in databases of different use purposes, like the database for managing electronic money, and the database for managing opening/closing of the door. the structures, data formats and capacities are different. As mentioned previously, by specifying terminal use purposes, it is possible to make easy the examinations on the method and capacity of databases installed inside and outside of these terminals, and further, it is possible to make easy the examinations of the installation place of each terminal, installation device, safety management and purposes and the like.

(Basic Information of Respective Terminals)

To the above respective terminals, the following basic information is stored.

(1) Installation position information
(2) Identification information
(3) Traffic organization information
(4) Terminal distance information
(5) Installation management information
(6) Terminal reliance information Herein, the respective basic information (1) to (6) that these respective terminals store is explained.

(Basic Information of Respective Terminals: 1. Installation Position Information)

Each terminal stores installation position information showing the position where the own terminal is installed.

This installation position information may be 2-dimensional or 3-dimensional information of the position where the information terminal is actually installed, or may show the name of installation position.

This 2-dimensional information is expressed by degrees of latitude and degrees of longitude, and the 3-dimensional information means spatial recognition information expressed by in addition of the degrees of latitude and the degrees of longitude, height from the ground or depth in the ground.

Furthermore, as examples showing names of installation positions, in addition to a fixed installation position like "XX building 6F", for example, there are ones with ever changing installation positions and latitude like airplane, helicopter, electric train, train, automobile, elevator, escalator and the like. For example, in this case, the installation position information is shows as "right door of passengers of airplane with airframe number 123 of type XX manufactured by XX possessed XX Airline".

Meanwhile, in the case when position information identification authentication systems represented by a GPS authentication system and a flight recorder are available, the installation position information may be expressed by information formats specified in those position information identification authentication systems.

Further, the height from the ground and the depth in the ground are not necessarily expressed in the metric system. For example, in the case of installation in a building structure, height levels such as the second floor, third floor, the first basement level of the building structure and the like may be recognized too.

The height from the ground and the depth in the ground may be ones measured from the ground surface at the ground point. However, in the case when the ground point is at or at the vicinity of a reference point of the Geographical Survey Institute, and comparison with the height above sea level can be made easily, the expression of the height above sea level may be used.

In the examples explained above, each terminal stores information showing its own installation position in itself, meanwhile, a device that can recognize the present position such as GPS or the like may be installed in the information terminal, and the device may recognize the present position (2-dimensional/3-dimensional information or circumstances of the installation position).

(Basic Information of Respective Terminals: 2. Terminal Identification ID)

Moreover, to each terminal, peculiar identification information to specify the terminal itself is allotted, and each terminal stores its own terminal identification ID.

This identification information may be a character string of several digits like a general identification ID or identification number. Further, it is preferable that to this identification information, in addition, names of installation places and concrete explanations are given. In particular, in the case of a terminal installed at one point expressed by same degrees of latitude and degrees of longitude, it is preferable that identification information is added to installation height degree and installation purposes, and clear terminal specification is made.

Moreover, FIG. 8 is a figure showing an example of the setting method of terminal identification ID in the embodiment of the present invention, and (a) shows the setting method when to show details of the terminal identification ID, and (b) shows the setting method when to show the terminal identification ID briefly.

In the case shown in details in (a), numbers are given according to terminal installation places like "Tokyo=13", "Itabashi-ku=21", . . . , and by combining the combination of these numbers further with peculiar numbers, terminal identification IDs of the respective terminals are set.

On the other hand, in the case of simplifier (b), common portions (for example, heading numeric several digits) of terminal identification IDs are replaced with other numeric values or characters, and thereby terminal identification IDs of the respective terminals are set.

Thus, by decreasing the number of characters included in identification ID, there are an effect to reduce the total amount of information in each terminal, and an effect to reduce the load of data processing.

Meanwhile, when to send and receive information to other terminal, this replacement portion is made back to original or additional information processing to recognize replaced information and the like are carried out, and thereby an authorization system condition for every terminal to recognize is secured.

Meanwhile, in the case when to each terminal, u-code (ubiquitous ID) issued by for example ubiquitous ID center is given, the u-code (ubiquitous ID) may be used as peculiar identification information.

In this case, the management place of identification number and installation position information and the like of the terminal may be made u-code solution database installed in u-code solution server managed by ubiquitous ID center.

(Basic Information of Respective Terminals: 3. Traffic Organization Information)

Further, each terminal stores traffic organization information showing the conditions of traffic organizations around the installation positions. For example, as those registered as traffic organization information, there are the followings.

1. Kind, use method of optimal traffic organization for person who uses this terminal
2. Kind, use method of easily selectable traffic organization for person who uses this terminal
3. Station name of nearest station and bus stop and the like
Distance to nearest station and bus stop and the like
Movement method to nearest station and bus stop and the like, and required time in the method
in the above 1 or 2

(Basic Information of Respective Terminals: 4. Terminal Distance Information)

Among the end side terminals 160, those installed in places with many visitors such as a station, department store or ward office and the like, or building structure or place to become landmark are recognized as "main terminals". Each main terminal stores information showing the distance between main terminals. Further, the end side terminals 160 other than the main terminals store information showing the distance to these main terminals.

For example, those registered as the distance information, there are the followings.

1. Information of measured straight line distance in spatial information
2. Information of measured straight line distance in 2-dimensional information obtained by projecting 3-dimensional information onto a plane
3. Information of measurement on the basis of length, height and the like of real road installation conditions, building structure and structures between terminals (Basic Information of Respective Terminals: 5. Installation Management Information)

Furthermore, each terminal stores installation management information including date and time of installation of the terminal or date and time of operation start, and information to specify the installer or manager.

The installer or manager herein includes not only corporate or individuals that own terminal formally, but also workers who are in charge of real installation work and install the terminal at specified space. Meanwhile, in the case where plural people carry out the installation process, information to specify all the plural people is recorded as installation management information.

Moreover, at necessity, information to grasp related people such as person who has developed the terminal, person who has manufactured it or person who has transferred it and the like may be stored.

(Basic Information of Respective Terminals: 6. Terminal Reliance Information)

Each terminal stores terminal reliance information in consideration of degree of existence of the installer and manager, and social reliance of belonging or related group.

The social reliance of belonging or related group herein is rating at a certain rate of numeric values calculated by points allotted to items of capital, sales, business category, listed or not, government or not and the like.

For example, in the case belonging to highly public groups such as the Ministry of Land, Infrastructure and Transport and the Ministry of Foreign Affairs and the like, points increase, and in the case where belonging group cannot be confirmed, points decrease.

Thereby, it is possible to easily judge the safety of terminals.

(Basic Information of Respective Terminals: Concrete Examples)

FIG. 9 is a figure showing examples of respective basic information stored in the above respective terminals, and in (a) to (c), their concrete examples are shown. The information is stored in the respective terminals, and sent to other terminals and servers at the moment of authentication of the registered person and the like.

In examples 1 to 3 shown in this figure, as various information concerning the terminal, terminal identification ID of respective terminals, installation date and time, installer, installation position (latitude, longitude, altitude, building structure and apparatus of installation) and the like are shown respectively.

Meanwhile, as shown in example 3, when companies and individuals related to the terminal ate registered as installation management information, they may be registered not by names of the companies and individuals, but by identification IDs to specify the companies and individuals.

Thus, by storing information showing the installer and manager of terminal in information terminal, it is possible to easily grasp the related people and locus of responsibility concerning installed terminal.

That is, for example, even if an unauthorized program is assembled into information terminal at the stage of development, or replacement with unauthorized other terminal is made at installation construction stage, when the use of terminal is started in authentication system, by inspecting the installation control information of the terminal, it is possible to easily clarify the locus of responsibility of these unauthorized processes.

Further, for example, in the case where the related people names shown in the installation management information and the people names listed in the installation construction plan are different, there may be a possibility of unauthorized act, and the unauthorized portion can be corrected before the start of use of the information terminal.

Furthermore, when unauthorized act of a person is found, the terminals related to the person can be grasped at instance, and the unauthorized portion of the terminal can be corrected, and measures necessary to make damage minimum can be taken rapidly.

Meanwhile, when the existence of installer or manager of information terminal is proved by specified organization, it is preferable that each terminal stores individual identification ID issued to the person whose existence is proved by the organization, or information for linking to database storing information of the person whose existence is proved.

On the other hand, when information concerning the installer and manager of the information terminal whose existence is proved is stored in the comprehensive DB 11 of the authentication system server 10, it is preferable that each terminal stores individual identification IDs of the installer and manager, and information for linking to the comprehensive DB 11.

(Explanation of Structure Example of Database)

Hereinafter, first through fourth structure examples of databases installed in respective terminals and servers are explained sequentially.

(Structure Example of First Database: Entire Structure Example)

FIG. 10 is a figure showing the structure example of a first database of authentication system according to the embodiment of the present invention. In this figure, schematic structures of comprehensive DBs 11, 111, 121, 131, 141, 151, 161 installed in respective terminals are shown.

As shown in the figure, the comprehensive DB 11 is structured of a history information DB 12, a validation information DB 13, a basic information DB 14, and an availability information DB 15.

Meanwhile, hereinafter, information in the database that the authentication system 10 can manage is referred to as individual information.

Among these, the history information DB 12 is a database to store information concerning individual history. Further, the validation information DB 13 is a database to store information concerning processes on validation of existence of individual or rightfulness of individual information, execution contents, evidence, witness and the like. Furthermore, the basic information DB 14 is a database to store basic Information of individual information. Moreover, the availability information DB 15 is a database to store information to determine the condition of action progress after authentication on the basis of authentication result of the registered person.

Hereinafter in the same manner, the comprehensive DB 111 is structured of a history information DB 112, a validation information DB 113, a basic information DB 114, and an availability information DB 115.

The comprehensive DB 121 is structured of a history information DB 122, a validation information DB 123, a basic information DB 124, and an availability information DB 125.

The comprehensive DB 131 is structured of a history information DB 132, a validation information DB 133, a basic information DB 134, and an availability information DB 135.

The comprehensive DB 141 is structured of a history information DB 142, a validation information DB 143, a basic information DB 144, and an availability information DB 145.

The comprehensive DB 151 is structured of a history information DB 152, a validation information DB 153, a basic information DB 154, and an availability information DB 155.

The comprehensive DB 161 is structured of a history information DB 162, a validation information DB 163, a basic information DB 164, and an availability information DB 165.

It is preferable that the history information DB, the validation information DB, the basic information DB and the availability information DB manage the information of the registered person by information folder per individual. Meanwhile, when there is no information to be stored into the respective comprehensive DBs, the information DB may not be installed in the terminal.

The comprehensive DBs 11, 111, 121, 131, 141, 151, 161, in the case when information to be registered or used is in common or limited among the registered people, without arranging individual folder, the structure itself of DB may be simplified so that one common DB is used.

The history information DBs 12, 112, 122, 132, 142, 152, 162 have a specified column to store all of activity data registered by the registered person individual, money data, education history, job history, activity history, biometrics information and the like. Further in this, there is a portion to store the history of information registration, browse request, authentication request, rightfulness request or rightfulness answer and the like executed by the user terminal 20, the browsing request side terminal 30, the registration request side terminal 40, the existence judgment request side terminal 50, the existence authentication request side terminal 60, the information rightfulness authentication request side terminal 70, the confirmation destination side terminal 80, the building structure side terminal 110, the organization side terminal 120, the area management side terminal 130, the relay side terminal 140, the aggregation side terminal 150, and the end side terminal 160.

The validation information DBs 13, 113, 123, 133, 143, 153 or 163 replace video/audio of the authorization system server 10 of the management organization used for verifying the existence of registered person individual, the activity records of related people, conversation contents with related organization, evidence, witness and the like into electronic information and store it.

FIG. 11 is a figure showing an example of information installed and stored in the basic information DB 14.

As shown in the figure, the basic information DB 14 is information that has been judged to be latest information or base of individual information of registered person individual, among information stored in the history information DBs 12, 112, 122, 132, 142, 152, 162 and the validation information DBs 13, 113, 123, 133, 143, 153, 163, extracted from the respective databases to store. For example, as extracted information, general standard information of registered person of address, name, date of birth and the like, and main items such as present company information or latest qualification list and the like extracted as topics.

Further, in the same manner, the basic information DB 114 is information that has been judged to be latest information or base of individual information of registered person individual, among information stored in the history information DBs 12, 152, 112, 162 and the validation information DBs 13, 153, 113, 163, extracted from the respective databases to store.

Hereinafter, in the same manner, the basic information DB 124 is information of main items extracted as topics from the history information DBs 12, 152, 122, 162 and the validation information DBs 13, 153, 123, 163.

The basic information DB 134 is information of main items extracted as topics from the history information DBs 12, 152, 132, 162 and the validation information DBs 13, 153, 133, 143, 163.

The basic information DB 144 is information of main items extracted as topics from the history information DBs 12, 152, 142, 162 and the validation information DBs 13, 153, 143, 163.

The basic information DB 154 is information of main items extracted as topics from the history information DBs 12, 152, 112, 122, 142, 162 and the validation information DBs 13, 153, 113, 123, 133, 163.

The basic information DB 164 is information of main items extracted as topics from the history information DBs 12, 152, 112, 122, 132, 142, 162 and the validation information DBs 13, 153, 113, 123, 133, 143, 163.

The topic information managed by the basic information DB 14 are linked to detailed information managed by the history information DBs 12, 112, 122, 132, 142, 152, 162 or the validation information DBs 13, 113, 123, 133, 143, 153, 163. For example, when the topic information is displayed on the display of terminal, browse requester and the like click the topic to easily browse the detailed information corresponding to the topic.

In the same manner, the topic information managed by the basic information DB 114 are linked to detailed item managed by the history information DBs 12, 152, 112 or the validation information DBs 13, 153, 113, 163.

Hereinafter in the same manner, the topic information managed by the basic information DB 124 are linked to detailed item managed by the history information DBs 12, 152, 122, 162 and the validation information DBs 13, 153, 123, 163.

The topic information managed by the basic information DB 134 are linked to detailed item managed by the history information DBs 12, 152, 132, 162 and the validation information DBs 13, 153, 133, 163.

The topic information managed by the basic information DB 144 are linked to detailed item managed by the history information DBs 12, 152, 142, 162 and the validation information DBs 13, 153, 143, 163.

The topic information managed by the basic information DB 154 are linked to detailed item managed by the history information DBs 12, 152, 112, 122, 132, 142, 162 and the validation information DBs 13, 153, 113, 123, 133, 143, 163.

The topic information managed by the basic information DB 164 are linked to detailed item managed by the history information DBs 12, 152, 112, 122, 132, 142, 162 and the validation information DBs 13, 153, 113, 123, 133, 143, 163.

The availability information DBs 15, 115, 125, 135, 145, 155, 165 manage information to determine, instruct, control the action progress after authentication, on the basis of the authentication result of the registered person individual.

FIG. 12 is a figure showing an example of information stored in the availability information DB as the embodiment of the present invention. In the availability information DB, the authentication result is classified into the following three main topics.

(1) In the case when the identical person authentication is made, only person whose authentication succeeds is regarded as registered person individual, necessary information to proceed processes such as action, service use, authentication system operation or control release and the like provided by the end side terminal 160 (or system structure unit including the end side terminal 160) that the person who succeeds the authentication used for authentication is sent.

(2) In the case when the identical person authentication is not made, actions are made so that the person who has failed the authentication cannot continue operation of the end side terminal 160 (or system structure unit including the end side terminal 160) that the person used, and processes thereafter are stopped, and alarm information is sent to related organization.

(3) In the case when information sufficient for performing individual authentication cannot be read, instruction is made for the end side terminal 160 to execute the authentication process once again or information that there is read error or the like is sent.

(Structure Example of First Database: Data Structure Example of History Information DB)

For example, as the history information registered to the above history information DB, there are the following (1) to (20). Meanwhile, in principle, to all information, temporal information showing the date and time of occurrence of the information.

(1) Personal Data

The personal data is registered at user's own responsibility, and its main items are individual data including name, address, telephone number, cell phone number, mail address, date of birth and the like. Further, as its sub items, there are various optional items such as nearest station, hobby, religion, family structure, kindred, friends, blood type, profile and the like. Further, this personal data may one to show contents of passport, driver's certificate or basic resident register card and the like.

(2) Educational History Data

As the education history data, graduate certificates and education record certificates in kindergarten, nursery school, primary school, junior high school, senior high school, university, career college, graduate school and the like may be registered. Meanwhile, these graduate certificates and education record certificates as certificates of the education history data may be registered by use of scanner function.

(3) Qualification Data

As the qualification data, data such as acquisition year, acquisition number or registration number from national examination to public qualification may be registered.

(4) Job History Data

As the job history data, there are working company (address, belonging department and section, business category, capital, number of employees and the like), period, employment type, employ conditions, job contents (success story, failure story, acquired technology, level, post position and the like), and as sub items, detailed items such as company culture, human network (superior, inferior, transaction companies and the like), reasons for getting into job, quitting job, and changing jobs, comments (company, business field), future aims and the like.

(5) Biometrics Information

As the biometrics information, there are fingerprint, iris, voiceprint, retina, vein, gene, face outline and the like, and all concerning human biometrics information may be registered.

(6) Visual Data

Video, images, audio recording individual activities or combination information of these may be registered as data. This includes not only data recorded for specified individual, but also, for example, group photos of travels and documentary video of festivals, which is information to supplement the existence of registered person individual.

(7) Action Record Data

Detailed items showing start of action and result of application form, admission certificate, participation certificate, commendation certificate, participant list, participation data and the like may be registered.

(8) Money Data

Electronic money remaining value, and use history information (9) Account Data

Account remaining value of saving account, fixed deposit, investment trust, and the history information thereof.

Load remaining value of housing loan, card loan, current loans receivable, and the history information thereof.

Remaining value of stocks, securities (bond payable, government bonds and the like), and the history information thereof Number of precious metals (gold, platinum and the like), and the history information thereof Number of items handled by merchandise exchange (adzuki beans, soy beans, petroleum, sugar and the like), and the history information thereof Number of foreign currency exchange, option, derivative, and the like, and the history information thereof

(10) Credit Card

Remaining value of credit card, usable remaining value, and the history information thereof

(11) Point Data

Remaining value of various credit cards, remaining value of various mileage cards, and the history information thereof

(12) Key Data

Information to become authentication judgment materials such as key opening and closing, switch ON/OFF, acceptance and rejection of entrance and exit (entering room and exiting room), acceptance and rejection of process progress, acceptance and rejection of service start and the like

(13) Purchase Data

Purchase product name, user service name, and the history information thereof

(14) Activity Data

Information of daily activity of registered person, information collected by the organization side terminal 120, the area management side terminal 130, the relay side terminal 140, the aggregation side terminal 150 and the like, and the history information thereof

(15) Visit Data

Information of places visited, information obtained by the building structure side terminal 110, and the history information thereof

(16) Country Entry and Exit Data

Country entry and exit information by immigration and registration office and the like, visit place information, and the history information thereof

(17) Reserved Seat Data

Information of reserved seat and passenger ticket of airplane or train or bus or the like, information of tickets of concert or movie theater and the like, information on reservation activities with specified date and time and place in daily life, and the history information thereof

(18) Medical Data

Medical chart information, dosage information, inspection information, physical information, and the history information thereof

(19) Insurance Data

Life insurance, damage insurance, certificate of purchase or used goods, and the history information thereof

(20) Movement Information

This includes the following four points.

1. Spatial information (terminal identification ID allotted to terminal, identification number)

2. Individual identification ID of authentication objective person

3. Temporal information of period of authentication, or temporal information showing period of read/input of individual information (biometrics information)

4. Information showing "authenticated" as the result of existence authentication

(21) Other Data

Other Information Difficult to Judge its Classification Destination

The present authentication system is mainly for supporting entire human living affairs, the range of data is not limited to listed items.

(Structure Example of First Database: Storage Limitation of Information in terminal 1)

FIG. 13 is a figure showing a data structure example in comprehensive DB inside the embodiment of the present invention.

In this figure, as an example, data structure in the comprehensive DB 111 of the building structure side terminal 110 is shown.

As shown in the figure, in the comprehensive DB 111 of the building structure side terminal 110, only data concerning the latest information of address is stored, and the previous address information has been deleted. Thus, in the comprehensive DB of each terminal, not all of individual information arriving to the terminal is stored or displayed.

Normally, the history information is updated continuously, and updated old information may be moved periodically or at optional period to upper level server or database of terminal, and in the building structure side terminal 110, the organization side terminal 120, the area management side terminal 130, the relay side terminal 140, the aggregation side terminal 150 and the end side terminal 160, only the latest information may be displayed or managed.

(Structure Example of First Database: Storage Limitation of Information in Terminal 2)

FIG. 14 is a figure showing respective data structure examples of databases installed in two different terminals according to the embodiment of the present invention.

In the examples in this figure, data structures of the history information DBs 114A, 114B installed in the building structure side terminals 110A, 110B, respectively, whose roles (installation positions) are different are shown.

In comprehensive DBs of respective terminals, even with terminals having identical function, stored data are not necessarily same, but only information corresponding to the role of the terminal may be stored.

Each terminal has functions corresponding to its use purposes, and stores information of contents corresponding to its use purposes.

As shown in the figure, the history information DB 114A is installed at the building structure side terminal 110A installed at home of the registered person individual, and the history information DB 114B is installed at the building structure side terminal 110B installed at the building structure of working place of the registered person individual.

Further, peculiar information data to be stored in these building structure side terminals 114A, 114B shows biometrics information registered for operating the authentication system for opening and closing the key of entrance and exit of home or working place.

The peculiar information data stored to the history information DBs 114A, 114B is not necessarily same biometrics information, and, the basic information is not necessarily in common.

In each terminal in the present embodiment, only minimum necessary information for use of the role required to the terminal may be stored.

(Structure Example of First Database: Storage Limitation of Information in Terminal 3)

FIG. 15 is a figure showing respective data structure examples of databases installed in three different terminals according to the embodiment of the present invention.

In the examples in this figure, data structures of the history information DBs 114, 124, 154 installed in the building structure side terminal 110, the organization side terminal 120 and the aggregation side terminal 150, respectively.

In databases of respective terminals, with different kinds of terminals, stored data are not necessarily same, but only information corresponding to the role of the terminal may be stored.

In the example in this figure, the history information DB 114 is the database installed in the building structure side terminal 110 installed in building of school to which the registered person individual goes, and the peculiar information data stored in this history information DB 114 shows biometrics information registered for operating the authentication system for opening and closing the key of entrance and exit of school building.

Further, the history information DB 124 is the database installed in the organization side terminal 120 installed in any place in the school to which the registered person individual goes, and the peculiar information stored in this history information DB 124 shows information registered for using as school register.

Thus, in this example too, in each terminal in the present authorization system, only minimum necessary information for use of the role required to the terminal may be stored.

(Structure Example of Second Database: Entire Structure Example)

FIG. 16 is a figure showing the structure example of a second database of authentication system according to the embodiment of the present invention. In this figure, a structure example of database that the authentication server 10 manages is shown.

In the example in FIG. 10, DB 11 is structured of a history information DB 12, a validation information DB 13, a basic information DB 14, and an availability information DB 15. In addition, it has been explained that it is preferable that the history information DB 12, the validation information DB 13, the basic information DB 14 and the availability information DB 15 manage the information of the registered person by information folder per individual.

However, in this basic skeleton framework, as the number of registered people managed by the authentication system server 10 increases, the number of individual information folders increase in proportion therewith. Further, since the history information managed in each folder is accumulated, and it is supposed to become enormous. As the result, it may take a long time before collating read information in the authentication system server.

Furthermore, the availability information used in specified server and the end side terminal, by the result of identical person authentication may common in plural registered people. For example, in the case when the end side terminal 160 is installed at employee door of working place building structure, and used for availability to entrance to the building structure (availability of opening and closing the door), the availability information after authentication is entrance permission (opening the door) or entrance non permission (remaining the door closed), and common to all employees.

In the example shown in FIG. 16, the authentication system server 10 is equipped with a comprehensive DB 11, an availability information DB 15 and a search information DB 16 in parallel. Further, the comprehensive DB 11 is the database for recording and managing the history information of each individual, and is structured of a history information DB 12, a validation information DB 13, and a basic information DB 14.

Further, when the availability information DB 15 performs authentication of the registered person individual, in terminals positioned at the lower level viewed from this authentication system server 10, it stores and manages information to determine, instruct or control the action progress after the authentication on the basis of the authentication result, and also stores availability information common among plural registered people.

(Structure Example of Second Database: Features of Search Information DB)

Further, the search information DB 16 stores list information of all registered people extracted for simplifying the search of registered people, from all individual information registered in the authentication system server 10 or the terminals positioned at the lower level viewed from this authentication system server 10. Furthermore, in the search information DB 16, this list information is linked to individual folder in the comprehensive DB 11 and managed therein.

The authentication system server 10, in performing individual authentication of registered person, searches whether data read or input from terminal positioned at the lower level exists in the list information of the search information DB 16.

The authentication system server 10, when data corresponding to the search information DB 16 exists, refers to information in individual folder of link destination in the comprehensive DB 11, and performs authentication process.

On the other hand, when the corresponding data does not exist, the authentication system server 10 sends the read or input information to the aggregation side terminal 150, and authenticates the registered person individual or searches for the corresponding data, and request the authentication/search result to be sent. Moreover, when the corresponding data does not exist, the authentication system server 10 may send an answer of authentication unavailability to the terminal that reads or inputs information of the registered person.

Heretofore, the structure examples of the second database in the authentication system server 10 have been explained, and other terminals are also in the same structure.

That is, the building structure side terminal is equipped with a comprehensive DB 11, an availability information DB 115, and a search information DB 116 in parallel.

The organization side terminal 110 is equipped with a comprehensive DB 121, an availability information DB 125, and a search information DB 126 in parallel.

Further, the area management side terminal 130 is equipped with a comprehensive DB 131, an availability information DB 135, a search information DB 136 in parallel.

Furthermore, the relay side terminal 140 is equipped with a comprehensive DB 141, an availability information DB 145, and a search information DB 146 in parallel.

Moreover, the aggregation side terminal 150 is equipped with a comprehensive DB 151, an availability information DB 155, and a search information DB 156 in parallel.

Still further, the end side terminal 160 is equipped with a comprehensive DB 161, an availability information DB 165, and a search information DB 166 in parallel.

(Structure Example of Second Database: Data Structure Example of Search Information DB)

FIG. 17 (*a*) is a figure showing a structure example where end side terminals 160A, 160B, 160C are connected in parallel at the lower level of the building structure side terminal 110. Further, FIG. 17 (*b*) is a figure showing a data structure example of the search information DB 116 that the building structure side terminal 110 manages in this structure example.

Hereinafter, with reference to these figures, the data structure of the search information DB 116 in the case where the building structure side terminal 110 is installed in working place, and in the premises of the working place, end side terminal 160A to 160C operated by employees of the working place are installed is explained.

Herein, it is supposed that the end side terminal 160A is installed at the front entrance, and the end side terminal 160B is installed at the service entrance, and the end side terminal 160C is installed at the vault.

To the search information DB 116, information of respective items as shown in (b) in FIG. 17 is extracted from individual folder of the building structure side terminal 110 and terminals positioned at the lower level of the building structure side terminal 110, and classified and stored.

Individual identification ID: name of individual folder of registered people (employees), link information with the search information DB 116

Registered person name: name information of employee

Information 1: biometrics information for identical person confirmation, used for entrance and exit of the front entrance Information 2: biometrics information for identical person confirmation, used for entrance and exit of the service entrance Information 3: biometrics information for identical person confirmation, used for entrance and exit of the vault In (b) in FIG. 17, for example, basic information such as date of birth and address, and personnel information such as belonging department and section and post position are omitted. This is because, in this building structure side terminal 110, and in the end side terminals 160A to 160B connected to the building structure side terminal 110, database mainly for read and input information is configured, and information of low use frequency is omitted, and thereby the load at information search in database is reduced and optimized.

(Structure Example of Third Database)

FIG. 18 is a figure showing the structure example of a third database of authentication system according to the embodiment of the present invention. In this figure, a structure example of database that the building structure side terminal 110 manages is shown.

As shown in the figure, the building structure side terminal 110 is equipped with a comprehensive DB 111, and a temporary storage DB 117 that temporarily stores individual information read (input) by this building structure side terminal 110 or individual information received from other terminal in parallel.

Hereinafter, in the same manner, the authentication system server 10 is equipped therein with a comprehensive DB 11, and a temporary storage DB 17 in parallel.

The organization side terminal 120 is equipped with a comprehensive DB 121, and a temporary storage DB 127 in parallel.

The area management side terminal 130 is equipped with a comprehensive DB 131, and a temporary storage DB 137 in parallel.

The relay side terminal 140 is equipped with a comprehensive DB 141, and a temporary storage DB 147 in parallel.

The aggregation side terminal 150 is equipped with a comprehensive DB 151, and a temporary storage DB 157 in parallel.

The end side terminal 160 is equipped with a comprehensive DB 161, and a temporary storage DB 167 in parallel.

(Structure Example of Fourth Database: Entire Structure Example)

Further, FIG. 19 is a figure showing the structure example of a fourth database of authentication system according to the embodiment of the present invention. In this figure, a structure example of database that the authentication server 10 manages is shown.

In the case where the comprehensive DB 111, the availability information DB 115, and the search information DB 116 exist in the building structure side terminal 110, these databases and the temporary storage DB 117 are installed in parallel.

Meanwhile, in the case where the availability information DB and the search information DB are installed in other terminal and server, the same structure is made.

(Structure Example of Fourth Database: Explanation of Temporary Storage DB)

Temporary storage DBs 17, 117, 127, 137, 147, 157, 167 are databases that temporarily store individual information read or input by each terminal, and individual information received from other terminal until they are processed.

As the storage actions, there are the following (1) to (5).

(1) Storage in waiting time of search in authentication system, for performing individual authentication (2) Storage until use by the terminal concerned or the terminal connected to the terminal concerned (3) Storage until storage to individual folder and the like by the terminal concerned or the terminal connected to the terminal concerned (4) Storage until storage by backup by the terminal concerned or the terminal connected to the terminal concerned (5) Storage as unprocessed information since the processing contents cannot be judged as any of (1) to (4)

In order to distribute the risk in the case when read or input individual information is lost in use or in course of storage, each terminal, in reading or inputting individual information of registered people, may copy the individual information and automatically stores it in the temporary storage DB of its own. Further, each terminal, from viewpoint of information leakage prevention, without copying individual information, may store it to the temporary storage DB, and via this temporary storage DB, may transfer the individual information to database or software and the like of terminal and server that requires the individual information.

The above temporary storage DBs 17, 117, 127, 137, 147, 157, 167 may be set so that stored individual information is deleted automatically from the DB concerned, after lapse of a specified time from storing information into the DB concerned.

The temporary storage DB is not an eternal storage place of information. Further, it is not preferable that information with unclear purpose is left for a long time from viewpoint of the load to the information processing by the authentication system and information leakage risk. Therefore, it is preferable that time is calculated in consideration of average time and processing steps and the like of any process in the terminal concerned or in terminal connected to the terminal concerned, time setting where deletion is made automatically from temporary storage DB, and temporary storage DB itself is all deleted at a specified time.

(Individual Authentication Processing by Terminal)

The authentication system has the above basic structure, and in concrete it performs individual authentication action of the registered person as shown below.

FIG. 20 is a sequence chart showing the flow of individual authentication action of the registered person by the authentication system according to the embodiment of the present invention.

In this sequence chart, the end side terminal 160 reads biometrics information, and the building structure side terminal 110 performs individual authentication action of the registered person on the basis of the read biometrics information.

Meanwhile, in this sequence chart, the flow of authentication action in the case when the building structure side terminal 110 does not have the search information DB 116 is shown.

First, the end side terminal 160 reads the individual information (biometrics information) of the registered person (step S1).

The end side terminal 160 sends the read biometrics information to the building structure side terminal 110 (step S2).

The building structure side terminal 110 sends the information to the basic information DB 114 of the comprehensive DB 111 installed it own, and performs search whether information corresponding to information sent by the end side terminal 160 is managed (step S3).

When the information concerned does not exist in the basic information DB 114, the building side terminal 110 further searches for the history information DB 112 (step S4).

As the result of search, when the information concerned is determined, the building structure side terminal 110 collates it with the information received from the end side terminal 160, and judges authentication (step S5).

The building structure side terminal 110 sends this collation result to the end side terminal 160 (step S6).

FIG. 21 is a sequence chart showing other flow of the individual authentication process of registered person by the authentication system according to the embodiment of the present invention.

In this sequence chart too, the end side terminal 160 reads biometrics information, and the building structure side terminal 110 performs the individual authentication of registered person on the basis of the read biometrics information.

Meanwhile, in this sequence chart, the flow of the authentication action in the case when the building structure side terminal 110 has the search information DB 116.

First, the end side terminal 160 reads the biometrics information of the registered person (step S11).

The end side terminal 160 sends the read biometrics information to the building structure side terminal 110 (step S12).

The building structure side terminal 110 sends the information to the search information DB 116 installed it own, and performs search whether information corresponding to information sent by the end side terminal 160 is managed in the search information DB 116 (step S13).

As the result of search, when the information concerned is determined, the building structure side terminal 110 refers to the information in the comprehensive DB 111 linked to the information concerned in the search information DB 116 (step S14), and judges authentication (step S15).

The building structure side terminal 110 sends this collation result to the end side terminal 160 (step S16).

Thus, each terminal or server has the search information DB that manages only information necessary for individual authentication of registered person, thereby it is possible to improve the efficiency of information search and reduce the authentication system load, and easily process a large amount of information at one time.

As described previously, each terminal and server in the authentication system performs authentication of registered person by use of input or read information, or information received from other terminal and server.

The information sent and received among terminals and servers at the moment of authentication of registered person is referred to movement information, and for example, this movement information includes the following information.

1. Spatial information (terminal identification ID allotted to terminal, identification number)
2. Individual identification ID of authentication objective person
3. Temporal information of period of performing authentication, or temporal information showing period of read/input of individual information (biometrics information)
4. Information showing "authenticated" as existence authentication It is preferable that terminals and servers start authentication process by use of the availability information DB, at the moment when they receive all the information items of the above 1 to 4. Thereby, it is possible to prevent authentication from being made by only insufficient information and unreliable authentication result from coming out.

Further, the present authentication system links various information used in authentication made in terminal and server and the result to each registered person, and creates and manages a flow of information concerning the registered person individual, that is, activity history.

For example, in the example of various information items of the above 1 to 4, in 1 to 3, "where the authentication objective person is now" is specified, and in 4, "Whether the authentication objective person is the existing identical person" is specified.

Meanwhile, hereinafter, the movement information always includes 1. Spatial information and 3. Temporal information, among the above information items 1 to 4.

First Embodiment

Hereinafter, the flow to the use start by a person who uses the present authentication system for the first time is explained separately in first stage to third stage.

(Initial Registration of Unregistered Person: First Stage: Information Registration)

FIG. 22 is a sequence chart showing an action example of the authentication system when a person to be registered registers its own history information for the first time to the end side terminal 160 and sub servers, in a first embodiment of the present invention.

Hereinafter, with reference to this figure, registration processing of individual information by a person who wants to use this authentication system is explained.

In order to use the present authentication system, first, it is necessary to register individual information of the person who uses the system. This is because by registration of individual information, hereinafter, by comparing the registered information and read information, it is possible to manage the authentication system on the basis of individual authentication.

Herein, the end side terminal 160 and sub servers (the building structure side terminal 110, the organization side terminal 120, the area management side terminal 130 and the relay side terminal 140) are explained as one unit.

First, the registered person individual uses the biometrics information reading function loaded in the end side terminal 160, and makes the biometrics information of the registered person read (step S21).

This biometrics information must be one necessary to use, or one efficient to use the end side terminal 160 or sub servers connected to the end side terminal 160. For example, in the case to enter a building structure via door, normally, since it is often that the door knob is gripped, the ends side terminal 160 to read the biometrics information is installed at door knob of building structure or the like, by making the biometrics information fingerprint, reading thereof can be made easily.

In addition, the registered person inputs basic information such as name or address or history information necessary to specify the registered person individual by the end side terminal 160 (step S22).

Further, at this moment, in order to make it easy to search the registration condition of the registered person individual in the authentication system, the basic resident register number of the registered person individual may be input. Meanwhile, when the basic resident register number is not known, or it is not input at the registration moment, substitutional number such as passport number, driver certificate number or basic resident register card number and the like may be input.

Meanwhile, at this moment, when character input function is not installed to the end side terminal 160, or the read function is limited to special type, processing may be made by upper level sub servers connected to the end side terminal 160 concerned, or other end side terminal 160 connected to the sub servers.

The end side terminal 160 searches the comprehensive DB 161, the search information DB 166, the temporary storage DB 167, and judges whether read or input information exists in its own (step S23).

Meanwhile, details of this processing are same as the action shown in FIG. 20 or FIG. 21.

When the end side terminal 160 confirms that read or input information does not exist in its own, it stores the read or input information to the temporary storage DB 167 in its own (step S24).

In the case when this end side terminal 160 does not have the temporary storage DB 167, this information is stored so that it can be judged that it is the information first read or input by the end side terminal 160.

The end side terminal 160 sends the read or input information via a communication line network 200, to sub servers to become the upper level terminals of the end side terminal 160 concerned (step S25).

The sub servers that have received information search whether individual information of registered person exists, by the comprehensive DB or the search information DB and the like (step S26). Meanwhile, this search processing is shown in FIG. 20 or FIG. 21.

The sub servers confirms that there is not individual information of registered person received in its own as the search result, that is, that the registered person individual is not yet registered in the unit concerned, they create individual folder to store individual information of registered person individual (step S27).

Further, the sub servers give "temporary individual identification ID" used until official individual identification ID is given to the registered person individual. The temporary individual identification ID may be simply set as identification ID of the terminal concerned with addition of date or date and time of registration.

The sub servers store, and register received information together with "temporary individual identification ID" to the individual folder (step S28). Further, those having the search information DB among the sub servers copy and store necessary information from individual folder to the search information DB. At this moment, the sub servers set link between the individual folder and the search information DB (step S29).

The sub servers send information that read/input information has been registered to sub servers and the "temporary individual identification ID" via the communication line network 200, to the end side terminal 160 of information sending source (step S30).

The end side terminal 160, on receiving the information of registration processing complete and the "temporary individual identification ID" in the upper level terminal, create individual folder to store the individual information of the registered person individual.

The end side terminal 160 stores and registers the read/input information together with the "temporary individual identification ID" to the individual folder (step S31). At this moment, the end side terminal 160 registers only information that the comprehensive DB 161 requires or only information that can be stored to the individual folder of the comprehensive DB 161, and deletes unnecessary information (step S32).

Further, in the case when the end side terminal 160 has the search information DB 166, it copies and stores information necessary to the search information DB 166 from the individual folder. At this moment, link is made between the individual folder and the search folder DB 166 (step S33).

The actions explained above (steps S21 to S33) are an example of the initial registration processing, and without via the end side terminal 160, individual information may be read, or input directly to the sub servers, and registration processing may be carried out.

By this first stage processing, authentication comparison information for use of the present authentication system is generated.

(Initial Registration of Unregistered Person: Second Stage: Name Identification Processing)

FIG. 23 is a sequence chart showing an action example at the moment when name identification processing is carried out in the present authentication system, after completion of the initial registration of the sub servers in the first embodiment of the present invention.

Hereinafter, with reference to this figure, the name identification processing after registration of individual information at the first stage is explained.

Meanwhile, the name identification processing is a process where registration conditions in terminals and servers in the authentication system are confirmed, and if plural different "individual identification IDs" or "temporary individual identification IDs" are allotted to one registered person, individual identification IDs are unified to one for the same registered person, and managed.

In the registration processing in the above first stage, the registered person individual could be confirmed to be not yet registered in the unit concerned, but there is a possibility that it has been already registered in the entire authentication system. By carrying out this name identification processing, it is possible to avoid duplicated registration of registered person individual, and improve the execution efficiency of search and authentication process.

First, the sub servers extract items common to individual from individual information that the registered person registers, for simplifying the search (step S41). Herein, common items are information items managed in common in terminals and servers of the authentication system, such as name, date of birth, various certificate numbers (basic resident register notification number, passport number or driver's certificate number and the like).

After completion of extraction, the sub servers make the extracted information, and information to request search for name identification, recognizable by the aggregation side terminal 150 as upper level terminal, and then send them to the aggregation side terminal 150 (step S42).

The aggregation side terminal 150 that has received information performs search to the comprehensive DB 151 or the search information DB 156 and the like, whether individual information of registered person exists (step S43). Meanwhile, details of this processing is same as the action shown in FIG. 20 or FIG. 21.

The aggregation side terminal 150, when information exists (step S44 Yes), sends the information that registration has been already made, and official individual identification ID, to the sub servers (step S45).

The sub servers replace the current temporary individual identification ID with the received individual identification ID (step S46).

Further, the sub servers send official individual identification ID to the end side terminal 160 concerning the information concerned, and change individual identification ID in the same manner (step S47).

The aggregation side terminal 150 confirms that there is not the received individual information of the registered person in its own as the search result (step S44 No), and creates individual folder to store individual information of registered person individual (step S48).

The aggregation side terminal 150 stores, and registers the received information together with the "temporary individual identification ID" to the individual folder (step S49). Further, when the aggregation side terminal 150 has the search information DB 156, it copies and stores information necessary for the search information DB 156 from the individual folder. At this moment, a link is set between the individual folder and the search information DB 156 (step S50).

The aggregation side terminal 150, in the same manner as the action at the step S41, extracts items common to individual from registered individual information. After completion of extraction, the aggregation side terminal 150 makes the extracted information, and information to request search for name identification, recognizable by the authentication system server 10 as upper level terminal, and then sends then to the authentication system server 10 (step S51).

The authentication system server 10 that has received information refers to the comprehensive DB 11 or the search information DB 16 and the like, and judges whether individual information of registered person exists (step S52). Meanwhile, details of this processing is same as the action shown in FIG. 20 or FIG. 21.

The authentication system server 10, when information exists (step S53 Yes), sends the information that registration has been already made, and official individual identification ID, to the aggregation side terminal 150 (step S54).

The aggregation side terminal 150 replaces the received individual identification ID with the temporary individual identification ID.

Further, it sends the official individual identification ID, to the sub servers and the end side terminal 160 concerning the information concerned, and makes them change the individual identification ID in the same manner.

The authentication system server 10, when there is not the received individual information of the registered person in its own as the search result (step S53 No), creates individual folder to store individual information of registered person individual (step S55).

The authentication system server 10 gives the official individual identification ID to the registered person individual on the basis of the received individual information of registered person (step S56). The authentication system server 10 stores, and registers the received information together with the "individual identification ID" to the individual folder (step S57). Further, in the when it has the search information DB 16, it copies and stores information necessary for the search information DB 16 from the individual folder. At this moment, a link is set between the individual folder and the search information DB 16.

The authentication system server 10 sends official individual identification ID to the aggregation side terminal 150 that has sent the individual information concerned to the authentication system server 10 (step S58). The aggregation side terminal 150 replaces the received individual identification ID with the temporary individual identification ID.

Further, it also sends information that the registered person individual is a person registered for the first time in the authentication system, and the existence validation is required.

The aggregation side terminal 150 that has received from the authentication system server 10, and sends the official individual identification ID and the validation process information to the sub servers and the end side terminal 160 concerning the registration this time, in the same manner, and makes them change the individual identification ID in the same manner (step S59).

The sub servers and the end side terminal 160 concerning the registration this time replace the temporary individual identification ID used so far, with the received individual identification ID.

Further, the sub servers send, and notify to the terminal (PC or portable terminal) that the registered person replace to the individual identification ID, the new individual identification ID, and message information that this individual identification ID is indispensable in using the present authentication system hereafter (step S60).

As explained above, by performing this name identification, it is possible to prevent plural individual identification IDs and individual folders from being created for an identical person, and individual information from being separated, and also to prevent uneven data from occurring at the existence degree validation of identical person. Further, it is possible to prevent information amount or number of information items in authentication system from increasing over necessity, and to easily perform the search function.

In particular, when individual information of a person is divided into plural individual folders, individual folders storing history information of low use frequency or of no use are left, and there is a fear of unauthorized use. But, by performing name identification, it is possible to make these risks minimum.

As the result of name identification work, if old individual folder is found, storage history information of the found individual folder and the like are transferred to a new individual folder, or new and old folders are linked with each other and managed as a body, thereby stored information is kept from being scattered.

(Initial Registration of Unregistered Person: Third Stage: Existence Validation Processing)

FIG. 24 is a sequence chart showing an action example at validation processing where in the first embodiment of the present invention, after the registered person registers its own individual information for the first time, whether the registered person individual is an existing person, and whether the registered information is true are verified.

With regard to the registered person individual in the present authentication system, existence validation processing of the registered person individual is executed from the initial registration to specified time lapse.

Hereinafter, with reference to this figure, the existence validation processing of registered person individual, executed after the registration of individual information, and the name identification processing at the first stage and the second stage, is explained.

In the present embodiment, after completion of the above name identification processing, the aggregation side terminal 150 carries out the validation of existence of the registered person.

Further, at reading and inputting of information, other people than the registered person individual attend to check for alteration of information, change or unauthorized transaction. Next, the attendants' witness, read or input information are stored to servers and terminals in form of electronic images, electronic video, electronic audio and the like. At this moment, it is preferable that, for example, address and contact telephone number such as Ministry of Foreign Affairs for passport, Police Office for driver's certificate, company name for working place and the like are made into electronic data and stored to servers and terminals in the same manner.

The aggregation side terminal 150 replaces the temporary individual identification ID with the individual identification ID (step S61), and then sends information to instruct the sub servers or the end side terminal 160 to send the basic information such as name and address necessary for specifying registered person individual and the history information to the aggregation side terminal 150, and information showing that the validation processing this time is executed by the aggregation side terminal 150 and the sub servers and the end side terminal 160 do not have to perform the processing (step S62).

The sub servers and the end side terminal 160 send the individual identification ID, and instructed information, to the aggregation side terminal 150 (step S63).

Meanwhile, it is preferable that in automatic connection with the processes at the steps S62, 363, notice information "validation processing now under its way at the aggregation side terminal" is displayed by the sub servers or the end side terminal 160. Thereby, it is possible to prevent double processing in terminals.

The aggregation side terminal 150 confirms that the presented evidential matter is true (not counterfeited, altered, or fabricated) by use of the eye of operator of the aggregation side terminal 150, software in terminal or tester (step S64). When it is confirmed to be true, to specified columns of the history information DB 152 and the validation information DB 153, date and time, collation result, and collator information are stored.

The aggregation side terminal 150 performs collation processing on whether the information that is judged true is right or not, to confirmation destination side terminal 80 according to properties of the information (step S65).

Herein, in concrete, the aggregation side terminal 150 asks for an answer whether the information that is judged true is true information at the confirmation destination side terminal 80 side, or one based on true evidential matter.

Further, in order to clarify answerer at the confirmation destination side terminal 80 side, the aggregation side terminal 150 asks the confirmation destination side terminal 80 to add information to specify answerer at answering (step S66).

Meanwhile, in the present embodiment, it is supposed that management side of authentication system has acquired from the registered person individual the consent to make public electronic image, electronic video, electronic audio and the like, to issue organization or related people of the evidential matter (images, video and the like of certificate of compliance, certificate of eligibility, certificate and the like) that the registered person individual presented, and to ask for an answer of truth of evidential matter and existence confirmation of the registered person individual.

Further, with regard to public certificate, it is supposed that by inputting information of identification ID of registered person and secret number and the like from servers and terminals, conditions can be easily confirmed.

Next, the confirmation destination side terminal 80 compares the information contents stored in its own, and the information contents received from the aggregation side terminal 150, and judges whether the received information contents are true or not (step S67).

Herein, as information to be compared, for example, electronic information such as images, video of certificate of compliance, certificate of eligibility, certificate and the like of registered person individual sent from the aggregation side terminal 150, the history information of registered person individual already stored in the confirmation destination side terminal 80, evidential matter or verbal evidence of people related to the registered person may be listed up.

As the result, when the confirmation destination side terminal 80 judges the information contents from the aggregation side terminal 150 are true or present, it sends answer information of "true" or "present", and information showing the answerer related to this judgment to the aggregation side terminal 150 (step S68).

Meanwhile, when the confirmation destination side terminal 80 judges the evidential matter is untrue or absent, it sends answer information of "untrue" or "absent", and information showing the answerer related to this judgment to the aggregation side terminal 150 (step S68).

Further, when it is difficult to judge by images and video and the like on the web site concerned, the confirmation destination side terminal 80 performs answer information of "cannot judge" and answerer specification to the aggregation side terminal 150 (step S68).

The aggregation side terminal 150, on receiving answer information from the confirmation destination side terminal 80, registers it to the validation information DB 153 (step S69).

At this moment, according to validation degree, information showing results, for example, "validation confirmation, true" or "validation not yet made" is stored to information.

From the series of results, the aggregation side terminal 150 totally judges the existence of the registered person, and registers the judgment result at the registration to the basic information FB 154 (step S70).

Herein, from the validation result, when the existence is confirmed, the aggregation side terminal 150 sends the result to the sub servers or the end side terminal 160, and sends the contents of the validation information DB 153 to the authentication system server 10.

On the other hand, from the validation result, when the existence of registered person cannot be confirmed, there is a possibility of spoofing and fabricated information and the like by third party other than the registered person, and accordingly the use of the authentication system by the person of the validation this time is stopped. Further, occurrence of error data is notified to related organizations, and safety measures such as execution of public investigation and stop of the use of the authentication system and the like are taken.

Meanwhile, the aggregation side terminal 150, when the registered person refuses authentication or does not provide information necessary for validation, register the fact to the basic information DB 154 and the validation information DB 153. Further, when information is incomplete and validation process is delayed, or validation processing must be carried out once again, the aggregation side terminal 150 displays the message information in the same manner.

As explained above, by performing this validation processing, it is possible to prevent a malicious person from using the authentication system by easily "spoofing" or becoming "a virtual person", and reduce greatly the security expenses and labor hours invested in system operation in order to prevent these unauthorized uses.

Furthermore, processes from acquisition of information to execution of validation processing are carried out by registered person at attendance of third party, and accordingly it is possible to prevent alteration and change of information, unauthorized transaction.

In the example explained above, the information validation request source is the aggregation side terminal 150, but it may be each terminal or server structuring the authentication system.

Further, in this example, the confirmation destination side terminal 80 performs validation at request, however, other terminal and server structuring the authentication system may perform the validation processing, so long as they have function to execute the validation processing.

Thus, by arranging plural terminals and servers to execute the validation processing, it is possible to prevent all validation processings from being concentrated in one device, and reduce the load of the processing.

Moreover, in the present embodiment, the validation of existence to a user of the authentication system is not carried out by only one special organization, and the validation processing of existence can be performed on the basis of judgment by all individuals related to this authentication system.

Thereby, it is possible to perform the validation of existence by various organizations such as company, school, hospital or entry/exit management office and the like and individuals, and to prevent the validation processing from being concentrated in one organization, and prevent the processing from being delayed.

(Calculation of Existence Rate)

Further, in the present embodiment, to registered person individual, existence is authenticated on the basis of the registered individual information, or the registered individual information of the identical person is digitized and evaluated by existence points, existence rate or existence rating, and authentication degree is externalized, and thereby to all the registered people who use the authentication system or companies, schools, organizations and the like to which registered people belong, services of high security can be provided.

Thereby, it is possible to prevent malicious person from using the system by easily "spoofing" or becoming "a virtual person", like in internet, at initial stage of registration in the present authentication system.

And, on the basis of truth of digitized existence, it is possible to limit the use range of this authentication system (device of terminal and server and the like, place, time and the like), and realize further safe operation of the authentication system.

Further, the validation of existence of registered person is carried out by use of passport and driver's certificate and the like in the above, and hereinafter, indexes showing reliability of the validation are explained.

FIG. 25 is a figure showing an example of calculation method of existence points in the authentication system according to the first embodiment of the present invention.

This existence point is the index showing the reliability to existence of registered person who registered its own individual information to the authentication system. Meanwhile, this "existence" means that the person (registered person is not a virtual person but an actually existing person.

This existence point is calculated on the basis of those used for identification and certification of existence used when the registered person used in registering its own individual information to the authentication system, and the more those used in the identification is of reliable kind, or the more those used in identification are, or the higher the peculiarity of those used in the identification is, the existence point becomes a higher value, and the reliability is judged to be highly reliable. For example, those used in this identification are identification certificates such as driver's certificate, passport and the like, or information peculiar to the registered person such as biometrics information.

Further, this existence point is also calculated on the basis of those that the registered person, after the registration of its individual information, presents to the system side for authentication, when using the authentication system. With regard to those presented by the authentication too, the more those used in the identification is of reliable kind, or the more those used in identification are, or the higher the peculiarity of those used in the identification is, the existence point becomes a higher value, and the reliability is judged to be highly reliable. For example, those used in this identification are biometrics information or information portable items (IC card, ubiquitous communicator or cell phone and the like) to be described later herein.

Hereinafter, the calculation method of the existence point is explained.

Meanwhile, those used in the above identification and those presented at authentication are referred to collectively as registered information.

First, the authentication system server 10 converts the kind of registered information of registered person individual into points.

Next, the authentication system server 10 multiplies this points by point allocation given to registration temporal information, validation result information, effective period information and information showing lapse time from the validation work execution period (hereinafter, referred to as validation lapse temporal information) respectively, and calculates attained points per registered information.

Further, the authentication system server 10 calculates this attained points, individually, per kind of registered information concerning the registered person.

The authentication system server 10 totalizes the attained points calculated per registered information per the registered person individual, and calculates existence points.

Hereinafter, with the example of the figure, the calculation method of existence points is explained.

For example, in the example of this figure,

Registered item (kind of evidential matter whose data concerning the above registered person is presented) (public evidential matter: 9 points, sub public evidential matter: 5 points, other evidential matter: 1 point)

Validation result information (could be validated: 3 points, could not be validated: 1 point)

Registration temporal information (time lapse from registration to database 11) (within a month or unchanged: 9 points, 1 month to 3 months: 5 points, 3 months to 6 months: 3 points, 6 months to 1 year: 2 points, over 1 year: 1 point)

Validation temporal information (time lapse from validation) (within a month or unchanged: 9 points, 1 month to 3 months: 5 points, 3 months to 6 months: 3 points, 6 months to 1 year: 2 points, over 1 year: 1 point)

Effective period information (effective period of evidential matter) (within period: 3 points, no period: 3 points, period lapse: 1 point)

are shown, and by multiplying these values, the existence points are calculated.

Further, the authentication system server 10 calculates risk rate consideration points, as index reflecting possible risk elements to the above existence points.

FIG. 26 is a figure showing an example of the calculation method of the risk rate consideration points by the authentication system according to the first embodiment of the present invention.

As shown in this figure, the risk rate consideration points are calculated by multiplying the above existence points by (1-risk rate).

This risk rates are various risks shown below expressed by 0 to 1 (1 when the risk is highest, 0 when the risk is lowest).

(1) Risk Arising from Registered Information

Risk arising in the case to use employee certificate, normal postal envelope, tax withholding certificate and the like that are easily tampered and changed as information (2) Risk Arising from Validation Method Risk existing in validation method such as validation work with confirmation destination existence not yet confirmed, validation work only by witness and the like (3) Other Risk Country risk (risk arising from instability of politics, economy, society of country) and identification field unknown at the moment of identification and temporarily given until judgment Further, as other indexes to show the reliability degree of validation result of existence, there are witness (person or group), trust evaluation degree, and matching rate of previous action pattern.

This trust evaluation degree is the trust degree of person or group that certificates existence of registered person, or issue organization of identification certificate used for existence certification and the like expressed by 0 to 1 (1 when the trust degree is highest, 0 when the trust degree is lowest).

In the case when a person certificates existence of registered person, this trust evaluation degree, for example, may be determined higher, as the name recognition and social position of the person is higher. Further, the trust evaluation degree may be determined according to whether the person can evaluate the registered person objectively or not, for example, it may be set low when the person is the family member of the registered person, and it may be set high when the person is unrelated third party of the registered person.

Furthermore, in the case when a group certificates existence of registered person, the trust evaluation degree may be determined according to whether the group is public or private, or the capital, establishment year, social influence of company and the like. For example, it may be set higher for public group than private group, and it may be set higher for group with higher capital, group with older establishment year, group with higher social influence.

Moreover, the matching rate of previous action pattern is the index to show how much the latest action pattern of the same registered person matches the past action pattern of registered person. In concrete, the authentication system server 10, on the basis of the history information and movement information (time, place) of a registered person, stored in database in its own, detects action pattern for where, at what time zone, in what order, the registered person goes, and calculates the matching rate as the matching rate of action pattern.

On the basis of the above existence point, the risk rate consideration point, trust evaluation degree, and matching rate of previous action pattern, the authentication system server 10 calculates the existence rate as the index to show the degree of truth of existence of registered person by any of the following equations 1 to 5.

$$\text{Existence rate} = 1 - \text{risk probability} \quad \text{(Equation 1)}$$

For example, in the case risk probability 30%, $$\text{Existence rate} = 1 - 30\% = 0.7$$

$$\text{Existence rate}(\%) = \text{risk rate consideration point}/\text{existence point} \times 100 \quad \text{(Equation 2)}$$

Among these, the risk rate consideration point is calculated as below. The attained point used in calculating the existence point is multiplied by the existence rate calculated on the basis of the above risk probability and the basic point is calculated, and these basic points are totalized for the registered person and the risk rate consideration point is calculated.

Further, the existence point is same as the above mentioned one.

In this equation 2, from viewpoint of reliability of value, it is preferable that the existence point is calculated as the total of attained point of at least 2 or higher.

FIG. 27 is a figure showing a calculation example of the basic point by this equation 2.

As shown in the figure, the basic point in the equation 2 is calculated by multiplying the attained point by the information arising risk, validation arising risk, and other risk.

$$\text{Existence rate}(\%) = \text{trust evaluation consideration point}/\text{existence point} \times 100 \quad \text{(Equation 3)}$$

FIG. 28 is a figure showing the calculation method of this trust evaluation consideration point.

Hereinafter, with reference to the figure, the calculation method of this trust evaluation consideration point is explained. The attained point used in calculating the existence point by the existence rate calculated on the basis of the above risk probability, and thereby the basic point is calculated. This basic point is multiplied by the determined trust evaluation degree, and thereby the trust evaluation consideration point is calculated.

Further, the existence point is same as the above mentioned one.

In this equation 3, from viewpoint of reliability of value, it is preferable that the existence point is calculated as the total of attained point of at least 2 or higher, and the trust evaluation consideration point is calculated as the total of trust evaluation consideration point of at least 2 or higher.

FIG. 29 is a figure showing a calculation example of the trust evaluation consideration point by this equation 3.

As shown in the figure, the trust evaluation consideration point is calculated by multiplying the basic point by the trust evaluation degree determined according to the person and group (lawyer, teacher, large company, friend and the like) that has certified existence of registered person.

(Equation 4)

In the case to apply this equation 4, action pattern that the registered person repeats daily is classified into time zone or place and registered to the authentication system server 10 beforehand.

And, the authentication system server 10, on extracting actual action pattern of registered person, compares the extracted action pattern and the above registered action pattern, and when the matching arte is high, the existence rate (%) becomes a high value, and it is evaluated that the existence of the registered person is high.

Hereinafter, the calculation method of existence of the equation 4 is explained.

First, the authentication system server 10 extracts and classifies the action pattern of registered person on the basis of time zone and place, in a certain period (for example, condition setting as past one year), and counts the number of times of these classified respective action patterns in the certain period and registers the result to its own.

Next, the authentication system server 10 extracts and classifies action pattern on the basis of time zone and place, in the latest certain period for example, condition setting as the latest one week), and counts the number of times of the respective action patterns.

And, the authentication system server 10 calculates mining rate per these classified respective action pattern. This mining rate is calculated by the following equations.

$$\text{Validation base mining rate} = \text{number of times in a certain period}/\text{number of days in the certain period}$$

$$\text{Objective destination mining rate} = \text{number of times in the latest certain period}/\text{number of days in the latest certain period}$$

$$\text{Mining rate}(\%) = \text{objective destination mining rate}/\text{validation base mining rate}$$

Next, the authentication system server 10 totalities at least two mining rates or more and calculates the mining point.

And, the authentication system server 10, as shown in the equation below, calculates the existence rate (%) with this mining point as numerator, and the number of added mining rates as denominator.

Existence rate(%)=total of mining rates/number of mining rates used in addition

FIG. 30 is a figure showing a calculation example of this equation 4.

Hereinafter, with reference to the figure, a concrete example of the calculation method by the equation 4 is explained.

In this example, action pattern (1) shows a registered person moves among respective units in the order "150A"→"150E"→"150H"→"150P". this action pattern (1) is repeated by the registered person 120 times in 6 months, and repeated 32 times in the latest 45 days.

Therefore, it is calculated as shown below.

Validation base mining rate=120÷180=0.67

Objective destination mining rate=32÷45=0.71

Mining rate(%)=0.71÷0.67=1.06

In the same manner, the mining rate of the action pattern (2) is calculated 0.65, and the mining rate of the action pattern (3) is calculated 1.17.

From the above, it is calculated that the existence rate= (1.06+0.65+1.17)÷3=0.96=96%.

(Equation 5)

By multiplying the respective existence rates calculated by the equations 1 to 3, by the existence rate calculated by the equation 4, respective existence rates are calculated.

Existence rate(%)(existence rates calculated by the equations 1 to 3)×(existence rate calculated by the equation 4)

FIG. 31 is a figure showing an example of collation between the existence rate and the authentication system use functions in the first embodiment of the present invention.

In the example shown in this figure, with regard to registered person with high existence rate, it is possible to receive the provision of various services in electronic environment automatically without evidential matter.

Respective terminals and servers structuring the authentication system store information showing the collation as shown in this figure, and limit the use of this authentication system, on the basis of existence of person who uses this authentication system.

With regard to registered person with high existence rate, various procedures that the person who is recognized as the registered person in the authentication system are little limited.

On the other hand, with regard to registered person with low existence rate, there is a possibility of "spoofing" by other person, and accordingly it is preferable that when damage occurs to the registered person individual shown by the identification ID concerned, use of the authentication system is limited so that the damage should be minimum.

Hereinafter, the relation among the existence rate expressing in point assurance of existence of registered person, existence rating, existence point and the like, and usable functions is referred to as "function matrix".

Thus, to registered person individual, at time point of registration of own individual information to the authentication system, at time point of use of the authentication system after registration, terminals and servers performs validation (authentication) of existence of the person whether the registered/user individual is an existing person or not, and whether the individual information of the registered/user individual matches the information already registered in the authentication system or not, and store the validation result to validation information DBs 13, 113, 123, 133, 143, 153, 163.

Respective terminals and servers in the authentication system, on the basis of these existence validation results (presence or absence of validation success, number of times, items and the like), may calculate the trust degree of existence of registered person in point, and may store information of trust degree of existence into databases per registered person.

This information of trust degree of existence may be used as materials of authentication of registered person. For example, terminals and servers may confirm and authenticate whether the person who receives the authentication is a person with existence confirmed, many existence points, and high existence rate, on the basis of the trust degree of the existence at use of the authentication system.

For example, in entering a special facility, with regard to person with high trust degree of existence, entrance process to the facility is easily executed. On the other hand, with regard to person with low trust degree of existence, the number of times of authentication may be increased, and authentication may be made on the basis of various kinds of information, and thereby comprehensive existence validation is carried out, and accordingly, it is possible to reduce risks of the authentication system operation.

FIG. 32 is a figure showing an example of combinations of existence rate and individual identification ID, in the first embodiment of the present invention.

The authentication system server 10, when calculating existence rate, automatically adds certain codes and character information according to the calculated existence rate, to individual identification ID of the person who calculated the existence rate.

When registered person uses the authentication system, terminals and servers refer to individual identification ID information at receiving and sending shown in the figure, and can easily judge at what level the existence rate of the registered person is.

Thereby, terminals and servers, without searching all registered information of registered person, refer to segment information showing range of existence, corresponded to individual identification ID, and can easily send availability information and easily perform approval of certain action and the like.

(Features of Authentication System)

Further, in the present embodiment, terminal identification ID is corresponded to individual information sent and received in the authentication system, therefore, it is needless to mention that it is possible to easily specify the sending source of the information.

Furthermore, when registered person acquires individual identification ID, the existence of the registered person is validated comprehensively, by evidential matter, witness, biometrics information and the like, and registration is made after judgment whether the registered person is an existing person, and accordingly it is possible to easily and precisely specify the sending source of information even in internet where it is difficult to specify the sending source of information.

At present, in internet use environment, since there is no limitation to its users, there are malicious people, various virus software, occurrence of fishing scam, harmful websites, and other problems. Therefore, enormous social losses have been made in consideration of development and purchase of antivirus software, stolen cash money and credit card fraud and the like. And it is difficult to specify and exclude such web criminals, and drastic solution is not yet made.

The authentication system according to the present embodiment is characterized by its high public use, and wide general purpose. Further, this authentication system may be configured in not a building structure or a specified area, but for example, in a wide area such as all over Japan, or all over the world.

This authentication system exchanges information around individual information ID, and when there occurs unexpected accident in the authentication system, it is possible to easily specify the source person.

Second Embodiment (Repeated Registration Processing 1 of Existing Registered Person)

In the present embodiment, the flow in the case when the registered person who has registered its individual information once, in the first embodiment, registers information to other terminal than the terminal used for the registration is explained.

FIG. 33 is a sequence chart showing an action example of the authentication system when the registered person registers its own history information for the first time to other end side terminal than the terminal to which the registered person registered once, in the second embodiment of the present invention.

In the same manner as in the first embodiment, first, the end side terminal 160 inputs/reads the individual information of the registered person, and when the input/read individual information is not yet registered in the databases 161, 166, 167, it stores the individual information to the temporary storage DB 167 (steps S71 to S74).

Next, the end side terminal 160 sends the individual information to the sub servers (step S75). The sub servers that have received the individual information search their own comprehensive DBs and search information DB, and judge whether the individual information is already registered in these databases or not (step S76).

When the sub servers confirm that the received individual information of the registered person is in their own as the search result, they store and register the individual information of the registered person received this time to specified DB (step S77).

Further, if the sub servers have the search information DB, they copy and store necessary information from individual folder to the search information DB. At this moment, the sub servers set link between the individual folder and the search information DB (step S78).

The sub servers send information that the individual information received from the end side terminal 160 has been registered to sub servers, and the individual identification ID via the communication line network 200, to the end side terminal 160 (step S79).

The end side terminal 160, on receiving the information of registration processing complete and the individual identification ID in the upper level terminal, create individual folder to store the individual information of the registered person individual.

The end side terminal 160 stores and registers the information together with the individual identification ID to the individual folder (step S80).

Thereafter, in the same manner as in the first embodiment, it deletes unnecessary information (step S81), and registers to the search information DB 167 (step S82).

Third Embodiment (Repeated Registration Processing 2 of Existing Registered Person)

Herein, "unit" is explained. A unit means a structure rate unit including one upper level terminal and one lower level terminal or more managed by the terminal.

That is, "terminals of the same unit" means terminals under management of the same terminal, and "terminals of other unit" means terminals under management of respectively different terminals.

Meanwhile, "use a unit" means for registered person to receive various services such as opening and closing the key and the like from any terminal structuring the unit.

FIG. 34 is a sequence chart showing an action example of the authentication system when the registered person registers its own history information for the first time to an end side terminal structuring other unit than the unit to which the registered person registered, in the third embodiment.

In the second embodiment, registered person registers its individual information once again to a terminal of the same unit. While on the other hand, in the present embodiment, the case when the registered person registers individual information once again to a terminal of other unit is explained.

The steps from registration of individual information by the end side terminal 160, and name identification processing, and to the answer of existence of individual information from the authentication system server 10 (steps S91 to S104) are same as the processes (steps S41 to S54) of the first embodiment.

The aggregation side terminal 150 that received from the authentication system server 10 changes its own "temporary individual identification ID" with official individual identification ID (step S105).

Thereafter, the aggregation side terminal 150 sends individual identification ID to the sub servers concerning the registration this time and the end side terminal 160 (step S106), and makes it change individual identification ID in the same manner (step S107). Meanwhile, the steps after this are same as those in the first embodiment.

Fourth Embodiment (Repeated Registration Processing 3 of Existing Registered Person)

In the present embodiment too, in the same manner as in the third embodiment, the case when the registered person registers individual information once again to a terminal of other unit is explained.

However, in the third embodiment, at the repeated registration, the registered person itself does not recognize its own individual identification ID, but in the present embodiment, the registered person has already recognized it.

FIG. 35 is a sequence chart showing an action example of the authentication system when the registered person registers its own history information for the first time to an end side terminal structuring other unit than the unit to which the registered person registered, and the registered person individual recognizes its individual identification ID, in the fourth embodiment of the present invention.

Hereinafter, with reference to this figure, explanation is made.

When registered person registers individual information, first, the end side terminal 160 displays a message to ask whether the registered person registers individual information to the authentication system for the first time or not.

Herein, if the registered person registered individual information before, at registration of individual information this time, in addition to normal registration processing, the registered person inputs the individual identification ID allotted before to the end side terminal 160.

The end side terminal 160 judges whether the read/input individual information is stored or not in at least one of the comprehensive DB 161 of its own, the search information DB 166 and the temporary storage DB 167 (step S111).

When the end side terminal 160 confirms that the read/input individual information is not stored in its own, it stores the read/input individual information into the temporary storage DB 167 in its own. When it does not have the temporary storage DB 167, it stores to the search information DB 166 and the comprehensive DB 161 so that the end side terminal 160 can judge that it is first information recognition.

Meanwhile, since individual identification ID is already allotted to the registered person, the end side terminal 160 corresponds the individual information to ID and stores it.

The end side terminal 160 sends basic information such as name and address or history information necessary to specify registered person individual via the communication line network, to sub servers to become upper level terminals of the end side terminal 160 concerned (step S112).

Sub servers search database in its own in the same manner (step S113), and when it confirms that the received information is not in database in its own (step S114 No), it sends basic information such as name and address or history information necessary to specify individual identification ID and registered person individual via the communication line network 200, to the aggregation side terminal 150 to become upper level terminal of the sub servers concerned (step S115).

The aggregation side terminal executes the same steps as the above steps S113 to S115 (steps S116 to S118).

The authentication system server 10 searches database in its own (step S119), and confirms that the received information is in its own (step S120 Yes), it validates whether the registered person of the received individual identification ID is identical to the person registered in database in its own, and exists (step S121).

For example, in this validation processing, the authentication system server 10 may compare and validate individual information in database of its own, and received individual information, or may collate to the confirmation destination side terminal 80, and may received the validation result from the confirmation destination side terminal 80.

When the authentication system server 10 judges that registered person is identical to the person registered in database in its own, and exists (step S122) as the result of validation, it sends information that the validation result and the individual identification ID should be used to the aggregation side terminal 50 (step S123).

Hereinafter in the same manner, the information is sent to sub servers, and the end side terminal 160 (steps S124, S125).

Fifth Embodiment (Occasional Existence Validation Processing of Registered Person)

FIG. 36 is a sequence chart showing an action example to perform validation processing whether registered person individual is an existing person in optional time of use of the authentication system, and whether registered information is true or not, in a fifth embodiment of the present invention.

Hereinafter, with reference to this figure, explanation is made on assumption that the aggregation side terminal 150 validates existence of registered person.

Sub servers accept registration of new individual information to validate existence of registered person (step S131). Sub servers may directly input/read individual information, or may receive it from the end side terminal 160.

Sub servers send information to request to perform existence validation of registered person individual in addition, individual identification ID, and newly registered information, to the aggregation side terminal 150 (step S132). At this moment, it is preferable that in automatic connection with the sending process this time, caution information "validation processing now under its way in the aggregation side terminal" is displayed by sub servers. Thereby, it is possible to prevent double processing in terminals.

The aggregation side terminal 150 confirms that the presented evidential matter is true (not counterfeited, altered, or fabricated) by use of the eye of operator of the aggregation side terminal 150, software in terminal or tester (step S133).

When it is confirmed to be true, to specified columns of the history information DB 152 and the validation information DB 153, date and time, collation result, and collator information are stored. Processes of steps S134 to S139 after this are same as the processes (steps S65 to S70) in the first embodiment.

Meanwhile, when existing information of the same kind of the basic information or the history information of registered person individual received this time exists in the aggregation side terminal 150, received information and existing information are compared and examined and collated.

From the validation result, when the existence is confirmed, the aggregation side terminal 150 sends the result to the related sub servers, and sends the contents of the validation information DB 153 to the authentication system server 10 (step S140).

The authentication system server 10, on receiving new existence validation result from the aggregation side terminal 150, stores and registers the received validation result into the validation information DB 13 of its own.

As the result of this validation processing, in the case of change in existence rate and existence point of registered person individual, it is necessary to reflect the new result to the information showing existence rate corresponded to individual identification ID, and the use rank shown in FIG. 26.

Further, in the same manner as the aggregation side terminal 150, the authentication system server 10, when existing information of the same kind as that of basic information or history information of registered person received this time exists in database of its own, may compare, examine and collate the received information and the existing information. This is because although it does not exist in the aggregation side terminal 150, it may have been registered to the authentication system server 10 via other aggregation side terminal 150.

Therefore, the authentication system server 10 make the new existence validation result into conventional existence data in point and executes necessary calculation (step S141).

As the result, in the case when there occurs change in information showing existence rate corresponded to individual identification ID, and use rank shown in FIG. 26, the data concerned in the authentication system server 10 is changed (step S142).

Next, it sends the notice of change and new data to the aggregation side terminal 150 and sub servers (step S143).

As explained above, when it is judged that existence validation processing is insufficient in lower level terminal, upper level terminal can perform validation processing by use of individual information sent from various terminals and stored intensively.

Thus, upper level terminal and server always repeat individual existence validation, and judge comprehensively, thereby the precision thereof increases, and accordingly it is difficult for a third party to do spoofing or become a virtual person. Further, it is natural that there is an effect to reduce validation processing of lower level terminal.

(Concept of Existence Authentication)

In validating existence of registered person, the authentication system concretely performs the following two processes.

First, in first validation process, terminals and servers judge whether existing individual information stored in database of authentication system, and the read or input information are identical, or they are in threshold value, and thereby validate existence of registered person.

Further, in second validation process, terminals and servers judge whether newly read/input information, and existing individual information stored in databases of the authentication system or information existing in other terminal in the authentication system are consistent in two points of temporal information and spatial information, and thereby validate existence of registered person.

Herein, the above second validation process is further explained in detail.

In this second validation process, terminals and servers, on the basis of read/input periods and position of individual information (biometrics information and the like) for specifying individual, validate presence or absence of unauthorized use by registered person in the authentication system, and further accumulate existence meaning and use purpose and the like of terminals and servers, and validate them.

For example, that a person who withdrew cash money from its bank account via an ATM at 13:00 in Marunouchi, Chiyoda-ku, Tokyo, and uses a library by authentication by biometrics information at 13:10 in Nishi-shinjuku, Shinjuku-ku, Tokyo is impossible at present. This shows inconsistency on temporal information.

On the other hand, when a person is recognized to go through an operation in intensive unit at 10:00 in a hospital in Marunouchi, Chiyoda-ku, Tokyo, withdraws cash money one million yen from its bank account via an ATM in Kyoto-city, Kyoto is impossible. This is recognized by the place of intensive unit in hospital, and shows inconsistency on spatial information to terminal purpose showing hospitalized condition.

Hereinafter, concrete process contents of the second validation process are explained.

Terminals and servers of the authentication system store information showing installation places, and traffic organization information (information of station and bus stop positions, time table and the like) around the installation places, and accordingly can calculate time required for movement among terminals.

For example, in movement by train or bus between Tokyo and Shinjuku, in movement from plural stations adjacent to Marunouchi, Chiyoda-ku, Tokyo as just previous movement place of terminal, to plural stations adjacent to Nishi-shinjuku, Shinjuku-ku, Tokyo of the latest movement place of terminal, terminals and servers search traffic means available at the time, and add and calculate required riding time.

Further, terminals and servers, on the basis of the distance from installation positions of terminals to the nearest station, calculate the time required for movement from terminals to the peripheral stations, on terminals of the previous and latest movement places. This station movement required time is calculated by, for example, multiplying the distance from the installation position of terminal to the nearest station, by a specified numeric value (for example, value obtained by converting the world record of 100-meter running race into kilometers per hour).

Finally, to the above required riding time, required movement time between stations in terminals at the previous and latest movement places is added, and forest movement time is calculated.

When the period of read/input of individual information at the terminal at the latest movement place (Nishi-shinjuku, Shinjuku-ku, Tokyo) is earlier than the fastest arrival schedule time obtained by adding the above movement forecast time to the period of read/input of individual information at the terminal at the previous movement place (Marunouchi, Chiyoda-ku, Tokyo), terminals and servers considered it as error value, and judge that read/input of information at the previous or latest movement place is unauthorized.

Meanwhile, in the case when reservation of air ticket or reservation ticket by read/input of individual information, since pass time of terminals can be forecasted, the pass time and read/input time at terminal at the latest movement place may be compared.

In the present authentication system, by terminals and sensors installed in real space, individual information is collected widely. The collected information is regarded as a flow. Next, in comparison of the information concerned and the information before and after information, it is validated whether there is impossible displacement, temporal and spatial, in consideration of the condition where the individual exists (is placed), and existence of person can be judged.

Sixth Embodiment (Authentication Process by Terminal Alone)

In the examples explained above, individual information read by the end side terminal 160 is authenticated by upper level terminal, meanwhile in the present embodiment, the end side terminal 160 itself performs authentication process of individual information.

FIG. 37 is a sequence chart showing an action example of execution of authentication process where terminal to which individual information is input compares information in its own, and read or input information, and judges whether registered person individual is an existing person, or whether registered information is true, in a sixth embodiment of the present invention.

In the present embodiment, as an example, the action of the end side terminal 160 reads biometrics information of registered person and performs authentication is explained.

The end side terminal 160, by use of attached scanner, reads or input biometrics information of registered person, and sends and stores information to database installed in its own (step S151).

Next, the end side terminal 160 compares the read or input biometrics information, and previous registration biometric information in the search information DB 166 in its own. As the result of comparative collation, when the read or input biometrics information, and previous registration biometric information match, the end side terminal 160 specifies individual identification ID of the person whose biometrics information is input/read (step S152).

Thereafter, the end side terminal 160 extracts corresponding information from individual folder of specified individual identification ID in the comprehensive DB 161 on the basis of specified individual identification ID (step S153), and compares and collates the extracted information and the read or input biometrics information (step S154), and performs authentication judgment whether it is identical person or not (step S155).

As the result of collation, when the person is authenticated as identical person, the end side terminal 160, by use of the availability information DB 165, performs sending process of the above authentication result to other terminals and servers (step S156).

Next, the end side terminal 160 stores and registers biometrics information read or input this time, authentication result information, and temporal information showing period of the authentication, to respective specified columns of the comprehensive DB 161 (step S157).

Thereafter, at the necessity of update, the end side terminal 160 may replace the information read or input this time and the like with existing information in the search information DB 166 (step S158).

In the authentication system, not only the authentication system server 10, but also terminals and servers perform authentication processing, and thereby it is possible to avoid the efficiency of processing and the overconcentration.

Thus, terminals and servers have authentication function respectively, and thereby, for example, even when communications with upper level terminals including the authentication server 10 is not available due to emergency situations such as power failure and line disconnection at disaster, failure with related upper level terminals and the like, it is possible for registered person to perform existence confirmation more strictly than identical person confirmation by evidential matters such as certificate and key.

Seventh Embodiment (Authentication Process by Continuity of Time and Place)

In the embodiment described above, read individual information and individual information in database are collated, and thereby individual authentication of registered person is performed. Meanwhile on the other hand, in the present embodiment, on the basis of information of read place and read time of individual information included in movement information, it is judged whether the existence of registered person can be continuously authenticated temporally and spatially or not.

FIG. 38 is a sequence chart showing an action example of process execution of authentication where terminal to which individual information is input compares read or input information, existing information in its own, and information that other terminal in the authentication system has and judges whether registered person individual is an existing person, or whether registered information is true, and whether there is continuity of individual information and existence, in a seventh embodiment of the present invention.

In the present embodiment, as an example, the action where the end side terminal 160 reads biometrics information and performs authentication is explained.

The end side terminal 160, by use of attached scanner, reads or inputs biometrics information of registered person, and sends and stores information to database installed in its own (step S161).

Next, the end side terminal 160 compares the read or input biometrics information, and previous registration biometric information in the search information DB 166 in its own. As the result of comparative collation, when the read or input biometrics information, and previous registration biometric information match, the end side terminal 160 specifies individual identification ID of the person whose biometrics information is input/read (step S162).

The end side terminal 160 sends specified individual identification ID, temporal information of read or input biometrics information, and request for existence validation information, and identification ID of its own to the sub servers as upper level terminals (step S163).

At this moment, the end side terminal 160 may send read or input biometrics information itself to sub servers too.

Sub servers, on the basis of individual identification ID received from the end side terminal 160, search the search information DB or the comprehensive DB in its own (step S166).

As the result of search, when information concerning the individual identification ID concerned is stored in the search information DB or the comprehensive DB (step S167 Yes), sub servers extract the latest existence information (information showing that existence of registered person has been confirmed) and the validation information related therewith or the validation result information from the information, and send them to the end side terminal 160 (step S166).

On the other hand, when as the result of search, when information concerning the individual identification ID concerned does not exits (step S167 No), sub servers sends information showing "no corresponding information" to the end side terminal 160 (step S168).

Further, sub servers sends the information received from the end side terminal 160, and necessary information in its own (the latest existence information and the validation information related therewith or the validation result information) to the aggregation side terminal 150 as upper level terminal (step S169).

The aggregation side terminal 160 performs the same processes as the above steps S166 to S169 (steps S170 to S173). Further, at step S172, the aggregation side terminal 150 sends information to sub servers and the end side terminal 160, and at step S173, it sends information to the authentication system server 10.

Next, the authentication system server 10 on the basis of the individual identification ID received from the aggregation side terminal 150 thereof, searches the search DB 16 or the comprehensive DB 11 in its own (step S174).

As the result of search, when information concerning the individual identification ID concerned is stored in the search information DB 16 or the comprehensive DB 11 (step S175 Yes), the authentication system server 10 extracts the latest existence information and the validation information related therewith or the validation result information from the information, and sends them to the end side terminal 160, sub servers and the aggregation side terminal 150 (step S176).

Thereafter, the authentication system server 10 compares and collates biometrics information stored in its own, sub servers, the aggregation side terminal 150 and the authentication system server 10 and the like, and read or input biometrics information (step S177), and performs authentication judgment whether the registered person exists or not (step S178).

And, at this moment, the end side terminal 160 may compare and collate the latest existence information stored in its own, sub servers, the aggregation side terminal 150 and the authentication system server 10 and the like, temporal information and spatial information of read/input individual information (biometrics information).

As the result of collation, when registered person is authenticated as identical person, the end side terminal 160, by use of the availability information DB 165 that the terminal has, permits or proceeds various services provided by the end side terminal concerned (step S179).

Next, the end side terminal 160 stores and registers biometrics information read or input this time, authentication result information, and temporal information showing period of the authentication, to respective specified columns of the comprehensive DB 161 (step S180).

Thereafter, at the necessity of update, the end side terminal 160 may replace the information read or input this time and the like with existing information in the search information DB 166 (step S181).

The comparison of temporal information and spatial information as the feature of the present authentication system is carried out on the basis of consistency of the entire authentication system, and accordingly it is possible to improve the security of the authentication system furthermore than operation only by the history information existing in database of the terminal concerned from and to which individual information is read/input this time.

In particular, biometrics information, temporal information and spatial information are combined and thereby registered person individual is validated comprehensively and widely, and thereby, it is possible to continuously specify registered person temporally, and exclude "spoofing" and "virtual name".

Further, since terminals and servers structuring the authentication system are connected via network, it is possible to perform processes such as authentication and the like, with databases of terminals and servers as a database, and eliminate geographical isolation and temporal isolation even in physically separated space, and easily compare existence authentication information.

Eighth Embodiment (Authentication Process by Information Recording Medium)

In the examples explained above, individual authentication of registered person is carried out by servers and terminals of the authentication system. Meanwhile in the present embodiment, an information recording medium having a CPU such as an IC card and the like that registered person owns carries out individual authentication of registered person.

FIG. 39 is a sequence chart showing an action example where in an eighth embodiment of the present invention, reader of biometrics information reads biometrics information, but since it does not have a database, information is collated with database outside of the device, and information that registered person is identical person is sent, in an eighth embodiment of the present invention.

For example, in IC card, authentication software is packaged that compares biometrics information to specify individual, the information concerned and newly read or input biometrics information, and calculates consistency rate and "threshold value" and the like and thereby performs individual authentication, and biometrics information read by biometrics information reader is compared and collated in the IC card.

Registered person inserts the IC card storing biometrics information to specify individual to the information reader. And, by a scanner attached to the information reader, registered person reads biometrics information (step S191), and sends read information (input information) to the inserted IC card (step S192).

The IC card converts read information data so that the received biometrics information should match the authentication software in its own (step S193).

Next, the IC card compares the converted read information, and data stored beforehand in its own, and calculates consistency rate and "threshold value" and the like (step S194), and judges whether the read information is of registered person itself or not (step S195).

When data match (step S195 Yes), the IC card sends information that the read information and identical person name and data match to the end side terminal 160 (step S196).

Meanwhile, it is preferable that in the IC card, in addition to biometrics information to specify individual, individual identification ID is stored, and in the case with the individual identification ID, the IC card sends the information concerned to the end side terminal 160.

Meanwhile, the IC card may send the above information to the end side terminal 160 in radio and non contact manner, or may contact the end side terminal 160 and send it.

The end side terminal 160 compares individual identification IC received from the IC card, and previous registered information in the search information DB 166. As the result of comparative collation, when individual identification ID matches previous registered information, individual identification ID is specified (step S197).

Thereafter, the end side terminal 160 compares and collates information stored in the comprehensive DB 161 in individual folder of the specified individual identification ID, and information sent from the IC card, and performs authentication judgment whether registered person is identical person or not (step S198).

Meanwhile, processes after this (steps S199 to S291) are same as processes (steps S156 to S158) in the first embodiment.

Further, at necessity, as in the seventh embodiment, authentication of existence is carried out in the entire authentication system.

As explained above, in the present embodiment, the IC card stores basic information necessary for individual identification, and, has software for authentication that performs individual authentication by the information.

Thus, by performing authentication process of individual information of registered person by use of a highly general purpose IC card, it is possible to reduce the load of process of the entire authentication system.

Further, separately from the IC card, in other terminals and servers, information that is permitted by authentication by the IC card and information showing existence continuity in the entire authentication system are stored, and accordingly, necessary information such as existence authentication information and validation information and permission information and the like is stored separately, and consequently, it is possible to reduce risks at emergency such as information leakage and theft and the like.

Furthermore, to the IC card according to the present embodiment, a function of conventional cell phone may be added, or description contents of certificates such as driver's certificate and basic resident register card and the like may be stored, and functions and purposes of such cell phone and certificates may be stored compositively.

Thereby, it is possible to improve convenience further more than the prior art, and validate the existence of registered person more precisely than conventional certificates.

Moreover, in the present embodiment, in the authentication system, individual information (biometrics information and activity history and the like) of registered person is stored in both the IC card that the registered person owns, and databases of terminals and servers. Therefore, even if individual information in either the IC card or terminals and the like is illegally rewritten, since other individual information is stored in original contents, it is possible to prevent a malicious third party from using it, and appropriately cope with "spoofing".

Ninth Embodiment (Authentication Process based on Matching of Read Sequence and Plural Information Items)

In the examples explained above, individual authentication of registered person is carried out by collation of read individual information of registered person, and individual information in database. Meanwhile in the present embodiment, in addition to the collation of the individual information itself, when plural information items are collated, individual authentication is performed in consideration of whether the input sequence of individual information by registered person is right or not.

FIG. 40 is a sequence chart showing an action example of individual authentication where when terminal to which individual information is input collates information in its own, and read or input information and judges whether the registered person is an existing person, and whether registered information is true, in addition to collation of individual information, it is judged whether read or input sequence of one or plural information items registered beforehand to terminal is proper or not, in a ninth embodiment of the present invention.

In the present embodiment, as an example, the action where the end side terminal 160 is read biometrics information of registered person and authentication is performed is explained.

The end side terminal 160, by use of attached scanner, reads or inputs one or more biometrics information of registered person, and stores it to database of its own (step S211).

At this moment, if it reads/inputs plural biometrics information, in the sequence registered beforehand in the end side terminal 160 (for example, in the order of fingerprint→iris→voiceprint), respective biometrics information is read/input.

Meanwhile, in order to prevent alteration or abuse of fabricated information, at the moment of reading/inputting this biometrics information, authentication may be made invalid when it does not complete in a certain time. For example, when to read fingerprint in the sequence of thumb→annular finger→index finger, fingers to be exposed to the scanner can be changed at once, and if it takes 2 seconds or more in changing fingers, authentication may be made unavailable.

The end side terminal 160 compares read or input biometrics information, and previous registered biometrics information in the search information DB 166 in its own. As the result of comparative collation, when read or input biometrics information matches previous registered biometrics information in the search information DB 166, individual identification ID is specified (step S212).

Thereafter, the end side terminal 160 extracts corresponding information from individual folder of the specified individual identification ID 8 step S213), and compares and collates the extracted information and the read or input information (step S214), and performs authentication judgment whether registered person is identical person or not (step S215).

Then, the end side terminal 160 compares the read/input sequence of biometrics information and sequence registered information in the search information DB 166 (step S216).

As the result of comparison and collation, when the read/input sequence of biometrics information matches the registered sequence in the search information DB 166 (step S217 Yes), it is judged that the existence of registered person individual has been authenticated.

Meanwhile, processes after this (steps S218 to S220) are same as the steps S156 to S158 in the sixth embodiment.

As explained above, in the present embodiment, plural individual information and read sequences are registered to terminals and servers of the authentication system, and authentication is performed according to matching conditions thereof, and accordingly, even in the case where a malicious third party uses the same terminal as the terminals that the registered person normally uses, or the same kind of individual information as that of the registered person, it is possible to easily prevent "spoofing" by the third party, and improve the precision of authentication of existence.

That is, even if individual information of the registered person leaks out to the third party, it is difficult for the third party to do "spoofing" by making the read sequence of individual information matched, and it is possible to secure security farther more than the case where the number of individual information for existence authentication is limited one piece.

Thus, by using plural individual information of registered person, and performing authentication by the read/input sequence, even if information leaks out, it is possible to safely use individual information of biometrics information and the like as authentication means, and effectively use the authentication system.

Meanwhile, in the operation of the authentication system,
1. Read or input information may be changed at necessity or optionally.
2. Read or input sequence setting of information may be changed at necessity or optionally.

When individual information for authentication is changed periodically or at necessity, even in the case of leakage of biometrics information and the like, by combining changing the contents and sequence of individual information for existence authentication in the present authentication system, and using 4-point authentication method where authentication action is consistency of spatial information and temporal information, it is possible to safely and continuously use the system.

Tenth Embodiment (Regulation of Registered Information Amount in Each Terminal)

Hereinafter, in the present embodiment, a process where in the case when data amount of individual information of registered person to be stored in each terminal is expected to exceed the memorable amount (number of items) in its own, the excessive amount is transferred to upper level terminal is explained.

FIG. 41 is a sequence chart showing the flow of the above data transfer processing, in the authentication system according to a tenth embodiment of the present invention.

In the present embodiment, as an example, the case where individual information of registered person is transferred from the building structure side terminal 110 to the aggregation side terminal 150.

Meanwhile, it is supposed that to each database, the number of information items or information amount to be stored in the database is set beforehand.

The building structure side terminal 110, when individual information is input newly from registered person, or on receiving individual information of registered person from the end side terminal 160 (step S221), confirms registration remaining number of items or remaining amount in specified column of the comprehensive DB 111 (step S222, S223).

When the data amount of individual information input/read this time is within the storable range of the comprehensive DB 111 (step S224 Yes), it registers the received individual information.

On the other hand, when in the comprehensive DB 111, there is no remaining number of items or remaining amount necessary to register the received individual information (step S224 No), the building structure side terminal 110 extracts a certain amount of individual information, among individual information already stored in the specified column of the comprehensive DB 111 (step S225), and sends the extracted individual information to the aggregation side terminal 150 (step S226).

Herein, the building structure side terminal 110 is to delete individual information sent to the aggregation side terminal 150, in order to newly register individual information received/input this time, and the individual information to be deleted is selected according to sequence of old registration period of individual information, or sequence of low priority of use in the sub server (preset).

The aggregation side terminal 150, on receiving individual information from the building structure side terminal 110, registers the received individual information to the comprehensive DB 151 (step S227). After registration processing, the aggregation side terminal 150 confirms that information registration is complete (step S228), and sends information that the registration of individual information received from the building structure side terminal 110 is complete to the building structure side terminal 110 (step S229).

The building structure side terminal 110, on receiving information of completion of registration from the aggregation side terminal 150, carries out a process to delete information sent at the step S226 (step S230).

The building structure side terminal 110 registers newly received or input individual information, to empty storage area of the comprehensive DB 111 that has been made as the result (step S231).

Meanwhile, it is preferable that to the registration completion information sent from the aggregation side terminal 150 at the step S229, information to request the building structure side terminal 110 to carry out the above deletion processing, and when the building structure side terminal 110 receives request information of the deletion processing, its action is controlled to automatically carry out the deletion processing according to the required information.

Further, after this, each terminal, at every time when a certain amount of individual information is registered to its own, sends part of individual information registered before, to upper level terminals and servers used for the registration, and deletes the sent individual information, and thereby, it is possible to reduce concentration of processes to one terminal, in the authentication system.

Thus, in the present embodiment, at search of individual information and authentication processing of registered person, a large amount of information is sent and received among terminals and servers, but by keeping the information amount of each terminal constant, it is possible to restrain load of information search and authentication processing in each terminal.

In lower level terminals, unnecessary or old individual information is deleted one after another, and the deleted individual information is sent and managed to servers and terminals managed by for example highly reliable organization, and thereby security management of the entire authentication system becomes easy. Further, in the case of leakage of individual information from each terminal, not all of individual information registered before is lost, and accordingly, security of registered person individual is increased.

Eleventh Embodiment (Registered Information Backup Process 1)

Hereinafter, in the present embodiment, a process to buck up registered information in each terminal by its upper level terminal is explained.

FIG. 42 is a sequence chart showing an action example where transfer process is carried out to transfer individual information that each terminal stores to its upper level terminal for backup in an eleventh embodiment of the embodiment.

In the present embodiment, as an example, the action where the building structure side terminal 110 transfers individual information to the aggregation side terminal 150 for backup of individual information is explained.

In the present embodiment, when individual information is backed up in the authentication system, date and time of backup execution, and terminal identification ID of terminal having backup individual information are stored to database in association with the individual information.

The building structure side terminal 110 confirms the backup condition of individual information stored to specified column of the comprehensive DB 111. And, the building structure side terminal 110 extracts individual information with backup processing not yet made, from information stored in the specified column (step S241), and sends information to the aggregation side terminal 150 (step S242).

The aggregation side terminal 150, on receiving individual information from the building structure side terminal 110, performs registration processing to the comprehensive DB 151 and the search information DB 156 (steps S243, S244). At this moment, the aggregation side terminal 150 performs validation processing whether individual information to be backed up causes double registration with individual information already stored in the comprehensive DB 151 and the search information DB 156, and stores the information.

In the present authentication system, even with the same kind of information, if dates and times of information are different, it is stored as other information, and it is not written in principle.

After processing, the aggregation side terminal 150 confirms that information registration is complete (step S245), and sends the information that the backup registration of individual information received from the building structure side terminal 110 is complete to the building structure side terminal 110 (step S246).

The building structure side terminal 110, on receiving the information of registration completion from the aggregation side terminal 150, performs a process to add information showing that the backup is complete, and the date and time thereof, and terminal of storage destination of backup respectively (step S247).

Meanwhile, it is preferable that, registration completion information sent from the aggregation side terminal 150 in the step S246 includes information to ask for execution process to add various information concerning the above backup to the building structure side terminal 110, and when the building structure side terminal 110 receives the request information of the addition process, the addition process of various information concerning backup is automatically performed according to the request information.

Further, in order to prevent backup leakage, backup process may be executed automatically per certain number of items, certain amount or certain date and time.

All individual information is stored in terminal and server that directly uses the information (hereinafter, this information is referred to as active information).

On the other hand, in preparation for deletion of active information, disconnection of communication with terminal having active information, information to manage information by other terminal than terminal having active information is made backup information.

As explained above, in the present embodiment, in the authentication system, individual information is stored in two or more portions, and accordingly it is possible to prevent the individual information from being lost completely in the authentication system. As a result, by use of plural individual information registered in time series, it is possible to authenticate the existence of registered person continuously, and improve the precision of the authentication.

Twelfth Embodiment (Registered Information Backup Process 2)

In the eleventh embodiment explained above, the building structure side terminal 110 registers registered information to the aggregation side terminal 150 as its upper level terminal for backup. In the present embodiment, further, the aggregation side terminal 150 registers registered information to the authentication system server 10 for backup.

FIG. 43 is a sequence chart showing an action example where transfer process is carried out to transfer individual information that each terminal stores to the authentication system server 10 in a twelfth embodiment of the embodiment. In the present embodiment, as an example, the action where individual information transferred from the building structure side terminal 110 to the aggregation side terminal 150 is further transferred to the authentication system server 10 is explained.

The processes (steps S251 to S257) where the building structure side terminal 110 extracts individual information, and performs backup process to the aggregation side terminal 150, and the building structure side terminal 110 registers the execution condition are same as the processes (steps S241 to S247) in the above eleventh embodiment.

Next, the aggregation side terminal 150 judges whether the individual information stored in specified column of the comprehensive DB 151 is registered in the authentication system server 10 or not (step S258).

And, the aggregation side terminal 150 extracts information not registered in the authentication system server 10, from the individual information stored in the comprehensive DB 151, and sends the extracted individual information to the authentication system server 10 (step S259).

The authentication system server 10, on receiving individual information from the aggregation side terminal 150, registers the received individual information to the comprehensive DB 11 (step S260).

At this moment, the authentication system server 10 performs validation processing whether the received individual information causes double registration with individual information already stored in the comprehensive DB 11, and stores the information.

Further, in the present authentication system, even with the same kind of information, if dates and times of information are different, it is stored as other information, and it is not written in principle.

Furthermore, in order to prevent transfer leakage, backup process may be executed automatically per certain number of items, certain amount or certain date and time.

The authentication system server 10, after backup processing, confirms that individual information registration is complete (step S261), and sends the information that the backup registration of individual information received from the aggregation side terminal 150 is complete to the aggregation side terminal 150 (step S262).

The aggregation side terminal 150, on receiving the information of registration completion from the authentication system server 10, and sends information that it has transferred part or whole of individual information backup registered by receiving from the building structure side terminal 110 to the authentication system server 10, to the building structure side terminal 110 (step S263).

Thereafter, the aggregation side terminal 150 deletes individual information sent at the step S259 (step S264).

When the building structure side terminal 110 receives information of registration completion from the aggregation side terminal 150 to the authentication system server 10, changes various information added to information sent at the step S259 in the comprehensive DB 111, into information showing the transfer to the authentication system server 10, and the date and time thereof (step S265).

Meanwhile, it is preferable that registration completion information of individual information sent from the aggregation side terminal 150 includes information to ask for execution process to add various information concerning the above change process of various information to the building structure side terminal 110, and when the building structure side terminal 110 receives the request information of the addition process, it automatically performs the change process of various information concerning backup is according to the request information.

Further, all individual information is stored finally in the authentication system server 10 or the external organization server 300. As a result, as a first effect, it is possible to secure the name identification process. Further, as a second effect, if enormous individual information is accumulated in terminals, the risk of leakage increases, and damage in the case of leakage becomes conspicuous, therefore, information is collected to servers that can strictly manage information (authentication system server 10, the external organization server 300), and unnecessary information is reduced. As a third effect, it is possible to reduce load of processes in terminals.

Thirteenth Embodiment (Registered Information Backup Process 3)

Hereinafter, in the present embodiment, connection/connection release actions by the authentication system server 10 with other devices at the backup process of registered information are explained.

FIG. 44 is a sequence chart showing an action example where individual information that each terminal stores is transferred to the authentication system server 10, and further transferred to the external organization server 300 in a thirteenth embodiment of the embodiment.

In the present embodiment, as an example, the action where individual information that each terminal stores is transferred to the authentication system server 10, and further transferred the external organization server 300 is explained.

Hereinafter, additional portion in the process of the twelfth embodiment is explained mainly.

The aggregation side terminal 150 extracts the external organization server 300 information not registered in the authentication system server 10, from the individual information stored in the comprehensive DB 151 (step S271), and sends the extracted individual information to the authentication system server 10 (step S272).

The authentication system server 10, on receiving individual information from the aggregation side terminal 150, sends information to release connection between its own and the external organization server 300, to the external organization server 300 (step S273), and releases the connection with the external organization server 300.

Next, the authentication system server 10 registers individual information received from the aggregation side terminal 150 to the comprehensive DB 11 and the search information DB 16 (steps S274, S275).

And, the authentication system server 10 confirms that individual information registration is complete (step S276), and sends the information that the backup registration of individual information received from the aggregation side terminal 150 is complete to the aggregation side terminal 150 (step S277).

Next, the authentication system server 10 judges whether the individual information stored in the specified column of the comprehensive DB 11 is registered in the external organization server 300 or not. And, it judges from information stored in the specified column, whether there is information not yet backed up in the external organization server 300, and there is need to execute backup process or not (step S279).

When the authentication system server 10 judges that the backup process is necessary, it extracts individual information to be backed up from the comprehensive DB 11 and the like (step S279).

Further, the authentication system server 10 sends information to release the connection between its own and the aggregation side terminal 150 to the aggregation side terminal 150 (step S280), and releases the connection with the aggregation side terminal 150.

Next, the authentication system server 10 connects to the external organization server 300 again, and sends the extracted individual information to be backed up to the external organization server 300 (step S281).

The external organization server 300 registers the individual information received from the authentication system server 10 in its own for the purpose of backup (step S282).

The external organization server 300, on confirming that the backup registration of the individual information is complete (step S283), sends information that the backup registration of the individual information received the authentication system server 10 is complete to the authentication system server 10 (step S284).

FIG. 45 (*a*) and FIG. 45 (*b*) are figures showing connection conditions between terminals and servers in the thirteenth embodiment, In the figures, the solid line means now in connection, and the dot line means connection released.

In FIG. 45 (*a*), the authentication system server 10 is connected to the external organization server 300, and is not connected to lower level terminals. On the other hand, in FIG. 45 (*b*), the authentication system server 10 is connected to lower level terminals, and is not connected to the external organization server 300.

In the same manner, in each terminal too, if the terminal is connected to the upper level terminals thereof, it may be not connected to the lower level terminals thereof, meanwhile, if the terminal is connected to the lower level terminals thereof, it may be not connected to the upper level terminals thereof.

In the present embodiment, in the authentication system, as part of security countermeasures against hacker attacks and virus infection and the like, the network is not always connected. Therefore, there occurs a dead end street in the authentication system, and at occurrence of a problem, its spread to other terminals can be prevented.

Fourteenth Embodiment (Registered Information Backup Process 4)

Hereinafter, in the present embodiment, the basic important information of registered person such as name, date of birth, address information and the like, among individual information, and the biometrics information registered for authenticating the existence of registered person individual are backed up bay databases at two or more portions, in order to prevent these information from being deleted, altered or the like.

FIG. 46 is a sequence chart showing an action example where individual information that the authentication system server 10 is transferred to two external organization servers at the same time in a fourteenth embodiment of the embodiment.

In the present embodiment, these two external organization servers are external organization servers 300A, 300B respectively.

The authentication system server 10 confirms whether the individual information stored to the specified column of the comprehensive DB 11 is registered in the external organization servers 300A, 300B or not.

Further, the authentication system server 10 extracts individual information not yet registered to the external organization servers 300A, 300B, from the information stored in the specified column of the comprehensive DB 11 (step S291), and sends the extracted individual information to the external organization servers 300A, 300B respectively at the same time (step S292).

The external organization servers 300A, 300B, on receiving the individual information from the authentication system server 10, performs registration process to the comprehensive CBs 311A, 311B installed in its own (steps S293, S294).

At this moment, the external organization servers 300A, 300B perform validation processing whether individual information received here causes double registration with individual information already stored in the comprehensive DBs 311A, 311B, and store the information. And at this moment, in the external organization servers 300A, 300B, even with the same kind of information, if dates and times of information are different, it is stored as other information, and it is not written in principle.

After registration process of individual information, the external organization servers 300A, 300B confirm that information registration is complete (steps S295, S296), and send the information that the backup registration of individual information received from the authentication system server 10 is complete to the authentication system server 10 (step S297).

The authentication system server 10 performs comparison and collation processing of stored information to the information in the comprehensive DB 311A, and the information in the comprehensive DB 311B, at necessity, per certain number of items, certain amount or certain date and time (step S298).

For example, there is a case where the external organization server 300A is in Okinawa, and the external organization server 300B in Hokkaido, and they are apart geographically, or another case where the external organization server 300A is under jurisdiction of the Ministry of Foreign Affairs, and the external organization server 300B under jurisdiction of the Bank of Japan, and they are apart in organizations.

The comprehensive DBs 311A, 311B in principle store identical individual information.

The authentication system server 10 collates individual information stored in the comprehensive DBs 311A, 311B respectively, and performs collation processing, and if there is mismatch in data, it judges that there is a possibility of troubles such as data alteration or the authentication system failure or the like.

In the present authentication system, the continuity and unchangeability of individual information of registered person are made the authentication criterion, and accordingly, mismatch in data is considered to be a fault in individual information, and warning information is sent to the person concerned, and at the same time, use functions are limited.

Meanwhile, the authentication system server 10, on receiving information that the individual information stored in its own has been backup registered to databases of two or more external organization servers, it may delete the individual information stored in its own in some cases.

Fifteenth Embodiment (Registered Information Backup Process 5)

In the present embodiment, the actions where the authentication system server 10 alternately or separately backs up individual information stored in its own, to two external organization servers are explained.

FIG. 47 is a sequence chart showing an action example where the authentication system server 10 alternately or separately backs up individual information stored in its own, to two external organization servers in a fifteenth embodiment of the embodiment.

In the present embodiment, these two external organization servers are external organization servers 300A, 300B respectively.

The authentication system server 10 confirms whether the individual information stored to the specified column of the comprehensive DB 11 is registered in the external organization servers 300A, 300B respectively or not.

And, the authentication system server 10 extracts individual information not yet registered to the external organization servers 300A, 300B, from the information stored in the specified column of the comprehensive DB 11 (step S301).

Next, the authentication system server 10 confirms the present connection conditions between its own and the external organization server 300B, and when it is connected to the external organization server 300B, it sends information to stop connection to the external organization server 300B (step S302), and releases the connection between its own and the external organization server 300B.

Thereafter, the authentication system server 10 sends individual information to be backed up to the external organization server 300A (step S303).

The external organization server 300A, on receiving individual information from the authentication system server 10, performs registration processing to the comprehensive DB 311A installed in its own (step S304).

At this moment, the external organization server 300A performs validation processing whether individual information received here causes double registration with individual information already stored in the comprehensive DB 311A, and stores the information. Further, in the external organization server 300A, even with the same kind of information, if dates and times of information are different, it is stored as other information, and it is not written in principle.

After registration process of individual information, the external organization server 300A confirms that information registration is complete (step S305), and sends the information that the backup registration of individual information received from the authentication system server 10 is complete to the authentication system server 10 (step S306).

Next, the authentication system server 10 sends information to stop connection, to the external organization server 300A (step S307), and releases the connection between its own and the external organization server 300A.

Furthermore, the authentication system server 10 sends information to start connection, to the external organization server 300B (step S308), and restarts the connection between its own and the external organization server 300B.

Thereafter, the authentication system server 10 performs the backup processing (steps S309 to S312) with the external organization server 300B, in the same manner as in the processing (steps S304 to S306) with the external organization server 300A.

Moreover, the authentication system server 10 compares stored information of the comprehensive DBs 311A, 311B, and performs collation processing, and if there is mismatch in data, it judges that there is a possibility of troubles such as data alteration or the authentication system failure or the like (step S312).

For example, in the case where there are two fingerprint information backed up in the comprehensive DB 311A (existence information read at 11:00 AM and 11:20 AM at working place in Ohte-machi, Chiyoda-ku, Tokyo), and there is iris information backed up in the comprehensive DB 311b (existence information read at 11:10 AM at a bank in Nishi-ikebukuro, Toyoshima-ku, Tokyo), it is judged that there is no consistency from time and place.

In the present authentication system, the continuity and unchangeability of individual information of registered person are made the authentication criterion, and accordingly, mismatch in data is considered to be a fault in individual information, and warning information is sent to the person concerned, and at the same time, use functions are limited.

In the fifteenth embodiment, the authentication system server 10 performs backup of individual information separately to the external organization servers 300A, 300B. Therefore, in the external organization servers 300A, 300B, it is possible to dispersed individual information according to extraction period and information kinds and the like and stores it.

In the fourteenth embodiment, identical individual information is stored to the comprehensive DBs 311A, 311B, meanwhile in the present embodiment, individual information stored in the comprehensive DBs 311A, 311B is not necessarily identical.

For example, the external organization server 300A accumulates and backs up data concerning the building structure side terminal 110, and the external organization server 300B accumulates and backs up data concerning the organization side terminal 120.

Further, in the morning, individual information concerning the building structure side terminal 110 may be accumulated and backed up to the external organization server 300A, and in the afternoon, data concerning the organization side terminal 120 may be accumulated and backed up to the external organization server 300B.

In the present embodiment, in order to back up information of individual authentication in daily living and information for existence alibi in detail according to occurrence sequence of the information, backup processing is dispersed to optimal external organization server to store the information.

For example, in the case where by readers of biometrics information with different reading methods, fingerprint information of registered person is read, and stored in the authentication system, it is efficient to structure and store databases individually according to the reading methods.

In this case, like in the present embodiment, the authentication system server 10 may perform transfer processing alternately or separately according to the format of read information, and sort information to databases of backup destination.

Sixteenth Embodiment (Registered Information Backup Process 6)

In the fourteenth and fifteenth embodiments, double backup of individual information is not carried out, meanwhile in the present embodiment, a method is applied where double registration is partially permitted.

FIG. 48 is a sequence chart showing an action example where individual information stored in the authentication system server 10 is transferred alternately or separately to three external organization servers in a sixteenth embodiment of the embodiment.

In the present embodiment, these two external organization servers are external organization servers 300A, 300B, 300C respectively.

In the present embodiment, as an example, the authentication system server 10 sorts its backup destinations, according to registration time (period) of individual information.

For example, the external organization server 300A stores data whose temporal information is from 0:00 to 9:00. The external organization server 300B stores data whose temporal information is from 8:00 to 17:00. The external organization server 300C stores data whose temporal information is from 16:00 to 1:00 next day.

The authentication system server 10 confirms whether individual information stored in the specified column of the comprehensive DB 11 is stored in the external organization servers 300A, 300B, 300C respectively or not.

Further, the authentication system server 10 extracts individual information not yet registered to the external organization servers 300A, 300B, 300C from the information stored in the specified column of the comprehensive DB 11 (step S321).

Next, the authentication system server 10 confirms the present connection conditions between its own and the external organization server 300B, 300C, and when it is connected to the external organization server 300B, 300C, it sends information to stop connection to the external organization servers now in connection (step S322), and releases the connection between its own and the external organization servers now in connection.

Thereafter, the authentication system server 10 sends individual information to be backed up to the external organization server 300A (step S323).

After lapse of a specified time, the authentication system server 10 extracts individual information to be backed up (step S324), and restarts the connection with the external organization server 300B, and sends the extracted individual information to both the external organization servers 300A, 300B (step S325).

The external organization server 300A, on receiving individual information from the authentication system server 10, performs registration processing to the comprehensive DB 311A installed in its own (step S326).

At this moment, the external organization server 300A performs validation processing whether individual information received here causes double registration with individual information already stored in the comprehensive DB 311A, and stores the information. Further, in the external organization server 300A, even with the same kind of information, if dates and times of information are different, it is stored as other information, and it is not written in principle.

After registration process of individual information, the external organization server 300A confirms that information registration is complete (step S327), and sends the information that the backup registration of individual information received from the authentication system server 10 is complete to the authentication system server 10 (step S328).

Next, the authentication system server 10 sends information to stop connection, to the external organization server 300A (step S329), and releases the connection between its own and the external organization server 300A.

Thereafter, the authentication system server 10 performs the processing (steps S330 to S341) with the external organization server 300B, 300C in the same manner as in the processing (steps S324 to S329 (with the external organization server 300A.

Moreover, the authentication system server 10 performs comparison and collation processing of stored information to the information in the comprehensive DB 311A, and the information in the comprehensive DB 311B, and the information in the comprehensive DB 311C at necessity, per certain number of items, certain amount or certain date and time (step S342).

In the present embodiment, in preparation for unexpected information loss and disconnection of communication line and the like, individual information for existence comparison validation is stored partially in duplicate. In the above example, even if individual information is lost in the external organization server 300B, by combining data stored in the external organization server 300A and the external organization server 300C, it is possible to minimize the loss.

In the present authentication system, in order to secure continuity of existence, even in the case of accident or loss, temporal discontinuation is made as short as possible.

In the eleventh through sixteenth embodiments, explanations have been made mainly on the authentication system server 10, however, the present authentication system is not limited to the above embodiments, but upper level terminals and lower level terminals may be connected via network only when data is sent and received.

Seventeenth Embodiment (Terminal Connection Order)

As described previously, when the authentication system registers individual information and authenticates registered person and the like, information is sent and received among terminals and servers configuring the system.

In the present embodiment, terminals and servers make connections with other terminals and servers according to preset priority order in order to send and receive information.

In the present embodiment, in the authentication system, the aggregation side terminal 150W has a structure to manage lower level building structure side terminals 110A, 110C, organization side terminal 120A.

FIG. 49 is a figure showing terminal of connection objective of the building structure side terminal 110C in a seventeenth embodiment.

Each terminal of the authentication system stores information showing priority order of terminals for connection of its own as shown in the figure, at authentication processing of registered person and the like.

In the case shown in the figure, the building structure side terminal 110C first tries to connect the building structure side terminal 110A with priority, and if the connection is not carried out normally, then it tries to connect the organization side terminal 120A, the aggregation side terminal 150D, the aggregation side terminal 150B, and so on in this order with priority.

Further, in the case of emergency, the building structure side terminal 110C tries to connect the aggregations side terminal 150W.

FIG. 50 is a sequence chart showing an action example when the building structure side terminal 110C makes connection with other terminal, in the seventeenth embodiment.

Hereinafter, with reference to the figure, the actions in the present embodiment are explained.

Each terminal, in sending information, makes access on the basis of terminal information for priority connection stored in its own. As described previously, in the case of the building structure side terminal 110C, the terminal to which it is connected with priority in ordinary operation is the building structure side terminal 110A.

The building structure side terminal 110C extracts specified individual information from its own comprehensive DB 111C (step S351), and sends the extracted individual information to the building structure side terminal 110A set with highest priority (step S352).

Herein, when the connection between the building structure side terminal 110C and the building structure side terminal 110A is carried out normally, and necessary information is exchanged, the building structure side terminal 110C is not connected to other terminal.

However, for some reason, when the building structure side terminal 110C detects condition of no connection with the building structure side terminal 110A (sent information does not arrive the building structure side terminal 110A) (step S354), the building structure side terminal 110C sends the above extracted individual information to the building structure side terminal 110A with the next priority (step S355).

In the case when connection with terminal of sending destination of individual information cannot be established, according to the above priority order, the building structure side terminal 110C tries connection (steps S356 to S359).

Finally, the building structure side terminal 110C makes connection to emergency connection terminal (aggregation side terminal 150W).

Meanwhile, it is preferable that in the case when the building structure side terminal 110C fails in access to terminal of sending destination of individual information once or for specified times, access is changed to terminal of the next priority order.

Thus, in each terminal, information of terminal of connection with highest priority, terminal of connection in the case of non connection with the highest priority terminal, or terminal of connection at emergency is set.

In daily living, action ranges of people are determined to some extent, and it is normal that use opportunity of large part of terminals installed out of the action ranges is extremely small.

For example, when a certain registered person is walking on the road of residential district, the opportunity to use the building structure side terminal 110 installed in other's building along the road, or the organization side terminal 120 of management unit of other family and company organization is extremely small.

Therefore, a certain terminal's sending information to other terminal unlimitedly may lead to complicated data processing, increase of load of circuit, and increase of information leakage risks.

Accordingly, it is preferable that each individual information of registered person is closely related with history information showing action history of each registered person, and try sending only to terminals that are considered to be related the registered person individual.

In conventional communication systems such as internet and mesh radio information system and the like, information is diffused, and is connected optionally to the connectable point at that time, among plural connection points, and goes to receiving destination. While on the other hand, in the present authentication system, terminals are connected via wire, sensor node where radio wave is sent only in extremely short distance and IC tag and thereby network is configured, and accordingly information can be exchanged without diffusion.

In conventional communication systems such as internet and mesh radio information system and the like, communication line network is generally made public, and accordingly, there are malicious people on communication line network, and they easily commit unauthorized browsing and unauthorized acquisition and unauthorized alteration. Against these, in the present authentication system, terminals close at hand use communication line technology of limited range such as extremely weak radio communication and infrared ray and the like, and when operation ends between the end side terminal 160 and sub servers, public line network may not be used. In addition, terminals of mutual communication are made clear, and terminal identification ID of the terminal and connection terminal list information are compared and collated. As a result, it is possible to prevent unauthorized access by double security.

In the conventional authentication system, information is transmitted unlimitedly and arrives destinations, but in the present authentication system, information is transmitted under limitation.

(Access at Emergency)

In installation area of terminals a certain registered person uses daily, when an accident such as power failure, incomplete communication and device failure and the like occurs in wide area, access is made to terminals installed in the area where the accident by such disaster does not occur, that is, terminals installed in the area largely apart geographically from the disaster occurrence area.

Thereby, at emergency, when upper level terminal of the terminal that registered person uses does not work, the terminal to be used is connected to other working terminal, and it is possible to perform data comparison for individual existence authentication and provision of authentication data and the like.

As access destinations at emergency, there are the authentication system server 10, the external organization server 300 or the aggregation side terminal 150 or the like, and they store all or necessary part of individual information stored in destination terminals designated by the connection information terminal list of terminal that registered person uses as backup or original.

It is preferable that the access places at emergency should be coped with in mutual association of governing organs in Japan, and in mutual association of Japan and countries all over the world. Further, in order to minimize unnecessary leakage or alteration of information, it is preferable that addresses of route places of information and managers should be judged clearly, and the route places are set to public places without unauthorized acts, governing organs, financial organs, communication providers, hospitals and the like.

Eighteenth Embodiment (Transmission Function to Plural Terminals)

In the embodiments explained above, each terminal in principle sends individual information to one upper level terminal. While on the other hand, in the present embodiment, each terminal sends information to two designated partner terminals.

FIG. 51 is a figure showing terminals to be connected with the building structure side terminal 110C, in an eighteenth embodiment.

Each terminal of the authentication system stores information showing the priority order of terminals to which its own makes connection as shown in the figures. Further, in connection destination terminals with this priority (hereinafter, referred to as main route terminal), other destination terminals that send information at the same time when information is sent to them (hereinafter, referred to as reflection terminals) are set per terminal.

FIG. 52 is a sequence chart showing an action example where the building structure side terminal 110C connect communications to other terminals, in the eighteenth embodiment. In the present authentication system, each terminal has a function to automatically send information to plural portions.

As shown in the figure, first, the end side terminal 160 reads biometrics information (step S401), and sends the read biometrics information and movement information to the building structure side terminals 110A, 110B (step S402).

In this case, the building structure side terminal 110A is the highest priority connection terminal (main route terminal) designated in the connection information terminal list, and the building structure side terminal 110B is terminal sent secondarily (reflection terminal).

The building structure side terminals 110B stores received information from the end side terminal 160, to the temporary storage DB installed in its own (step S403), and waits for further instruction.

When the end side terminal 160 detects condition of no connection with the building structure side terminal 110A for some reason (step S405), it makes connection with the terminal of the next priority order in the connection information terminal list.

On the other hand, when the connection between the end side terminal 160 and the building structure side terminal 110A succeeds (step S404 Available), the building structure side terminal 110A sends information to show that individual information has been received from the end side terminal 160, to the end side terminal 160 (step S406).

The end side terminal 160, on receiving the information to show that individual information has been received from the building structure side terminal 110A, sends information to request for deletion of individual information stored in the temporary storage DB of the building structure side terminal 110B (step S407).

The building structure side terminal 110B, on receiving the deletion request information from the end side terminal 160, deletes information stored in the temporary storage DB of its own (step S408).

The authentication system according to the present embodiment is to secure place (reflection terminal) to store individual information in the present authentication system, so as to back up individual information, even in the case when terminal of sending source of individual information and terminal of receiving destination.

This reflection terminal is different from access place at emergency, and does not store all individual information of the individual concerned, but it holds information temporarily. Further, it is preferable that according to functions of end side terminal and the like of information read place, same products of readers and different place installation terminals of same manufacturer are made reflection terminal from viewpoint of compatibility of information.

Furthermore, in the present embodiment, the building structure side terminal 110B (reflection terminal), on receiving deletion request information, deletes information stored in the temporary storage DB of its own, and in addition, it may automatically delete information after lapse of a certain time.

Nineteenth Embodiment (Network among Authentication System Servers)

FIG. 53 is an image figure showing a network configuration of authentication system servers 10, in the authentication system according to a nineteenth embodiment of the present invention.

The authentication system server 10 may be installed, for example, per governing unit like prefecture unit or city unit.

Thus, each area is divided into a certain range, and the authentication system server 10 is installed per certain range, and the capacity of individual folders that the authentication system server 10 owns is dispersed, and accordingly it is possible to disperse load of the authentication system into several portions, more effectively than operation of wide range such as country unit by one authentication system server 10.

20th Embodiment (Comparison Collation of Information Stored in Authentication System Server 10 and External Organization Server 300)

As described previously, the authentication system server 10 registers registered information of its own to the external organization server 300, and performs backup. In the present embodiment, registered information in the authentication system server 10, and registered information in the external organization server 300 are compared and collated to check whether registered information is tampered.

FIG. 54 is a sequence chart showing an action example where the authentication system server 10 and the external organization server 300 perform comparison collation processing of stored information at optional time, in a 20th embodiment.

The comprehensive DB 11 of the authentication system server 10, and the comprehensive DB 311 of the external organization server 300, at necessity, perform comparison collation processing of stored information at a certain number of items, a certain capacity or a certain date and time.

At this moment, both the authentication system server 10 and the external organization server 300 can start this collation processing. In the present embodiment, it is supposed that the external organization server 300 starts this collation processing.

First, the external organization server 300 extracts individual information of the portion where collation is performed (step S411). In extracting, there is no need to compare all information stored, but in consideration of past collation conditions, range may be limited to previous existence validation information and history information.

The external organization server 300 sends the extracted information, and information to request for execution of comparison collation with information stored in the authentication system server 10, to the authentication system server 10 (step S412).

The authentication system server 10, on receiving the extracted information and the collation request information, on the basis of the individual identification ID of registered person included in the extracted information, extracts individual information of the corresponding registered person from the basic information DB 14 of its own, and compares to see whether the contents of the information in the basic information DB 14, and the contents of received information match (step S413).

Herein, in the case when the compared contents mismatch, the authentication system server 10 performs emergency warning notice to registered person individual via electronic mail and the like, and restricts the authentication system use of the registered person concerned at once.

On the other hand, in the case when the compared contents match, then the authentication system server 10 compares to see whether the contents of the history information DB 12, and the contents of information stored in the validation information DB 13 and the like match (steps S414, S415).

In the case when mismatch is found, the same notice and use restriction as the above are carried out.

The authentication system server 10 confirms that information contents match in DBs 12 to 14 and in some case (step S416), it sends information of "execution complete, no problem" to the external organization server 300 (step S417).

The authentication system server 10, after sending answer information to the external organization server 300, inputs date and time of comparison processing execution, operator of execution and judge, and sets these input information to compared and collated information and stores it (step S418).

Thereafter, the authentication system server 10 deletes individual information received from the external organization server 300 (step S419).

On the other hand, the external organization server 300, after receiving answer information, sets date and time of comparison processing execution, operator of execution and judge, to the extracted information and stores it (step S420).

Thereafter, the external organization server 300 ends the extraction processing (step S421).

As explained above, in the present embodiment, individual information and the like of registered person stored in the authentication system server 10 and the external organization server 300 are compared, and it is validated whether information is tampered, changed, deleted or the like, and thereby, it is possible to prevent the risk of hacker or malicious programmer operating information.

This validation processing is also carried out in the same manner, between the authentication system server 10 and the aggregation side terminal 150, and between the sub servers and the end side terminal 160 and the like.

21st Embodiment (Recognition of Movement Start and Stop of Registered Person)

When activities of people are analyzed, people live in two special conditions, that is, the condition where people is surrounded by some "things", and the condition where people are released from the "things".

The condition where people is surrounded by some "things" means the condition where people are surrounded by buildings such as home, working place and shops and hospital or structural things such as building structures and the like, and people exist in movement means such as electric train and airplane and vehicle and ships.

The condition where people are released from the "things" means the condition where people exists out of "things" of building structures and movement means, like the condition where people are walking on road, the condition where people spend exercising outdoors.

That a person exists means that the person exists physically in a specified place at a specified time. Therefore, individual existence information is information peculiar to the person, and must be in close relation with the individual existence.

Accordingly, in the present embodiment, information to be used in individual living deriving from the individual existence information (for example, use of electronic money information of the individual concerned, door open and close information permitted to the individual concerned and the like) is closely related with that the individual actually exists in some space.

Herein, in the present embodiment, as an example, as shown in previous FIG. 6, it is supposed that the unit where end side terminals 160A, 160B, 160C are connected to the building side terminal 110 is included in the authentication system.

In such a structure, when the building side terminal 110 or the end side terminals 160A, 160B, 160C recognize that registered person individual "is" in the condition surrounded by "things" such as building structures and the like (building, structural things such as building structures, room, airplane, vehicle, cars, automobiles, trunks, boxes, tent, capsule, locker and the like), the building structure side terminal 110 has a function to limit the use of individual information of registered person surrounded by this "thing" to terminals of this unit, or to stop the movement of usable unit of individual information.

Further, when the building side terminal 110 recognizes that registered person individual is in the condition surrounded by "things", it sends control signal to forcibly stop the use of the individual information to terminals and the like outside of the unit, and information that it is abnormal for the individual information of the registered person to be used outside of the unit via communication line network.

Furthermore, when the building side terminal 110 recognizes that the individual information is used outside of the unit, it sends warning information to terminals and servers in the authentication system via communication line network.

On the other hand, when the building side terminal 110 or the end side terminals 160A, 160B, 160C recognize that registered person individual "is" in the condition released from "things" such as building structures and the like, the building structure side terminal 110 has a function to limit the use of individual information of registered person released from this "thing" to terminals outside of this unit, or to enable the movement of usable unit of individual information.

Further, the building side terminal 110 recognizes that registered person individual is in the condition released from "things", it sends control signal to permit the use of the individual information to terminals and the like outside of the unit, and information that it is normal for the individual information of the registered person to be used outside of the unit via communication line network.

In the example in FIG. 6, the end side terminal 160A is installed at the knob of the outside of the door. In general, when a person enters building structures, the person grips the outside door knob, and therefore, when this end side terminal 160A reads biometrics information, it shows that the person enters the building structure.

On the other hand, the end side terminal 160B is installed at the knob of the inside of the door. In general, when a person get out of building structures, the person grips the inside door knob, and therefore, when this end side terminal 160B reads biometrics information, it shows that the person goes out of the building structure.

For example, when the information the registered person individual "got out of the company entrance at 19:00" for going home is recognized, it is impossible that the registered person concerned is operating a personal computer at 19:11 in the working place building. In this case, the authentication system makes at 19:00 and after, the system unusable for a person who "calls himself the registered person" or "spoofs".

As a result, it is possible to link individual existence and individual information, and easily secure the security near at hand.

A person can establish both the freedom of its activity and the secrecy thereof, and the existent of the person may be covered with a "veil". However, since individual information has become valuable toady, and there may be spoofing or virtual story by making wrong use of this "veil of existence of person".

Further, except for certain area, in daily life, people are living by going to and from the condition surrounded by "things" and the condition surrounded by "things". For example, as human common living, people sleep in the condition surrounded by "things". Then, a person, for performing daily affairs, visits others who are in the condition surrounded by "things", and does some activity.

By use of IT technologies, it is easy to grasp whether a person is in the condition surrounded by "things" or not. For example, by arranging various readers and sensor to "things" that surround a person, it is possible to recognize the existence of the person, without being restricted by presence or absence of recognition of the individual concerned.

When the condition that the registered person individual is surrounded by certain "thing" can be found, it is preferable for individual information to be used only in the surrounded space, and the use of individual information outside of the space concerned may be in principle prohibited as information not related to the individual concerned.

Thus, people in many cases do some activities in the condition surrounded by "things". That is, when entangled space is considered as a unit, it may be said that people live in the continuity of time and space combining units and units.

Therefore, when a person is in a certain unit, the use of the individual information concerning the person is limited to the range of physical frame structuring the unit concern (in train, in building structure and the like).

In order to manage the condition surrounded by "things", an authentication system may be made up with a structure where the building structure side terminal 110 is made upper level terminal, and various readers and sensors are made end side terminals 160.

FIG. 55 is a figure showing an image around building structure. The figure shows a virtual house map, and as shown therein, the building structure side terminal 110 exists in every house, and the structure may be made independently per house.

FIG. 56 is a figure of the image of FIG. 55 converted into one of terminal configuration of the present authentication system. In station and hospital and supermarket as large scale facilities, the aggregation side terminal 150 is installed in themselves. On the other hand, as for individual houses, the aggregation side terminal 150 is installed in each block association.

Herein, with reference to FIG. 56, an example where space in which registered person is in hospital is specified is explained. In the example of the figure, in the hospital, the building structure side terminal 110Y, and plural end side terminals 160 directly connected thereto are installed. Further, in this hospital, organization side terminal 120G for managing the work history of hospital employees and the electronic medical records of patients, and end side terminals 160 directly connected thereto are installed. Furthermore, in this hospital, aggregation side terminal 150C for totally managing a unit configured of two sub servers, that is, the building structure side terminal 110Y and the organization side terminal 120G, is installed.

A patient makes the terminal in the building structure side terminal 110Y read its own individual information, and at necessity, the patient inputs information of its name, age, hospital history and the like, and thereby it is recognized for the patient to come to the hospital.

The building structure side terminal 110Y, on collecting these individual information, sends the collected individual information to the aggregation side terminal 150C as its upper level terminal.

The aggregation side terminal 150C sends the individual information received from the building structure side terminal 110Y, and information necessary for medical examination, dosage such as medical record browsing, insurance card number and the like stored in the comprehensive DB 151 of the aggregation side terminal 150C, to the organization side terminal 120G.

The organization side terminal 120G, on receiving these individual information necessary for medical examination, gets ready to execute medical examination preparation and medical record preparation for the patient in the hospital where its own unit is installed.

22nd Embodiment (Setting of Main Terminal)

In the modern society, it is general that building structures such as home apartment and working place building are included in people's living space. Further, people do their daily activities such as commuting to working place, going to school, and shopping and the like, in a certain range of living space.

Therefore, the unit around the building structure in the living space of the registered person individual, as the main unit of the registered person concerned, is made the base point where information use permission information generates. Further, when information network is structured so that the use permission information of individual information of the registered person moves from the main unit to other unit along with movement of the registered person, along movement route and is transmitted sequentially, it is possible for the registered person to enjoy various services by use of its own individual information.

Thus, in the present embodiment, according to the timing of movement of registered person, the use permission (or stop) information of individual information of the registered person moves via terminals around the movement positions.

FIG. 57 is an image figure showing this concept. In prior art, information has been stored into "things (recording media)" such as a cell phone, ubiquitous communicator, IC chip or magnetic card and the like. And with the "things" as media, information is used. This has isolated the relation between people as authentication objectives and information.

While on the other hand, in the present invention, the peculiar information for authentication is biometrics information of person to be authenticated, and as the result of the authentication, use of information is permitted, and the place where information can be used is limited to a certain space configured of terminals of reading/inputting of the biometrics information concerned, and thereby an all-in-one system where person=information is made, and it is possible to improve security of use of information.

In the present embodiment, when registered person moves the use permission places of its own individual information, first, at registration of the individual information, by use of the end side terminal 160 and the like, the registered person inputs terminal identification ID of the building structure side terminal 110 closely related to the registered person individual concerned. Meanwhile, plural terminal identification IDs of the building structure side terminal 110 that is the base point of the registered person may be registered.

In the present authentication system, the building structure side terminal 110A installed in a building structure in which registered person individual lives is made "main terminal", and a structure unit made of one or more lower level terminals managed by the building structure side terminal 110A is made "main unit", and the aggregation side terminal 150A having the building structure side terminal 110A as its lower level terminal is made "main server".

While on the other hand, the building structure side terminal 110B additionally installed in building structures such as school and company is made "sub terminal", and a structure unit made of one or more lower level terminals managed by the building structure side terminal 110B is made "sub unit", and the aggregation side terminal 150B having the building structure side terminal 110B as its lower level terminal is made "sub server".

However, in the case where there is not the building structure side terminal 110A or the aggregation side terminal 150A, the building structure side terminal 110B or the aggregation side terminal 150B is made "main unit"

23rd Embodiment (Information Movement 1)

In the present embodiment, as the registered person individual moves from its home to working place, units to be used by the registered person change. The transition of units used by registered person until the time point when the registered person departs its home is explained.

FIG. 58 is a figure showing a structure example of authentication system in daily activity range of the registered person, according to the present embodiment.

In this figure, terminals and servers connected by line are directly connected via network, and among these, the movement route of individual identification information of the registered person at the time point when the registered person gets out of its home is shown by solid line.

Further, FIG. 59 is a sequence chart showing an action example when information use permission information is transferred from the building structure side terminal 110A to other terminal, in a 23rd embodiment of the present invention.

First, the registered person individual grips the door knob installed in room inside, among door knobs of its home door, and opens the door knob for going out. At this moment, the end side terminal 160B attached to the door knob reads the biometrics information (for example, fingerprint information) of the registered person (step S431), and sends the read biometrics information and movement information to the building structure side terminal 110A (step S432).

The building structure side terminal 110A compares and collates the individual information of registered person stored beforehand in its own, and the received information from the end side terminal 160B (step S433), and performs registered person existence confirmation (step S434), and at the same time stores necessary information from the information received this time newly to its own (step S435).

Further, to terminals and servers of the authentication system, information showing use purpose of each terminal is stored. As described previously, the use purpose of the end side terminal 160B is to "get out from a building structure".

Therefore, the building structure side terminal 110A, on receiving the biometrics information and the movement information from the end side terminal 160B, recognizes that the registered person has got out, creates information with information showing the unit that requests for individual authentication and individual information use permission and provision of services by the authentication system changes from the current unit, added to the movement information (hereinafter, referred to as movement start information) (step S436).

The building structure side terminal 110A stores this movement start information to the temporary storage DB 117A of its own.

With regard to this movement start information or movement stop information (information with information showing the unit that requests for individual authentication and individual information use permission and provision of services by the authentication system stops moving or information showing existence information, added to the movement information) and the like, in order to be totally recognized in any terminal of the present authentication system, they may be shown by simple numeric values, for example, "001" for movement start, and "999" for stop.

(Authentication System Use Stop Information in Association with Information Movement Information)

The building structure side terminal 110A, from the registered person going out, recognizes that the registered person does not exist in the unit configured of the building structure side terminal 110A and the end side terminals 160A, 160B under its management (step S437).

Further, the building structure side terminal 110A, in the unit, creates information showing stop command of use of the authentication system by the identification ID of the registered person, and sends it to the end side terminals 160A, 160B under its management (step S438).

Thereby, it is possible to prevent a malicious third party from spoofing as the registered person and using the authentication system.

For example, after the stop command is sent out, when the use of the individual information of the registered person is requested in the unit, the building structure side terminal 110A judges that the request for use is abnormal, and sends information to issue a warning or recognize it as an abnormal value, and forcibly stop the use, to the terminal that has requested for the use.

Further, as second use purpose of the end side terminal 160B, "locking/unlocking the key" is set. The end side terminal 160B reads the biometrics information of registered person, and also, on receiving instruction information to lock the door key, from the building structure side terminal 110A, locks the key.

The building structure side terminal 110A recognizes that the registered person has got out of its home, and the home key has been locked.

Thus, the building structure side terminal 110A can also manage security such as locking the home key.

Thereafter, the building structure side terminal 110A sends the above movement start information to the aggregation side terminal 150D as the upper level terminal that manages its own (step S439).

The aggregation side terminal 150D, on receiving the movement start information from the building structure side terminal 110A, stores this received information to the temporary storage DB 157D of its own (step S440), and recognizes that the movement of the units where the individual information of the registered person is used has started (step S441).

Thereafter, the aggregation side terminal 150D relates information showing that its own has recognized the movement start information, to the above received information, and sends it to the authentication system server 10A that manages its own (step S442).

The authentication system server 10A, on receiving the information from the aggregation side terminal 150D, stores these received information to the temporary storage DB 17A of its own (step S443), and recognizes that the movement of the units where the individual information of the registered person is used has started (step S444).

24th Embodiment (Information Movement 2)

Herein, with regard to the transition of units used by registered person, when the registered person moves from its home to its working place, the authentication action at the time point when the registered person arrives the station is explained.

FIG. 60 (a) is a figure showing a structure example of authentication system in daily activity range of the registered person, according to the present embodiment.

In this figure, the movement route of individual identification information of the registered person at the time point when the registered person gets out of its home and arrives the station is shown by solid line.

Further, FIG. 60 (b) is a figure showing an installation example of building structure side terminal 110W and end side terminals 160C, 160D, 160Cc, 160Dd in the station premises.

In this figure, the end side terminals 160Cc, 160Cd are installed at the north ticket gate of the station, and the end side terminals 160C, 160D are installed at the south ticket gate.

FIG. 61 and FIG. 62 are each a sequence chart showing an action example when information use permission information is transferred from the building structure side terminal 110A to the building structure side terminal 110W, in a 24th embodiment of the present invention.

Hereinafter, explanations are made along this sequence chart.

Registered person individual, on arriving the nearest station, touches the end side terminal 160D installed at the ticket gate of the station, and makes it read biometrics information such as fingerprint and the like (step S451), and the end side terminal 160D sends the read biometrics information and the movement information to the building structure side terminal 110W (step S452).

The building structure side terminal 110W compares and collates the information of registered person stored beforehand in its own, and the received information from the end side terminal 160C (step S453), and performs registered person existence confirmation (step S454), and at the same time stores necessary information from the information received this time newly to its own (step S455).

Further, the building structure side terminal 110W confirms that the movement stop information to the effect that the registered person exists in its own unit is not stored in its own, and confirms that movement prior notice information (information of information to notify that there is a possibility that the unit that requests for individual authentication and individual information use permission may move to its own unit) is not stored in its own (step S456).

The movement start information is the information to show the history of actual movement of the registered person, meanwhile, this movement prior notice information is the information to show the future movement schedule of the registered person. This movement prior notice information, in concrete, includes any information of the following 1 to 5.

1. Special information added to the terminal that is scheduled to be used by the person to be authenticated (registered person) (terminal identification ID, identification number)

2. Temporal information to show scheduled time when the person to be authenticated (registered person) uses 3. Terminal identification ID of sending source of the movement prior notice information 4. Terminal identification ID, identification number of the terminal that manages scheduled unit to become the start point of action, or the main unit of the registered person individual 5. Information to show the terminal (unit) concerning the next of its own (own unit)

Meanwhile, herein, the case where the movement prior notice information, movement start information, movement stop information of the registered person (hereinafter, referred to as movement related information) is described later.

Also, the building structure side terminal 110W refers to the use purposes of respective terminals stored in its own, and reads the biometrics information by the end side terminal 160D, and recognizes that "the registered person wants a riding as movement means" (step S457), and creates the movement stop information to show that the registered person has completed the movement to the installation range of its own unit (step S458).

And, the building structure side terminal 110W stores the created movement stop information to the temporary storage DB 117W of its own.

Further, the building structure side terminal 110W recognizes that the registered person does not exist at the outside of its own unit, by the movement stop information, and at the outside of its unit, creates information to show stop command of use of the authentication system by the identification ID of the registered person, and prepares to send it to the aggregation side terminal 150A.

Furthermore, the building structure side terminal 110W recognizes that the registered person exists in the installation range in its own unit, and creates information to show that there is a possibility that the registered person individual may use the present authentication system for the movement information (hereinafter, referred to as use prior notice information), and sends it with individual identification ID and the like of the registered person to respective end side terminals (step S459).

Thus, before the registered person actually uses the end side terminal to perform the authentication processing and the like, that there is a possibility of use is notified to the end side terminal beforehand, thereby, each terminal of the unit that receives the use prior notice information refers to the search DB and the temporary storage DB and the like, and searches for the registered person, and can be prepared for authentication processing and the like after that. Thereafter, when individual information of registered person is read in the terminal concerned, it is possible to perform comparison and collation, and execute efficient authentication system operation.

Next, the building structure side terminal 110W sends the movement stop information to show movement into its own unit, and information to command the use stop in the outside of its own unit, to the aggregation side terminal 150A as upper level terminal (step S461).

For example, when after sending the stop command, the use of individual information of the registered person is requested in the outside of this unit, the building structure side terminal 110W judges the request for use as abnormal, and sends information to issue a warning or recognize it as an abnormal value, and forcibly stop the use, to the terminal that has requested for the use.

The aggregation side terminal 150A, on receiving the movement stop information and the like of registered person individual from the building structure side terminal 110W, stores the received information concerned to the temporary storage DB 157A of its own (step S462).

Further, the aggregation side terminal 150A recognizes from the received information, that the unit that requests for use permission information of individual authentication and individual information has completed its movement to the unit of the building structure side terminal 110W (step S463).

Furthermore, the aggregation side terminal 150A searches whether movement related information of registered person has been received from terminals and servers of the following 1 to 4 (step S464).

1. Other lower level terminal in the unit that the aggregation side terminal 150A manages
2. Authentication system server 10A that manages the aggregation side terminal 150A
3. Unit of other aggregation side terminal than the aggregation side terminal 150A
4. Other authentication system server than the authentication system server 10A that manages the aggregation side terminal 150A

The aggregation side terminal 150A confirms that it has not received the movement prior notice information and the like of registered person from the terminals and servers of the above 1 to 4, as the result of search, and sends the movement stop information to show the movement into its own unit, and information to command use stop in the outside of its own unit, to the authentication system server 10A that manages its own (step S465).

Meanwhile, the case where the movement related information of registered person exists as the result of search is described later herein.

The authentication system server 10A, on receiving the movement stop information and the like of the registered person individual from the aggregation side terminal 150A, stores the received information concerned to the temporary storage DB 17A of its own (step S466).

Further, the authentication system server 10A recognizes from the received information, that the unit that requests for individual authentication and individual information use permission has completed movement to the unit of the building structure side terminal 110W (step S467).

Furthermore, the authentication system server 10A searches whether it has received the movement prior notice information and the like of registered person, from other than the aggregation side terminal 150A and other lower level terminal in the unit that the aggregation side terminal 150A manages (step S468).

As the result of search, in the case when the authentication system server 10 has not received the movement prior notice information and the like from other than terminal in the unit of the aggregation side terminal 150A (step S469 No), it validates whether the contents of individual information of registered person stored in its own, and the contents of individual information received from the aggregation side terminal 150A match or not from viewpoints of place and time (steps S470, S471). This validation process is same as the process in the fifth embodiment.

Meanwhile, the case where the movement related information of registered person exists as the result of search is described later herein.

When the authentication system server 10A, as the result of mutual information contents matching, judges that the existence of the registered person can be proved, and the input history of the individual information is matching specially and temporally (step S472 Yes), it sends information to show that "validation of existence continuity has been completed" to the aggregation side terminal 150A (step S473).

This sending information is also the information to permit services and authentication system action that the registered person wants to use, in the unit that the aggregation side terminal 150A manages.

The aggregation side terminal 150A, on receiving the permission information from the authentication system server 10A, adds the received information concerned to the registered person movement stop information in the temporary storage DB 157A of its own and stores it (step S474).

Then, the aggregation side terminal 150A sends this permission information to the building structure side terminal 110W (step S475).

The building structure side terminal 110W, on receiving the permission information from the aggregation side terminal 150A, adds the received information concerned to the registered person movement stop information in the temporary storage DB 117A of its own and stores it (step S476).

Then, the building structure side terminal 110W, on the basis of this permission information, sends information to permit use service of the present authentication system that the registered person requests, in the present embodiment, for the registered person to enter the station premises to get on a train, to the end side terminal 160C (step S477).

The end side terminal 160D, on receiving the permission information from the building structure side terminal 110W, opens the connected ticket gate door, and permits the registered person individual to enter the station premises (step S478).

Further, it may be defined in terminal installation purpose, that this is an action to permit the registered person to get on a train too.

On the other hand, in the case when there is other aggregation side terminal (this being the aggregation side terminal 150D) than the aggregation side terminal 150A that has sent the movement related information, to the authentication system server 10A, the authentication system server 10 sends other unit movement completion information (information of information to show that the use unit has moved to other unit, added to the movement information), to the aggregation side terminal 150D (step S479).

This other unit movement completion information is also the information to delete the movement related information of registered person, existing in the unit that the aggregation side terminal 150D manages.

The authentication system server 10, the aggregation side terminal 150 or the sub servers, when temporarily storing the movement related information in their own, on receiving the movement stop information to identical registered person, perform continuity matching validation of information between the movement start information and the movement stop information. As the result, when it is judged to be matching, the movement start information may be converted into other unit movement completion information, and may be sent back to the sending source of the movement start information.

The aggregation side terminal 150D, on receiving the other unit movement completion information from the authentication system server 10A, on the basis of information in the temporary storage DB 157D of its own, extracts information to show terminal of sending source of the movement start information sent previously to the authentication system server 10.

The aggregation side terminal 150D, after the extraction, specifies the building structure side terminal 110A that has become the sending source of the movement start information. And, it sends the other unit movement completion information received this time to the building structure side terminal 110A of the sending source (step S460).

Next, the aggregation side terminal 150D deletes the movement start information of the registered person concerned, in the temporary storage DB 157D of its own (step S481).

The building structure side terminal 110A, on receiving the other unit movement completion information from the aggregation side terminal 150D, on the basis of the individual identification ID included in the information concerned, searches the temporary storage DB 117D of its own, and extracts and deletes the movement start information of the registered person concerned (step S482).

On the other hand, in the case when the authentication system server 10A, as the result of the mutual information content matching, judges that the existence of the registered person cannot be proved, or the input history of the individual information is not matching specially and temporally (step S472 No), it sends information to show "no existence" or information to prompt existence validation once again, to the aggregation side terminal 150A (step S483).

This sending information is also the information not to permit (to prohibit) services and authentication system operation that registered person individual wants to use, in the unit that the aggregation side terminal 150A manages.

The aggregation side terminal 150A, on receiving the non permission information from the authentication system server 10A, adds the received information concerned to the registered person movement stop information in the temporary storage DB 157A of its own and stores it (step S484).

Meanwhile, when this non permission information is added to the movement stop information and stored in each terminal in the unit of this aggregation side terminal 150A, in the unit, control information to limit or stop the authentication system use of the registered person is created.

Next, the aggregation side terminal 150A sends this non permission information, and created use limit/stop information to the building structure side terminal 110W (step S465).

The building structure side terminal 110W, on receiving the non permission information from the aggregation side terminal 150A, adds the received information concerned to the registered person movement stop information in the temporary storage DB 117A of its own and stores it (step S486).

In the same manner, the building structure side terminal 110W creates use limit/stop information.

Next, the building structure side terminal 110W sends this non permission information, and created use limit/stop information to the end side terminal 160D (step S487).

The end side terminal 160D, on receiving those information from the building structure side terminal 110W, displays to the registered person individual, a message to request to read the individual information once again, and message information to deny entrance (ride) (step S488).

25th Embodiment (Information Movement 3)

Herein, the transition of units used by registered person, when the registered person moves from the nearest station from its home to the nearest station to its working place, is explained.

FIG. 63 is a figure showing an installation example of authentication systems around home and working place of registered person in the present embodiment.

In the example in this figure, the building structure side terminal 110A is installed at home, and the aggregation side terminal 150D is installed in the course to the nearest station from home, building structure side terminal 110*w*, aggregation side terminal 150A are installed in the nearest station from home, building structure side terminal 110WT, aggregation side terminal 150AT are installed in the nearest station to the working place, building structure side terminals 110HK, 110CK, aggregations side terminals 150HK, 110CK, organization side terminals 120HK, 120CK are installed in the working place.

Further, organization side terminal 120E that the traffic organization related to the stations manages is installed.

Furthermore, FIG. 64 is a figure showing a network structure example of servers and terminals configuring the authentication system.

In this figure, the movement route of movement information for the registered person moves to go from the nearest station of its home to the nearest station of its working place is shown in solid line.

FIG. 65 is a sequence chart showing an action example when terminals used by registered person move from the building structure side terminal 110A to the building structure side terminal 110W, in a 25th embodiment of the present invention.

Hereinafter, along this sequence chart, explanations are made.

As described previously, when the registered person individual arrives the station, the registered person touches the end side terminal 160D installed at the ticket gate of the station and makes it read biometrics information, and the end side terminal 160D sends the read biometrics information and the movement information to the building structure side terminal 110W, thereafter, the registered person is permitted to enter the station premises (ride) (step S501).

Further, as described previously, the building structure side terminal 110W sends the movement stop information to show movement into its own unit, and information to command the use stop in the outside of its own unit, to the aggregation side terminal 150A (step S502).

Furthermore, the building structure side terminal 110W sends those received information to the authentication system server 10 (step S503).

Moreover, the building structure side terminal 110W sends the same information as that sent to the aggregation side terminal 150A, also to the organization side terminal 120E (step S504).

At this moment, when it is clear that the terminals and sub servers that created the movement stop information are installed in movement means, or installed for using the movement means, the movement stop information automatically creates and sends movement prior notice information.

This organization side terminal 120E is one used in a railroad company, and individual information of passengers using the railroad of this company and the like are stored as database therein.

The organization side terminal 120E, on receiving those movement related information, by use of individual identification ID and the like included in the information, search database of its own, and extracts commutation ticket information of registered person individual (step S505).

FIG. 66 is an image figure showing an example of the commutation ticket information of registered person individual.

In the example in the figure, the nearest station to home is made start terminal, and the nearest station to working place is made end terminal. Further, this commutation ticket information includes biometrics information and the like to be used for specifying commutation ticket effective period and individual at the ticket gate.

Further, FIG. 67 is a figure showing an example of a ticket gate database that manages end side terminals installed in the nearest stations of home and working place, and the installation places (ticket gates), and the upper level terminals thereof. The organization side terminal 120E manages such a database as shown in this figure in its own.

First, the organization side terminal 120E, with the terminal identification ID of the building structure side terminal 110W as a key, search the above ticket gate DB, and specifies the place (station) where the registered person individual exists at present.

Next, the organization side terminal 120E refers to the commutation ticket information, and confirms whether the specified place (installation station of building structure side terminal 110W) is start terminal side or end terminal side.

In the case when the recognized place information confirms that it is start terminal side, on the basis of extracted commutation ticket information, it specifies the end terminal side. On the other hand, in the case when the recognized place information confirms that it is end terminal side, on the basis of extracted commutation ticket information, it specifies the start terminal side.

Meanwhile, in the case when the recognized place information is not start terminal side or end terminal side, it is temporarily stored in the organization side terminal 120E, and processed according to transition of the movement related information after that.

Herein, the organization side terminal 120E recognizes the building structure side terminal 110W as the start terminal side, and specifies the building structure side terminal 110WT as the end terminal side (steps S506, S507).

Next, the organization side terminal 120E sends the received information from the building structure side terminal 110W, to the building structure side terminal 110WT at the end terminal side (step S508).

The building structure side terminal 110WT, on receiving the movement prior notice information and the like from the organization side terminal 120E, recognizes that there is a high possibility that the registered person individual of the information concerned may perform terminal operation and existence authentication and the like in the unit that its own managed, in a certain time.

Next, the building structure side terminal 110WT searches beforehand the individual information of registered person stored in its own, and prepares the stored information ready for easy use when operation is executed in the unit after that, or ready for specifying the registered person individual (step S509).

Further, the building structure side terminal 110WT stores the received movement prior notice information, to the temporary storage DB 117WT of its own.

When the registered person individual arrives the station, the registered person touches the end side terminal 160DT installed at the ticket gate of the station and makes it read biometrics information (step S510), and the end side terminal 160DT sends the read biometrics information and the movement information to the building structure side terminal 110WT (step S511). This action is same as that in the seventh embodiment and the like.

The building structure side terminal 110WT compares and collates the information received from the end side terminal 160DT, and the individual information and the like of the corresponding registered person stored in its own beforehand, and performs confirmation of existence of the registered person (step S512), and necessary information among information received this time from the end side terminal 160DT newly to its own.

Further, the building structure side terminal 110WT confirms whether the movement prior notice information of the registered person individual is stored in its own or not (step S513).

In the case where the movement prior notice information of the registered person individual is stored (step S513 Yes), it recognizes that the registered person has moved into the unit of the building structure side terminal 110WT (step S514).

At this moment, the building structure side terminal 110WT performs validation processing whether the contents of the movement prior notice information of individual information of registered person, and the contents of the information received from the end side terminal 160DT match spatially and temporally or not.

Further, in this manner, the building structure side terminal 110WT stores beforehand the movement prior notice information to show movement of use places of individual information of registered person, it can recognize the movement of use units of individual information of registered person individual, before performing collation with information that the aggregation side terminal 150AT and the authentication server 10A as its upper level terminals.

Furthermore, the building structure side terminal 110WT creates information to recognize in the authentication system that the registered person individual has moved, according to the movement prior notice information to show a possibility that the unit where the registered person performs individual authentication and asks for use permission may move (hereinafter, referred to as movement prior notice attainment information), and sends it to the aggregation side terminal 150AT and the authentication system server 10A (step S516).

By this movement prior notice attainment information, the aggregation side terminal 150AT and the authentication system server 10A recognize that the latest unit where the registered person individual exists has become the building structure side terminal 110WT. Further, the aggregation side terminal 150AT and the authentication system server 10A delete previously stored movement related information.

The new movement stop information created by information received from the end side terminal 160DT is stored to the temporary storage DB 117WT in the building structure side terminal 110WT.

In parallel with this process, the building structure side terminal 110WT recognizes that the information received from the end side terminal 160DT is the first definition, that is, "get-off desire information", by the terminal installation purpose in its own, and creates information to permit get-off, and sends it (step S515).

The end side terminal 160DT, on receiving the permission information from the building structure side terminal 110WT, opens the ticket gate door attached to its own, and permits the registered person individual to go out of the station premises.

As for other procedures and concepts than described, refer to the 23rd or 24th embodiment.

26th Embodiment (Information Movement 4)

Herein, the transition of units used by registered person, when the registered person moves from the nearest station of its working place to the working place, is explained.

FIG. 68 is a figure showing an installation example of authentication systems around the place of registered person, in the authentication system according to the present embodiment.

In the example in the figure, end side terminals 160HL, 160hL are installed at the service entrance of the building of the working place, end side terminals 160HK, 160hK, and building structure side terminal 110HK that manages end side terminals installed in these buildings, and aggregation side terminal 150HK that manages this building structure side terminal 110 are installed at the front entrance.

Further, end side terminals 160E, 160Ee, and building structure side terminal 110CK that manages end side terminals installed at the working place, and aggregation side terminal 150CK that manages this building structure side terminal 110 are installed at the entrance of the working place in the building.

Furthermore, FIG. 69 is a figure showing a network structure example of servers and terminals configuring the authentication system.

In this figure, the movement route where the registered person moves to go from the nearest station of its working place to the entrance door of the working place is shown in solid line.

In the present embodiment, one room of a large building is the working place office, and the working place office is the unit that surrounds the registered person individual, and the large building is a larger unit that surrounds the unit. As the similar configurations, there are the relation of one's own room and the entire apartment building, the relation of a parked car and a solid parking area, and the relation of an airplane and an air port facility and the like.

When the working place office is defined as "B unit", and the large building is defined as "A unit", it is defined that "B unit is included in A unit". Further, "B unit" is referred to as a component unit, and "A unit" is referred to as a base unit.

Information transmission of terminals is so designed that when units are in the relation of including and being included, if the existence of individual is confirmed in a component unit, the existence information is sent to terminals structuring the base unit and it is recognized that the individual concerned exists in the base unit.

In the present embodiment, further, it is recognized in what component unit in the base unit the registered person exists.

For example, even if it is recognized that the registered person individual has entered the base unit of the large building, the registered person may exist in corridor or in elevator. Therefore, in order to clarify whether the registered person has reached the component unit or not, individual units are configured in unit of working place and in unit of building.

FIG. 70 is a figure showing the connection relation of the building structure side terminal 110HK and the aggregation side terminal 150HK that manages that, and other aggregation side terminals installed in the building.

In the example in the figure, the building structure side terminal 110HK is connected to the aggregation side terminal 150HK that is its upper level terminal, and manages the entrance at the first floor.

Further, the building structure side terminal 110HK is connected via the aggregation side terminal 150HK to aggregation side terminal 150 HZ that manages the base unit (entire building), and thereby connected indirectly to respective aggregation side terminals 150CK, 150HH, 150HE, 150HM, 150HT that manage respective component units.

The building structure side terminal 110HK, after authentication of registered person, sends the history of authentication and the like to the connected aggregation terminals of the base unit.

Hereinafter, with regard to the authentication action by the authentication system to the registered person at its working place, two patterns are explained.

(Authentication Action: Pattern 1)

Hereinafter, authentication action of a first pattern is explained.

Meanwhile, this authentication action is roughly same as the authentication action in the above station premises, therefore, details thereof are omitted.

When the registered person individual arrives the building of its working place, the registered person touches the end side terminal 160HL and the end side terminal 160HK installed at the building entrance and makes them read biometrics information such, and the end side terminals send the read biometrics information and the movement information to the building structure side terminal 110HK.

The building structure side terminal 110HK performs authentication of the registered person, on the basis of the sent biometrics information and the like. Herein, when the authentication succeeds, the building structure side terminal 110HK sends information to permit entrance to the building inside, to the end side terminal that has read the biometrics information.

The end side terminal that has read the permission information permits the registered person to enter the building, by opening the door or the like.

Next, the registered person touches the end side terminal 160E installed at the entrance of the working place office to make it read biometrics information, and the end side terminal 160E sends the read biometrics information and the movement information to the building structure side terminal 110CK.

The building structure side terminal 110CK and the like, on the basis of the sent biometrics information and the like, performs authentication of the registered person. Herein, when the authentication succeeds, the building structure side terminal 110CK sends information to permit entrance to the building inside, to the end side terminal that has read the biometrics information.

The end side terminal that has read the permission information permits the registered person to enter the building, by opening the door or the like.

(Authentication Action: Pattern 2)

Normally, the registered person, as the above pattern 1, performs authentication at the entrance of the building structure, and then performs authentication at the entrance of the working place. However, for example, in busy time in the morning, the registered person may omit the authentication action at the entrance of the building structure. In the present pattern, authentication action by the authentication system in the case when the registered person omits the authentication action at a certain point is explained.

FIG. 71 is a sequence chart showing an action example when terminals used by the registered person move from the building structure side terminal 110WT to the building structure side terminal 110CK, in a 26th embodiment of the present invention.

Hereinafter, with reference to this sequence chart, the authentication action of a second pattern at the working place is explained.

Meanwhile, in this pattern too, same portions as in the authentication action in the above station premises are omitted in the explanation.

The registered person individual, after arriving the working place building, does not perform the individual authentication processing by the end side terminal 160HK. But the registered person touches the end side terminal 160E installed at the working place office entrance directly and makes it read biometrics information (step S521), and the end side terminal 160E sends the read biometrics information and the movement information to the building structure side terminal 110CK (step S522).

Next, the building structure side terminal 110CK, in the same manner as the processing at the station premises, performs the judgment processing of the existence of registered person, confirmation processing to judge whether or not to store the movement related information to its own and the like (step S523).

Thereafter, the building structure side terminal 110CK sends the movement stop information of the registered person, and information to show use stop in the outside of its own unit, to the aggregation side terminal 150CK (step S524).

Next, the aggregation side terminal 150CK sends the movement stop information of the registered person, and information to show use stop in the outside of its own unit, to the authentication system server 10A (step S525).

The authentication system server 10A judges temporal and spatial continuity of individual information (step S526), and sends the permission information including the judgment result to the aggregation side terminal 150CK (step S527).

The aggregation side terminal 150CK stores this received permission information (step S528).

Further, the authentication system server 10A, on the basis of the fact that the registered person has become out of the area of the nearest station of the working place, sends to the aggregation side terminal 150AT of the nearest station of the working place, other unit movement completion information of the aggregation side terminal 150AT (step S529).

Terminals of the unit of the aggregation side terminal 150AT, on receiving this information for deletion, delete the movement related information of the corresponding registered person. as the result, in the unit that the aggregation side terminal 150CK as the component unit manages, authentication processing of registered person and storage of movement related information are carried out.

Thereafter, the aggregation side terminal 150CK sends the permission information including the judgment result, not merely to the building structure side terminal 110CK in its own, but also to the aggregation side terminal 150HZ that manages the base unit (step S530).

The aggregation side terminal 150HZ, after storing the received permission information to its own (step S531), sends the permission information to the building structure side terminal 150HK as its own lower level terminal (step S532). The building structure side terminal 150HK, on receiving the permission information, stores the received information to its own (step S533), On the other hand, the building structure side terminal 110CK that has received the permission information stores the permission information to its own (step S534), and sends the permission information to the end side terminal 160E that is its own lower level terminal, and has read the biometrics information (step S535).

The end side terminal 160E, on the basis of the authentication judgment result included in the received permission information, performs the action to permit or permit or not permit the entrance of the registered person to the working place (step S536). For example, when the judgment result is to permit entrance, the end side terminal 160 unlocks the door key of the working place office, and permits the entrance. On the other hand, when it is to reject the entrance, it displays a message to prompt to read the biometrics information once again, or a message to reject the entrance.

Thus, when units are in the relation of inclusion, any terminal in the component unit, and the aggregation side terminal or sub servers that manage the base unit have the same movement stop information. In this case, the information existing in the component unit side is referred to as "front movement stop information", and that existing in the base unit side is referred to as "back movement stop information".

To the "front movement stop information", information to specify terminal having the "back movement stop information" is added, and to the "back movement stop information", to specify terminal having the "front movement stop information" is added.

Thereafter, when the registered person moves out of the management area of the current unit, the terminal that has received the deletion information and stores the "front movement stop information" deletes the movement stop information of its own, and sends the deletion information to the terminal that stores the "back movement stop information" in the same manner. The terminal that has received the deletion information and stores the "back movement stop information" deletes the corresponding movement stop information of its own in the same manner.

Further, in the case when the terminal storing the "back movement stop information" receives the deletion information, it deletes the corresponding movement stop information of its own in the same manner, and sends this deletion information to the terminal storing the "front movement stop information", and the terminal storing the "front movement stop information" deletes the corresponding movement information.

In this manner, both the "front movement stop information" and the "back movement stop information" are deleted.

27th Embodiment (Information Movement 5)

In this embodiment, in the same manner as in the example described above, the unit (tenant of department store) surrounding registered person individual is surrounded by a larger unit (department store).

FIG. 72 is a figure showing an installation example of terminals when an authentication system is configured in a department store, in the present embodiment.

In the example in this figure, in this department store, there are tenants C, D.

As shown in the figure, at the entrance and exit of the building of this department store, end side terminals 160A, 160a, 160B, 160b are installed. And, at the entrance and exit of the tenant C, end side terminals 160C, 160c are installed, and in the tenant inside, building structure side terminal 110C, aggregation side terminal 150D are installed. In the same manner, at the entrance and exit of the tenant D, end side terminals 160D, 160d are installed, and in the tenant inside, building structure side terminal 110D, aggregation side terminal 150D are installed. Further, the building side terminal 110A and the aggregations side terminal 150A manage the entire department store.

Furthermore, FIG. 73 is a figure showing a connection example of networks among terminals installed in the above department store.

The solid line and dot line in this figure show networks connecting respective terminals, and the solid line shows the route through which information is sent and received at the authentication processing explained later herein.

FIG. 74 is a sequence chart showing an action example where information is moved among units existing in the building that the aggregation side terminal 150A manages, in a 27th embodiment. Herein, with an image where individual moves in building of a commercial facility, explanations are made.

Registered person individual enters this department store, and visits the tenant D at present. It is supposed that the movement stop information of the registered person individual is recognized by the aggregation side terminal 150A and the building structure side terminal 110D.

When the registered person individual finishes shopping at the tenant D and moves, the person touches the end side terminal 160*d* installed at the exit and makes it read biometrics information (step S541), and the end side terminal 160*d* sends the read biometrics information and the movement information to the building structure side terminal 110D (step S542).

The building structure side terminal 110D, on receiving the biometrics information and the movement information, collates than with the action history and the like so far of the registered person, and performs authentication of the registered person (step S543). When the authentication succeeds, the building structure side terminal 110D recognizes that when the biometrics information is read by the end side terminal 160*d*, the registered person has got out of the tenant D unit, and creates the movement start information and sends it to the aggregation side terminal 150D (step S544).

The aggregation side terminal 150D, after receiving the movement start information, performs necessary processing. Next, the aggregation side terminal 150D sends the movement start information to the aggregation side terminal 150A (step S544). This is because the unit that the aggregation side terminal 150D manages is included in the base unit that the aggregation side terminal 150A manages.

Thereafter, when the registered person individual visits the tenant C, the registered person touches the end side terminal 160C and makes it read biometrics information (step S546), and the end side terminal 160C sends the read biometrics information and the movement information to the building structure side terminal 110C (step S47).

The building structure side terminal 110C, on receiving the biometrics information and the movement information, collates than with the action history and the like so far of the registered person, and performs authentication of the registered person (step S548). When the authentication succeeds, the building structure side terminal 110C recognizes that the registered person has entered the tenant C unit, by reading the biometrics information by the end side terminal 160C, and creates the movement stop information and sends it to the aggregation side terminal 150D (step S549).

The aggregation side terminal 150C, after receiving the movement start information, performs necessary processing. Next, the aggregation side terminal 150C sends the movement stop information to the aggregation side terminal 150A (step S550).

Next, the aggregation side terminal 150A collates the contents of the movement start information received from the aggregation side terminal 150D, and the contents of the movement stop information received from the aggregation side terminal 150C, and judges the existence of the corresponding registered person and temporal and spatial continuity of the movement related information (step S551).

As the result, when the aggregation side terminal 150A recognizes that there are the existence and the information continuity, it sends permission information to show that "validation of existence continuity has been completed", to the aggregation side terminal 150C (step S552).

Further, the aggregation side terminal 150D sends the received information to the building structure side terminal 110C (step S553). The building structure side terminal 110C, after storing the received information to its own (step S554), sends it to the end side terminal 160C (step S555).

The end side terminal 160C, on receiving the permission information to show that "validation of existence continuity has been completed", displays a message that "authentication has been done", and provides some kinds of services (step S556).

On the other hand, when the aggregation side terminal 150A recognizes that there is the existence and the information continuity, it sends other unit movement completion information to the aggregation side terminal 150D (step S557).

The aggregation side terminal 150D, on receiving the deletion information, deletes the movement start information of the corresponding registered person, and then sends the deletion information to the building structure side terminal 110D (step S558). The building structure side terminal 110D, on receiving the deletion information, deletes the movement start information of the corresponding registered person.

Thus, in units that are in the relation of inclusion, the movement related information is shared among the units via the aggregation side terminal in the base unit. As the result, in movement among units of the inclusion relation, at every action, the movement related information is not sent to the authentication system server 10 for validating the information continuity, but the aggregation side terminal 150 that manages the base unit is made to take the function.

For example, in the case of a large scale commercial facility such as a department store, if it is recognized that registered person visits any shop in the department store building, it is recognized that the registered person exists in the department store by the authentication system. When the registered person moves in the department store along shopping, the registered person does not get out of the building of the department store, but just only changes its existence position in the base unit of the department store unit. Therefore, if it is recognized that the registered person moves in the base unit of the department store unit, the existence of the registered person and the continuity of the movement information are proved.

At this moment, the registered person individual remains in the base unit, and there is no use of information out of the inside. Therefore, since the existence of the registered person and the continuity of the movement information are sufficiently proved by performing the authentication by the aggregation side terminal 150 of the base unit, there is no need of authentication by the authentication system server 10, and it is possible to reduce the load of the authentication system server 10.

Further, at this moment, the use of information outside of the base unit is stopped, and accordingly, individual information cannot be abused, and it is possible to realize a high level security of individual information protection.

Meanwhile, the structure and actions explained above are not limited to the department store, but they may be applied to all building structures having sections therein for example, working room and study room in working place and school, one's own portion of apartment building, patient's room in hospital, airport and station, commercial facilities and the like as the base unit. Naturally, they may be applied to a detached building so long as it has component units therein.

28th Embodiment (Information Movement 6)

Hereinafter, authentication processing by authentication system in the case where registered person moves by use of movement means such as an airplane and the like is explained. Meanwhile, in the example shown below, it is supposed that registered person moves to the nearest airport (Haneda Airport) from its home and gets onboard an airplane, and moves to movement destination (Fukuoka Airport).

Meanwhile, hereinafter, unless otherwise specified, it is supposed that the processing in the present embodiment is same as that in the commutation of the registered person.

FIG. 75 is a figure showing an installation example of terminals and servers where registered person moves by use of movement means such as an airplane and the like.

As shown in the figure, at the home of registered person, aggregation side terminal 150A, building structure side terminal 110B, organization side terminal 120A, end side terminals 160A, 160B are installed. Among them, in the room of the home, end side terminal 160A such as general purpose PC and the like is installed, and at the door knob at the home entrance, end side terminal 160B is installed.

Further, in Haneda Airport nearest from home, aggregation side terminal 150E, building structure side terminal 110F, organization side terminal 120E, end side terminals 160E, 160F are installed. Among these, in the airport premises, end side terminal 160E is installed, and at the boarding ticket gate, end side terminal 160F is installed.

Furthermore, in Fukuoka Airport nearest to the movement destination, aggregation side terminal 150G, building structure side terminal 110H, organization side terminal 120G, end side terminals 160G, 160H are installed. Among these, in the airport premises, end side terminal 160G is installed, and at the boarding ticket gate, end side terminal 160H is installed.

Moreover, in airline company carrying out these airline affairs (company facilities of operation centers thereof), aggregation side terminal 150C, building structure side terminal 110D, organization side terminal 120C, end side terminals 160C, 160C are installed. Among these, in the company premises, end side terminal 160C is installed, and at the company facility entrance, end side terminal 160C is installed.

FIG. 76 is a figure showing an installation example of terminals and servers configuring authentication system when registered person moves by use of movement means such as an airplane and the like.

In this figure, the movement route of movement related information while registered person uses the end side terminal 160A at home and thereby reserve an air ticket is shown in solid line.

FIG. 77 is a sequence chart showing an action example where units used by registered person are changed when registered person individual moves along determined schedule, in a 28th embodiment of the present invention. Herein, a first stage is shown among four stages where individual reserves an airplane.

First, when the registered person individual comes home, the registered person makes the end side terminal 160B installed at the door knob read the biometrics information thereof (step S), and the end side terminal 160B stores the biometrics information and the movement information to the temporary storage DB of the end side terminal 160B itself, and the temporary storage DBs of the building structure side terminal 110B and the aggregation side terminal 150A of its upper level terminals.

At this moment, as the result of individual existence authentication by the biometrics information received from the end side terminal 160B, movement stop information is created and sent from the building structure side terminal 110B. The aggregation side terminal 150A integrates the movement stop information received from the building structure side terminal 110B, and the movement start information received from the aggregation side terminal 150 of other unit, and recognizes that the registered person individual exists in the unit of individual home, and the movement information of the registered person has continuity. Meanwhile, this process is same as the one mentioned above, and details thereof are omitted herein.

Thereafter, the registered person individual who wants to get on an airplane makes the end side terminal 160A at home read the biometrics information (step S601), and the end side terminal 160A sends the read biometrics information and the movement information to the organization side terminal 120A (step S602).

The organization side terminal 120A collates the received individual information and the individual information stored in its own. This collation process is same as the one mentioned above, and details thereof are omitted herein.

Herein, the collation of individual information shows matching, the organization side terminal 120A then judges whether the registered person individual has matching with the movement history, and validates the comprehensive existence of individual (step S603).

Next, the organization side terminal 120A sends information to request the aggregation side terminal 150A that comprehensively manages the registered person individual home to validate whether the movement stop information showing the existence of the registered person individual is stored in the unit that the aggregation side terminal 150A manages, and the above created movement stop information (step S604).

Next, the aggregation side terminal 150A, on receiving the validation request information from the organization side terminal 120A, compares the movement stop information received at the same time, and the movement related information stored in its own, and validates whether the existence of registered person and the continuity of movement information and the like match or not (step S605).

As the result, when information matches, the end side terminal 150A judges that the registered person individual exists, and sends the permission information to permit the registered person to use the organization side terminal 120A and the end side terminal 160A, to the organization side terminal 120A and the end side terminal 160A (step S606).

The registered person individual, by use of the organization side terminal 120A and the end side terminal 160A, accesses organization side terminal 120C that manages the passenger list of the airline company that the registered person wants to get (step S607).

This organization side terminal 120C manages customer management DB installed for the airline company to perform boarding reservation processing, customer mileage management, boarding condition management and the like.

Next, the registered person individual, by use of the end side terminal 160A, inputs specified items such as passenger name, date and time, flight number and the like that the airline company asks, and sends them to the organization side terminal 120C (step S608), and performs the reservation process of desired flight number. At this moment, it is preferable that the registered person individual inputs information showing scheduled unit to become the action base point of the flight day.

Herein, "action base point" means the ground point at which the action starts when the registered person performs specific action. In the present embodiment, since the registered person starts from its home at the flight day, the "action base point" becomes the home. Further, "scheduled unit to become the action base point" means the unit that the aggregation side terminal 150A which manages action of registered person at this home (the unit structured of terminals 150A, 110B, 120A, 160A, 160B).

The organization side terminal 120C confirms the existence of the registered person individual, and specifies the passenger and performs the reservation processing (step S609).

The organization side terminal 120C, after completion of the reservation processing, creates the movement prior notice information, and sends it together with information to show the scheduled unit to become the action base point of the day of the registered person individual, to the aggregation side terminal 150C of the airline company that manages its own airplanes (step S610).

The aggregation side terminal 150C of the airline company that has received the movement prior notice information and the like stores the received information to the temporary storage DB 157C of its own (step S611).

Next, the aggregation side terminal 150C sends the received movement prior notice information and the like to the authentication system server 10B that managed its own (step S612).

The authentication system server 10B that has received the movement prior notice information and the like stores the received information to the temporary storage DB 17B of its own (step S613). Next, the authentication system server 10B sends the received movement prior notice information and the like to the authentication system server 10A that manages the scheduled unit to become the action base point of the registered person individual on the day (step S614).

The authentication system server 10A that has received the movement prior notice information and the like stores the received information to the temporary storage DB 17A of its own (step S615). Next, the authentication system server 10A sends the received movement prior notice information and the like to the aggregation side terminal 150A that manages the scheduled unit to become the action base point of the registered person individual on the day (step S616).

The aggregation side terminal 150A that received the received movement prior notice information and the like stores the received information to the temporary storage DB 157A of its own (step S617).

As explained above, action schedules at the moment when registered person gets on an airplane are set to terminals beforehand, and thereby, on the day of the flight, individual information of registered person is smoothly transferred along the actions of registered person.

29th Embodiment (Information Movement 7)

Hereinafter, various actions by authentication system in the case where registered person leaves its home and goes to the airport on the day of the flight is explained. Herein, a second stage is shown among four stages where individual reserves an airplane and moves.

FIG. 78 is a figure showing an installation example of terminals and servers configuring authentication system when registered person moves by use of movement means such as an airplane and the like. In this figure, the movement route of movement related information while registered person leaves its home and goes to the airport on the day of the flight is shown in solid line.

FIG. 79 is a sequence chart showing an action example where units used by registered person are changed when registered person individual moves along determined schedule, in a 29th embodiment of the present invention.

The registered person individual leaves its home to become the action base point on the flight day. At this movement, the registered person makes the end side terminal 160B installed at its home the biometrics information thereof (step S621), and the end side terminal 160B stores the read biometrics information and the movement information to the building structure side terminal 110B (step S622).

The building structure side terminal 110B performs authentication on the basis of the received individual information, and when this authentication succeeds, it recognizes that "the registered person has gone out" (step S623).

When this go-out information recognition is made, the building structure side terminal 110B sends the movement start information to the aggregation side terminal 150A at its home (step S624).

The aggregation side terminal 150A at its home validates whether the continuity of the existence of registered person and the like match on the basis of the received movement start information (step S625).

Next, the aggregation side terminal 150A judges whether the movement prior notice information concerning the above air ticket reservation is stored in its own or not (step S626), and when the movement prior notice information is stored (step S626 Yes), it compares and collates the contents of the movement prior notice information, and the received movement start information (step S627).

When the aggregation side terminal 150A recognizes that the contents of the movement start information matches the movement prior notice information concerned, it sends movement notice information to notify that actions based on the movement prior notice information have been started, to the authentication system servers 10A, 10B as the sending sources of the movement prior notice information concerned, the aggregation side terminal 150C, the organization side terminal 120C (step S628).

The terminal that has received the movement notice information may send use availability information to terminals of the unit that its own is included or manages. The use availability information is the information to prompt preparation for authentication processing and the like, since although it is not recognized that registered person individual exists in the unit to which terminals belong, there is a possibility that use of individual information of registered person individual may be made in the unit in future.

The organization side terminal 120C that is the sending source of the movement prior notice information concerned, on receiving the movement notice information, extracts information concerning the registered person individual from database of its own (step S629), and recognizes that the registered person has moved to the outside of its home (step S630).

As explained above, in the case when action schedules of registered person are present by reservation of air ticket and the like, when registered person starts the scheduled actions it is notified to related unit and terminals in unit concerned on the action route, the possibility that authentication processing by the registered person may be performed in a certain time from now on, and it is necessary to perform preparation for the authentication processing.

By this notification, terminals and the like on the action route of registered person can extract individual information of the registered person beforehand, and accordingly it is possible to perform information processing at once when access is actually made by the registered person.

Further, use of individual information at unit or place away from the action schedule may be recognized as abnormal value data, and accordingly it is possible to prevent individual information of registered person from being abused or leaked out.

30th Embodiment (Information Movement 8)

FIG. 80 is a figure showing an installation example of terminals and servers configuring authentication system when registered person moves by use of movement means such as an airplane and the like.

In this figure, the movement route of movement related information while registered person arrives the airport and gets onboard the airplane is shown in solid line.

FIG. 81 is a sequence chart showing an action example where units used by registered person are changed when registered person individual moves along determined schedule, in a 30th embodiment of the present invention. Herein, a third stage is shown among four stages where individual reserves an airplane and moves.

As mentioned previously, the organization side terminal 120C, on receiving the movement notice information of registered person individual, extracts information of boarding reservation contents and the like from the movement prior notice information including boarding reservation contents stored in its own (step S641).

Next, the organization side terminal 120C sends the extracted information, via the aggregation type terminal 150C that manages its own, to units and terminals concerning the registered person's getting onboard the airplane (step S642).

It is preferable that this sent extraction information is stored in temporary storage DBs at plural portions in preparation for failure of route terminal, loss of information.

In the present embodiment, this extraction information is stored in temporary storage DBs of the authentication system server 10B, the aggregation side terminal 150E, the building structure side terminal 110F, the organization side terminal 120E (steps S643 to S646).

Among these, the building structure side terminal 110F stores the extraction information as comparative information for performing individual identification necessary to recognize the condition where the registered person individual moves to the unit that its own manages in future.

Further, the organization side terminal 120E stores the extraction information as information to cope with future change in the flight number and flight conditions of registered person on the day.

The registered person individual arrives the air port, and touches the end side terminal 160F installed at the boarding gate and make it read the biometrics information (step S647), and the end side terminal 160F sends the read biometrics information and the movement information to the building structure side terminal 110F (step S648).

Next, the building structure side terminal 110F compares and collates the received biometrics information, and the comparative information for performing individual identification stored beforehand (step S649), and performs the validation of the continuity of the movement related information and the existence of registered person and the like (step S650), and judges them (step S651).

When the building structure side terminal 110F recognizes that the person who input biometrics information at the step S647 is the identical person whose reservation the registered person individual made, and who wants to be onboard the airplane, it sends permission information to permit the person who input the individual information to get onboard the corresponding airplane, to the end side terminal 160F (step S652).

The end side terminal 160F, on receiving this permission information, opens the door of the ticket gate where the end side terminal 160F is installed (step S653).

Further, the building structure side terminal 110F, sends movement prior notice completion information to delete the movement related information and the extraction information so far, in response to the fact that the registered person individual, has moved in the unit to get onboard the airplane, to the authentication system server 105 and the aggregation side terminal 150E (step S654).

By the operation of the present authentication system, it is possible for individual to bring information that the individual has qualification to get onboard the airplane not depending upon "thing" that is air ticket, and to authenticate the existence of individual. Therefore, even if registered person moves "without anything", necessary information will move along with him.

Further, terminals and servers that do not require individual information of registered person for getting onboard the airplane delete the individual information, and accordingly, it is possible to prevent a third party from spoofing and using the individual information.

In the same manner, by use of the present authentication system, all the media such as air ticket and commutation ticket and ticket, paper money and coin, various cards, cell phone and portable terminal become unnecessary, and accordingly it is possible to exclude all risks of loss or theft and the like of "things".

Furthermore, in the case when the movement means and route and time table from home to the airport are searched via software in terminal or internet, the search result information may be used as movement related information.

In this case, registered person, by use of the end side terminal 160 installed at its home, makes it read its own biometrics information, and searches for movement route and movement means, and then the end side terminal 160 recognizes one or plural routes to be used among searched plural routes by mining technology, and sends movement prior notice information including the read biometrics information to terminals installed on the routes.

The reason for selecting plural routes is because they may be used bypass means in the case when the first scheduled route is closed due to weather, delay owing to accident and the like.

Moreover, in the case when software to provide conventional transshipment information service is packaged to the end side terminal 160, it may be set so that information such as transshipment information, transshipment station, transfer means necessary for structuring movement prior notice information should be automatically extracted from input search conditions. Thereafter, this extracted information is added to movement prior notice information and information showing existence validation result.

Further, the end side terminal 160 may send movement prior notice information on the basis of boarding schedule day and time, to units that manage main traffic organs expected to be used by registered person for movement, for example, aggregation type terminal and building structure side terminal that manage the nearest station of home, the nearest station of airport and transshipment station between them.

Furthermore, in the case when the action route of registered person is forecasted, after authentication by the unit or terminal is made, the terminal identification ID of unit or terminal to which movement confirmation is supposed is sent beforehand to units and terminals as additional information of movement prior notice information.

As the result, once the action of registered person is started, the movement related information is sent sequentially to the next target ground point of the current position. As the next runner of relay of athletic games waits on the course according to the condition of the current runner, unit or terminal scheduled to receive the movement related information is made to receive conditions beforehand, and can be prepared for use. Further, terminals and servers on the action route of registered person, when to start information processing necessary for existence authentication and service provision and the like beforehand, can do processing smoothly or preferentially.

On the other hand, since unit and terminal to use individual information of the registered person can be specified, it is possible to limit the use at unit and terminal out of the action route of the registered person, and thereby attain both convenience and security.

31st Embodiment (Information Movement 9)

Herein, a fourth stage is shown among four stages where individual reserves an airplane and moves.

Hereinafter, various actions by the authentication system where registered person gets onboard the reserved airplane and arrives its destination are explained.

FIG. 82 is a figure showing an installation example of terminals and servers configuring authentication system when registered person moves by use of movement means such as an airplane and the like.

In this figure, the movement route of movement related information while registered person gets onboard the reserved airplane and arrives its destination is shown in solid line.

It is previously mentioned that when registered person individual moves in condition surrounded by "thing", the "thing" is regarded as a unit.

When to move between units that are mutually apart from in a short time, people use movement means such as airplane, electric train or automobile as a unit.

It is supposed that the unit of movement means has the following functions.

The first function is, as mentioned previously, to use biometrics information, and thereby, passengers can use ticketless services, without keeping an air ticket.

The second function is to make easy the boarding confirmation to the movement means, easily search the current position of passenger not yet in its seat, and make an announcement necessary to prompt the passenger to be seated.

FIG. 83 is a sequence chart showing an action example where units used by registered person are changed when registered person individual moves along determined schedule, in a 31st embodiment of the present invention.

First, when the registered person individual sits on the reserved seat in the airplane, the registered person makes the end side terminal 160M installed in seat read biometrics information (step S661), and the end side terminal 160M sends the read biometrics information and the movement information to the building structure side terminal 110M (step S662).

To the building structure side terminal 110M, information such as biometrics information and the like necessary to specify passenger is stored beforehand from the organization side terminal 120C.

The building structure side terminal 110M compares and collates the biometrics information stored beforehand in its own, and the biometrics information received from the end side terminal 160M (step S663), and judges whether the registered person and the actual passenger match or not (step S664).

At this moment, when they match, it sends to related terminals, movement stop information for judging that use of the authentication system by the registered person in outside of the unit that the building structure side terminal 110M structures is abnormal.

On the other hand, when they do not match, it sends information to show "mismatch, and confirmation work required" to terminal that aircrew in the airplane operates, and notifies the seat number of the mismatching passenger. The aircrew confirms this mismatching information, and performs necessary procedures including carrying out identical person authentication once again, moving the passenger to correct reserved seat and the like.

The building structure side terminal 110M searches boarding condition before take-off schedule time of the airplane, and extracts individual information of passenger who is registered in the boarding list, but seating information not yet arrives from the end side terminal 160M (step S665).

The building structure side terminal 110M sends this extracted not yet arrive passenger information to the authentication system server 10B, the aggregation side terminal 150E and the building structure side terminal 110F that manage the airport of take-off side (step S666).

The authentication system server 10B, the aggregation side terminal 150E and the building structure side terminal 110F that have received the not yet arrive passenger information search whether the movement stop information and the use prior notice information and the like exist in their own or not (steps S667 to S669).

When they exist, the authentication system server 10B, the aggregation side terminal 150E and the building structure side terminal 110F send and confirm the period when registered person input/read individual information last, and specify the unit that recognized registered person individual last in the present authentication system (step S670).

After the unit is specified, the terminal that manages the unit concerned (in the present embodiment, the building structure side terminal 110F) sends to the permission information to execute announcement to tell the last boarding guide to the not yet arrive passenger, to the end side terminal 160 for announcement in the specified unit.

The end side terminal 160 for announcement, on receiving the permission information, executes announcement to tell the last boarding guide to the not yet arrive passenger (step S671).

Further, the terminal that manages the unit concerned (in the present embodiment, the building structure side terminal 110F) has a function to send the permission information to execute announcement to tell the last boarding guide to the not yet arrive passenger, to the terminal that manages terminals on the route connecting the installation position of terminal under management, and the position of the building structure side terminal 110M, and make it execute the announcement.

In the prior art, announcement was made all over the airport facility, and individual information of personal name and destination was leaked out unlimitedly, but in the present embodiment, the announcement place is limited, and the individual information leakage is limited, and thereby privacy is protected. Further, since the last existence place is clarified, the airline company can take intensive measures upon the route from the last existence place to the airplane, and can make its business affairs efficient.

Furthermore, to seats of movement means such as airplane and the like, thermal sensor and weight sensor and the like may be built in.

Even after seating is made after the boarding passenger confirmation, if registered person can move to other unit, when sensor senses that passenger is off its seat for a certain time, it recognizes that the seat is empty, and may notice it to terminals of the authentication system.

The conditions where person can move to other unit include, for example, in an airplane, the conditions before the boarding door is closed for take-off preparation, and the condition after the boarding door is opened after landing. In the case of an electric train, they include the condition before the passenger door is closed for departing the station, and the condition after the passenger door is opened at arrival to station. In the case of an automobile, they include the condition before the door is closed for starting, and the condition after the door is opened.

It is preferable that in order to recognize movement unavailable condition to outside of the unit concerned, sensor for sensing opening. closing is attached to the door of movement means, to recognize its opening/closing information.

Terminal in the unit of the movement means, after the door of unit of movement means that moves registered person physically, when the existence of registered person is confirmed in the unit, it supposes that registered person individual moves with the movement means. At this moment, terminal of the movement means sends movement related information to other terminal and server that are supposed to be related thereafter by the destination information of the movement means.

For example, in the case of automobile, there is one where doors are locked automatically when running starts. End side terminal 160 is installed to the grip of door inside of automobile, and in the condition where the automobile starts running and all the doors are locked automatically, and if the existence of registered person individual is confirmed in the unit of the automobile, it is easily speculated that the registered person individual moves with the automobile.

Meanwhile, in the case of automobile, a structure is made where car GPS function and time proof means are combined, and when doors of the automobile concerned are locked or unlocked, the position and time of the automobile concerned are liked and recognized, and thereby movement place can be grasped.

In the present embodiment, the building structure side terminal 110M installed in airplane recognizes the time when the passenger doors of the airplane are closed before take-off as the take-off time (departure time), and the time when the passenger doors are opened after landing as the landing time (arrival time).

At take-off of the airplane, the building structure side terminal 110M measures the time when the passenger doors are closed at Haneda Airport at take-off side (step S672), and sends take-off temporal information to the authentication system server 10B as the last aggregation destination of management of individual information so far, and the aggregation side terminal 150D at Fukuoka Airport at landing side to become the management start base point from now (step S673).

This take-off temporal information includes information to show the measured take-off time, the terminal identification ID of the building structure side terminal 110M of the sending source, and the identification ID of registered person whose getting onboard the airplane has been already confirmed.

The authentication system server 10B, on receiving this take-off temporal information, judges that the registered person individual does not exist in the area of the take-off side (step S674), and sends other unit movement completion information to show that movement related information is deleted, to terminals and server on the movement route of registered person so far (herein, the building structure side terminal 110F and the aggregation side terminal 150E) (step S675).

Thereafter, when the airplane arrives Fukuoka Airport as the destination, and the passenger doors are opened, the building structure side terminal 110M measures the time when the doors are opened (step S676).

Next, the building structure side terminal 110M sends the landing temporal information to the authentication system server 10B as the latest aggregation destination of management of individual information so far, and the aggregation side terminal 150C of Fukuoka Airport to become the management start base point from now (step S677).

This landing temporal information includes information to show the measured landing time, the terminal identification ID of the building structure side terminal 110M of the sending source, and the identification ID of registered person whose getting onboard the airplane has been already confirmed.

The authentication system server 10B, on receiving this landing temporal information, judges the existence continuity of registered person, on the basis of the take-off temporal information in its own, whether the sending source terminal of the take-off landing temporal information is identical identification ID or not and the like (step S678), and then sends answer information to recognize the continuity of information, to the aggregation side terminal 150G to become the management start base point from now (step S679).

After this, the unit that the aggregation side terminal 150G manages becomes start point and performs authentication processing of registered person and the like.

Thus, in the present embodiment, terminal installed in the unit of movement means measures the time actually taken from the start period and end period of movement of movement means, to arrival at the destination, and accordingly it is possible to obtain precise movement required time.

Further, when it is proved that the registered person exists in this movement means by authentication of individual information, even if individual information of the registered person is input in outside of the unit of the movement means, the use of the present authentication system is stopped or limited, and accordingly, it is possible to prevent a third party from spoofing.

Further, in the case when the registered person is in the movement means, if the destination of the movement means is changed during movement, from the terminal installed in the movement means, to other terminal and server, information that the change of information of destination in the movement related information stored in the terminal and server is requested is sent.

To each terminal, even when alarm to the effect that alarm is made when registered person does an action not scheduled, the change request is sent as described above, and accordingly, it is possible to prevent the alarm from being made unnecessarily.

For example, now suppose that after the airplane takes off Haneda Airport, the destination is changed from Fukuoka Airport to Nagasaki Airport due to weather. At this moment, the building structure side terminal 110M installed in the airplane recognizes that change on the basis of key input and the like by aircrew of the airplane (step S680), and sends information to show that the movement destination has been changed from the unit managed by the aggregation side terminal 150G of Fukuoka Airport, to the aggregations side terminal 150M of Nagasaki Airport that manages Nagasaki Airport, to related terminals (step S681).

Thus, in the case when the destination is changed, terminal in movement means sends information to request the change of movement related information, during movement, and sends new movement related information to terminal of the destination after the change, and accordingly, even in the case when action schedule of registered person changes suddenly, it is possible to perform the individual authentication smoothly, without labor of the registered person individual.

In the embodiment explained above, terminals measure the time required actually for movement from opening and closing time of passenger doors and the like, meanwhile, by use of time table data stored in terminals beforehand, movement required time of movement means may be calculated.

32nd Embodiment (Information Movement 10: Data Mining 1)

Hereinafter, in the present embodiment, from the past movement history of registered person, the movement route of the registered person is forecasted, and the forecasted movement route is sent as mining information, to related respective terminals.

FIG. 84 is a sequence chart showing an action example where use terminal conditions are extracted from the history information of registered person individual and expected routes are calculated, in a 32nd embodiment of the present invention.

For example, in the case of commutation, the station to get on and the station to get off are same every day, and the ticket gates used are roughly same. Further, in commutation, ticket machines and position of train car are roughly fixed unconsciously.

Furthermore, in the case of use of traffic organizations for return home and business trip, rough routes are fixed.

Moreover, naturally, it is not possible for an identical person to be at different places at the same time.

Therefore, in the present embodiment, the authentication system patternizes actions of registered person on the basis of accumulated past history information of registered person, and creates expected movement routes customized per registered person individual as mining information.

The authentication system analyzes period of individual information input by registered person, identification ID of terminal of input, the number of use times, reservation condition of traffic organization of registered person and input purpose of individual information (opening and closing the door and the like) and so on, and calculates expected movement routes.

Further, terminals and servers of the authentication system may store this created expected movement route information, or may be ready to recognize part of various databases already existing in individual folders of their own as mining information.

FIG. 85 is a figure, as an example, showing the use order (first→ . . . →last unit) of aggregation side terminals of units registered person used in the morning Monday in latest three months.

In the present embodiment, the authentication system server 10A extracts the use order (use pattern) of units registered person used in certain period (in the morning Monday), and rearranges them in the frequency order of use pattern and stores them to basic information database 14A.

Herein, one day is divided into AM and PM, and the terminal Identification ID of the aggregation side terminal 150 that manages action start unit (first unit), the terminal identification ID of the aggregation side terminal 150 that manages route units (second, third units), and the terminal identification ID of the aggregation side terminal 150 that manages destination unit (last unit).

First, the authentication system server 10A, in creating the expected movement route information, sets conditions to determine the period to extract history information to become the base, and objective terminal to extract the history information (step S801).

Next, the authentication system server 10A, on the basis of the terminal identification ID of terminal added to history information stored in its own, to the aggregation side terminal 150 that manages the terminal of the identification ID, and the aggregation side terminal if the added terminal identification ID is the aggregation side terminal 150, sends the decision conditions, and instructs extraction processing of history information (step S802).

Each aggregation side terminal 150, on receiving the instruction information of the extraction processing from the authentication system server 10A, on the basis of the terminal identification ID of terminal added to the history information stored in its own, extracts necessary information (steps S803 to S805).

At this moment, each aggregation side terminal 150 does not need to perform the extraction processing of all the history information, bit the extraction object is limited to only history information not yet sent as backup information from each aggregation side terminal 150 to the authentication system server 10A.

Each aggregation side terminal 150, after completion of extraction processing, sends the result information of the extraction processing, to the authentication system server 10A (step S806).

The authentication system server 10A temporarily stores information received from each aggregation side terminal 150 (step S807), and performs the same extraction processing as the above from history information stored in its own and the external organization server 300 (step S808).

Next, the authentication system server 10A, on the basis of these extracted history information, analyzes items such as action start time and action start place and the like when registered person performs specified action (step S809).

Meanwhile, action patterns are different per registered person individual, and contents of actions to become the analysis objectives may be made different between a person who goes to specified places every day, and another person who goes to different related places.

In the example in FIG. 85, the authentication system server 10A extracts expected movement route information (mining information) by related terminal by extraction condition "from which terminal to which terminal, movement was made in certain time (day of the week)", and the use frequency thereof (step S810).

As a result, it is possible to forecast pattern connection and point connected explained hereinafter.

This pattern connection is the case where there are plural terminals expected to be connected next via a certain terminal. In the example in FIG. 85, in the case via the aggregation side terminal 150A of the first unit, there are two, that is, the aggregation side terminal 150E and the aggregation side terminal 150G expected next in the second unit.

On the other hand, the point connection is the case where there is only one terminal expected to be connected next via a certain terminal. In the example in FIG. 83, in the case via the aggregation side terminal 150K of the third unit, there is only the aggregation side terminal 150P expected next in the fourth unit.

Meanwhile, connection destinations in the seventeenth embodiment are terminals installed for registration and authentication of individual information of registered person, temporary storage of data and the like. On the other hand, connection destinations defined in the present embodiment are terminals of sending destinations of movement related information.

The authentication system server 10A stores analyzed and created expected movement route information to a specified place of its own (step S811).

Thereafter, the authentication system server 10A sends the created mining information to each aggregation side terminal 150 (step S812).

Each aggregation side terminal 150, on receiving the mining information, stores the received mining information to specified place of its own (steps S813 to S815), and uses this mining information in various processes including creation of movement information and sending of movement related information and the like after that.

Meanwhile, in the present embodiment, the frequency of the mining work is optional, however, it is preferable that analyzing and reviewing the mining work at a short specified period such as one week or one month makes easy the comparison and analysis with past mining information, and can cope with changes of action patterns of individual.

Each terminal installed in the present embodiment stores this mining information, and accordingly it is possible to set sending destination of use possibility information showing future action schedule of registered person. As a result, each terminal can be ready to send movement related information at authentication processing and the like, that is, can work together among terminals, and movement of use units of individual information in the authentication system can be facilitated smoothly.

Further, since the history information of registered person is converted into action pattern information, when history information is newly input to the authentication system, it is possible to compare it with this action pattern information.

As the result of comparison, when terminal and server judge that the newly input history information mismatches the conventional action pattern information, it assumes that "the person who input the individual information is not the registered person individual", and stop and limit the use of the present authentication system, and give alarm information to related people, and thereby, security of registered person individual living is enhanced.

33rd Embodiment (Information Movement 11: Data Mining 2)

In the present embodiment, from the mining information, movement destinations to which registered person go in future are speculated, and to terminals installed in the movement destinations, instructions to be ready for various processes are made, thereby processing is made efficient.

In the present embodiment, various actions are explained where registered person individual goes from its home to a super market for shopping in the afternoon on a holiday.

FIG. 86 is a figure showing an installation example of terminals and servers configuring authentication system around the home of registered person and the super market.

In this figure, the movement route of movement related information while registered person goes from the home to the super market is shown in solid line.

FIG. 87 is a sequence chart showing an action example where action pattern is forecasted from the mining information of registered person individual, and the movement related information is sent, in a 33rd embodiment of the present invention.

First, when the registered person individual goes out from the home, the registered person makes the end side terminal 160B read its own biometrics information (step S821), and the end side terminal 160B sends the read biometrics information and the movement information to the building structure side terminal 110A (step S822).

The building structure side terminal 110A collates individual information and the like included in these information (steps S823).

As a result, when the existence of registered person is recognized, the building structure side terminal 110A recognizes that the registered person has gone out from the home (step S824), and sends information that the use of the authentication system from the end side terminal 160B by the registered person is topped, to the end side terminal 160B (step S825).

Further, the building structure side terminal 110A, according to the received authentication result, creates the movement start information, and sends it to the aggregation side terminal 150D (step S826).

The aggregation side terminal 150D, on receiving the movement start information, recognizes that the transfer of units that the registered person uses has been started (step S827), and compares and collates the received movement start information, and the mining information stored in its own, and extracts the most frequent one from the action pattern information of registered person included in the mining information (step S828).

Herein, as an example, from the relation between the day of the week and the time zone of action start, it extracts action pattern when registered person goes out for shopping.

Next, the aggregation side terminal 150D recognizes that the transfer of units that the registered person uses has been started in the authentication system, and in order for each terminal to easily perform the recognition of the movement related information continuously in future, sends the movement start information to the authentication system server 10A as the upper level terminal of the aggregation side terminal 150D (step S829).

The authentication system server 10A, on receiving the movement start information, recognizes that the transfer of units that the registered person uses has been started (step S830).

On the other hand, the aggregation side terminal 150D, from the comparison result with the mining information, sends the movement prior notice information to the aggregation side terminal 150B as the upper level terminal of the building structure side terminal 110C of the super market with high possibility that the registered person may input individual information (step S831).

The aggregation side terminal 150B, on receiving the movement prior notice information, extracts individual information of the registered person from its own database, in preparation for future input of individual information by the registered person (step S832).

By incorporating the individual existence authentication and the movement related information with the mining information in this manner, the following two effects are obtained.

Firstly, in forecast unit or terminal by mining, registered person individual moving to its own unit is forecasted and preparation is made beforehand, and accordingly, it is possible to make the system processing after that efficient.

Secondly, it is possible to transfer the movement start information beforehand to the most upper level terminal to cover wide area, that is, the authentication system server 10A, in preparation for registered person individual to move to other place than expected by mining.

Then, the terminal that has read individual information of registered person individual is searched by upper level terminal of the terminal concerned sequentially for just previous movement start information, and inevitably, perform search to the most upper level authentication system server of the read terminal. as a result, only the most upper level authentication system servers can perform mutual search and reference for exchanging the movement related information, and it is possible to limit the terminals for process of the movement related information to minimum. Accordingly, it is possible to reduce the load of the entire system.

34th Embodiment (Information Movement 12: Data Mining 3)

In the present embodiment, various actions are explained where registered person takes action other than the action pattern specified beforehand in the authentication system, like going out for a walk suddenly from the home at night of holiday, and the terminal to which individual information is input next cannot be specified.

FIG. 88 is a figure showing an installation example of terminals and servers configuring authentication system around the home of registered person.

In this figure, the movement route of movement related information while registered person suddenly takes other action than the action pattern is shown in solid line.

FIG. 89 is a sequence chart showing an action example where the movement related information is sent to the system inside, when action pattern cannot be forecasted from mining information of registered person individual, in a 34th embodiment of the present invention.

First, when the registered person individual goes out from the home, the registered person makes the end side terminal 160B read its own biometrics information (step S841), and the end side terminal 160B sends the read biometrics information and the movement information to the building structure side terminal 110A (step S842).

The building structure side terminal 110A collates individual information and the like included in these information (steps S843).

As a result, when the existence of registered person is recognized, the building structure side terminal 110A recognizes that the registered person has gone out from the home (step S844), and the building structure side terminal 110A creates the movement start information by the authentication result, and sends it to the aggregation side terminal 150D (step S845).

The aggregation side terminal 150D, on receiving the movement start information, recognizes that the transfer of units that the registered person uses has been started (step S846), and compares and collates the received movement start information, and the mining information stored in its own, and extracts the most frequent one from the action pattern information of registered person included in the mining information (step S847).

Meanwhile, herein, from the relation between the day of the week and the time zone of action start, it extracts information that there is not corresponding pattern information.

When there is not corresponding pattern information or point information, firstly, the aggregation side terminal 150 adjacent to the place where its own is installed is selected, and secondly, the adjacent aggregation side terminal 150 in use in other time zone is selected.

Next, the aggregation side terminal 150D recognizes that the transfer of units that the registered person uses has been started in the authentication system, and in order for each terminal to easily perform the recognition of the movement related information continuously in future, sends the movement start information to the authentication system server 10A as the upper level terminal of the aggregation side terminal 150D (step S848).

The authentication system server 10A, on receiving the movement start information, recognizes that the transfer of units that the registered person uses has been started (step S849).

On the other hand, the aggregation side terminal 150D, since the aggregation side terminal 150 with high possibility that the registered person may input individual information next is not specified, sends the movement prior notice information to the aggregation side terminals 150E, 150F, adjacent to the place where the aggregation side terminal 150D is installed, or adjacent aggregation side terminals 150A, 150B, 150C existing in action pattern in other time zone of the registered person (step S850).

The aggregation side terminals 150A, 150B, 150C, 150E, 150F hereinafter referred to collectively as aggregation side terminals 150ABCEF), on receiving the movement prior notice information, extracts individual information of the registered person from its own database, in preparation for future input of individual information by the registered person (step S851).

Among the aggregation side terminals 150ABCEF, the aggregation side terminal to which individual information of registered person is input sends the movement stop information to the authentication system server 10A (steps S851 to S853).

The authentication system server 10A, on receiving the movement stop information, on the basis of the received movement stop information, judges the existence of registered person and the continuity of movement information (step S854).

The authentication system server 10A sends permission information to permit a specified action such as unlocking the key and the like, to the aggregation side terminal 150 to which individual information is newly input (step S855).

Further, the authentication system server 10A sends other unit movement completion information, to the aggregation side terminal 150D (step S856).

The aggregation side terminal 150D, on receiving the other unit movement completion information from the authentication system server 10A, deletes the movement start information in its own, and sends the other unit movement completion information, to the aggregation side terminal 150 that sent the movement prior notice information at the step S850 (other than the aggregation side terminal 150 that made actions of steps S851 to S853) (step S857).

Thereby, there is no information from the aggregation side terminal 150D, a structure can be made where the aggregation side terminal 150 that confirmed new individual existence is made the start point.

As the result, there is no need to send the movement start information to all the terminals in the authentication system, and information is exchanged with terminals specified to some extent. When there is a distance from the space where the registered person individual is at present, or to terminals to which individual information of the registered person has not been input, information is not transmitted.

For example, in present mesh radio information system, information is transmitted to all terminals that exist in radio area, and have function to receive radio, as a result, information leakage risk is high, and the load of entire system becomes large.

While on the other hand, in the authentication system according to the present embodiment, terminals are limited, and consequently, information leakage risk is low, and system load can be reduced.

Further, the sub servers and the aggregation side terminal 150 in the authentication system may analyze action pattern of each registered person, and set mutual link among terminals in the case when input of individual information is carried out continuously, and thereby make smooth the information transfer in the authentication system.

35th Embodiment (Information Movement 13)

FIG. 90 is a sequence chart showing an action example where there is individual existence information at the working place, in a 35th embodiment of the present invention. Herein, explanations are made with an image at the moment when the individual arrives the working place building.

In the present embodiment, the case is shown when registered person individual asks for individual authentication to enter the building at the entrance of the working place building to go to the working place, but there is one who calls itself the registered person individual and has already entered the building.

First, the registered person individual touches the end side terminal 160B installed at the working place building entrance and makes it read biometrics information (step S861), and the end side terminal 160B sends the read biometrics information and the movement information to the building structure side terminal 110B (step S862).

The building structure side terminal 110B compares and collates information stored in its own, and the received information (step S863), and performs confirmation process of the existence of registered person (step S864), and stores necessary information (history information such as individual identification ID of registered person who read individual information, read period, terminal identification ID of read terminal and the like) from information received this time newly to its own.

Further, the building structure side terminal 110B confirms whether the movement stop information is stored in the unit of the building structure of the working place.

As a result, when the movement stop information exists in the unit that the building structure side terminal 110B manages, the building structure side terminal 110B judges that the rightfulness of the information received from the end side terminal 160B cannot be approved (step S865).

Thus, when it is recognized that identical person exists in different places, when the person who has arrived the entrance of the building of the working place is the registered person itself in this case, there is a possibility that other person is spoofing in the working place.

Therefore, when the building structure side terminal 110B judges that the rightfulness of the movement information received from the end side terminal 160B cannot be approved, it creates "system use stop information" as information to show abnormal condition, and sends the created information to all the terminals in the unit that the building structure side terminal 110B manages (step S866).

Furthermore, it is preferable that at this moment, the building structure side terminal 110B sends the information also to the aggregation side terminal 150 and the authentication system server 10, in order to keep the security of the entire authentication system.

Moreover, in the case of high importance such as the terminal that the building structure side terminal 110B is installed in, for example, a place closed to all unauthorized people, or procedures concerning individual financial assets are made, information to show abnormal condition may be sent to place preset by registered person individual, or may be incorporated with a system to give message to police.

Each terminal, on receiving this "system use stop information", stops the use of the present authentication system to the registered person individual or the person spoofing as the registered person individual (step S867).

Thereafter, the building structure side terminal 110B sends information to prompt registered person to input individual information again, to the end side terminal 160B, and prompts it (steps S868, S869).

The building structure side terminal 110B refers to the result of re-validation of the existence of the registered person, and validates which of the information existing in the unit, and the information read by the end side terminal 160B this time is the information to show the existence of the true individual, and then restores the use of the present authentication system by the biometrics information.

In the present embodiment, in the case when person is moved in the unit inside, in the case where there is already existence information of the person concerned in the unit inside, information transfer and system use are stopped.

It is natural that it is impossible for an identical person to be at two or more places at the same time.

Even in the case when registered person and individual information of the registered person are separated, and misappropriation and abuse and the like are made, the present authentication system easily grasps such an abnormal condition, and sends out an alarm or the like, and accordingly it is possible to complement vulnerability peculiar to such information.

36th Embodiment (Information Movement 14)

In the present embodiment hereinafter, the case where registered person is a customer, sales assistant or security guard in a department store, and moves in the building of the department store is explained.

FIG. 91 is a figure showing an installation example of terminals and servers configuring authentication system in a department store.

In the example in this figure, there are tenants C, D in this department store.

As shown in the figure, end side terminal 160B is installed at the entrance/exit of the building of this department store. Further, end side terminal 160C is installed at the entrance/exit of the tenant C, and building structure side terminal 110C, aggregation side terminal 150C are installed in the tenant. In the same manner, end side terminal 160D is installed at the entrance/exit of the tenant D, and building structure side terminal 110D, aggregation side terminal 150D are installed in the tenant. Furthermore, end side terminal 160E is installed at the boarding gate (entrance/exit) of elevator, and end side terminal 160F is installed at the entrance/exit of closed area. Moreover, the building structure side terminal 110B manages this floor (first floor of the department store building), and the building structure side terminal 110A and the aggregation side terminal 150A manage the entire department store building.

Further, FIG. 92 is a figure showing a connection example of networks among terminals installed in this department store, in the present embodiment.

Solid line and dot line in this figure show networks connecting terminals, and among them, the solid line shows the route via which information is sent and received at the moment of authentication processing explained hereinafter.

FIG. 93 is a sequence chart showing an action example of a system that, when registered person individual exists in the building, can confirm the existence, in a 36th embodiment of the present invention.

First, when registered person individual enters the building, the registered person makes the end side terminal 160B read biometrics information (step S871), and the end side terminal 160B sends the biometrics information and the movement information, to the building structure side terminal 110A that manages the entire building (step S872).

The building structure side terminal 110A, on receiving those information, performs existence authentication of the registered person and confirmation of continuity of movement related information and the like (step S873).

As a result, when the building structure side terminal 110A can confirm the existence of registered person and the like, it extracts the read period of those information and the identification ID of read terminal, from the received information, and by use of this extracted information, creates a current position display file to show the current position of registered person, and displays it on a screen (step S874).

FIG. 94 is a figure showing a display example of the current position display file.

In the example in this figure, about at which period at which place the registered person was, the identification ID and installation place (name of building, area) of the end side terminal 160 that confirmed the individual information of registered person and read time are shown in text information.

Further, FIG. 95 is a figure showing another display example of the current position display file.

In the example in this figure, about at which period at which place the registered person was, visual information is shown on a map information of building and area.

In this figure, the current position of registered person is shown with star mark. Further, along the information showing the current position of the registered person, individual identification ID and name of the registered person, and input period of individual information may be shown.

Furthermore, even in the case when registered person moves with the elevator E in order to move from the building structure entrance, the tenant D, the tenant C, and to other floor, the building structure side terminal 110A displays the current position in the same manner (steps S875 to S886).

Meanwhile, the end side terminal 160 may be further installed, for example, in the corridor between the tenant D and the tenant C, in the corridor between the tenant C and the elevator E and so on, and accordingly, it is possible to grasp the current position of registered person in further detail.

As explained above, when the existence in the unit is recognized, by use of the installation position information of the terminal that confirmed the existence, it is possible to display units and places where registered person exists at present. This existence position information is made into digital information, and therefore, it is possible to confirm the existence place on a table in time series, and to browse the positions of all the related people as a list.

Furthermore, display may be made in a method where the existence place of registered person individual is laid upon a 2-dimensional amp or a 3-dimensional map, 4-dimensional information showing building conditions.

For example, in the case of sales lots of department store, respective sales lots are made component units and the entire department store is made base unit, when an employee moves, by making terminals read individual information, the current position of the employee can be grasped easily and mutually.

By this system, in the case of company or school, existence place confirmation of specified person and activity conditions and the like can be grasped, and in the case of commercial facilities, concentration conditions of customers to specified area or shop, customer flow, extraction of suspicious individual, search and help for lost child and other conditions can be grasped.

Further, at emergency, people existing at the emergency occurrence place can be specified, and use in every phase of society can be made.

In this system, spatial information is linked with installation position information of terminal, and accordingly it is possible to easily recognize 3-dimensional position of registered person. Further, terminals are installed in respective rooms, and thereby it is possible to easily distinguish existence places, and consequently it is possible to complement vulnerability of measurement errors that have been like to occur in conventional GPS systems and the like.

Furthermore, in the prior art, there has been an art where radio system and IC tags and various sensors are installed in building, and individual acts having a portable terminal and its existence position is confirmed. In this art, although vulnerability of spatial information is complemented, the portable terminal is brought on the body or near the body, and existence place is always monitored, and there is a high possibility that privacy may be infringed.

For example, in the prior art, even when an employee of department store goes to toilet, there is a danger that its action history may be taken without its own consent.

In the same manner, in the case of customer, visited places and records of sales lot routes are taken without its own consent unconsciously, and the products and services that interest customer are grasped by a third party.

In the present authentication system, registered person makes the end side terminal 160 read individual information on its own will, and consequently it is possible to avoid such privacy infringement.

Therefore, the present authentication system may be used to make a clear distinction from the surveillance society conditions where by use of conventional various arts, for example, radio waves of cell phones are read at base station, face recognition systems are operated with cameras at streets, and the existence of person is recognized irrespective of individual will.

Individual will is respected, and privacy is protected about action at places unless person does not use individual information at any terminal of unit the person arrives, at self responsibility or self judgment.

37th Embodiment (Information Movement 15: Registered Person Navigation Process 1)

Hereinafter, in the present embodiment hereinafter, a process for authentication system to navigate registered person to its destination, when registered person moves from the current position to the destination in building is performed.

FIG. 96 is a figure showing an installation example of terminals and servers configuring authentication system in a department store, in the present embodiment.

In the example in this figure, there are tenants C, D in this department store.

As shown in the figure, end side terminal 160B is installed at the entrance/exit of the building of this department store. Further, end side terminal 160C is installed at the entrance/exit of the tenant C, and building structure side terminal 110C, aggregation side terminal 150D are installed in the tenant. In the same manner, end side terminal 160D is installed at the entrance/exit of the tenant D, and building structure side terminal 110D, aggregation side terminal 150D are installed in the tenant. Furthermore, end side terminal 160E is installed at the boarding gate (entrance/exit) of elevator, and end side terminal 160F is installed at the entrance/exit of closed area. Moreover, the building structure side terminal 110B manages this floor (first floor of the department store building), and the building structure side terminal 110A and the aggregation side terminal 150A manage the entire department store building.

Further, on routes of this floor, end side terminals (navigators) 160W1 to W13 are installed. The end side terminals 160W1 to W13 has a function to navigate registered person to its destination by screen display, light illumination, audio output and the like.

FIG. 97 is a figure showing a connection example of networks among terminals installed in this department store, in the present embodiment.

Solid line and dot line in this figure show networks connecting terminals, and among them, the solid line shows the route via which information is sent and received at the moment of navigation (navi) actions explained hereinafter.

FIG. 98 is a sequence chart showing an action example of a system that, when registered person individual moves in the building, can navigate or confirm the movement places, in a 37th embodiment of the present invention.

However, in this figure, the building structure side terminal 110B directly connected to the end side terminal 160B is considered to be same as the end side terminal 160B, and is not shown in the sequence chart.

Further, the building structure side terminal 110W directly connected to the end side terminals 160W1 to 160W13 is considered to be same as the end side terminals 160W1 to 160W13, and is not shown in the sequence chart.

First, when registered person individual enters the building, the registered person makes the end side terminal 160B read biometrics information (step S901), and the end side terminal 160B sends the biometrics information and the movement information, to the building structure side terminal 110A that manages the entire building (step S902).

The building structure side terminal 110A, on receiving those information, performs existence authentication of the registered person and confirmation of continuity of movement related information and the like (step S903).

As a result, when the building structure side terminal 110A can confirm the input operator of the individual information as the registered person individual, it extracts the read period of the information and the identification ID of read terminal, from the received information, and by use of this extracted information, creates a current position display file to show the current position of registered person, and displays it on a screen (step S904).

Thereafter, the building structure side terminal 110A sends information to show that the existence or entity of registered person individual has been conformed, to the end side terminal 160B (step S905).

The end side terminal 160B, on receiving the information to show that the existence or entity of registered person individual has been conformed, displays that effect.

Registered person confirms the display contents, and by use of the end side terminal 160B, inputs the place in the building inside that it will visit from now (step S906). Herein, a touch panel screen like liquid crystal and the like is installed to the end side terminal 160B, and by touching name displayed on the screen, desired destination can be selected. Meanwhile, to the end side terminal 160B, a table is stored beforehand, where tenant name and name to be displayed on the screen, and terminal identification ID to clearly judge the installation place are mutually associated.

Herein, when registered person selects "tenant C entrance" on the screen, the information of the end side terminal 160C installed at the entrance of the tenant C is selected, as present in the authentication system inside.

The end side terminal 160B, when the destination information (tenant C entrance) is input, recognizes that registered person is starting its movement, and creates the movement start information and the movement prior notice information concerning the registered person, and among them, it associate the terminal identification ID of the end side terminal 160C installed at the destination (tenant C entrance), to the movement start information, and sends it to the building structure side terminal 110A (step S907).

The building structure side terminal 110A recognizes the contents of the movement start information and the terminal identification ID received from the end side terminal 160B (step S908), and refers to the installation positions of the end side terminals 160B, 160C, and calculates the best movement route (step S909).

The best movement route is calculated in consideration of conditions of registered person who is to move this time, and conditions of building.

For example, in general, as the movement route, the shortest route is guided, however in the case when person to move is an aged person, a route that is a bit runabout route, but with little bump, and where an elevator or the like can be used, may be selected.

The building structure side terminal 110A, after calculation of the route, sends information to show that start of navi and the navi method to the end side terminal 160B (step S910).

This navi method is determined in consideration of conditions of registered person who is to move this time, and conditions of building. For example, in the case when person to move is a blind person, audio navigation is performed, and in the case when person to move is a deaf person, visual navigation is performed.

Further, the building structure side terminal 110A sends, to the end side terminals 160W1 to 160W6, information for navi system operation of order of operation of them, display time, operation method and the like (step S911).

The end side terminals 160W1 to 160W6, on the basis of the received information for navi system operation, prepare for execution of navi display (step S912).

The end side terminal 160B displays and notifies the navi method received from the building structure side terminal 110A to registered person individual. The registered person individual who has confirmed the navi method inputs information of the confirmation to the end side terminal 160B (step S913).

The end side terminal 160B recognizes that registered person has started its action by this input action, and sends the above created movement prior notice information to the end side terminal 160C near the destination (step S914). The end side terminal 160C, on receiving this movement prior notice information, extracts individual information and the like of the corresponding registered person from its own database, and is prepared for movement of registered person (step S915).

Thereafter, the end side terminals 160W1 to 160W6 provide navi information to registered person, by audio, texts, images and the like (step S916).

Herein, a concrete example of the navi method by the end side terminals 160W1 to 160W6 is explained.

In the case where the end side terminals 160W1 to 160W6 are installed on the floor of building, and visual information sending devices such as light emitting diodes and electric bulbs are installed in terminals, registered person follows navi terminals that light up sequentially and is guided to the destination (tenant C) (hereinafter, this method is referred to as navi light).

Further, the end side terminals 160W1 to 160W6 can change the speed at which light emitting diodes light up, according to conditions of registered person who is to move this time, from the speed at which a healthy person walks, to the speed at which an aged person walks.

Furthermore, there is a case where plural people use the navi light at the same time, the building structure side terminal 110A may instruct the end side terminals 160W1 to 160W6 to emit light or display in respectively peculiar colors.

Moreover, when the route is complicated, in the case when registered person loses lighting of light emitting diodes, then registered person may make the end side terminal 160 at the vicinity thereof at that moment read individual information, and the route may be set again and displayed between the read terminal and the destination.

Still further, in the present embodiment, individual information can be used only at the existence place of registered person individual along the movement of registered person individual.

First, until registered person is recognized by the end side terminal 160B, individual information is used only in the outside of the unit managed by the building aggregation type terminal 150A.

Next, when navi information is displayed by the end side terminal 160B, and registered person starts its movement, individual information is used only in the corridor of building or the hall, connecting the end side terminal 160B and the end side terminal 160C.

When it is recognized at the end side terminal 160C as the final destination, it is used only in the unit managed by the building aggregation type terminal 150C that manages the tenant C.

Therefore, units to be used move along the action of registered person individual, and accordingly it is possible to prevent other person from spoofing.

38th Embodiment (Information Movement 16: Registered Person Navigation Process 2)

Hereinafter, a part of navigation action of movement route to registered person of the 37th embodiment is explained supplementarily.

Meanwhile, it is supposed that the movement route of registered person individual is already recognized in the authentication system, and the registered person is in the course of its movement.

FIG. 99 is a figure showing an installation example of terminals of authentication system for explaining the navigation action of movement route to this registered person.

In the example in this figure, aggregation side terminal 150 that manages the entire building is installed, under the management thereof, building structure side terminals 110A, 110C that manage end side terminal 160 of specified area of the building are installed. Further, end side terminals 160A, 160B managed by the building structure side terminal 110A, and end side terminals 160C, 160D managed by the building structure side terminal 110C are installed.

Among these, the end side terminals 160A, 160D have a function as a sensor that senses approach of registered person, and reads the individual information (face recognition available). Further, the end side terminals 160B, 160C have the function to navigate registered person to movement route by audio.

Further, FIG. 100 is a figure showing an installation example of networks of terminals installed in this building, in the present embodiment.

Solid line and dot line in this figure show networks connecting terminals, and among them, the solid line shows the route via which information is sent and received at the moment of navigation (navi) action explained hereinafter.

FIG. 101 is a sequence chart showing an action example of a system that, when registered person individual moves in the building, can navigate or confirm the movement place, in a 38th embodiment of the present invention.

The aggregation side terminal 150, on recognizing the movement start information received from the end side terminal 160 to which registered person input individual information last (step S921), calculates the route, from the terminal identification ID of terminal of the sending source and near the destination, included in the movement start information (step S922), and recognizes the installation place of the end side terminal 160 on the route (step S923).

The aggregation side terminal 150 sends the calculated movement prior notice information to the building structure side terminal 110A (step S924). This movement prior notice information includes information of terminal in the unit the moves next after the unit of the building structure side terminal 110A (in the present embodiment, the unit of the end side terminal 160C), on the expected movement route of registered person.

The building structure side terminal 110A extracts individual information from the movement prior notice information, and prepares for collation of individual information (step S925).

The end side terminal 160A reads biometrics information (herein, face information) at the moment when the registered person gets off the elevator (step S926), and sends the biometrics information and the movement information, to the building structure side terminal 110A (step S927).

The building structure side terminal 110A, on receiving these information, performs existence collation of registered person by the information (step S928), and creates the most appropriate word for registered person to move from the space under its own management to the next space (step S929), and sends it to the end side terminal 160B (step S930), and sends audio navigation information by the end side terminal 160B (step S931). In the present embodiment, announcement of contents "after getting off the elevator, just go straight in the right" is made.

Further, the building structure side terminal 110A sends the movement start information to the building structure side terminal 110C that manages the terminal to read biometrics information (herein, face information) next (step S932).

Thereafter, as registered person individual moves, the same processes 8 steps S933 to S939) are carried out also in the building structure side terminal 110C.

At present, there are approximately 400 thousand people who have acquired visual disorder due to diabetes and glaucoma and the like. the number thereof will increase in future in aging society and increase of adult diseases. Those who had acquired visual disorder in young ages, and have expertized trainings at nursing schools and the like, may easily use "raised letters" and "braille blocks" in many cases, but those who had visual disorder after aged see difficulties in learning them.

In the case when end side terminals are installed at the entrance/exit of building, the entrance/exit of elevator, elevator button, room door and the like, if it is recognized in the present authentication system that registered person has visual disorder, it is easy to provide necessary movement support information from the system operation.

For example, in the case of elevator, end side terminal is installed to the button to input the floor to get off, and the button is pressed, the terminal recognizes conditions of the person from the fingerprint or the like of the person who pressed the button, and if support is required, the movement prior notice information may be sent to respective terminals at the floor at which the person gets off.

Since the movement route information recognized or calculated in the present authentication system is digital information, it can be easily changed according to device that receive the information. Therefore, digital navigation information can be converted into audio broadcasting where hearing sense can be used, illumination signals where sense of vision can be used, vibration where sense of touch can be used and the like.

In the present authentication system, various individual information can be registered at registration of the existence of registered person, and accordingly, when there is some physical disorder with registered person, the digital navigation information may be converted into a method to be easily transmitted to registered person under such a condition.

Movement support technology considered at present is for coping with peculiar physical disorder, but in the present authentication system, general purpose measures may be also taken. Further, the conventional movement support technology carries out necessary procedures for the first time, when person arrives its installation place, but in the present authentication system, by use of the movement prior notice information, measures can be taken at once, and smooth movement support can be attained.

39th Embodiment (Information Movement 17: Elevator Action Control)

In the present embodiment, a part of the 37th embodiment is explained supplementarily. Sensor has a function to identify a face authentication system, among biometrics information. The person to move is one with visual disorder, and living at the fifth floor of apartment building.

Further, to each terminal of the authentication system, mining information showing the action history of registered person is stored.

FIG. 102 is a figure showing an installation example of terminals of authentication system in apartment building, in the present embodiment.

In the example in this figure, in domicile in the apartment building, end side terminals 160A, 160B are installed at the outside and inside of the home door knob, and the building structure side terminal 110A that manages these terminals are installed in domicile.

Further, together with the end side terminal 160C, end side terminal 160D that controls the elevator action is installed so as to be associated with the floor designation and action buttons of the elevator. Furthermore, building structure side terminal 110C that manages these end side terminals 160C, 160D is installed in the elevator.

FIG. 103 is a figure showing a connection example of networks of terminals installed in this apartment building, in the present embodiment.

Solid line and dot line in this figure show networks connecting terminals, and among them, the solid line shows the route via which information is sent and received at the moment of elevator action control explained hereinafter.

FIG. 104 is a sequence chart showing an action example of a system where, when registered person individual moves in the building, peripheral devices perform preparatory action according to the movement, in a 39th embodiment of the present invention.

First, registered person individual grips the door knob installed at the room inside, among door knobs of domicile door, and opens the door knob to go out. At this moment, the end side terminal 160B attached to the door knob reads biometrics information (step S941), and sends the biometrics information and the movement information, to the building structure side terminal 110A (step S942).

The building structure side terminal 110A compares and collates the information stored in its own and the received information, and performs registered person existence authentication (step S943), and recognizes that the registered person individual has started its movement (step S944).

Thereafter, the building structure side terminal 110A sends the movement start information to the aggregation side terminal 150 (step S945).

The aggregations side terminal 150, after receiving the movement start information, sends the movement start information to the aggregation side terminal 150 (step S946).

In the present embodiment, when registered person gets out of its domicile, it is recognized that registered person moves from the fifth floor down to the first floor by use of the elevator.

Further, the aggregation side terminal 150 recognizes that the registered person individual has started its movement (transfer of units that the registered person uses is started) (step S947).

Next, the aggregation side terminal 150 sends, to the building structure side terminal 110C that manages the elevator, the movement prior notice information by mining information and the like, and information showing the sending source (end side terminal 160B) of the movement start information (step S948).

The building structure side terminal 110C that manages the elevator, on receiving those information from the aggregation side terminal 150, recognizes that the registered person individual has started its movement (transfer of units that the registered person uses is started) (step S949).

In the present embodiment, the building structure side terminal 110C recognizes that registered person moves from the fifth floor down to the first floor.

Next, the building structure side terminal 110C, on the basis of the received movement prior notice information and the movement start, information sending source information, and the spatial information of the area where its own is installed, calculates and estimates the route that registered person will take in future and the destination (step S950). Meanwhile, at this moment, by existing average operation temporal information of the domicile and the elevator door, and the operation time calculated from the movement distance and the average walking speed, the time to arrive the front of the elevator door may be forecasted.

At the time when registered person individual is expected to arrive the elevator door at the fifth floor, the building structure side terminal 110C instructs the end side terminal 160D, so that the elevator should arrive the fifth floor (step S951).

The end side terminal 160D, according to the instruction from the building structure side terminal 110C, controls the action of the elevator so as to arrive the fifth floor at the forecasted arrival time (step S952).

As explained above, when the action forecast of registered person is sent to the end side terminal 160 that controls specified apparatuses such as elevator and the like, the end side terminal 160 operates the elevator before arrival of registered person, and accordingly, registered person can receive services along its own action pattern.

For example, when the authentication system recognizes that registered person is going home, air conditioners at home may be started into operation automatically, and lights inside and outside of home may be turned on. Furthermore, when the authentication system recognizes that registered person is going to its working place, devices at the working place such as its PC and copy machine and the like may be started into operation.

Thus, in the present embodiment, the system to support the transfer of units that registered person uses is operated, and accordingly it is possible to make devices perform the action preparation smoothly, over the action range of registered person, and automatically provide functions according to individuals.

In the conventional ubiquitous technologies, individual independent technologies exist piecemeal, but in the present authentication system, these technologies are made into one integrated structure subordinate to actions of people, and it is possible to provide comprehensive services to registered people.

40th Embodiment (Information Movement 18: Vulnerability Supplement at Initial Visit)

In the present authentication system, when individual information is used, the existence authentication by collation of individual information is indispensable. Therefore, registered person individual registers individual information to become the base of the existence authentication, for example, biometrics information, to related terminals and servers and the like beforehand, and compares and collates it with the information read at the use of the system, and thereby performs the existence authentication.

However, in a place where registered person visits for the first time, in principle, there is not basic individual information to be compared and collated.

In such a case, like the present embodiment as explained below, by use of electronic recording media, the terminal where there is basic individual information, and the terminal that registered person uses at present are connected by network, and thereby the transfer of units that registered person uses and the acquisition of movement related information are supplemented.

FIG. 105 is a sequence chart showing an action example of a system to secure the information continuity, at a place where registered person visits for the first time, in a 40th embodiment of the present invention.

First, registered person registers its own individual information and the like to the authentication system server 10 by use of the end side terminal 160 and the like. Meanwhile, this registration action is same as that in the first embodiment, therefore details thereof are omitted herein.

The authentication system server 10, on receiving individual information and the like of registered person, displays the received contents, and the management organization of this server examines the individual information and the like, and validates the existence of the person. When the existence of registered person is recognized, this authentication system server 10 determines an official individual identification ID to the registered person (step S961).

The authentication system server 10 sends this determined individual identification ID to the aggregation side terminal 150A (step S962).

Further, the authentication system server 10 sends, to the aggregation side terminal 150A, instruction information to issue a navigation electronic recording medium storing individual information and individual identification ID and the like of registered person (step S963).

This navigation electronic recording medium means an electronic recording medium such as an IC chip and an IC tag and the like, and for example, this navigation electronic recording medium is installed in an information portable device such as IC card, ubiquitous communicator and cell phone and the like.

The aggregation side terminal 150A writes the received individual identification ID and the like into the navigation electronic recording medium, and issues a navigation electronic recording medium exclusive for registered person (step S964).

The aggregation side terminal 150A, when completing the procedures as instructed from the authentication system server 10, sends the completion notice thereof to the authentication system server 10 (step S965).

FIG. 106 is a figure showing an example of contents of this completion notice.

As shown in the figure, this completion notice includes information such as the name of information portable device, the kind of electronic recording medium, date and time of storage, name of operator of procedures, procedure place and the like. This information is stored into individual folder of registered person individual in the authentication system server 10 (step S966).

To the navigation electronic recording medium, only the individual identification ID of registered person, and the terminal identification ID of the end side terminal 150 that manages main unit or sub unit of the registered person individual concerned are written. These two IDs are referred to collectively as recording medium storage ID hereinafter.

In order to prevent the leakage of individual information, even the basic information of individual name and address and the like is not stored into the navigation electronic recording medium.

Further, in order to prevent the abuse of individual information, the terminal that has read the navigation electronic recording medium may display or notify only the recording medium storage ID, and may not display or notify other contents.

Even when the navigation electronic recording medium is stolen or lost, since the minimum of individual information of registered person individual is stored in the simple body of navigation electronic recording medium, a third party cannot use the authentication system at all, and the risk of information leakage is limited to minimum, and the security effect is enhanced.

When registered person uses the end side terminal 160 to which its own individual information is not yet registered, at a place of first visit, and requires individual existence validation, and use of individual information and the like, registered person uses the navigation electronic recording medium stored in the information portable device.

First, registered person individual makes the end side terminal 160 read the recording medium storage ID in the navigation electronic recording medium (step S967).

The end side terminal 160 confirms that the aggregation side terminal 150A is the information reference destination of registered person from the read recording medium storage ID (step S968).

Next, the end side terminal 160 reads biometrics information of registered person individual (step S969), and sends the read biometrics information and the movement information, and information to request the existence authentication, to the aggregation side terminal 150A (step S970).

The aggregation side terminal 150A, on receiving the biometrics information, collates the received information with the individual information in its own and validates the existence, and searches the movement related information of the individual concerned in the system and judges the continuity (steps S971, S972).

As a result, when the aggregation side terminal 150A judges that the existence of registered person and the continuity of movement information are satisfied, it sends the permission information of system use, to the end side terminal 160 (step S973).

The end side terminal 160 receives the permission information sent from the aggregation side terminal 150A (step S974).

On the other hand, the aggregation side terminal 150A sends the terminal identification ID of the terminal where the registered person individual exists at present (herein, the end side terminal 160), to the terminal having the movement related information of the individual concerned judged in the search (herein, the building structure side terminal 110) (step S975).

The building structure side terminal 110, on receiving the terminal identification ID of the end side terminal 160, recognizes that the registered person has moved to the end side terminal 160 (the terminal that the registered person has transferred to the end side terminal 160) (step S976), and sends the movement start information to the end side terminal 160 (step S977).

The end side terminal 160, on receiving the permission information from the aggregation type terminal 150A, and the movement start information from the building structure side terminal 110 (step S978), judges that the registered person has been confirmed, and performs the process requested to the terminal such as unlocking the key and the like (step S979).

As explained above, the end side terminal 160 that has read the recording medium storage ID stored in the navigation electronic recording medium performs reference to the aggregation side terminal 150 that manages the main unit of the individual concerned as the central information accumulation place of the individual concerned, via network.

By this reference function, it is possible to compare and refer to individual information provided from a person before face, and a structure to easily validate identical person existence is provided.

Meanwhile, it is needless to mention that the same effect can be attained even when registered person does not relay upon the navigation electronic recording medium, but tells the information of the individual identification ID and the terminal identification ID of the aggregation side terminal 150 orally or in document. However, in the oral case, there are risks of mistake in memorizing the individual identification ID and the terminal identification ID, or recognition of information by a third party at the moment of input. In the case of document, since information is described in "thing" called "paper", in handling document, there are risks of easy recognition of information by a third party, and circulation of information, therefore, it is preferable to use the navigation electronic recording medium as much as possible.

Further, when the movement related information of the present authentication system is used, the unit that registered person uses transfers to the unit of the current position at the time point of the registered person individual, and accordingly, it is possible to use all of individual information that registered person owns at necessity.

For example, at a shop where registered person visits for shopping and dining for the first time, registered person can perform individual existence authentication and use electronic money for payment, and at first medical examination at hospital, registered person can perform individual existence authentication, present existing electronic medical record information to the hospital of the first medical examination, and pay the medical examination charges by bank draft from bank account.

By this system, the existence of individual, action to use individual information in social activities, electronic money, electronic bank account, electronic credit card, electronic identification certificate and the like are operated in an integrated environment, and accordingly, it is possible to provide smooth information management and security.

41st Embodiment (Information Movement 19: Transaction by Anonymity Using Navigation Electronic Recording Medium)

In the embodiment shown below, it is supposed that registered person wants to withhold individual information such as its own name and the like, and present its individual identification ID, and use services via the end side terminal 160

(unlocking of the key, presentation of information, use of electronic money, insurance agreement and the like).

Individual who can use the present authentication system performs registration to the system beforehand, and at the moment of the registration, the existence of individual is validated. In the present embodiment, further, the above navigation electronic recording medium is employed as supplementary means.

By use of this navigation electronic recording medium in the system, it is possible to receive the provision of various necessary services, while keeping anonymousness.

It is supposed the individual authentication using the navigation electronic recording medium, and the transfer of units that registered person uses are completed before the action flow explained hereinafter. Further, it is supposed that the disclosure range of individual information is determined by registered person individual, and the disclosure range is added to respective individual information in the authentication system.

FIG. 107 is a sequence chart showing an action example of a system when the system is used while registered person individual is anonymous, in a 41st embodiment of the present invention.

First, registered person individual inputs to use the authentication system on an anonymous basis to the end side terminal 160 (step S1001).

The end side terminal 160 examines use purposes set in its own (unlocking the key, presentation of information, use of electronic money, insurance agreement and the like), and determines whether to permit the use under anonymity or not.

When the use under anonymity is permitted, registered person registers its own individual identification ID, information of use contents and date and time and the like to the end side terminal 160 (step S1002).

Thereafter, in the case where there is no problem with the use by the registered person (step S1003 No), the end side terminal 160 does not recognize individual information of the real name and address and the like of the registered person individual. If the period for after-sales service and motion for complaint and the like passes, the use is completed.

Meanwhile, in the case of any complaint or request from registered person individual side to the end side terminal 160 side, by presenting the individual identification ID registered at the step S1001 to the end side terminal 160 side, identity of the person who has used the authentication system may be proved.

On the other hand, in the case where registered person commits unauthorized acts in the use and causes a problem (step S1003 Yes), the end side terminal 160 sends a search request to specify registered person individual, to the organization side terminal 120 installed in police and the like (step S1004).

The organization side terminal 120, on receiving the search request, creates search warrant information to show the contents of search warrant according to the request contents, after input to show approval of the police side is made (step S1005).

The organization side terminal 120 sends, to the authentication system server 10, this search warrant information, and information to request the disclosure of individual information of the corresponding registered person to the management organization side of this server (step S1006).

The management organization side of this server, on receiving these information by the authentication system server 10, confirms that it is s disclosure request based on such a lawful ground as search warrant.

After the confirmation, the authentication system server 10 extracts necessary portions for the search (name, gender, date of birth, address, working place and the like) from registered information of registered person individual (step S1007), and sends them to the organization side terminal 120 in the police (step S1008).

The organization side terminal 120, on receiving the registered information, on the basis of attributes of the information contents, and the contents of search warrant, judges whether respective items are appropriate for information publication or not (step S1009).

At this moment, the police side displays the registered information on the screen of the organization side terminal 120, confirms the display contents and judges whether information publication is right or wrong, and may input right and wrong per item to the organization side terminal 120.

The organization side terminal 120 sends information of disclosure range of information determined in the above manner to the end side terminal 160 (step S1010).

The end side terminal 160, on receiving individual information of registered person available for publication, displays the received information (step S1011).

Thereafter, the police and end side terminal 160 side carry out search for the registered person who has made illegal procedures or transaction and procedures for law suit.

As explained above, in the present authentication system, registered person is existence validated at the moment of registration, and the continuity of existence is secured by the use of movement related information. Accordingly, if individual identification ID allotted to registered person individual is used, and a transaction is made after existence authentication, actions such as transaction by real name or presentation of individual information are not necessary.

If there occurs a problem, with regard to individual information of object of individual identification ID, necessary information may be extracted from registered information in the authentication system, and further, even the place of object of individual identification ID at present may be grasped.

In the method where only a real name is converted to a temporary name, where the existence and continuity of individual are not secured, and accordingly there is a risk of spoofing. But, in the present authentication system, transaction is made after the identity verification of registered person is carried out, and action records are left, and accordingly, there is no room for spoofing, and even under anonymousness, security of transaction is secured.

Herein, embodiment via the police has been explained, however, "public servant real name search committee" may be installed as an arbitration organ, and third party organizations such as "lawyer association" and "customer protection center" may be made interposition organizations.

And at occurrence of a problem, in the case where parties have determined that disclosure request can be made directly to management organization of the authentication system server 10, the management organization may disclose information in deference of the agreement will.

Thus, by using the present authentication system, at occurrence of a problem, some search and measure can be made on the basis of individual identification ID, and privacy is protected with only individual identification ID known. As a result, it is possible to provide a safe and secure system with established balance of security and privacy.

This authentication system may be applied to the use of public traffic organizations, for example, aircrews of airplane and airline company, or aircrews and aircrews. Further, it may be applied to cases of living in common space for a certain time like patients and hospital, or patients and patients, guests and hotel, or guests and guests, audience of lecture and sponsors, or audience and audience, and commercial transactions where there are many who want their real names withheld, for example, CD or video rental applicants and rental company, or private mail box applicants and providers, or auction related people.

42nd Embodiment (Information Movement 20: Different Configuration Registration of Biometrics)

Hereinafter, various actions by authentication system are explained where registered person individual visits the management organization of the authentication system server 10 and performs its own registration procedures. Meanwhile, respective processes, unless otherwise specified, are same as those in the first embodiment.

In the management organization that registered person visits, end side terminals 160A, 160B, 160C are installed, and each of them has a function to read fingerprint information as biometrics information.

Further, the end side terminal 160A is manufactured by company A, the end side terminal 160B is manufactured by company B, and the end side terminal 160C is manufactured by company C, and they digitalize and collate fingerprint images by reading methods originally developed by the respective manufactures.

FIG. 108 is a sequence chart showing an action example of authentication system when registered person individual registers biometrics information of specified physical portions in plurality at the same time with different reading methods, in a 42nd embodiment of the present invention.

First, registered person individual uses the biometrics information reading function installed in the end side terminal 160A, and makes it read its own biometrics information (step S1021).

The end side terminal 160A sends the read information via the communication line network 200 to sub servers that are upper level terminals of the end side terminal 160A concerned (step S1022).

Sub servers that have received biometrics information from the end side terminal 160A searches database in its own, whether there exists information of registered person individual or not (step S1023), and after they confirm that there is not information of registered person individual, they prepare individual folder to store individual information of registered person individual (step S1024), and stores it (step S1025).

Further, sub servers add "temporary individual identification ID" to registered person individual (step S1026), and send this temporary individual identification ID, and information to show registration completion to the end side terminal 160A (step S1027).

The end side terminal 160A, on receiving the registration completion information, deletes information read at the step S1021 and existing in its own (step S1028).

Then, the end side terminal 160B reads biometrics information, and inputs added individual identification ID (step S1029), and sends this read and input information to sub servers (step S1030).

Thereafter, the same processes are carried out in information registration (steps S1031 to S1033), and the same processes are carried out in the end side terminal 160C too (steps S1034 to S1038).

Thus, biometrics information of the same contents read by respectively different methods is associated to one (temporary) individual identification ID.

As a result, in the present embodiment, with regard to the fingerprint of "index finger of right hand", biometrics information has registered in three kinds of authentication methods.

In the current operation conditions, from the difference of reading methods and data conversions, the difference of data analysis methods and the like (hereinafter, referred to as reading methods), there is no compatibility among respective biometrics reading information. Further, biometrics information readers of different reading methods have been already supplied to world markets by plural manufacturers, and it is difficult to unify them into a single technical method, and accordingly there is a possibility that same biometrics information may be recognized as different one.

Even in such a case, by use of the authentication system in the present embodiment, in use that follows, it is possible to compare and collate with plural information in databases at one time of operation, and convenience of registered person individual is improved.

Meanwhile, registered person individual may select reading method by its own judgment, and register information in all the reading methods, or in part thereof.

FIG. 109 is a figure showing an example of a list showing in what reading methods, biometrics information is registered.

In the example of this figure, it is regulated that the contents of respective biometrics information are shown by codes, like the right thumb fingerprint as "101", the right index finger fingerprint as "102", and so on.

Further, according to reading method (end side terminal 160 that reads), codes "Aaa", "Ebb", and so on are allotted.

For example, when the right index finger fingerprint is read by the end side terminal 160A, the code of the biometrics information is "Aaa102".

To the terminal identification ID of installed terminal, this objective code is included, and the terminal identification ID of sending terminal of read data, and the objective code given to registered information in database are compared and collated, and thereby it is possible to perform search and identification easily and at once.

Furthermore, even when a hacker gets in the authentication system, by changing objective codes in bulk periodically, or by combining objective codes and random numbers, it is possible to make it difficult to grasp the kinds of basic data.

43rd Embodiment (Information Movement 21: Alarm at Existence Mismatch)

In the authentication system, as possible causes of mismatch in the collation of individual information of registered person, there are besides "spoofing by a third party", malfunction of terminal that reads individual information, and others.

In the present embodiment, the authentication system, at every occurrence of mismatch in collation of individual information, creates a mismatch information registration slip where the cause thereof and the like are described, and adds up slips.

FIG. 110 is a figure showing an example of this mismatch information registration slip.

As shown in the figure, this registration slip includes information such as the identification ID of the terminal where mismatch has occurred, occurrence time, occurrence cause, individual identification ID of user, individual identification ID of identifier and the like. This information is finally aggregated and stored in the authentication system server 10.

FIG. 111 is a sequence chart showing an action example to collect causes for mismatch, when the present authentication system is used, and there is mismatch in the collation of individual information and the validation of existence, in a 43rd embodiment of the present invention.

First, registered person individual uses the end side terminal 160, and makes it read its own biometrics information (step S1041), and the end side terminal 160 sends the read biometrics information and the movement information to sub servers (step S1042).

The sub servers, on receiving the biometrics information and the movement information, collate the received biometrics information, and the biometrics information of registered person stored in their own (step S1043).

As the result of collation, when the sub servers judge that the biometrics information read by the end side terminal 160 mismatches the registered information of the registered person concerned, they create a mismatch information registration slip showing the contents thereof (step S1044).

This mismatch information registration slip is a file created in the case when the biometrics information read by the end side terminal 160 mismatches the registered information of the registered person concerned already registered in the authentication system, and includes information such as the terminal identification ID of the end side terminal 160, reading time, validation time, individual identification ID of user, and the like.

Thereafter, the sub servers send to the end side terminal 160, information to stop the use of the authentication system since the collation result is mismatch, and information to show request for validation again and investigation on cause (step S1045).

Meanwhile, at this moment, it is preferable that the sub servers send also the mismatch information registration slip created this time for cause input at the end side terminal 160 and use as materials of investigation item confirmation.

The end side terminal 160, on receiving the mismatch information from the sub servers, performs audio output and/or screen display of a message to request registered person individual to perform reading procedures of biometrics information again for validation once again.

The biometrics information read herein repeats the processes of the above steps S1041 to S1045.

The end side terminal 160 or the operator of the end side terminal 160 performs hearing from the registered person, and investigation for cause such as terminal failure inspection (step S1046).

As a result, the end side terminal 160 sends the information to show the judged mismatch cause to the sub servers (step S1047), and the sub servers write the information to show the mismatch cause, to the mismatch information registration slip (step S1048).

At this moment, to the mismatch information registration slip, information such as the occurrence cause, individual identification ID of identifier and the like are written.

Thereafter, the sub servers sends stored mismatch information registration slips at a certain period or at a certain number of slips or at instruction from upper level terminal, to the aggregation side terminal 150 that manages its own (step S1049).

The aggregation side terminal 150 puts together the mismatch information registration slips collected from lower level terminals that it manages (step S1050), and sends them to the authentication system server 10 (step S1051).

The authentication system server 10 tallies up the mismatch information registration slips collected from respective aggregation side terminals 150, and analyzes causes and problems of information mismatch (step S1052), and uses them for future technical development and system operation.

For example, in the case where the main cause of mismatch occurrence is the problem of reading, technical adjustment is made with device development manufacturer, and the development of new product and improvement of device are facilitated, and thereby it is possible to arrange a further highly convenient terminals for registered person.

Further, in the case when individual information of registered person individual leaks out, and mismatch occurs from problem viewpoint of continuity, the authentication system may send information to call attention to information leakage, to the terminal of registered person who is the true owner of the individual information concerned.

Then, with regard to individual with high leakage frequency of individual information, the movement related information and the authentication processing are managed intensively, and thereby it is possible to prevent system use by spoofing, and to increase security.

Further, with regard to a criminal who steals individual information, at the moment of using the stolen information, it is become clear the person is not the registered identical person, therefore it becomes difficult to steal information. Accordingly, an effect to prevent a crime occurs.

44th Embodiment (Information Movement 22: Use Limitation of Unauthorized User 1)

Hereinafter, the use limitation processing of authentication system, to a user who unauthorizedly uses the authentication system by spoofing and the like, is explained.

FIG. 112 is a figure showing a use limited person registration slip used for managing information of a user to whom the use of the authentication system is limited or stopped. This registration skip includes information such as the reason for recognition of use limitation, recognition time, limitation contents, limitation release schedule time and the like. This information is aggregated and stored in the authentication system server 10.

FIG. 113 is a figure showing use limitation standard table, in the case to limit or stop the use of the present authentication system. In this use limitation standard table, standards for limitation and stop action are clearly regulated, and if unauthorized action falls upon this standard table, the contents concerned are limited or stopped.

For example, unauthorized actions regulated in this standard table are preset according to punishment criminal law fixed principle. As for the contents, events that are mainly internationally recognized as crimes are objectives, and operation may be applied after cases are judged as guilty in criminal trials. The applicable period start after release on bail in the suspended term, and after release from prison in the case of spending time in prison. However, the case of such an act as is judged to be extremely harmful or damaging to the operation of IT environment and ubiquitous environment may be applied, whether there is judgment of criminal trial or not.

Further, when registered person commits unauthorized use in the present authentication system, the authentication system server 10 may limit or stop the use of the system according to the action.

FIG. 114 is a sequence chart showing an action example of the system when it is found that registered person individual has committed unauthorized use of the present authentication system, and the use of the system is limited, in a 44th embodiment of the present invention.

First, the authentication system server 10 refers to the above use limitation standard table, and examines whether the action of the registered person who has committed unauthorized use falls under category of criminal punishment or not.

As a result, when the authentication system server 10 recognizes that some use limit or stop is necessary (step S1061), it notifies that effect to registered person individual (step S1062), and creates the above use limited person registration slip, and stores it in a specified place in its own.

Also, the authentication system server 10 adds information to show the person is a use limited person, to the individual identification ID of the corresponding registered person individual in database of its own (step S1063).

Thereafter, the authentication system server 10, by use of the above mining information, extracts aggregation side terminal 150 and terminals of sub servers that are closely related with the use limited registered person individual.

The authentication system server 10 sends the individual identification ID of the use limited registered person individual, and information to show that its use if limited, to the extracted terminals (step S1064).

The aggregation side terminal 150 and terminals of sub servers that have received these information from the authentication system server 10, on the basis of the received individual identification ID, extract individual folder of the corresponding registered person individual in their own (steps S1065, S1066), and register information to show that the use is limited (steps S1067, S1068).

By this processing, in the same manner as in the authentication system server 10, in the aggregation side terminal 150 and terminals of sub servers, information to show that the person is a use limited person is added to the individual identification ID of the registered person who has committed unauthorized use.

After this registration, when the registered person who has committed unauthorized use wants to use the present authentication system, the end side terminal 160 is made to read biometrics information (step S1069), and the end side terminal 160 sends the biometrics information and the movement information, to the sub servers (step S1070), and they collate the read information and validate the existence (step S1071).

The sub servers, at the collation of the read information, recognize that information to show the person is the use limited person is added to the individual identification ID, and specifies that the owner of the information read by the end side terminal 160 is the use limited person (step S1072).

The sub servers, after specifying that the registered person individual is the use limited person, in order to confirm the use limited contents, send the individual identification ID, the terminal identification ID of the end side terminal 160, and the requested use contents and the like to the authentication system server 10, and request it to confirm them (step S1073).

The authentication system server 10, on receiving the request information from the sub servers, extracts the use limited person registration slip stored in its own, and creates answer according authentication conditions (step S1074), and sends it to the sub servers and the end side terminal 160 (step S1075).

As a result, the end side terminal 160 recognizes the limited contents and range of system use, and supplies the use contents requested by the registered person within the limited range.

As explained above, in the present authentication system, when it is found that registered person has committed an unauthorized action, system use forcible stop and partial limitation of use functions are made to the registered person, and accordingly it is possible to realize high level security over the system, and respect the rights of sound users of the present authentication system, and operate the system smoothly.

The vulnerability of internet lies in that there are people who spoof as a third party, or spoof as a virtual person and abuse the system, since the true existence of users is not validated. Further, it lies also in that even after unauthorized use is found, it is impossible to exclude the unauthorized user from internet, and the unauthorized user can easily use internet again. Accordingly, criminal cases happen frequently and economic damages are made, and enormous expenses of companies and individuals are spent to supplement the vulnerability of virus countermeasures and antivirus software, and enormous social losses have been made all over the world.

In the present authentication system, individual existence validation is carried out at registration stage, and use by spoofing is prevented at its gate stage. On the other hand, to a person who has committed a criminal unauthorized use, certain warning information is added, and the use is limited or stopped at its exit stage, and thereby security is assured.

45th Embodiment (Information Movement 23: Use Limitation of Unauthorized User 2)

Hereinafter, the processing by authentication system, when to perform an investigation on a user who unauthorizedly uses the authentication system, is explained.

FIG. 115 is a sequence chart showing an action example of the system in the case when warning conditions are set to registered person individual in the present authentication system, a contact is made to related organization as soon as registered person individual is confirmed, in a 45th embodiment of the present invention.

In the present embodiment, explanations are made with a crime suspect as an example.

First, the police side obtains a search warrant, and by use of the organization side terminal 120 installed in the police side, inputs information concerning the contents of the search warrant (step S1081), and sends search cooperation information including a request for search cooperation to the management organization side of the authentication system server 10, and biometrics information to recognize the suspect individual to the authentication system server 10 (step S1082).

The authentication system server 10, on receiving the search cooperation information, searches individual folder stored in its own, and specifies the individual identification ID of the suspect individual, and creates the above use limited person registration slip, and registers information to show "to perform search cooperation" to the remark in the registration slip, and stores it in a specified place in its own. And, it adds information to show that the person is a use limited person as "objective person of search cooperation", to the individual identification ID of registered person individual (step S1083).

Meanwhile, at this moment, the authentication system server 10 does not notify to the registered person individual that the person has been registered to the use limited person registration slip.

Thereafter, the authentication system server 10 sends use limited person information to recognize that the person is the objective person of the search cooperation to the sub servers (step S1084).

Terminals such as sub servers and the like that have received these information from the authentication system server 10, on the basis of received individual identification ID, extract individual folder of the registered person individual in their own, and register information to show that use is limited (herein, search cooperation).

By this processing, in the same manner as in the authentication system server 10, in the sub servers, warning information to show that the person is a search cooperation objective person is added to the individual identification ID of the registered person individual.

After this registration, when the registered person individual wants to use the present authentication system, the end side terminal 160 is made to read biometrics information (step S1085), and the end side terminal 160 sends the biometrics information and the movement information, to the sub servers (step S1086), and they collate the read information and validate the existence (step S1087).

The sub servers, at the collation of the read information, recognize that information to show the person is the search cooperation objective person is added to the individual identification ID, and specifies that the owner of the information read by the end side terminal 160 is the search cooperation objective person (step S1088).

The sub servers, after specifying that the registered person individual is the search cooperation objective person, in order to confirm the search cooperation method, send the individual identification ID, the terminal identification ID of the end side terminal 160, and the requested use contents and the like to the authentication system server 10, and request it to confirm them (step S1089).

The authentication system server 10, on receiving the request information from the sub servers, extracts the use limited person registration slip stored in its own (step S1090), and recognizes that the registered person is the search cooperation objective person of the object to which the management organization side of this server performs the search cooperation (step S1091).

And, by this recognition, the authentication system server 10, sends information that there exists the suspect at the end side terminal 160, the read temporal information, the terminal installation place information and the like, on the basis of the information received from the sub servers, to the organization side terminal 120 at the police side (step S1092).

Further, the authentication system server 10 creates information to show that the management organization side of this server is waiting for the answer from the police side, and sends it to the sub servers and the end side terminal 160 (step S1093).

The organization side terminal 120 at the police side, on receiving the message from the authentication system server 10, performs necessary condition judgment (step S1094), and creates answer information and sends it to the authentication system server 10, the sub servers and the end side terminal 160 (step S1095).

As a result, the end side terminal 160 recognizes the instruction contents from the organization side terminal 120 at the police side and the use available range of the authentication system to the registered person, and performs necessary action to the registered person individual (step S1096).

In applied embodiment of the present authentication system, since the existence place of individual is specified, it is possible to provide information to needs to grasp various existences.

For example, the present embodiment may be applied widely to, besides the case of the crime suspect explained above, the case to grasp the current positions of children going from school to home and employees on sales, the case of search for kidnapped child or missing person, the case to specify a lost child or an aged wanderer, and the present embodiment is just only an embodiment example.

46th Embodiment (Information Movement 24: Information Storage Period)

In the present system, registered individual information, after a certain time, is automatically deleted, to protect privacy.

For example, in the entire authentication system, after lapse of a certain time from the time point when registered person last inputs or stores individual information such as biometrics information and the like and various information of the movement information and the like to the end side terminal 160, terminals and servers delete all information concerning the registered person stored in their own.

Further, terminals and servers may, after lapse of a certain time from the time point when information concerning registered person is input or stored to their own, delete those input or stored information individually.

Meanwhile, in the example explained above, information is deleted after lapse of a certain time, and this "certain time" is determined on the basis of, for example, laws and conditions of the region where this authentication system is installed, as shown below.

1. Time to be obtained adding the longest criminal prescription period regulated by the law of criminal procedure specified in areas (country, prefecture, city and the like) where information is input or stored, or the area to which the registered person belongs, to the time when the information is input or stored 2. Time to be obtained adding the effective period of public certificates such as a passport, driver's certificate, basic resident register card, tax payer number card or social insurance ID card and the like, specified in areas (country, prefecture, city and the like) where information is input or stored, or the area to which the registered person belongs, to the time when the information is input or stored 3. Certain time from death of registered person 4. Deletion period set by registered person, not conflict with the time of the above 1 through 3

5. Other

In particular, the movement related information is linked with actions of people, it is preferable that it is deleted after lapse of a certain time from information creation.

Further, the movement related information is closely related with actions, it may be deleted not at the certain time, but in a shot cycle time such as one day or six hours. Thereby, the movement related information is automatically deleted, registered person starts it action from the identity existence confirmation any new action start point, and existence validation precision can be increased, and at the same time, it is possible to prevent abuse of the movement related information by spoofing and unauthorized acquisition and the like arising from information unprocessed for a long time.

Naturally, through proposal from registered identical person, it is possible to delete at necessity these individual information, movement information and movement related information of registered person itself.

FIG. 116 is a sequence chart showing an action example of the system in the case when the authentication system server 10 validates the storage period of individual information of registered person individual, and deletes information expiring of the storage period, in a 46th embodiment of the present invention.

Hereinafter, with reference to this figure, the deletion method of individual information of registered person by the authentication system according to the present embodiment is explained, and it is supposed that the registered person does not set the deletion conditions of registered information.

First, the authentication system server 10, according to the above conditions, extracts information to be deleted, from stored individual folder (step S1101).

After the extraction, the authentication system server 10 refers to each terminal, whether there is any missing registration of information related to registered person, such as no registration in its own server but registration in other terminal, and at necessity, sends information to perform backup process of information (step S1102).

The aggregation side terminal 150 that has received the instruction from the authentication system server 10 validates whether there is the missing registration, in terminals in the unit that its own manages (step S1103), and reports the extraction results and contents (step S1104).

In the steps S1103, S1104, in concrete, the process shown below is carried out.

The aggregation side terminal 150 receives and stores all information concerning the registered person of the objective of the deletion process this time, from the authentication system server 10. Next, the aggregation side terminal 150 searches database in its own and extracts information concerning the registered person, and requests terminals under management of its own to supply information concerning the registered person. The aggregation side terminal 150, on receiving information concerning the registered person from terminals under management of its own, collates the combination of this received information and the information extracted from database of its own, and the information received from the authentication system server 10. As the result of this collation, if there is information that is not stored in the authentication system server 10, among information stored in its own and terminals under management, the aggregation side terminal 150 extracts the information, and sends it as the report contents to the authentication system server 10.

The authentication system server 10, on receiving this report contents, stores the information concerning registered person included in the received information into its own (step S1105). Then, the authentication system server 10 performs extraction process of information to be deleted once again, and judges whether to perform the deletion process or not (step S1106).

Once information is deleted, it is difficult to restore it, therefore, the deletion process is carried out doubly, and contents are examined sufficiently.

The authentication system server 10 performs the deletion process to the information that becomes deletion objective information by the final judgment (step S1107).

Thereafter, the authentication system server 10 sends the information that it has deleted, and the extraction conditions of deletion objective information to the aggregation side terminal 150 and the external organization authentication system server 300 (step S1108), and instructs them to perform deletion process.

The aggregation side terminal 150 and the external organization authentication system server 300 that have received this instruction extract individual information of the objective concerned (steps S1109, S1110), and perform the deletion process (steps S1111, S1112). After completion of the deletion process, the aggregation side terminal 150 and the external organization authentication system server 300 send a completion report to the authentication system server 10 (steps S1113, S1114).

47th Embodiment (Information Movement 25: Considerations on Navigation Electronic Recording Media, and Information Portable Devices)

Hereinafter, in the present embodiment, by use of the relation between a cell phone and a base station, the current position of registered person is estimated, and to the device at the estimated position, preparation for various processes is prompted.

FIG. 117 is a sequence chart showing an action example of the system in the case when registered person individual uses a navigation electronic recording medium or an information portable device, and the transfer of units that registered person uses is subserved, in a 47th embodiment of the present invention. Herein, as an example, the above information portable device is a cell phone, and the above navigation electronic recording medium is loaded in the cell phone.

Hereinafter, in the present embodiment, explanations are made with the end side terminal 160 as a navigation electronic recording medium (cell phone), and with the area management side terminal 130 as a cell phone base station.

It is supposed that registered person has consented beforehand that the cell phone automatically communicates via a communication line network with an external device (herein, the base station of cell phone).

This cell phone, in its "waiting" condition, emits electric waves and communicates with the base station of cell phone. At this moment, communications with the base station are stored as records, and by the electric wave receiving antenna at the base station, the position can be judged to some extent.

For example, the range that the base station covers is set within a 3-kilometer radius from the base station.

When registered person is at home, the cell phone base station 130A that manages the range including this home communicates with the cell phone of registered person (step S1121).

When communications are made, the cell phone base station 130A creates sub movement stop information (step S1122), and sends it to the aggregation side terminal 150 that manages the main unit (step S1123).

This sub movement stop information is information on estimation that registered person individual exists in the unit that terminals structure, and in the case when there is a request for the use of individual information of registered person individual in the outside of the unit concerned, alarm information is sent to terminals and servers of the present authentication system.

The aggregation side terminal 150, on receiving the sub movement stop information, stores it into search DB 156 or basic information DB 154 and the like in its own. This is because when the movement related information of registered person, the authentication request information or the permission information are received, it is possible to easily perform comparison and validation of these received information and the sub movement stop information.

By this storage process, the aggregation side terminal 150 estimates and recognizes that registered person individual exists around the installation place of the cell phone base station 130A (step S1124).

Therefore, the aggregation side terminal 150 creates use possibility information (step S1125), and sends this created use possibility information to respective terminals (respective terminals under management) around the installation place of the cell phone base station 130A (step S1126), and prompts them to prepare for the authentication process of registered person individual and the like.

Thereafter, when registered person goes out with the cell phone, cell phone base station 130B that manages the place where registered person goes to communicates with the cell phone of registered person (step S1127).

Then, the cell phone base station 130B creates sub movement stop information (step S1128), and sends this created sub movement stop information to the aggregation side terminal 150 that manages the main unit (step S1129).

The aggregation side terminal 150, on receiving this sub movement stop information, stores it in search DB 156 or basic information DB 154 and the like in its own. By this storage process, the aggregation side terminal 150 estimates and recognizes that registered person individual exists (has moved to) around the installation place of the cell phone base station 130B (step S1130). Herein, the aggregation side terminal 150 creates use possibility information (step S1131), and sends this created use possibility information to respective terminals around the installation place of the cell phone base station 130B (step S1132), and prompts them to prepare for the authentication process of registered person individual and the like.

Thus, along with communication process of the cell phone, if actions where registered person individual moves are recognized in the authentication system, it is possible to make the units that registered person individual uses always ready at hand. In the present embodiment, the unit that registered person individual uses transfers with the existence place of registered identical person, while registered person individual is unaware, and accordingly, it is possible to improve the convenience of the present authentication system, and prevent the unauthorized abuse of information.

However, since the owner of a cell phone is not always registered identical person, the use is limited to its easily prepared condition, and to an actual individual information use request, the individual existence authentication process is carried out.

The cell phone is just only an example, and an IC chip, IC tag, ubiquitous communicator, anticrime buzzer and the like may be employed, so long as it is a portable communication terminal, having the same function as the above cell phone.

48th Embodiment (Information Movement 26: Considerations on Face Authentication System)

In the present embodiment, it is supposed that authentication information is biometrics information of the face shape (outline), and the end side terminal 160 has a function to read the face shape, and is installed on the street.

FIG. 118 is a sequence chart showing an action example of the system where registered person individual uses a face authentication system, and the transfer of units that registered person uses is subserved, in a 48th embodiment of the present invention.

It is supposed that registered person has consented beforehand that individual authentication is carried out at necessity by the face biometrics information.

When registered person individual goes out from home, and passes the end side terminal 150A installed at the vicinity of its home, the end side terminal 160A reads the face information of the registered person individual (step S1141), and carries out a process to specify an individual on the basis of individual information stored in its own (step S1142).

The end side terminal 160A, on specifying individual, creates sub movement start information (step S1143), and sends this created sub movement start information to the aggregation side terminal 150 that manages its own terminal (step S1144).

This sub movement stop information is information on estimation that registered person individual does not exist (has moved) in the unit that terminals structure, and in the case when there is a request for the use of individual information of registered person individual in the unit concerned, alarm information is sent to terminals and servers of the present authentication system.

The aggregation side terminal 150, on receiving the sub movement start information, stores it into search DB 156 or basic information DB 154 and the like in its own. This is because when the movement related information of registered person, the authentication request information or the permission information are received, it is possible to easily perform comparison and validation of these received information and the sub movement stop information.

By this storage process, the aggregation side terminal 150 estimates and recognizes that registered person individual does not exist around the installation place of the end side terminal 160A (step S1145).

Therefore, the aggregation side terminal 150 creates use possibility information (step S1146), and sends this created use possibility information to the end side terminal 160B adjacent to or near the installation place of the end side terminal 160A (step S1147).

The end side terminal 160B, on receiving this use possibility information, prepares for the authentication process of registered person individual (step S1148).

When registered person passes the end side terminal 160B, the end side terminal 160B reads the face information of registered person (step S1149), and performs a process to specify the individual on the basis of individual information prepared in its own (step S1150).

When the end side terminal 160B specifies the individual, it creates sub movement start information (step S1151), and sends this created sub movement start information to the aggregation side terminal 150 that manages its own terminal (step S1152).

The aggregation side terminal 150, on receiving the sub movement start information, stores it into search DB 156 or basic information DB 154 and the like in its own. By this storage process, the aggregation side terminal 150 estimates and recognizes that registered person individual does not exist around the installation place of the end side terminal 160B (step S1153).

Therefore, the aggregation side terminal 150 creates use possibility information (step S1154).

The aggregation side terminal 150, then by use of mining data, selects the end side terminal 160 that the registered person is estimated to pass next after passing the installation place of the end side terminal 160B, and sends the created use possibility information, to the selected end side terminal 160, and prompts it to prepare for the authentication process of registered person individual (step S1155).

Further, the aggregation side terminal 150 sends the use possibility information also to the end side terminal 160 adjacent to or near the installation place of the end side terminal 160, and prompts it to prepare for the authentication process of registered person individual.

Thus, the authentication system can recognize actions of movement of registered person individual, from the face shape of registered person read by readers installed on streets, and can be always prepared for information use of registered person individual.

Furthermore, in the present embodiment, the authentication system can be used only at the existence place and at the vicinity thereof at the time point of registered identical person, and accordingly, it is possible to improve the convenience of the present embodiment, and prevent unauthorized abuse of information.

In the present embodiment, by use of monitor cameras (video/images) and monitors already installed on the streets and in buildings, like by use of cell phones, it is possible to easily limit the use places of the authentication system by registered person.

49th Embodiment (Information Movement 27: Change of Authentication Information/Method)

In order to change the authentication information and authentication method, it is necessary to perform individual authentication whether the person who makes the procedures is the true identical person of the authentication information.

Details follow the conventional individual authentication procedures, meanwhile, after identity confirmation, by use of conventional authentication information and method display, change registration of change items (input order, authentication information, information portable device name, main unit name and the like) is carried out.

50th Embodiment (Outline of 50th Embodiment)

It has been general that when to belong to organizations such as school, working place, and the like, and to use various services of banks and the like, some local identification IDs (student number, employee number, member number and the like) are given in order to make easy the management of their members and users and the like (hereinafter, referred to as registered people).

In respective organizations and the like, individual information is associated to the given identification ID and make them into database, and information of the registered people is managed.

In general, the registered person frequently belongs to those plural organizations and bodies, and uses plural services, and plural different local identification IDs are given to one registered person in many cases.

And, when this registered person uses the authentication system in the present embodiment, further, individual identification ID to be used in this entire system issued by the system server 10 is given. When this registered person uses this authentication system for example in school, in the school, a local student identification ID issued by the school, and the individual identification ID issued by the system are used. The authentication system in the present embodiment is for easily using the authentication system, without frequently sorting those IDs, even in the case of a registered person with plural identification IDs.

Hereinafter, in the present embodiment, it is supposed that the registered person goes to the school, and uses the authentication system.

(Structure of 50th Embodiment)

FIG. 120 is a figure showing the structure of the authentication system in a 50th embodiment of the present invention.

As shown in the figure, the authentication system includes the end side terminal 160A that reads the fingerprint of the registered person at the school and performs authentication, the building structure side terminal 110A that specifies the registered person on the basis of the authentication result, the aggregation side terminal 150 that aggregates movement information of the registered person from the building structure side terminal 110A, and the authentication system server 10 that aggregates the movement information from the aggregation side terminal 150.

Meanwhile, the authentication system in the present embodiment is equipped with other servers and terminals, in the same manner as in other embodiments, but in the present embodiment, the illustration and description thereof are omitted.

Further, in the present embodiment, it is supposed that the registered person is specified with its student identification ID "1A025". Further, it is supposed that the authentication system side has given its individual identification ID "1234567" to the registered person.

The building structure side terminal 110A is equipped with a database DB 11 that manages individual information of registered person in association with this student identification ID, and a database DB 12 that shows the correspondence between this student identification ID and the individual identification ID.

Furthermore, the building structure side terminal 110A is equipped with a database DB 61 that accumulates the fingerprint information of registered person.

(Action of 50th Embodiment)

FIG. 121 is a sequence chart showing an action flow of the authentication system in a 50th embodiment of the present invention. Hereinafter, with reference to the figure, the action of the authentication system in the present embodiment is explained.

First, when the registered person arrives the school entrance, the registered person makes the end side terminal 160A installed at the entrance read its own fingerprint (step S5001).

The end side terminal 160A collates the read fingerprint information, with the fingerprint information already registered in its own, and performs authentication of registered person (step S5002).

When it is authenticated that the person is the registered identical person (step S5002 Yes), the end side terminal 160A sends authentication result information to show that the authentication has succeeded, identification ID corresponding to the registered person individual (herein, student identification ID "1A25"), and information to specify its own terminal (spatial information), to the building structure side terminal 110A (step S5003).

The building structure side terminal 110A, on receiving these information from the end side terminal 160A, temporarily stores these received information into its own (step S5004).

And, the building structure side terminal 110A, on the basis of these received information, recognizes that the registered person individual exists in the unit (in the school building) of the building structure side terminal 110A (step S5005).

Next, the building structure side terminal 110A searches database in its own on the basis of the stored identification ID (student identification ID "1A025"), and specifies the individual identification ID "1234567" corresponding to the identification ID (step S5006).

Thereafter, the building structure side terminal 110A extracts spatial information, temporal information and authentication result information, among the above stored received information, and associate the specified individual identification ID to these extracted received information, and thereby creates movement information (step S5007). Herein, since the building structure side terminal 110A recognizes that the registered person exists in the unit, the created movement information becomes movement stop information to show that the registered person has completed its movement into the school building.

Then, the building structure side terminal 110A sends this created movement stop information via network to the aggregation side terminal 150 (step S5008).

(Summary of 50th Embodiment)

As explained above, in the authentication system in the present embodiment, it is possible to easily use the authentication system, without frequently sorting those IDs, even in the case of a registered person with plural identification IDs.

(Modified Example of 50th Embodiment)

FIG. 122 is a figure showing the structure of an authentication system according to a modified example of the present embodiment.

As shown in the figure, in this modified example, databases DB 11, DB 12 are connected to the outside of the building structure side terminal 110A, and database DB 61 is connected to the outside of the end side terminal 160A.

In this modified example, these databases DB 11, DB 12, DB 61 are not always connected to terminals.

For example, in school, they may be connected at the moment of attending the school in the morning and at the moment of going home in the evening, and structure part of the function to create movement information. In normal cases, it is rare for a student who has attended the school once to get out of the unit around the school building in daylight. Therefore, it is preferable connecting them only for a certain time with expectation of use, to connecting them all the time to cause unauthorized information acquisition or leakage by hackers and the like.

Further, the building structure side terminal 110A may be connected to the databases DB 11, DB 12 at the stage of receiving information of registered person from the end side terminal 160A.

Furthermore, the building structure side terminal 110A may be disconnected from the databases DB 11, DB 12 at the stage when the individual identification ID of registered person is specified.

51st Embodiment (Outline of 51st Embodiment)

In the 50th embodiment described above, the building structure side terminal 110A is equipped with the database DB 12 that shows the correspondence between a specified identification ID (student identification ID) and the individual identification ID used in the system. This building structure side terminal 110A refers to the database DB 12, and thereby converts the specified identification ID of registered person into individual identification ID, and makes the authentication system available to registered person.

While on the other hand, in the present embodiment, the building structure side terminal 110B has a calculation program and algorithm to convert the specified identification ID into individual identification ID, and can convert the specified identification ID received from the end side terminal 160B by the calculation program and algorithm, into individual identification ID that can be used in the system.

Hereinafter, unless otherwise specified, explanations are made on the assumption that the present embodiment is same as the 50th embodiment.

Meanwhile, in the present embodiment, it is supposed that registered person goes to its working place, and uses the authentication system therein.

(Structure of 51st Embodiment)

FIG. 123 is a figure showing the structure of an authentication system in a 51st embodiment of the present invention.

As shown in the figure, the authentication system includes the end side terminal 160B that reads the fingerprint of the registered person at the working place and performs authentication, the building structure side terminal 110B that specifies the registered person on the basis of the authentication result, the aggregation side terminal 150 that aggregates movement information of the registered person from the building structure side terminal 110B, and the authentication system server 10 that aggregates the movement information from the aggregation side terminal 150.

Meanwhile, the authentication system in the present embodiment is equipped with other servers and terminals, in the same manner as in other embodiments, but in the present embodiment, the illustration and description thereof are omitted.

Further, in the present embodiment, it is supposed that the registered person is specified with its employee identification ID "101". Further, it is supposed that the authentication system side has given its individual identification ID "1234567" to the registered person.

The building structure side terminal 110B is equipped with a database DB 13 that manages individual information of registered person in association with this employee identification ID.

Further, the end side terminal 160B is equipped with a database DB 61 that accumulates the fingerprint information of registered person.

(Action of 51st Embodiment)

FIG. 124 is a sequence chart showing an action flow of the authentication system in a 51st embodiment of the present invention. Hereinafter, with reference to the figure, the action of the authentication system in the present embodiment is explained.

First, when the registered person arrives the working place entrance, the registered person makes the end side terminal 160B installed at the entrance read its own fingerprint (step S5101).

The end side terminal 160B collates the read fingerprint information, with the fingerprint information already registered in its own, and performs authentication of registered person (step S5102).

When it is authenticated that the person is the registered identical person (step S5102 Yes), the end side terminal 160B sends authentication result information to show that the authentication has succeeded, identification ID corresponding to the registered person individual (herein, employee identification ID "101"), and information to specify its own terminal (spatial information), to the building structure side terminal 110B (step S5103).

The building structure side terminal 110B, on receiving these information from the end side terminal 160B, temporarily stores these received information into its own (step S5104).

And, the building structure side terminal 110B, on the basis of these received information, recognizes that the registered person individual exists in the unit (in the working place building) of the building structure side terminal 110B (step S5105).

Next, the building structure side terminal 110B converts the stored employee identification ID '101" by calculations with the specified calculation equation and algorithm, into the employee identification ID "1234567" (step S5106).

Thereafter, the building structure side terminal 110B extracts spatial information, temporal information and authentication result information, among the above stored received information, and associate the specified individual identification ID to these extracted received information, and thereby creates movement information (step S5107). Herein, since the building structure side terminal 110B recognizes that the registered person exists in the unit, the created movement information becomes movement stop information to show that the registered person has completed its movement into the school building.

Then, the building structure side terminal 110B sends this created movement stop information via network to the aggregation side terminal 150 (step S5108).

Meanwhile, in the present embodiment, it is possible to convert individual identification ID into a specified identification ID (employee identification ID and the like) by use of the above calculation function.

(Summary of 51st Embodiment)

As explained above, in the authentication system in the present embodiment, the building structure side terminal 110B converts the specified identification ID received from the end side terminal 160B, by the calculation program and algorithm packaged in its own, into individual identification ID that can be used in the system, and accordingly, it is possible to easily use the authentication system, without frequently sorting those IDs, even in the case of a registered person with plural identification IDs.

(Modified Example of 51st Embodiment)

FIG. 125 is a figure showing the structure of an authentication system according to a modified example of the present embodiment.

As shown in the figure, in this modified example, database DB 13, and the storage device of calculation program and algorithm are connected to the outside of the building structure side terminal 110A, and database DB 61 is connected to the outside of the end side terminal 160A.

In this modified example, in the same manner as in the above 50th embodiment, there databases DB 13, DB 61, and the storage device of calculation program and algorithm are connected to terminals only in necessary time zone, and accordingly it is possible to conspicuously reduce the possibility of attacks from hackers from the outside.

Further, the building structure side terminal 110B may be connected to the database DB 13 and the storage device of calculation program and algorithm, at the stage of receiving information of registered person from the end side terminal 160A.

Furthermore, the building structure side terminal 110A may be disconnected from the database DB 13 and the storage device of calculation program and algorithm, at the stage when the individual identification ID of registered person is specified.

52nd Embodiment (Outline of 52nd Embodiment)

As described previously, in the 50th embodiment, the building structure side terminal 110A is equipped with the database DB 12 that shows the correspondence between the specified identification ID and the individual identification ID.

Further, in the 51st embodiment, the building structure side terminal 110B has a calculation program and algorithm to convert the specified identification ID into individual identification ID.

While on the other hand, in the present embodiment, other server or terminal than the building structure terminal has the above database DB 12, and has the above calculation program and algorithm to convert the specified identification ID into individual identification ID, and thereby processes and accumulation areas in the building structure side terminal are dispersed, and the load thereof is eased.

Hereinafter, unless otherwise specified, explanations are made on the assumption that the present embodiment is same as the 50th embodiment.

Meanwhile, in the present embodiment, it is supposed that registered person goes to its school, and uses the authentication system therein.

(Structure of 52nd Embodiment)

FIG. 126 is a figure showing the structure of an authentication system in a 52nd embodiment of the present invention. As shown in the figure, the authentication system includes the end side terminal 160A that reads the fingerprint of the registered person at the school and performs authentication, the building structure side terminal 110A that specifies the registered person on the basis of the authentication result, the aggregation side terminal 150 that aggregates movement information of the registered person from the building structure side terminal 110A, and the authentication system server 10 that aggregates the movement information from the aggregation side terminal 150.

Meanwhile, the authentication system in the present embodiment is equipped with other servers and terminals, in the same manner as in other embodiments, but in the present embodiment, the illustration and description thereof are omitted.

The building structure side terminal 110A is equipped with a database DB 11 that manages individual information of registered person in association with this student identification ID.

The end side terminal 160A is equipped with a database DB 61 that accumulates the fingerprint information of registered person.

The aggregation side terminal 150 is equipped with a database DB 12 that shows the correspondence between this student identification ID and the individual identification ID. Further, the aggregation side terminal 150 has a calculation program and algorithm to convert the student identification ID into individual identification ID.

(Action of 52nd Embodiment)

FIG. 127 is a figure showing the action flow of an authentication system in a 52nd embodiment of the present invention. Hereinafter, with reference to the figure, the action of the authentication system in the present embodiment is explained.

The processes when the registered person arrives the school entrance, and the building structure side terminal 110A recognizes its existence are same as the steps S5001 to S5005 in the 52nd embodiment (steps S5201 to S5205).

After the building structure side terminal 110A recognizes that the registered person individual exists in the unit (in the school building) of the building structure side terminal 110A, it creates instruction information to create movement stop information (step S5206).

This instruction information includes the above temporarily stored authentication result information, temporal information, identification ID corresponding to registered person individual (herein, student identification ID "1A025"), and information to specify the building structure side terminal 110A (spatial information), and creation instruction information of movement stop information.

The building structure side terminal 110A sends this instruction information to the aggregation side terminal 150 (step S5207).

The aggregation side terminal 150, on receiving the instruction information, stores the received instruction information temporarily in its own (step S5208).

Next, the aggregation side terminal 150 searches the database DB 51 on the basis of identification ID included in this instruction information (student identification ID "1A025"), and specifies the individual identification ID "1234567" corresponding to the identification ID (step S5209).

Next, the aggregation side terminal 150, by use of the specified individual identification ID, and information included in the above instruction information (authentication result information, temporal information, spatial information), creates movement stop information (step S5210), And the aggregation side terminal 150 sends this created movement stop information via network to the authentication system server 10 (step S5211).

Meanwhile, in the above, the aggregation side terminal 150 converts the student identification ID into the individual identification ID by use of the database DB 51, but as in the 52nd embodiment, the calculation program and algorithm for conversion packaged in its own terminal may be used for the conversion.

(Summary of 52nd Embodiment)

As explained above, in the authentication system in the present embodiment, the aggregation side terminal 150 in the place of the building structure side terminal 110A, has the database for conversion of identification ID, and is equipped with the calculation program and algorithm for conversion, and accordingly, it is possible to reduce the processes of the building structure side terminal 110A and the load of accumulation area.

Further, even if the security system of the building structure side terminal 110A or the end side terminal 160A is attached by hackers and individual information or individual identification ID leaks out, since the individual identification ID itself is not used by the building structure side terminal 110A or the end side terminal 160A, it becomes difficult to directly specify the individual identification ID, and accordingly it is possible to increase the security of system operation.

(Modified Example of 52nd Embodiment)

FIG. 128 (a), FIG. 128 (b) are each a figure showing the structure of an authentication system according to a modified example of the present embodiment.

As shown in the figures, in this modified example, databases DB 11, DB 13 are connected to the outside of the building structure side terminal 110, and database DB 12, and the storage device of calculation program and algorithm are connected to the outside of the end side terminal 160.

In this modified example, in the same manner as in the above 50th and 51st embodiments, there databases DB 11, DB 12, DB 13, DB 61, and the storage device of calculation program and algorithm are connected to terminals only in necessary time zone, and accordingly it is possible to conspicuously reduce the possibility of attacks from hackers from the outside.

Further, the building structure side terminal 110 may be connected to the databases DB11, DB 13, at the stage of receiving information of registered person from the end side terminal 160. With regard to the building structure side terminal 110, as in the thirteenth embodiment, if it is connected to either the aggregation side terminal 150 or the end side terminal 160, it may not be connected to the other. In the same manner, the aggregation side terminal 150 may be connected to the database DB 12 and the storage device of calculation program and algorithm, at the stage when the it receives information of registered person.

Furthermore, the building structure side terminal 110 and the aggregation side terminal 150 may be disconnected from the databases DB 11, DB 12, DB 13, and the storage device of calculation program and algorithm, at the stage when the individual identification ID of registered person is specified.

53rd Embodiment (Outline of 53rd Embodiment)

In the present embodiment, registered person can perform financial transactions by use of an authentication system. The financial transactions herein include cash withdrawal, deposit or transfer and the like in financial organizations such as banks and the like.

In the present embodiment, as an example of the financial transactions, actions of the authentication system in the case when registered person withdraws cash from its bank account are explained.

Meanwhile, unless otherwise specified, the present embodiment is same as the above other embodiments.

(Structure of 53rd Embodiment)

FIG. 129 is a figure showing the structure of an authentication system in a 53rd embodiment of the present invention.

As shown in the figure, the authentication system includes the end side terminal 160A that reads the biometrics information and the like of the registered person, the building structure side terminal 110A that acquires the read information from the end side terminal 160A, the organization side terminal 120A that acquires the read information from the building structure side terminal 110A, the area management side terminal 130 that manages information of registered person in a wider area including the management area of the building structure side terminal 110A, the authentication system server 10 that manages information of registered person used in respective terminals, and an information portable device 500 that stores various information concerning registered person.

The end side terminal 160A is an information processor installed in main offices or branches of financial organizations such as banks and the like. This end side terminal 160A has the function of an ATM (Automatic Teller Machine) normally installed in banks and the like.

Further, the end side terminal 160A has the function to read biometrics information of registered person, and it can read any biometrics information such as, for example, vein pattern, fingerprint or iris and the like of registered person.

The building structure side terminal 110A is basically the information processor installed in main offices or branches of financial organizations such as banks and the like, and collects information of registered person from end side terminals 160A in main offices or branches.

The organization side terminal 120A is basically a server device installed per financial organization, and collects information of registered person from end side terminals 160A in main offices or branches of the financial organization.

The information portable device 500 is a device or a recording medium that registered person takes along, and stores address information of information contact points concerning this registered person. For example, this information portable device 500 is a cell phone, PHS, PDA, USB memory, IC tag or IC card and the like.

(Action of 53rd Embodiment)

FIG. 130 to FIG. 132 are each a sequence chart showing the action flow of an authentication system in a 53rd embodiment of the present invention.

Hereinafter, with reference to the figures, an action example of the authentication system in the case where registered person individual uses plural registered biometrics information and movement information and perform financial transactions is explained.

Meanwhile, in the present embodiment, individual information for authentication is, as an example, biometrics information of palm vein.

Registered person individual visits the ATM corner at Marunouchi Branch of Bank A as the transaction bank branch of registered person individual. In this ATM corner, end side terminal 160A is installed.

To this end side terminal 160A, a monitor screen is attached, and on the screen, a display to select desired transaction and proceed the transaction procedures is made, and for example, plural keys for changing the displays of financial organization names are displayed. Registered person select this key, and can display optional financial organization names (main office, branch names), like "all financial organizations that registered person individual makes transactions with", "only bank A", "other financial organization" and the like.

Herein, when registered person individual select "only bank A" (step S5301), the end side terminal 160A creates information to show that objective of financial transactions is limited to the bank A (for example "JP111ONLY") (step S5302).

Then, registered person individual makes the end side terminal 160A read the "navigation electronic recording medium" in the information portable device 500 explained in the above 40th embodiment. As the result, the end side terminal recognizes the recording medium storage ID in the navigation electronic recording medium (step S5303).

The end side terminal 160A, from the read recording medium storage ID, recognizes that the end side terminal 150A is the information reference destination of registered person individual (step S5304).

Next, registered person individual makes the end side terminal 160A read biometrics information (step S5305).

Thereafter, registered person selects "cash withdrawal" from transaction kinds displayed on the monitor screen, and input "withdrawal desired amount" (step S5306).

The end side terminal 160A sends the read biometrics information, information to show that the objective of financial transaction is the bank A, spatial information to specify the end side terminal 160A, temporal information to show read time of biometrics information, information to request for withdrawal permission, and information to show that the information reference destination of registered person individual is the aggregation side terminal 150A, to the building structure side terminal 110A (step S5307).

The building structure side terminal 110A, on receiving the above various information from the end side terminal 160A, temporarily stores it in its own (step S5308).

Next, to the organization side terminal 120A that manages depositor database of the bank A, it sends the information received form the end side terminal 160A (step S5309).

The organization side terminal 120A, on receiving the above various information, temporarily stores it in its own (step S5310).

Next, the organization side terminal 120A compares and collates the received biometrics information, and the biometrics information stored in its own beforehand, and specifies registered person individual (step S5311).

The organization side terminal 120A, on specifying registered person, searches database in its own terminal, and extracts transaction conditions and individual identification ID of this specified registered person individual (step 65312).

Through the above processes, the first stage preparation of cash withdrawal process is complete.

Thereafter, the organization side terminal 120A, on the basis of the extracted individual identification ID of the registered person individual, sends information to request for confirmation, whether the movement information of registered person exists in the unit including the building structure side terminal 110A or not, to the building structure side terminal 110A (step S5313).

The building structure side terminal 110A searches for the movement information, in the unit, in response to the confirmation request of the movement information (step S5314).

Herein, the building structure side terminal 110A, when the movement information exists in the unit, sends the movement information, and when the movement information does not exist in the unit, it sends information to show "not applicable", respectively to the organization side terminal 120A (step S5315).

The process in the case when the organization side terminal 120A receives the information of "not applicable" from the building structure side terminal 110A (step S5316 No) is described later herein.

On the other hand, in the case when the organization side terminal 120A receives the movement information from the building structure side terminal 110A (step S5316 Yes), it compares and collates the received movement information, and the information stored at the step S5310, and perform the existence authentication of registered person (step S5317).

Hereinafter, the actions of the authentication system are explained separately in the case when the existence of this registered person is confirmed (step S5317 Yes), and the case when it is not confirmed (step S5317 No). Further, the case when the organization side terminal 120A receives the information of "not applicable" (step S5316 No) is explained individually.

(1) When the Existence of this Registered Person is Confirmed (Step S5317 Yes)

As the result of the above existence authentication, in the case when the existence of this registered person is confirmed (step S5317 Yes), the organization side terminal 120A creates movement stop information, and financial transaction permission information (step S5318).

Meanwhile, this financial transaction permission information is the information to show that registered person is permitted to use the authentication system to perform financial transactions, and permitted transaction contents are specified therein.

Through the above processes, the second stage preparation of cash withdrawal process is complete.

Next, the organization side terminal 120A refers to the above financial transaction permission information, and judges whether the cash withdrawal process that the registered person requests at present is within the transaction process range permitted to the registered identical person (herein, whether within the cash withdrawal limit amount or not) or not (step S5319).

In the case when the cash withdrawal process is permitted (step S5319 Yes), the organization side terminal 120A sends the permission information to permit the cash withdrawal, and the movement stop information, to the building structure side terminal 110A (step S5320).

The building structure side terminal 110A, on receiving the permission information and the movement stop information from the organization side terminal 120A, stores the received movement stop information in its own terminal (step S5321).

Further, the building structure side terminal 110A sends the received permission information to the end side terminal 160A (step S5322).

The end side terminal 160A, on receiving the permission information from the building structure side terminal 110A, pays the cash to the registered person individual from cash payment port of its own terminal (step S5323).

While on the other hand, as the result of reference to the financial transaction permission information, in the case when the cash withdrawal is not within the transaction process range permitted to the registered identical person (step S5319 No), the organization side terminal 120A sends non permission information to show that the cash withdrawal is not permitted, and the movement stop information, to the building structure side terminal 110A (step S5324).

The building structure side terminal 110A, on receiving the non permission information from the organization side terminal 120A, stores the received movement stop information in its own terminal (step S5325). Further, the building structure side terminal 110A sends the non permission information to the end side terminal 160A (step S5326).

The end side terminal 160A, on receiving the non permission information from the building structure side terminal 110A, displays a message "transaction suspended due to short balance" on the monitor of its own terminal, and prompts the registered person to input the cash amount and the like (step S5327).

When the Existence of this Registered Person is not Confirmed (Step S5317 No)

On the other hand, As the result of the above existence authentication, in the case when the existence of this registered person is not confirmed (step S5317 No), the organization side terminal 120A creates transaction prohibition information (step S5330), and sends it to the building structure side terminal 110A (step S5331).

This transaction prohibition information is the information to show that no financial transaction is permitted to the registered person.

The building structure side terminal 110A, on receiving the transaction prohibition information, sends this transaction prohibition information to the end side terminal 160A (step S5332).

The end side terminal 160A, on receiving the transaction prohibition information, displays a message "no transaction available" on the monitor of its own terminal (step S5333).

(3) When the Organization Side Terminal 120a Receives the Information Of "Not Applicable" (Step S5316 No)

The organization side terminal 120A, when receiving the information of "not applicable" of movement information from the building structure side terminal 110A (step S5316 No), refers to the information to specify the information reference destination of registered person, stored beforehand in its own terminal (step S5334).

When the organization side terminal 120A recognizes that the information reference destination is the aggregation side terminal 150A from the specification information, inquires to the aggregation side terminal 150A, whether it recognizes the storage place of movement information of registered person individual or not (step S5335).

When the aggregation side terminal 150A receives the inquiry from the organization side terminal 120A, if it recognizes the storage place of movement information of the corresponding registered person individual (step S5336 Yes), it sends to other terminal or server storing the movement information, information to show that the registered person exists in the unit that the building structure side terminal 110A manages (in the branch), and information to show that the movement information of the registered person should be sent to the building structure side terminal 110A (step S5337).

Thereafter, from the terminal or server storing the movement information, via the building structure side terminal 110A, the movement information is sent finally to the organization side terminal 120A.

On the other hand, when the aggregation side terminal 150A does not recognize the existence place of movement information (step S5336 No), it performs reference to the authentication system server 10 as higher level terminal, the area management side terminal 130A that manages a further wider area including the management area of the building structure side terminal 110A or other terminals and servers estimated on the basis of mining of history information (step S5338).

(Summary of 53rd Embodiment)

As explained above, according to the present embodiment, when registered person performs financial transactions such as cash withdrawal, the authentication system can easily prove the existence of registered identical person, and the security of the transactions is assured.

In particular, even in the case where individual information such as the secret number of a bank card, since it is impossible to prove the existence of registered identical person, only with individual information unauthorizedly acquired, unauthorized cash withdrawal and the like cannot be made, and accordingly, the system greatly contributes to the structure of safety and security of living as social infrastructure.

Meanwhile, in the present embodiment, in the case with consent of registered person individual, information for individual authentication of registered person (pattern of biometrics information of the palm vein and the like) may be stored in the "navigation electronic recording medium" in the information portable device 500.

At this moment, the end side terminal 160A, when reading biometrics information from registered person itself, reads biometrics information also from this information portable device 500, and collates these both biometrics information and performs individual authentication of registered person.

Further, in the same manner as in the eighth embodiment, authentication function may be added to the information portable device 500, and information to specify the conditions of financial transactions, deposit account number or name identification code and the like of registered person may be stored therein.

In the present embodiment, with regard to the authentication system, explanations have been made with cash withdrawal from bank account as an example. On the other hand, this authentication system may be applied to other fields.

For example, the end side terminal 160A may be installed in shops and hospitals and the like and information reading function may be added thereto. Further, the organization side terminal 120A may be functioned as management server of electronic money, management server of a credit card company or management server of a point card.

Thus, it is needles to mention that the authentication system can cover not only the field of financial transactions, but also other fields in general purpose manners.

Further, the authentication system may be used to prove certificates having some role to specify person such as passport, driver's certificate, basic resident register card, library card, student certificate or employee certificate, air ticket, boarding ticket or admission ticket and the like, and to directly substitute for these certificates.

Meanwhile, it is needless to mention that in order to prevent information leakage during communications, it is preferable to take safety measures such as encryption process or random number process in sending information.

54th Embodiment (Application to Electronic Money Settlement)

The authentication system in the 53rd embodiment is to perform authentication at financial transactions of banks and the like, and thereby assure the security of financial transactions by ATM and the like.

In the present embodiment, as a modified example of the 53rd embodiment, an authentication system is used for the use of electronic money. Hereinafter, unless otherwise specified, it is supposed that the structure and actions of the present embodiment is same as those in the 53rd embodiment.

In the case when the authentication system is applied to electronic money, the composition of the authentication system shown in FIG. 129 is changed in reading as below.

The end side terminal 160A is an information processor to be installed at a shop or hospital and the like. This end side terminal 160A has a function as a register normally installed at shops and the like.

The building structure side terminal 110A is basically an information processor to be installed per shop and hospital, and collects information of registered person from respective end side terminals 160A in shop and hospital where it is installed.

The organization side terminal 120A is basically a server device to be installed per electronic money service provider, and collects information of registered person from the building structure side terminal 110A installed per shop and hospital.

The information portable device 500 is a device or recording medium that registered person takes along, and stores address information of information contact points concerning this registered person. For example, this information portable device 500 is a cell phone, PHS, PDA, USB memory, IC tag or IC card and the like.

Hereinafter, actions of the authentication system in the present embodiment are explained.

Registered person individual tells that he or she wants to use electronic money, and then makes the end side terminal 160A at the front of shop read the "navigation electronic recording medium" and individual information in the information portable device 500.

The end side terminal 160A sends the read biometrics information, information to show that the electronic money process is requested, spatial information to specify the end side terminal 160A, temporal information to show the read time of biometrics information, purchase money amount display on the register (registered person individual's payment money amount) information, and information to show that the information reference destination of registered person individual is the end side terminal 150A, to the building side terminal 110A.

The building side terminal 110A, on receiving the above various information from the end side terminal 160A, stores it in its own temporarily, and sends the information received from the end side terminal 160A, to the organization side terminal 120A that manages electronic money information of registered person individual.

The organization side terminal 120A, on receiving the above various information, stores it in its own temporarily, and then, the organization side terminal 120A compares and collates the received biometrics information, and the biometrics information store beforehand in its own, and specifies the registered person individual.

The organization side terminal 120A, after specifying the registered person, searches database in its own terminal, and extracts transaction conditions and individual identification ID of this specified registered person individual, and on the basis of the extracted individual identification ID of the registered person individual, sends information to request for confirmation, whether the movement information of registered person exists in the unit including the building structure side terminal 110A or not, to the building structure side terminal 110A.

When the organization side terminal 120A receives the movement information from the building structure side terminal 110A, it compares and collates the received movement information, and the temporarily stored information, and performs the existence authentication of registered person.

As the result of the above existence authentication, in the case when the existence of this registered person is confirmed, the organization side terminal 120A creates movement stop information, and electronic money settlement transaction permission information.

Meanwhile, this electronic money settlement transaction permission information is the information to show that it is permitted to perform a transaction to transfer money information from electronic money account of registered person to the account of the end side terminal 160A or person (including organization, group) that manages the end side terminal 160A.

Next, the organization side terminal 120A refers to the above electronic money settlement transaction permission information, and judges whether the electronic money use amount that the registered person requests at present is within the use limit money amount permitted to the registered identical person or not.

In the case when the electronic money use amount is within the use limit money amount, the organization side terminal 120A performs the fund settlement, and sends the result information, and the movement stop information to the building structure side terminal 110A.

The building structure side terminal 110A, on receiving the result information and the movement stop information from the organization side terminal 120A, stores the received movement stop information in its own terminal, further, the building structure side terminal 110A sends the received result information to the end side terminal 160A.

The end side terminal 160A, on receiving the permission information from the building structure side terminal 110A, displays information to show the transaction has been completed on its own terminal.

As explained above, according to the present embodiment, the authentication system authenticates registered person by use of the movement information that cannot be easily fabricates, and permits settlement by electronic money only when this authentication succeeds, and accordingly it is possible to prevent unauthorized use of electronic money by "spoofing" and the like by a third party.

Meanwhile, in the present embodiment, at the authentication of registered person, information of the information portable device 500 is used, but without using this information of the information portable device 500, only the authentication of the movement information by biometrics information of registered person may be performed.

55th Embodiment (Application to Credit Card)

The authentication system in the 53rd embodiment is to perform authentication at financial transactions of banks and the like, and thereby assure the security of financial transactions by ATM and the like.

In the present embodiment, as a modified example of the 53rd embodiment, an authentication system is used for the use of credit card. Hereinafter, unless otherwise specified, it is supposed that the structure and actions of the present embodiment is same as those in the 53rd embodiment.

In the case when the authentication system is applied to a credit card, the composition of the authentication system shown in FIG. 129 is changed in reading as below.

The end side terminal 160A is an information processor to be installed at a shop or hospital and the like. This end side terminal 160A has a function as a register normally installed at shops and the like.

The building structure side terminal 110A is basically an information processor to be installed per shop and hospital, and collects information of registered person from respective end side terminals 160A in shop and hospital where it is installed.

The organization side terminal 120A is basically a server device to be installed per credit card company, and collects information of registered person from the building structure side terminal 110A installed per shop and hospital.

The information portable device 500 is a device or recording medium that registered person takes along, and stores address information of information contact points and transaction credit card information and the like concerning this registered person. For example, this information portable device 500 is a cell phone, PHS, PDA, USB memory, IC tag or IC card and the like.

Hereinafter, actions of the authentication system in the present embodiment are explained.

Registered person individual tells that he or she wants to use its credit card, and then makes the end side terminal 160A at the front of shop read the "navigation electronic recording medium" and individual information in the information portable device 500.

The end side terminal 160A sends the read biometrics information, information to show that the credit card process is requested, spatial information to specify the end side terminal 160A, temporal information to show the read time of biometrics information, purchase money amount display on the register (registered person individual's payment money amount) information, and information to show that the information reference destination of registered person individual is the end side terminal 150A, to the building side terminal 110A.

The building side terminal 110A, on receiving the above various information from the end side terminal 160A, stores it in its own temporarily, and sends the information received from the end side terminal 160A, to the organization side terminal 120A that manages credit card information of registered person individual.

The organization side terminal 120A, on receiving the above various information, stores it in its own temporarily, and then, the organization side terminal 120A compares and collates the received biometrics information, and the biometrics information store beforehand in its own, and specifies the registered person individual.

The organization side terminal 120A, after specifying the registered person, searches database in its own terminal, and extracts transaction conditions and individual identification ID of this specified registered person individual, and on the basis of the extracted individual identification ID of the registered person individual, sends information to request for confirmation, whether the movement information of registered person exists in the unit including the building structure side terminal 110A or not, to the building structure side terminal 110A.

When the organization side terminal 120A receives the movement information from the building structure side terminal 110A, it compares and collates the received movement information, and the temporarily stored information, and performs the existence authentication of registered person. As the result of the above existence authentication, in the case when the existence of this registered person is confirmed, the organization side terminal 120A creates movement stop information, and credit card settlement transaction permission information.

Meanwhile, this credit card settlement transaction permission information is the information to show that a credit card company permits for registered person to perform a fund settlement process by a credit card to the account of the end side terminal 160A or person (including organization, group) that manages the end side terminal 160A.

Next, the organization side terminal 120A refers to the above credit card settlement transaction permission information, and judges whether the credit card use amount that the registered person requests at present is within the use limit money amount permitted to the registered identical person or not.

In the case when the credit card use amount is within the use limit money amount, the organization side terminal 120A performs the credit card authentication settlement, and sends the authentication result information, and the movement stop information to the building structure side terminal 110A.

The building structure side terminal 110A, on receiving the authentication result information and the movement stop information from the organization side terminal 120A, stores the received movement stop information in its own terminal. Further, the building structure side terminal 110A sends the received authentication result information to the end side terminal 160A.

The end side terminal 160A, on receiving the permission information from the building structure side terminal 110A, displays information to show the transaction has been completed on its own terminal.

As explained above, according to the present embodiment, the authentication system authenticates registered person by use of the movement information that cannot be easily fabricates, and permits settlement by credit card only when this authentication succeeds, and accordingly it is possible to prevent unauthorized use of electronic money by "spoofing" and the like by a third party.

Meanwhile, in the present embodiment, at the authentication of registered person, information of the information portable device 500 is used, but without using this information of the information portable device 500, only the authentication of the movement information by biometrics information of registered person may be performed.

56th Embodiment (Substitution of Identification Cards such as Passport)

The authentication system in the 53rd embodiment is to perform authentication at financial transactions of banks and the like, and thereby assure the security of financial transactions by ATM and the like.

In the present embodiment, as a modified example of the 53rd embodiment, authentication is performed by use of movement information by an authentication system, an din the place of identification cards such as passport and driver certificate, identification of registered person is carried out. Hereinafter, unless otherwise specified, it is supposed that the structure and actions of the present embodiment are same as those in the 53rd embodiment.

In the case when the authentication system is used in the place of identification certificates, the composition of the authentication system shown in FIG. 129 is changed in reading as below. Herein explanations are made with a passport as an example.

The end side terminal 160A is an information processor to be installed at an immigration counter.

The building structure side terminal 110A is basically an information processor to be installed per airport and port facility and immigration procedure building, and collects information of registered person from respective end side terminals 160A in airport and port facility and immigration procedure building where it is installed.

The organization side terminal 120A is basically a server device to be installed per Ministry of Foreign Affairs of each country and immigration office, and collects information of registered person from the building structure side terminal 110A installed per airport and port facility and immigration procedure building.

The information portable device 500 is a device or recording medium that registered person takes along, and stores address information of information contact points and the like concerning this registered person. For example, this information portable device 500 is a cell phone, PHS, PDA, USB memory, IC tag or IC card and the like.

Hereinafter, actions of the authentication system in the present embodiment are explained.

Registered person individual tells that he or she wants to enter or depart a country, and then makes the end side terminal 160A in airport and port facility and immigration procedure building read the "navigation electronic recording medium" and individual information in the information portable device 500.

The end side terminal 160A sends the read biometrics information, information to show that the person wants to enter or depart the country, spatial information to specify the end side terminal 160A, temporal information to show the read time of biometrics information, purchase money amount display on the register (registered person individual's payment money amount) information, and information to show that the information reference destination of registered person individual is the end side terminal 150A, to the building side terminal 110A.

The building side terminal 110A, on receiving the above various information from the end side terminal 160A, stores it in its own temporarily, and sends the information received from the end side terminal 160A, to the organization side terminal 120A that manages passport information of registered person individual.

The organization side terminal 120A, on receiving the above various information, stores it in its own temporarily, and then, the organization side terminal 120A compares and collates the received biometrics information, and the biometrics information store beforehand in its own, and specifies the registered person individual.

The organization side terminal 120A, after specifying the registered person, searches database in its own terminal, and extracts transaction conditions and individual identification ID of this specified registered person individual, and on the basis of the extracted individual identification ID of the registered person individual, sends information to request for confirmation, whether the movement information of registered person exists in the unit including the building structure side terminal 110A or not, to the building structure side terminal 110A.

When the organization side terminal 120A receives the movement information from the building structure side terminal 110A, it compares and collates the received movement information, and the temporarily stored information, and performs the existence authentication of registered person. As the result of the above existence authentication, in the case when the existence of this registered person is confirmed, the organization side terminal 120A creates movement stop information, and immigration permission information.

The organization side terminal 120A sends the immigration permission information and the movement stop information to the building structure side terminal 110A.

The building structure side terminal 110A, on receiving the immigration permission information and the movement stop information from the organization side terminal 120A, stores the received movement stop information in its own terminal. Further, the building structure side terminal 110A sends the received immigration permission information to the end side terminal 160A.

The end side terminal 160A, on receiving the permission information from the building structure side terminal 110A, displays information to show the immigration permission has been made on its own terminal.

As explained above, according to the present embodiment, the authentication system authenticates registered person by use of the movement information that cannot be easily fabricates, and considers that registered person has presented its identification certificate only when this authentication succeeds, and accordingly it is possible to prevent unauthorized use of identification certificates by "spoofing" and the like via fabrication of passport by a third party.

Meanwhile, in the present embodiment, at the authentication of registered person, information of the information portable device 500 is used, but without using this information of the information portable device 500, only the authentication of the movement information by biometrics information of registered person may be performed.

57th Embodiment (Ticketless Service of Reservation Ticket, Air ticket, Commutation Ticket and the like)

The authentication system in the 53rd embodiment is to perform authentication at financial transactions of banks and the like, and thereby assure the security of financial transactions by ATM and the like.

In the present embodiment, as a modified example of the 53rd embodiment, authentication is performed for use of ticketless services of a reservation ticket, air ticket, commutation ticket and the like. Hereinafter, unless otherwise specified, it is supposed that the structure and actions of the present embodiment are same as those in the 53rd embodiment.

In the case when the authentication system is used for ticketless services of a reservation ticket, air ticket, commutation ticket and the like, the composition of the authentication system shown in FIG. 129 is changed in reading as below. Herein explanations are made with an air ticket as an example.

The end side terminal 160A is an information processor to be installed at an airport counter and boarding gate.

The building structure side terminal 110A is basically an information processor to be installed per airport, and collects information of registered person from respective end side terminals 160A in airport where it is installed.

The organization side terminal 120A is basically a server device to be installed per airline company, and collects information of registered person from the building structure side terminal 110A installed per airport.

The information portable device 500 is a device or recording medium that registered person takes along, and stores address information of information contact points and air ticket reservation information and the like concerning this registered person. For example, this information portable device 500 is a cell phone, PHS, PDA, USB memory, IC tag or IC card and the like.

Hereinafter, actions of the authentication system in the present embodiment are explained.

Registered person individual tells that he or she wants to get onboard an airplane, and then makes the end side terminal 160A in airport counter read the "navigation electronic recording medium" and individual information in the information portable device 500.

The end side terminal 160A sends the read biometrics information, information to show that the person wants to a boarding permission process, spatial information to specify the end side terminal 160A, temporal information to show the read time of biometrics information, airplane reservation information, and information to show that the information reference destination of registered person individual is the end side terminal 150A, to the building side terminal 110A.

The building side terminal 110A, on receiving the above various information from the end side terminal 160A, stores it in its own temporarily, and sends the information received from the end side terminal 160A, to the organization side terminal 120A that manages airplane reservation information of registered person individual.

The organization side terminal 120A, on receiving the above various information, stores it in its own temporarily, and then, the organization side terminal 120A compares and collates the received biometrics information, and the biometrics information store beforehand in its own, and specifies the registered person individual.

The organization side terminal 120A, after specifying the registered person, searches database in its own terminal, and extracts transaction conditions and individual identification ID of this specified registered person individual, and on the basis of the extracted individual identification ID of the registered person individual, sends information to request for confirmation, whether the movement information of registered person exists in the unit including the building structure side terminal 110A or not, to the building structure side terminal 110A.

When the organization side terminal 120A receives the movement information from the building structure side terminal 110A, it compares and collates the received movement information, and the temporarily stored information, and performs the existence authentication of registered person. As the result of the above existence authentication, in the case when the existence of this registered person is confirmed, the organization side terminal 120A creates movement stop information, and boarding permission information, and sends the boarding permission information and the movement stop information to the building structure side terminal 110A.

The building structure side terminal 110A, on receiving the boarding permission information and the movement stop information from the organization side terminal 120A, stores the received movement stop information in its own terminal.

Further, the building structure side terminal 110A sends the received boarding permission information to the end side terminal 160A.

The end side terminal 160A, on receiving the boarding permission information from the building structure side terminal 110A, displays information to show the boarding permission has been made on its own terminal.

As explained above, according to the present embodiment, the authentication system authenticates registered person by use of the movement information that cannot be easily fabricates, and permits the use of ticketless services to registered person only when this authentication succeeds, and accordingly it is possible to prevent unjust act such as fabrication of ticket.

Meanwhile, in the present embodiment, at the authentication of registered person, information of the information portable device 500 is used but without using this information of the information portable device 500, only the authentication of the movement information by biometrics information of registered person may be performed.

58th Embodiment (Structure of 58th Embodiment)

FIG. 133 is a figure showing the structure of the authentication system in a 58th embodiment of the present invention.

As shown in the figure, the authentication system includes the end side terminal 160A that reads the individual information of the registered person at its home, the building structure side terminal 110A that collects the individual information read at the entire home, the aggregation side terminal 150A that collects the individual information read around the home, the aggregation side terminal 150W that is connected at emergency when the end side terminal 160A cannot be connected to the building structure side terminal 110A, and the building structure side terminal 110M that stores the individual information read by the end side terminal 160A for backup.

Further, the authentication system has the end side terminal 160B that reads individual information of the registered person at the nearest station from home, the building structure side terminal 110B that collects the individual information read at the entire station, the aggregation side terminal 150B collects the individual information read around the station, the aggregation side terminal 150W that is connected at emergency when the end side terminal 160B cannot be connected to the building structure side terminal 110B, and the building structure side terminal 110K that stores the individual information read by the end side terminal 160B for backup.

Furthermore, the authentication system has the end side terminal 160C that reads individual information of the registered person at hospital, the building structure side terminal 110C that collects the individual information read at the entire hospital, the aggregation side terminal 150C collects the individual information read around the hospital.

Moreover, the authentication system has the area management side terminal 130A that collects the individual information read in the entire area including its home and the station, the area management side terminal 130B that collects the individual information read in the entire area including the station and the hospital, and the authentication system server 10 that collects and manages the individual information from all the terminals of the authentication system.

The authentication system in the present embodiment is to read biometrics information of registered person in respective places and grasp when and where the registered person was, and check consistency between facts (herein, referred to as continuity), and thereby to judge whether spoofing is committed or not.

For example, when a certain registered person was at Tokyo station at 12:00 PM, and the existence was confirmed at Sapporo station just after one minute, it is judged that the continuity of the registered person is lost, and it is considered that there exists an act of a third party committing spoofing and the like.

In this manner, in order to continuously perform authentication of registered person by this authentication system, it is necessary to always perform processes to read biometrics information of registered person and authenticate registered person and so on.

On the other hand, at occurrence of a large scale natural disaster and the like, there is a possibility this authentication system may be subject to some damage.

For example, when earthquake occurs and power stations and electric power plants and the like are heavily damaged, or indoor electric lines see failures die to a flood over floor level in a typhoon and the like, a wide area power failure occurs, and various terminals or readers in the authentication system cannot work properly, and the functions thereof are limited. As a result, there is a possibility that units in the authentication system may be disconnected in many places.

Further, under such circumstances, even without occurrence of disconnection, electric power use amount exceeds the regulated level due to insufficient electric power supply and breakers go down, and further, due to abnormal indoor power distribution owing to electric outlet failures and disconnection of terminal sockets, power failure conditions take place in some limited areas.

In the present embodiment, even in such disasters, the authentication system can emergently supply the most lower level of services to registered people and the like.

Furthermore, at occurrence of a disaster, each terminal or server, when power supply by normal electric lines stops, examines whether its own terminal has self power generation function or not, and when it has the self power generation function, it starts self power generation by the function, and thereby secures electric power supplied to its own terminal.

Moreover, as other method, each terminal or server may receive power supply from other device that can supply electric power by wire or by radio. For example, as these methods, there are a method where a car engine is started and generated electric power is taken in by wire, or another method where electricity is received from a cell phone terminal via radio wave and the like.

Further, in the present embodiment, in the case of a large scale power failure due to troubles in power generation station or power transmission lines at occurrence of a disaster, the operation mode of the authentication system is changed from the normal mode to the emergency measure mode.

When the mode is changed into this emergency measure mode, each terminal or server in this authentication system performs the authentication action of registered person, only in its own, or in the minimum unit structured of a small number of other terminals and servers connected to its own.

Furthermore, at this emergency measure mode, for saving electric power, information to sent and received is limited and thereby the data amount is reduced.

Meanwhile, when this entire authentication system is used by public organizations such as the government and the like, the government or the local government organizations and the like announce an emergency alert at the occurrence of disaster, and may change this authentication system forcibly into the emergency measure mode.

For example, when a large earthquake preliminary alert is announced, when the initial micromotion of earthquake is detected, when a large typhoon is expected to be on shore, and when a concentrated heavy rain is expected, the mode is changed into the emergency measure mode.

Meanwhile, with regard to those particulars made under this emergency measure mode, exemption from responsibility or reduction of responsibility may be specified beforehand in laws or system operation regulations.

(Actions of 58th Embodiment)

(1) Action before Occurrence of Disaster

FIG. 134, and FIG. 135 are each a sequence chart showing the action flow of the authentication system in a 58th embodiment of the present invention.

Hereinafter, with reference to the figures, the authentication action of the authentication system at occurrence of a disaster in the present embodiment is explained.

When registered person individual goes out from its home, registered person makes the end side terminal 160A read individual information (step S6001), and the end side terminal 160A sends the read individual information to the building structure side terminal 110A (step S6002).

The building structure side terminal 110A, on receiving the individual information, recognizes that the registered person has got out from its home (step S6003).

And, the building structure side terminal 110A creates movement start information to show that the registered person has got out from its home and started its action (step S6004), and sends it in network (step S6005). At this moment, the building structure side terminal 110A sends information not only to what is called priority connection destination in the seventeenth embodiment, but also to emergency connection destination (aggregation side terminal 150W), and what is called reflection connection destination (building structure side terminal 110K) (steps S6006 to S6008). Each terminal that receives this movement start information temporarily stores the information.

(2) Action at Power Failure of all Terminals

Thereafter, the registered person arrives the nearest station from its home, and makes the end side terminal 160B at the ticket gate of the nearest station read the individual, information (step S6009).

Herein, suppose that an earthquake occurs after the individual information is read, and disconnection occurs, and power supply to all the terminals stops. At this moment, information transmission and authentication process and the like by the authentication system stop temporarily.

At this moment, the authentication system may be changed into the above emergency measure mode.

(3) Action at Power Supply only to End Side Terminal

Thereafter, by starting the spare power source of the nearest station and the like, when the power supply is recovered in only the end side terminal 160B at the ticket gate of the nearest station, the end side terminal 160B sends, to the terminal predetermined as the priority connection order (explained in the seventeenth embodiment), a signal to check whether communications are available at present or not (step S6010). At this moment, for example, the end side terminal 160B sends the check signal to the building structure side terminal 160B, the aggregation side terminal 150Z and the building structure side terminal 110M, and checks whether communications are available at present or not.

At this moment, from terminal that can communicate, a response signal to the check signal is sent back to the end side terminal 160B (step S6011). In the case when there is a terminal connectable to the end side terminal 160B (step S6012 Yes), the end side terminal 160B registers the ID of the connectable terminal (hereinafter, referred to as connectable terminal ID) into its own (step S6013). The end side terminal 160B companies with this connectable terminal after now, and sends and receives information via network.

On the other hand, in the case when there is not a terminal connectable to its own (step S5012 No), the end side terminal 160B, after lapse of a specified time, performs the communication destination confirmation process at steps S6010 to S6012 once again.

In the present embodiment, as an example, it is supposed that the end side terminal 160B can communicate with the building structure side terminals 110B, 110M, as the result of the confirmation, but it cannot communicate with the aggregation side terminal 150Z.

Next, the end side terminal 160B validates whether there is registered individual information for authentication in its own or not (step S6014). herein, in the same manner as in the sixth embodiment, when in the end side terminal 160B, there is a database for authentication where individual information and the like of registered person are accumulated, the end side terminal 160B compares and validates the individual information of registered person in information of the database, and the individual information of registered person read at the step S6009 (step S6015), and performs individual authentication (step S6016).

As the result, when it is specified that the person is the registered identical person, the end side terminal 160B permits the registered person to enter the station premises.

Thus, even when a disaster occurs, and the terminals and servers connectable with the end side terminal 160B are limited, if individual authentication is possible in its own, by performing the individual authentication process, it is possible to confirm the registered identical person.

Meanwhile, it is needless to mention that in order to assure safety and security of human life, it is possible to permit registered person to enter without individual authentication by judgment of station related members.

Then, the end side terminal 160B sends information to show that the authentication of this registered person has succeeded, to the aggregation side terminal 150Z (step S6017).

At this moment, in consideration of electricity assured amount and consumption amount of the end side terminal 160B, in order to make an operation for as long a time as possible, information to be sent is limited to the basic information including the individual identification ID of registered person individual, the authentication time, and the position information of the end side terminal 160B.

Thus, in the present embodiment, authentication process is performed on the basis of the individual information read by the end side terminal 160B at emergency, and thereby, even if connections are not available with terminals and servers that carry out authentication process in normal operation, it is possible to provide authentication service by the authentication system.

(4) Recovery Action after Occurrence of Disaster

Next, the recovery action after the network of the authentication system is temporarily shut down, at occurrence of a disaster, is explained.

FIG. 136 is a figure showing an example of list data of terminals of connection destinations of the end side terminal 160A in the 58th embodiment of the present invention.

This list data is stored in the end side terminal 160A, and the end side terminal 160A refers to this list data, and sends and receives information to and from connection destinations on this list.

As shown in the figure, the end side terminal 150A, on reading the individual information of registered person, creates movement information by use of this read individual information, and sends this created movement information to the "highest priority" aggregation side terminal 150A by priority. If it is not connectable with this aggregation side terminal 150A, then it sends the information to the "next priority" organization side terminal 120A. Further, the end side terminal 160A sends the movement information for backup to the "reflection" building side terminal 110K. At emergency such as occurrence of a disaster, it sends the information to the "emergency" aggregation side terminal 150W.

FIG. 137 is a sequence chart showing the action flow of the authentication system in the 58th embodiment of the present invention. Hereinafter, with reference to the figure, the recovery action of the network by the authentication system, in the case when the network gets down at a disaster, in the present embodiment, is explained.

When a disaster occurs, the end side terminal 110K receives from the authentication system server 10, information to show that the area where the end side terminal 160A as the sending source of movement information at normal operation has been struck (step S6021).

The end side terminal 110K, on receiving this information, recognizes that the end side terminal 160A is in the disaster struck area, and it is in the emergency measurement mode (step S6022).

The end side terminal 110K, on recognizing that it is in the emergency measure mode, sends the movement information stored in its own, to the end side terminal 160A and the system server 10.

If the end side terminal is in operation (step S6023 Yes), it receives the movement information from the building structure side terminal 110K (step S6024), and performs the preparation of individual authentication on the basis of the movement information (step S6025), and confirms the operation conditions of terminal or server of the priority connection destination (step S6026).

When the registered person individual is alive and the individual information of the registered person can be read, the end side terminal 160A authenticates the individual existence authentication in consideration of the movement information received from the building structure side terminal 110K.

On the other hand, when a trouble occurs with the end side terminal 160A, and it cannot receive the movement information from the building structure side terminal 110K (step S6023 No), the building structure side terminal 110K sends the movement information, to the building structure side terminal 110A that manages the unit including the end side terminal 160A instead (step S6028).

Further, in the case when a trouble occurs with the building structure side terminal 110A and it cannot receive the movement information (step S6027 No), sends the movement information to the aggregation side terminal 150A instead (step S6032), and furthermore, in the case when the aggregation side terminal 150A cannot receive the information (step S6031 No), it sends the movement information to the area side terminal 130A that totally manages the area (step S6036).

(5) Disaster Victim Database

Further, at occurrence of such a disaster, the authentication system may emergently creates a database of people expected to exist in a certain area (hereinafter, referred to as disaster victim database), and use it for confirming the safety thereof.

This disaster victim database is created, for example, as shown below.

The authentication system server 10 or the area management side terminal 130 or the like estimate the registered person corresponding to the movement information sent in a certain time just before in the struck certain area as a disaster victim in the area, and extracts the movement information in its own and other terminals (above reflection terminal and connectable terminal in the struck area and the like), and creates the disaster victim database on the basis of the individual identification ID of the registered person.

Further, the authentication system server 10 or the area management side terminal 130 or the like may extract personal name, individual identification ID and the like of the registered person whose existence is estimated in the struck area, from any information such as basic resident register, student register, employee list, passenger list or electronic medical record information and the like stored in its own or the backup server 300 and the like, and create the database.

Meanwhile, with regard to the creation of this disaster victim database, it is preferable that as prior operation rule, a database of people who are supposed to exist in a certain area is created, in the case of emergency.

The authentication system prepares this disaster victim database, and thereby the information that the end side terminal 160B sends arrives via the network to the authentication system server 10 and the like, and it is possible to easily confirm the safety of registered person individual.

This disaster victim database has two functions.

The first is safety confirmation materials, and the authentication system server 10 and the like, at every time of receiving information to specify a person from the struck area, delete data of the person related to the received information, on the disaster victim database. Thereby, only people whose safety is not confirmed yet are left in the list of the database, and it is possible for related members to easily perform search activities for those whose safety is not confirmed.

Further, the second is current position display function, and the authentication system server 10 and the like, at every time of receiving information to specify a person from the struck area, register position information and time (clock time) information related to the received information into the disaster victim database, and end it to terminal and the like that access this database and display it per individual. For example, in the case of hospital and large building having self power generator, part of terminals may be recovered at early stage. Therefore, those who want to tell its survival to families and friends visit hospital and the like in the course toward evacuation center and home and the like, and then, make the end side terminal 160 installed in the hospital and the like read individual identification ID and individual information, and send movement information via the network to the authentication system server 10 and the like, and can register the effect that they are alive into the disaster victim database.

Furthermore, by use of the second function, the number of people existing in a certain area may be estimated or grasped, and be used for measures of sending necessary goods and examining rescue methods and the like.

At the same time, it is preferable that as a sub function, fund settlement function is expanded and registered. It is supposed that when a disaster victim purchases necessary food and equipment, he or she may have lost money, and financial organizations may be closed. Therefore, in the case when fund settlement is necessary, in addition to the basic information such as the individual identification ID of registered person, authentication time, the position information of the end side terminal 160, money amount is added, and thereby it is possible for the disaster victim to purchase goods and use services temporarily on credit sales manner.

The purchaser reads individual information by terminal at shop and the like, and sends information to show that he or she wants fund settlement and the money amount to the database, thereby the database may add the money amount concerned to the registered person individual identification ID and register the settlement information.

(Summary of 58th Embodiment)

Thus, in the present embodiment, even when part of the network is disconnected due to a disaster or the like, and terminals are faulty, respective terminals search for connectable terminals and servers and connect them, and automatically form a network, and accordingly, even in emergency, it is possible to provide authentication service and the like by the authentication system as much as possible, effectively for lifesaving and the like.

Summary of Embodiments

Meanwhile, each terminal in the authentication system may be equipped or loaded with a sensor that can grasp infrared ray, temperature, humidity, illuminance, human body, sound, radio wave condition, electric power condition, acceleration, distortion, vibration, magnetism and the like.

Further, the search information comprehensive DBs 16, 116, 126, 136, 146, 156, 166 accumulate the minimum of individual information of people scheduled to use each terminal, and may be used as information for emergency authentication system operation at emergency of natural disasters and power failure and the like.

Furthermore, in the above embodiments, various information in all the databases is associated with the individual identification ID peculiar to registered person and stored. In concrete, databases used in this authentication system necessarily store this individual identification ID.

It is preferable that each terminal or server, in sending the history information of registered person individual to other terminal and server, sends it automatically with addition of the individual identification ID.

Moreover, as the information to identify registered person individual, besides the above (temporary) individual identification ID, there is registered person identification information.

For example, this registered person identification information is biometrics information of registered person individual, and electronic information peculiar to registered person, and is stored into an electronic recording medium and the like that registered person owns. One or more registered person identification information is registered per registered person individual in the authentication system.

In the case of use in Japan, the individual identification ID peculiar to registered person may be issued on the basis of the basic resident register notification number (indicating residence certificate code). As this individual identification ID, there are a case where the notification number is used as it is, and another case where it is converted into other digital information by a certain calculation method or random number and then used. Meanwhile, in execution, as sub means, numbers popular to the nation such as passport number and driver's license number and basic resident register card number may be used as individual identification ID.

In the case of use overseas, the peculiar number that can unifiedly encompass the nation of a country such as tax payer number, passport number, resident number and the like may be used as individual identification ID.

Further, the passport number that an individual owns may be converted into other digital information by a certain calculation method or random number, on the basis of number or character of passport issuing government organ code, gender code, date of individual birth and the like.

In particular, the passport may become the common identification certificate all over the world, and accordingly, it is possible to easily allot a common individual identification ID all over the world.

For example, in the case where the number of identification certificate in Japan is not given yet like a foreigner who wants to enter Japan, it is possible to easily allot an individual identification ID on the basis of this passport number.

Furthermore, data to be stored in the authentication system may be repeated in plural devices.

FIG. 119 is an image figure showing the information amounts of the comprehensive DBs 11, 111, 121, 131, 141, 151, 161 as the embodiment of the present invention. In the comprehensive DB 11, all the data concerning registered person is stored. On the other hand, in the comprehensive DBs 111, 121, 131, 141, 151, 161, data to be expected to be used therein is mainly stored, and the history information existing in the respective comprehensive DBs may have repeated portions.

Therefore, when the individual information amount of registered person individual that the comprehensive DB 11 is mad as 100, the total amount of individual information existing in the terminals 111, 121, 131, 141, 151, 161 may exceed 100. For example, basic information such as name and address and date of birth and the like are stored in duplicate in terminals, and used therein, and accordingly it exists in duplicate in data of this authentication system.

In the same manner, in each terminal too, the total sum of the individual information amount of registered person individual of lower level terminal connected to the terminal may not necessarily match the individual information amount of registered person individual that upper level terminal holds.

(Communications of Terminal Reading, Method, Data Conversion Method)

At present, various manufactures and university institutes all over the world develop and manufacture biometrics readers, and the technical methods that they insist such as terminal reading methods, data conversion methods, calculation methods of consistency and "threshold value" and the like vary widely.

Each technology has featured peculiar thereto, but there is no consideration about mutual elasticity, and it is not considered to be infrastructure of the entire society. For example, in the case when two biometrics readers are used with an identical finger print, if the reading methods differ in respective scanners, the fingerprint data read by these cannot be used as continuity of validation and reinforced proof.

Then, even if so many biometrics readers are installed in the world, just each process is complete, but they does not contribute to convenience of the whole society and registered person individual.

In the present embodiment, terminals and servers, when authenticated, send only the above movement information to normally operate the authentication system. That is, in the present embodiment, the collation of read data is carried out by the device that reads the data, thereafter, the movement information including facts authenticated is sent and received in the authentication system. Therefore, the data reading methods of the devices structuring the authentication system of the present embodiment may be different mutually.

Accordingly, manufacturers of readers of the end side terminal 160 and the like can carry out a highly free development and manufacture of their readers, so long as they observe the minimum specification restriction that "to send movement information when authenticated", and can reduce the burdens in their development and manufacture stages.

Meanwhile, data of read biometrics information and the like is stored in the readers concerned.

Further, terminals and servers may store names of manufactures and research institutes that develop and manufacture the terminals and lower level terminals that the terminals and servers manage, terminal identification IDs of terminals used by the manufacturers and research institutes and made as contact destinations to these manufacturers, peculiar IDs showing reading methods and data conversion methods and peculiar manufacture type numbers and the like of applicable devices.

For example, the aggregation side terminal 150 has a database listing all the functions of lower level terminals that its own manages. Thereby, when terminals and servers can authenticate mutual read information, in validating coidentity of registered information registered in terminals and servers, it is possible to extract information easily.

Further, thus, in database, functions of terminal that its own manages are managed, thereby it is possible to validate the rates and frequencies of devices used in the entire authentication system, and use them for future spread policy.

Furthermore, error rates and failure frequencies and the like of terminals and servers can be accumulated, and accordingly, they can be used for improvements and new technology developments.

Moreover, with regard to terminals, the reading, function of individual information of biometrics information and the like stored in the end side terminal 160 and the real or false judgment function of evidential materials may be installed in other terminals in the same manner.

Further, the end side terminal 160 may be a cell phone, a portable terminal, a ubiquitous communicator, an IC card, and an electronic recording medium, and may be installed in household electric appliances and the like. Meanwhile, this end side terminal 160 may be one owned or occupied by registered person individual, or may be leased from management side and the like of the authentication system to registered person.

Furthermore, in the authentication system in the above embodiments, registered person makes the end side terminal 160 and the like read its own biometrics information and thereby performs authentication, meanwhile, electronic information of characters, numbers or codes and the like, or combinations thereof may be input directly to the end side terminal 160 and the like through keys, or information recording media where these electronic information is written may be read, and thereby authentication may be performed.

Terminals and servers in the above authentication system are realized by a program loaded mainly onto a CPU and memories. However, this device or server may be structured by combination of other optional hardware and software, and the high design free degree thereof may be easily understood by those skilled in the art.

Moreover, in the case when the above terminals and servers are structured as software modules, this program may be recorded into an optical recording medium, a magnetic recording medium, an optical magnetic recording medium, or a recording medium such as a semiconductor and the like, and may be loaded from the above recording media, or may be loaded from an external device connected via a specified network.

Meanwhile, the above embodiments are just preferred examples of the present invention, and the embodiments of the present invention are not limited thereto, but the present invention may be embodied by appropriately modifying the structural components thereof without departing from the spirit or essential characteristics thereof.

BRIEF DESCRIPTION OF DRAWINGS

FIG. 5 is a figure showing an example of information stored in the own spatial information DB and the related spatial information DB in the building structure side terminal.

FIG. 6 is a figure showing an image where in the embodiment of the present invention, the building structure side terminal 110 and the end side terminal 160 are installed in a building structure.

FIG. 7 is a figure showing an example of installation purposes and concrete action of each terminal as the embodiment of the present invention.

FIG. 8 is a figure showing an example of the setting method of terminal identification ID in the embodiment of the present invention, and (a) shows the setting method when to show details of the terminal identification ID, and (b) shows the setting method when to show the terminal identification ID briefly.

FIG. 9 is a figure showing examples of respective basic information stored in the above respective terminals, and in (a) to (c), their concrete examples are shown.

FIG. 12 is a figure showing an example of information stored in the availability information DB as the embodiment of the present invention.

FIG. 13 is a figure showing a data structure example in comprehensive DB in the embodiment of the present invention.

FIG. 17 (a) is a figure showing a structure example where end side terminals are connected in parallel at the lower level of the building structure side terminal, and FIG. 17 (b) is a figure showing a data structure example of the search information DB that the building structure side terminal manages in this structure example.

FIG. 27 is a figure showing a calculation example of the basic point by the equation 2.

FIG. 28 is a figure showing the calculation method of the trust evaluation consideration point.

FIG. 29 is a figure showing a calculation example of the trust evaluation consideration point by the equation 3.

FIG. 30 is a figure showing a calculation example of the equation 4.

FIG. 31 is a figure showing an example of collation between the existence rate and the authentication system use functions in the first embodiment of the present invention.

FIG. 32 is a figure showing an example of combinations of existence rate and individual identification ID, in the first embodiment of the present invention.

FIG. 48 is a sequence chart showing an action example where individual information stored in the authentication system server 10 is transferred alternately or separately to three external organization servers in a sixteenth embodiment of the embodiment.

FIG. 49 is a figure showing terminal of connection objective of the building structure side terminal in a seventeenth embodiment.

FIG. 50 is a sequence chart showing an action example when the building structure side terminal 110C makes connection with other terminal, in the seventeenth embodiment.

FIG. 51 is a figure showing terminals to be connected with the building structure side terminal, in an eighteenth embodiment.

FIG. 57 is an image figure showing the concept that according to the timing of movement of registered person, the use permission (or stop) information of individual information of the registered person moves via terminals around the movement positions.

FIG. 60 (a) is a figure showing a structure example of authentication system in daily activity range of the registered person, according to the present embodiment, and FIG. 60 (b) is a figure showing an installation example of building structure side terminal and end side terminals in the station premises.

FIG. 63 is a figure showing an installation example of authentication systems around home and working place of registered person in the present embodiment.

FIG. 66 is an image figure showing an example of the commutation ticket information of registered person individual.

FIG. 67 is a figure showing an example of a ticket gate database that manages end side terminals installed in the nearest stations of home and working place, and the installation places, and the upper level terminals thereof.

FIG. 70 is a figure showing the connection relation of the building structure side terminal and the aggregation side terminal that manages that, and other aggregation side terminals installed in the building.

FIG. 75 is a figure showing an installation example of terminals and servers where registered person moves by use of movement means such as an airplane and the like.

FIG. 76 is a figure showing an installation example of terminals and servers configuring authentication system when registered person moves by use of movement means such as an airplane and the like.

FIG. 78 is a figure showing an installation example of terminals and servers configuring authentication system when registered person moves by use of movement means such as an airplane and the like.

FIG. 80 is a figure showing an installation example of terminals and servers configuring authentication system when registered person moves by use of movement means such as an airplane and the like.

FIG. 82 is a figure showing an installation example of terminals and servers configuring authentication system when registered person moves by use of movement means such as an airplane and the like.

FIG. 85 is a figure, as an example, showing the use order of aggregation side terminals of units registered person used in the morning on Monday in latest three months.

FIG. 94 is a figure showing a display example of the current position display file.

FIG. 106 is a figure showing an example of contents of this completion notice.

FIG. 109 is a figure showing an example of a list showing in what reading methods, biometrics information is registered.

FIG. 110 is a figure showing an example of this mismatch information registration slip.

FIG. 112 is a figure showing a use limited person registration slip used for managing information of a user to whom the use of the authentication system is limited or stopped.

FIG. 113 is a figure showing use limitation standard table, in the case to limit or stop the use of the present authentication system.

FIG. 121 is a sequence chart showing an action flow of the authentication system in a 50th embodiment of the present invention FIG. 122 is a figure showing the structure of an authentication system according to a modified example of the present embodiment.

FIG. 123 is a figure showing the structure of an authentication system in a 51st embodiment of the present invention.

FIG. 124 is a sequence chart showing an action flow of the authentication system in a 51st embodiment of the present invention.

FIG. 125 is a figure showing the structure of an authentication system according to a modified example of the present embodiment.

FIG. 126 is a figure showing the structure of an authentication system in a 52nd embodiment of the present invention.

FIG. 127 is a figure showing the action flow of an authentication system in a 52nd embodiment of the present invention.

Figure 128:
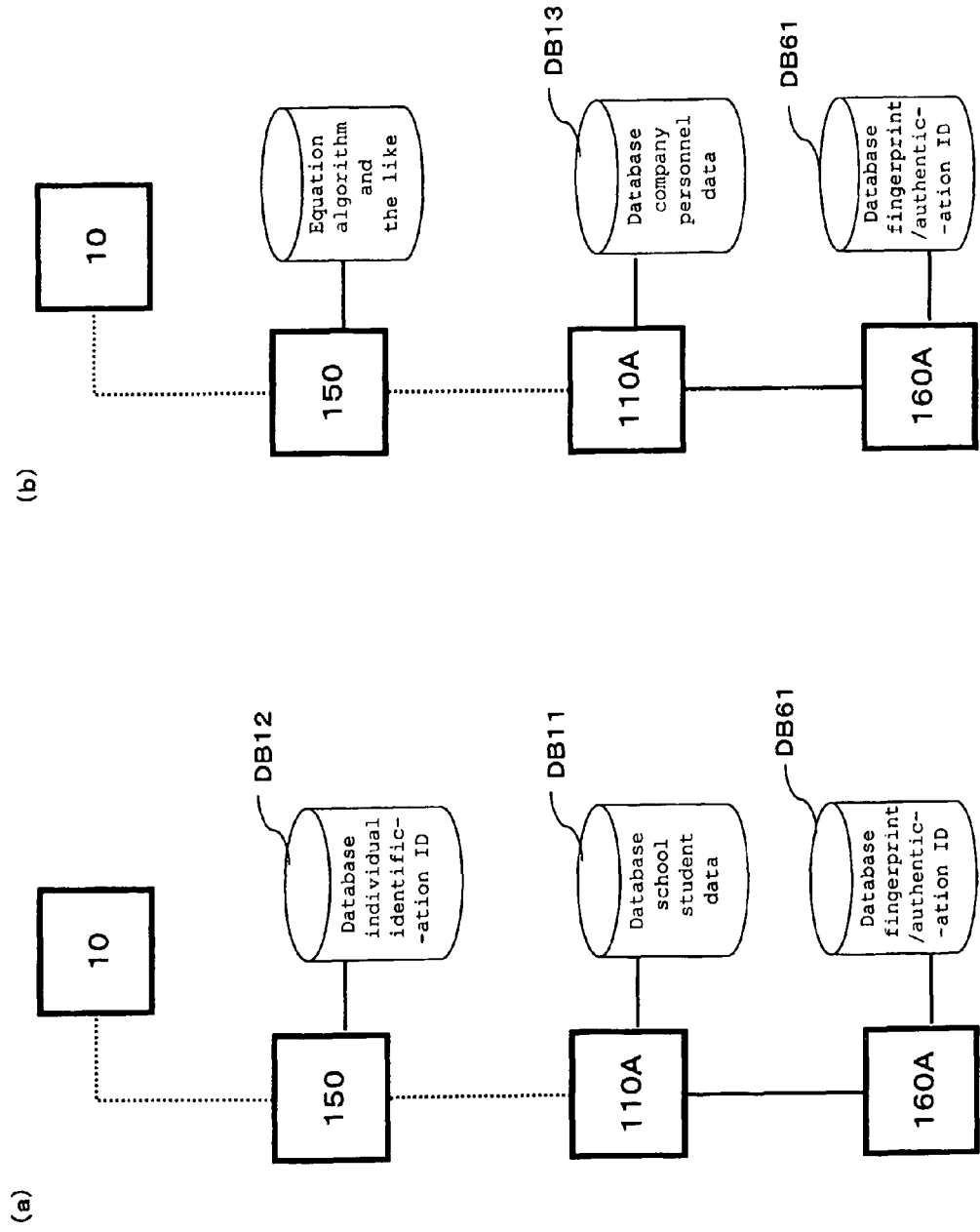

FIG. 128 (a), FIG. 128 (b) are each a figure showing the structure of an authentication system according to a modified example of the present embodiment.

Figure 129:
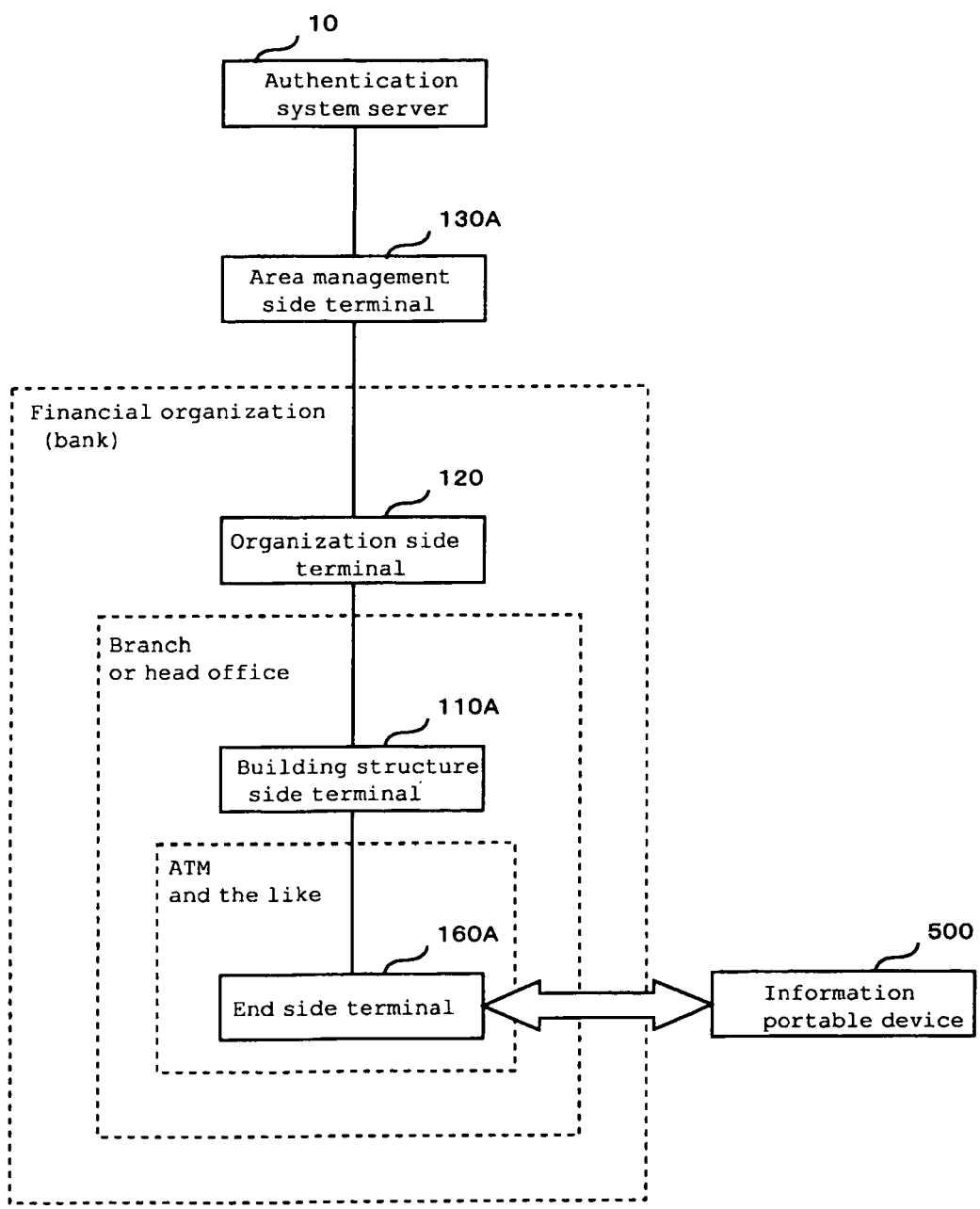

FIG. 129 is a figure showing the structure of an authentication system in a 53rd embodiment of the present invention.

Figure 130:
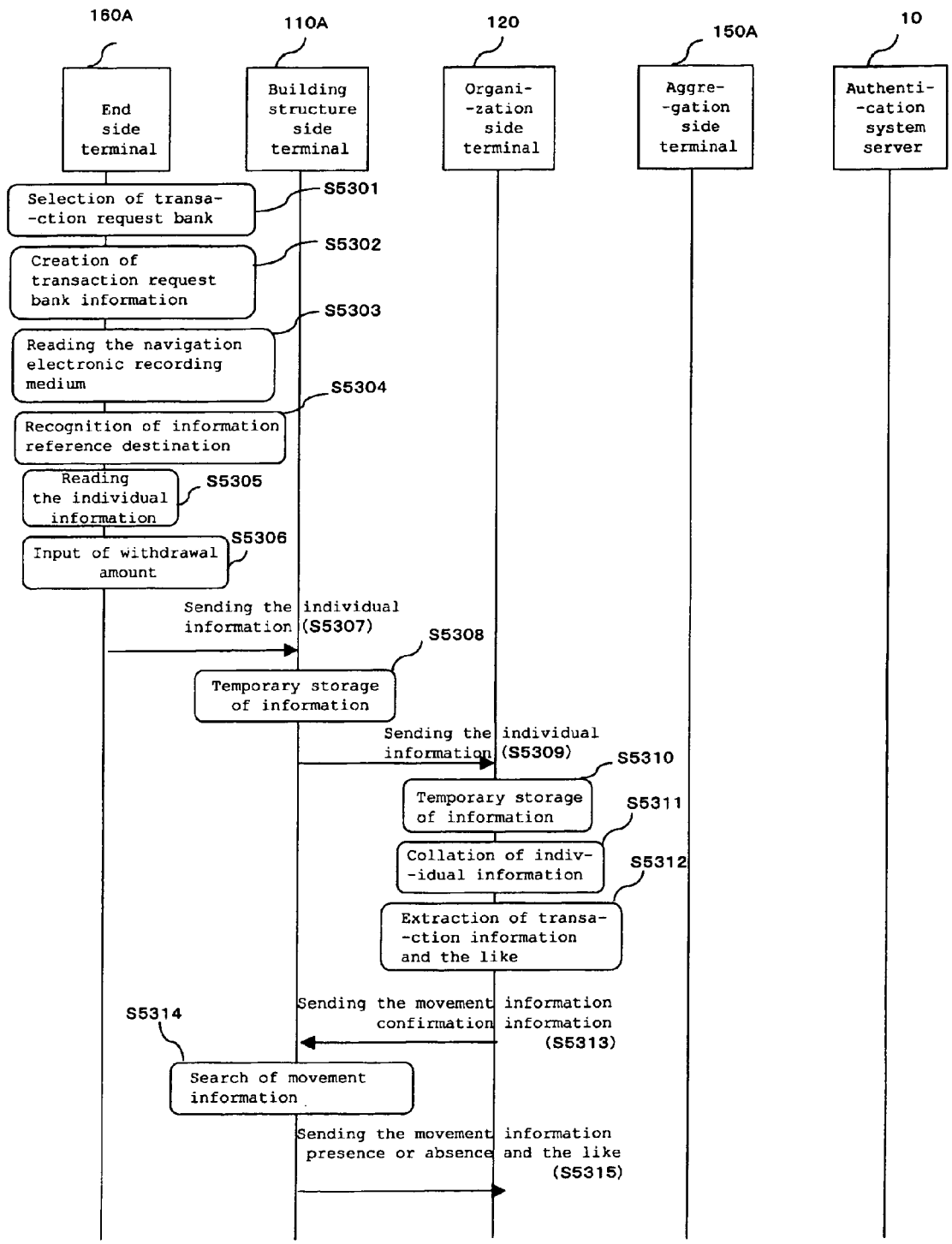

FIG. 130 is a sequence chart showing the action flow of an authentication system in a 53rd embodiment of the present invention.

Figure 131:
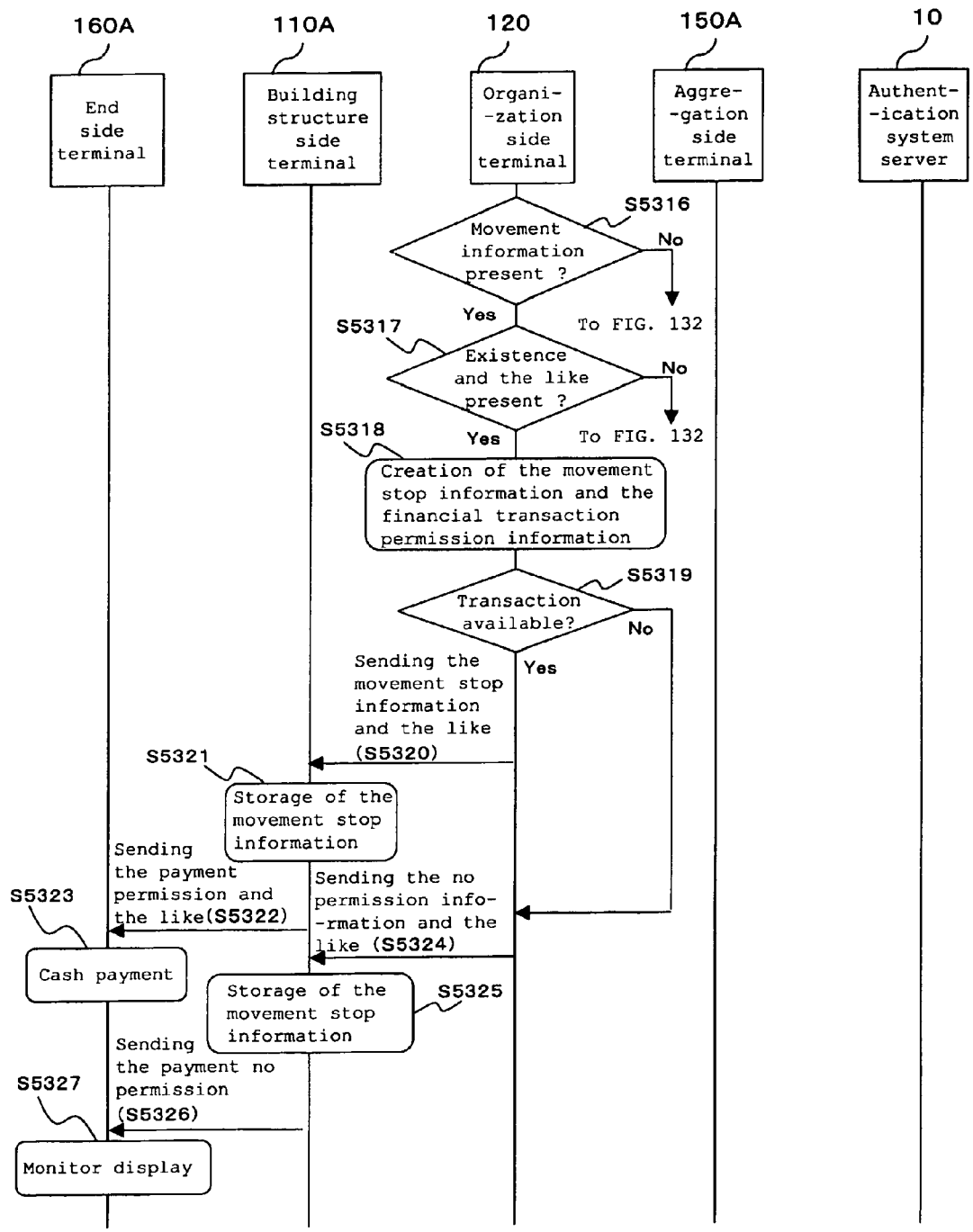

FIG. 131 is a sequence chart showing the action flow of an authentication system in the 53rd embodiment of the present invention.

Figure 132:
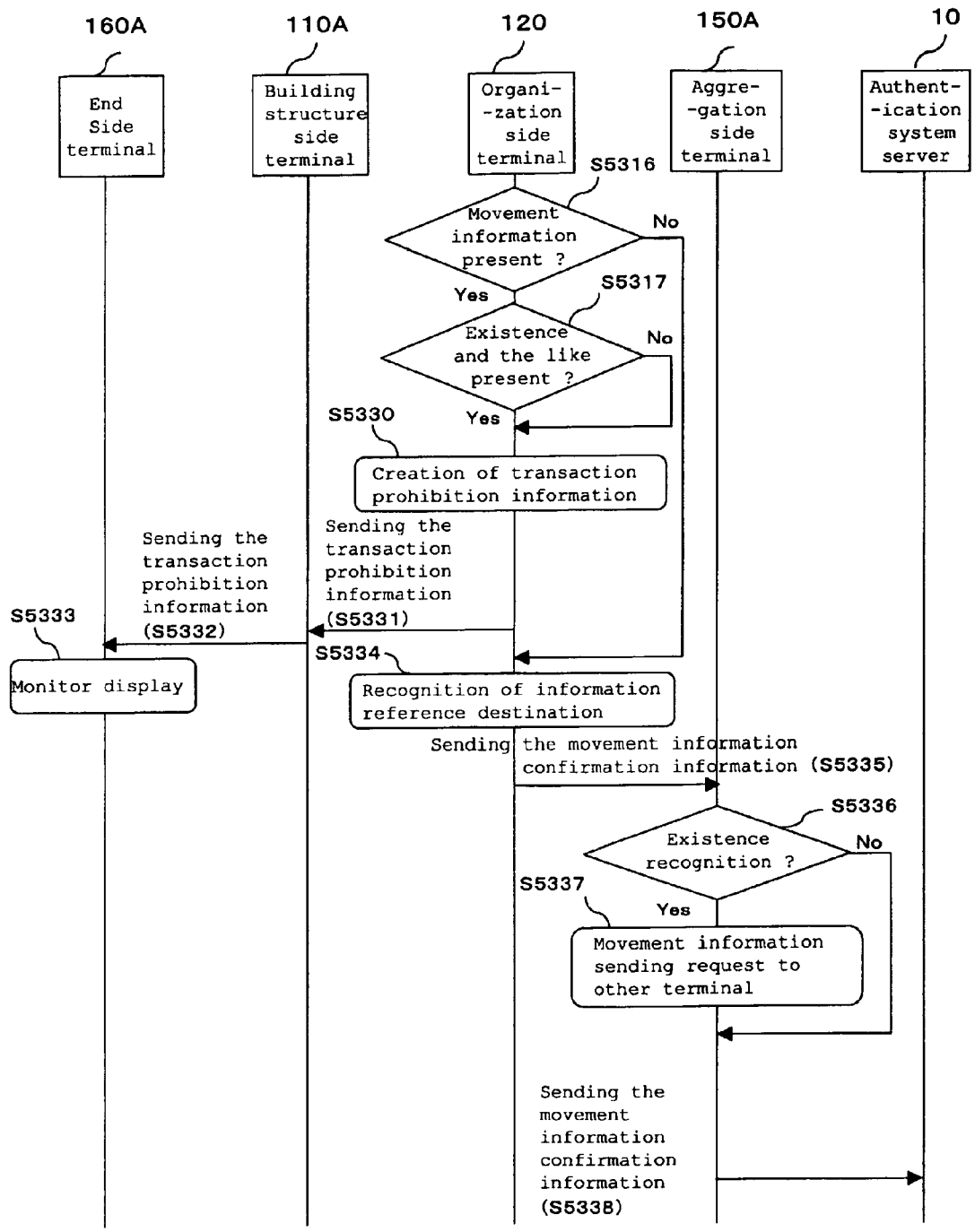

FIG. 132 is a sequence chart showing the action flow of an authentication system in the 53rd embodiment of the present invention.

Figure 133:
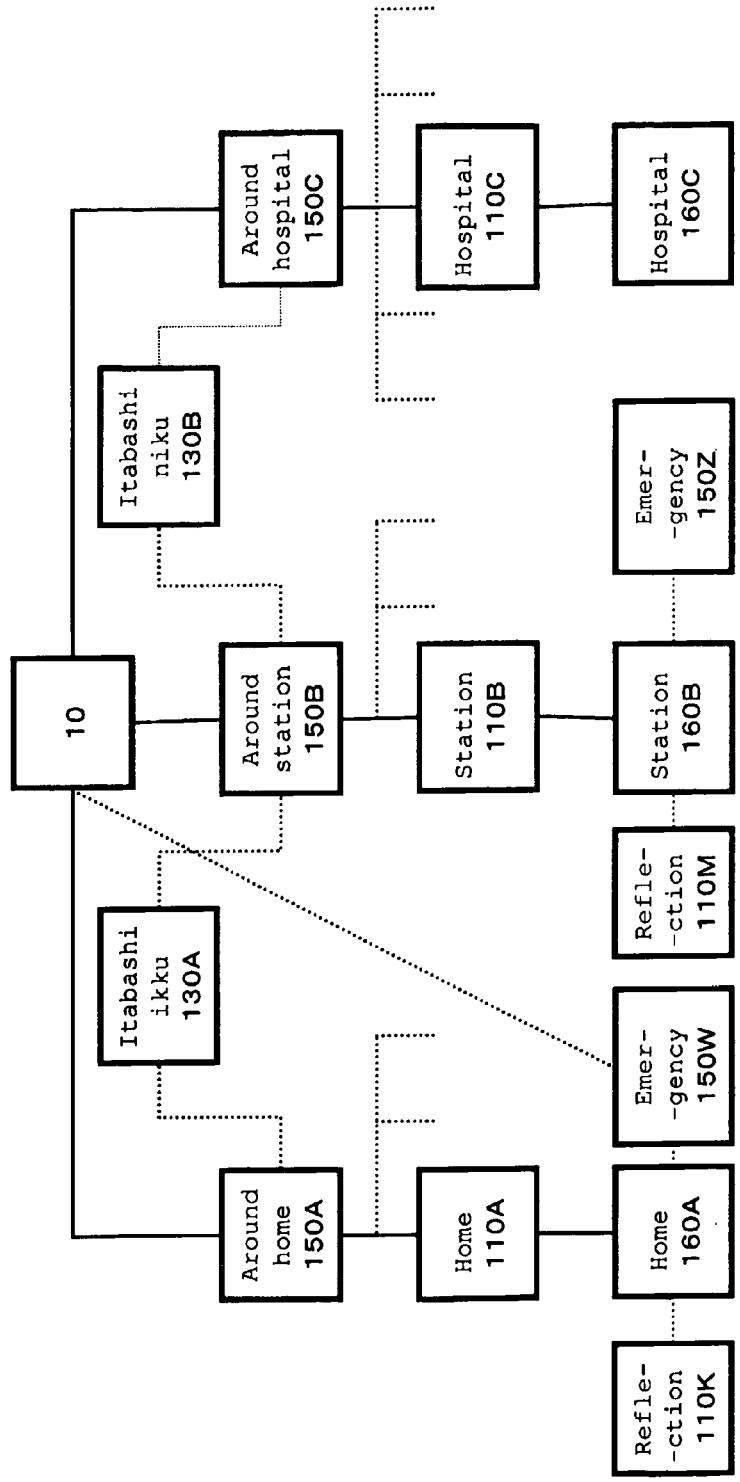

FIG. 133 is a figure showing the structure of the authentication system in a 54th embodiment of the present invention.

Figure 134:
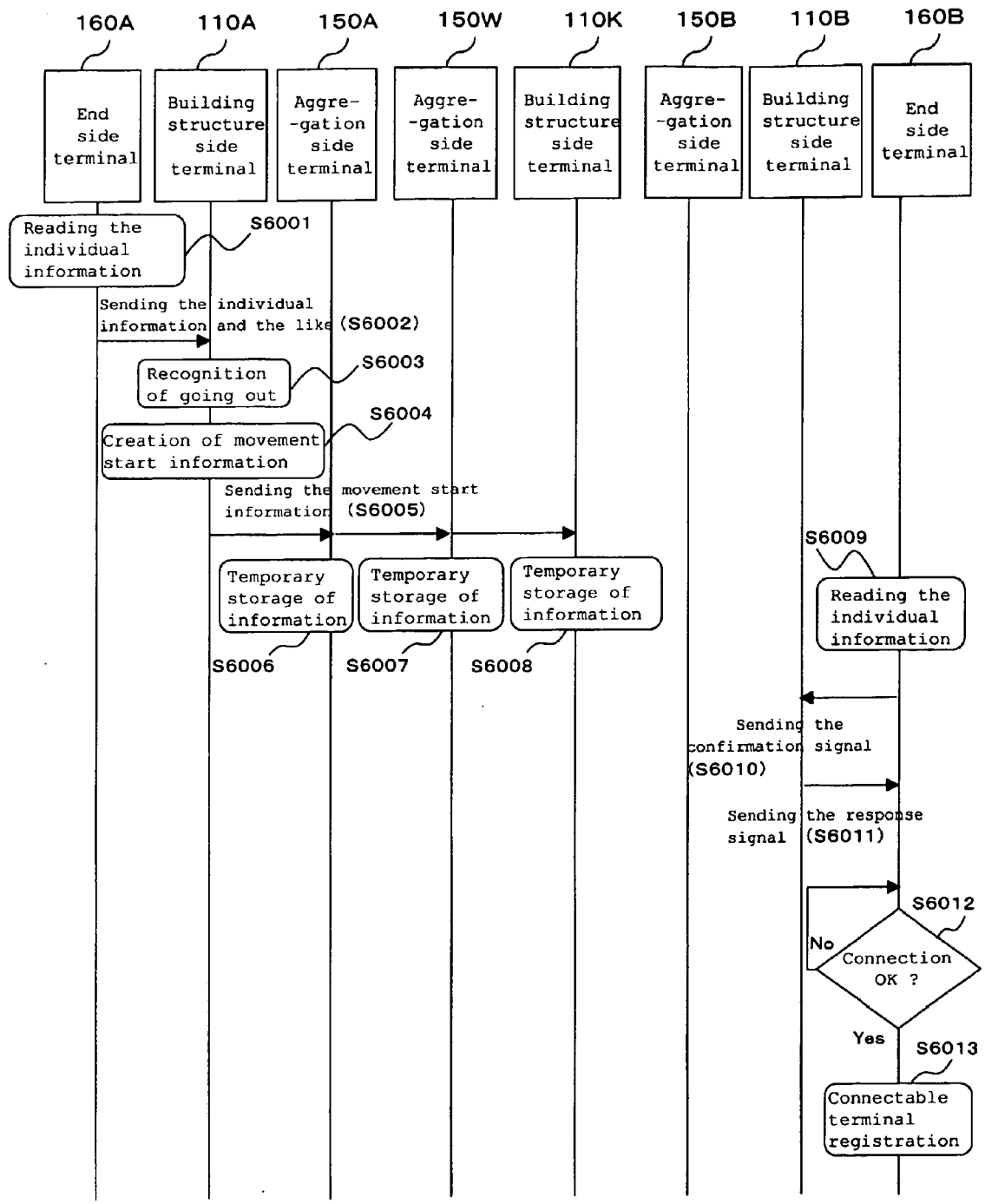

FIG. 134 is a sequence chart showing the action flow of the authentication system in the 54th embodiment of the present invention.

Figure 135:
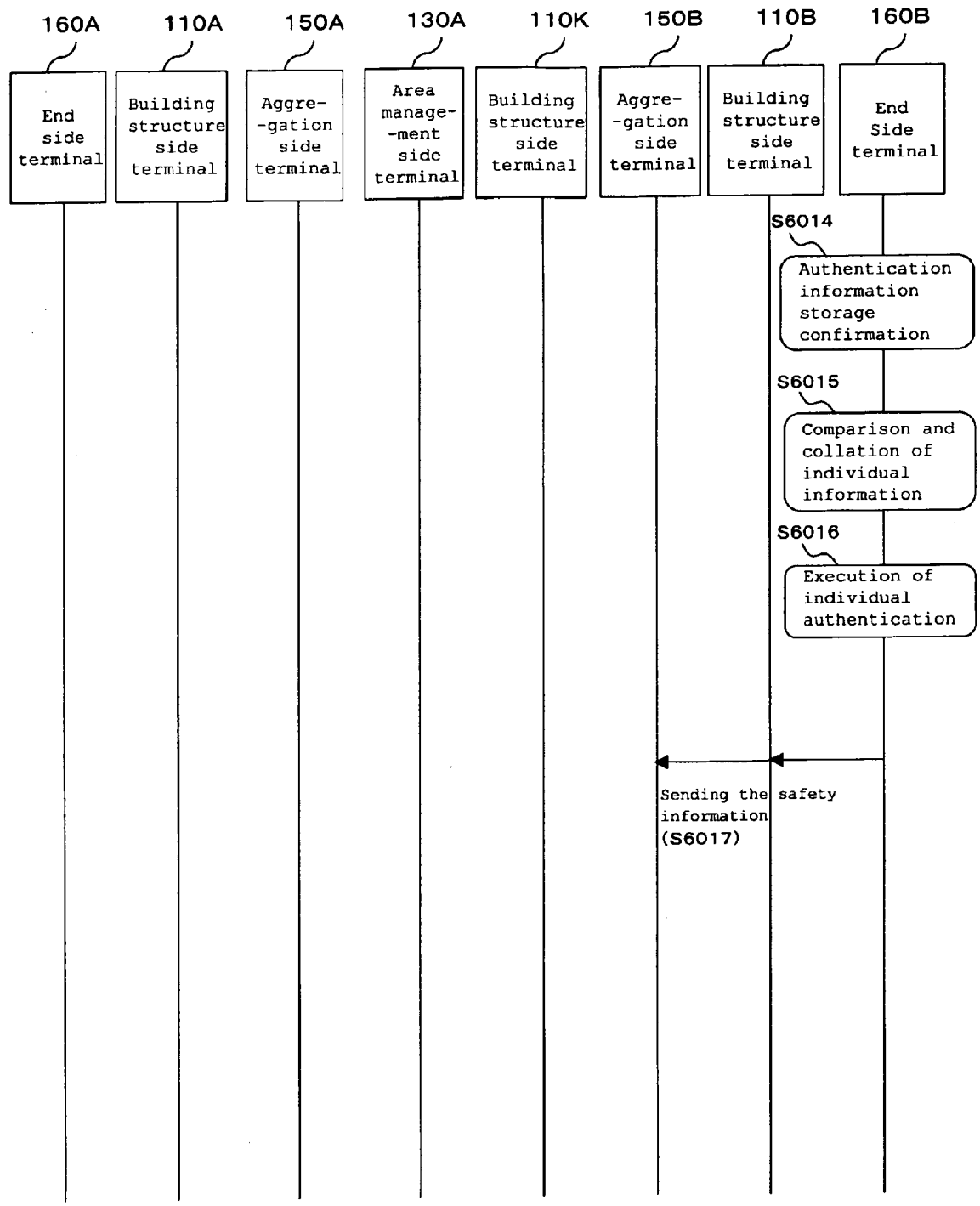

FIG. 135 is a sequence chart showing the action flow of the authentication system in the 54th embodiment of the present invention.

FIG. 136 is a figure showing an example of list data of terminals of connection destinations of the end side terminal in the 54th embodiment of the present invention.

Figure 137:
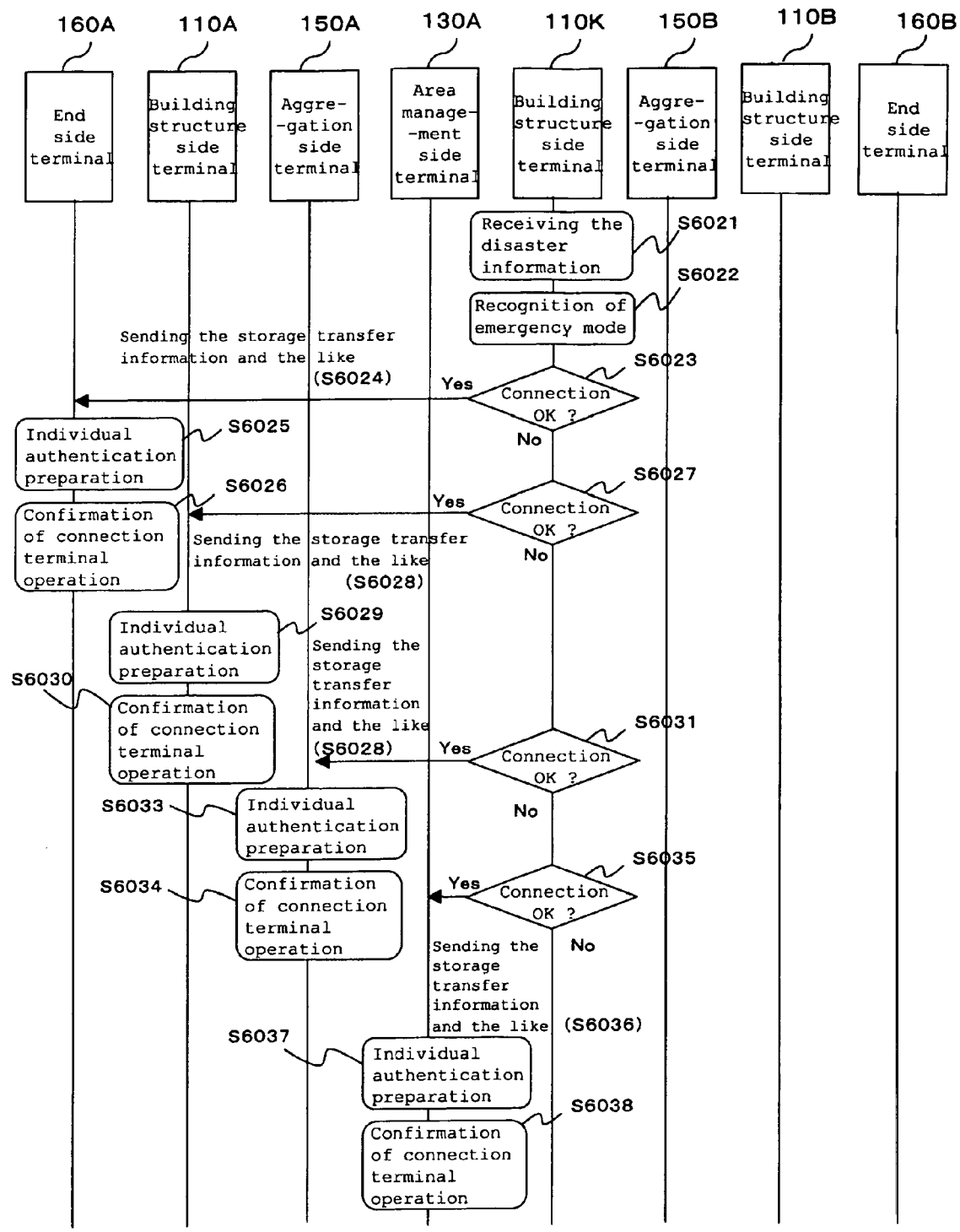

FIG. 137 is a sequence chart showing the action flow of the authentication system in the 54th embodiment of the present invention.

DESCRIPTION OF CODES

Figure 1:
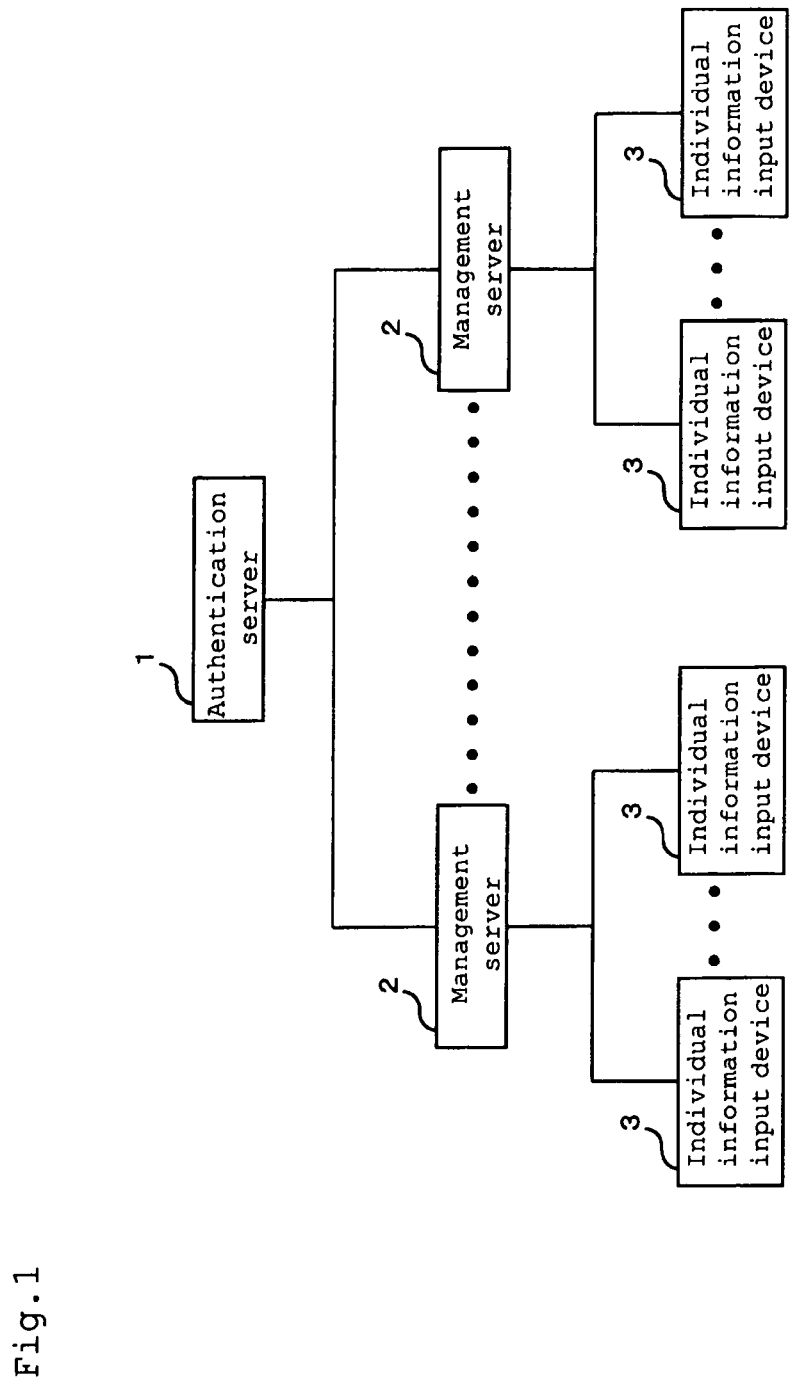
FIG. 1 is a figure showing the basic structural principle of an authentication system according to a embodiment of the present invention.
Figure 2:
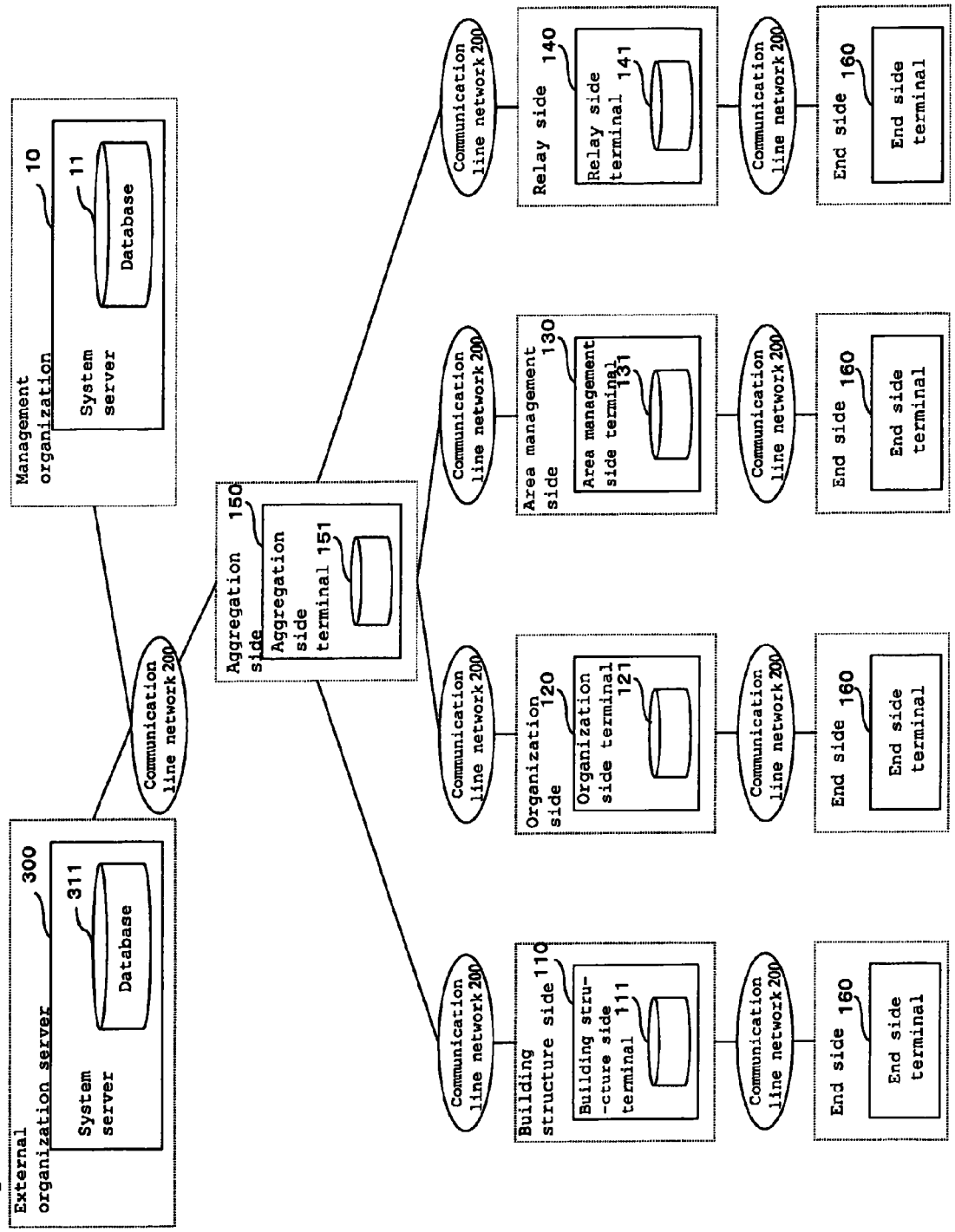
FIG. 2 is a block diagram showing the skeleton framework of the authentication system according to the embodiment of the present invention.
Figure 3:
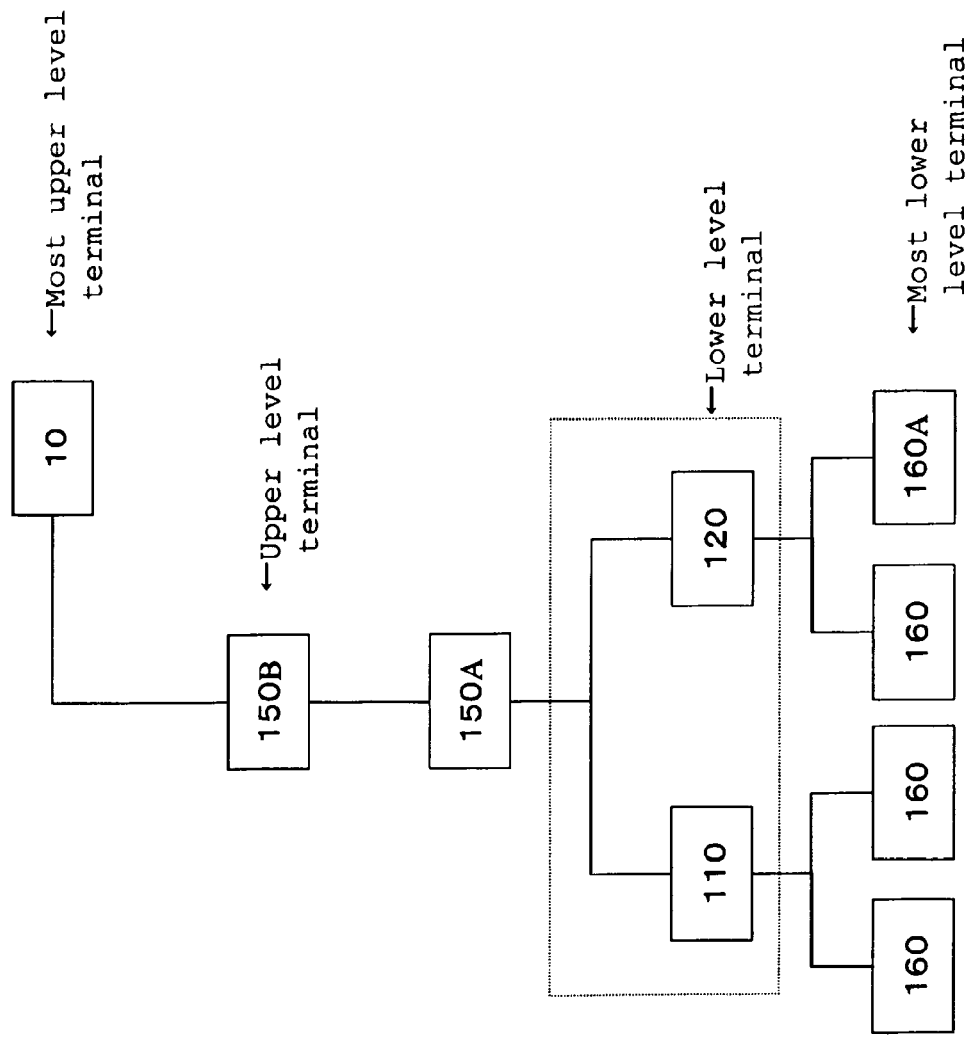
FIG. 3 is a block diagram showing the simplified structure of the authentication system according to the present embodiment.
Figure 4:
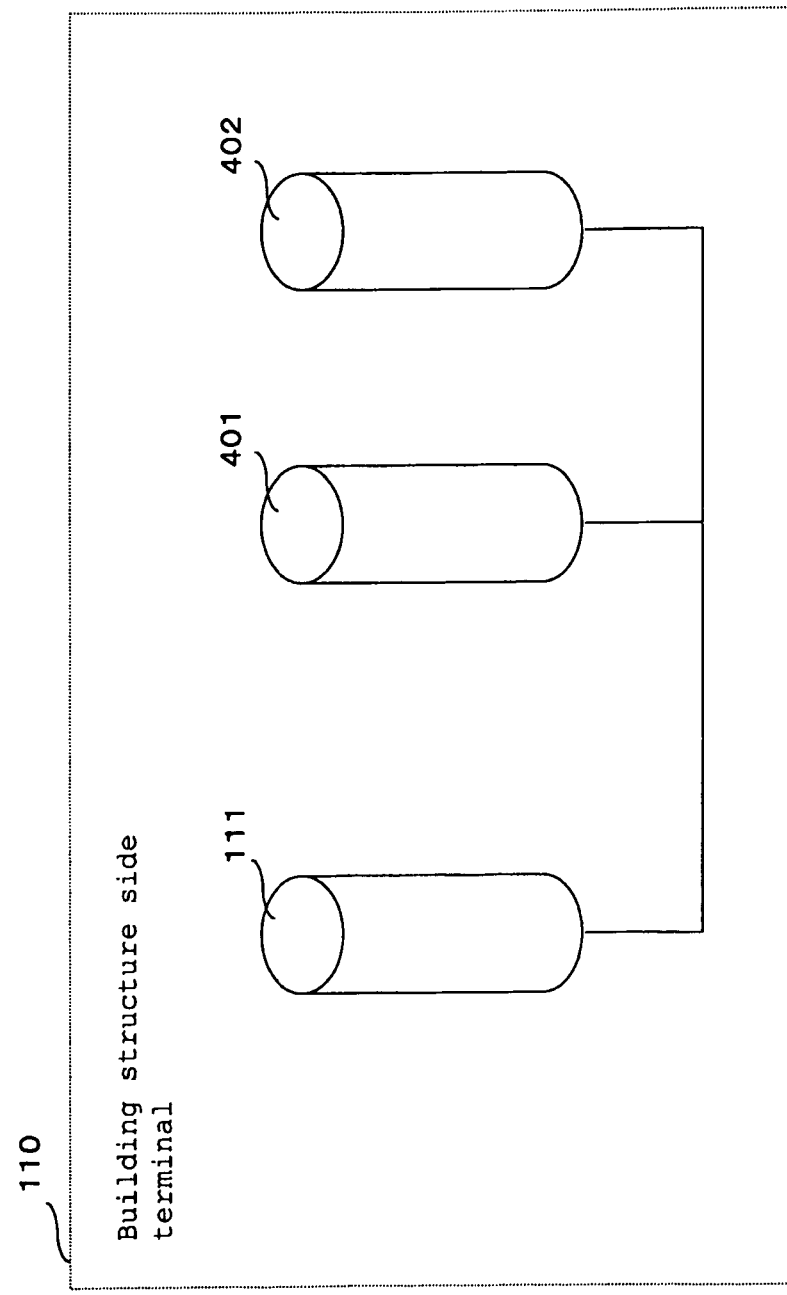
FIG. 4 is a block diagram of skeleton framework showing an example of the database in the building structure terminal
Figure 10:
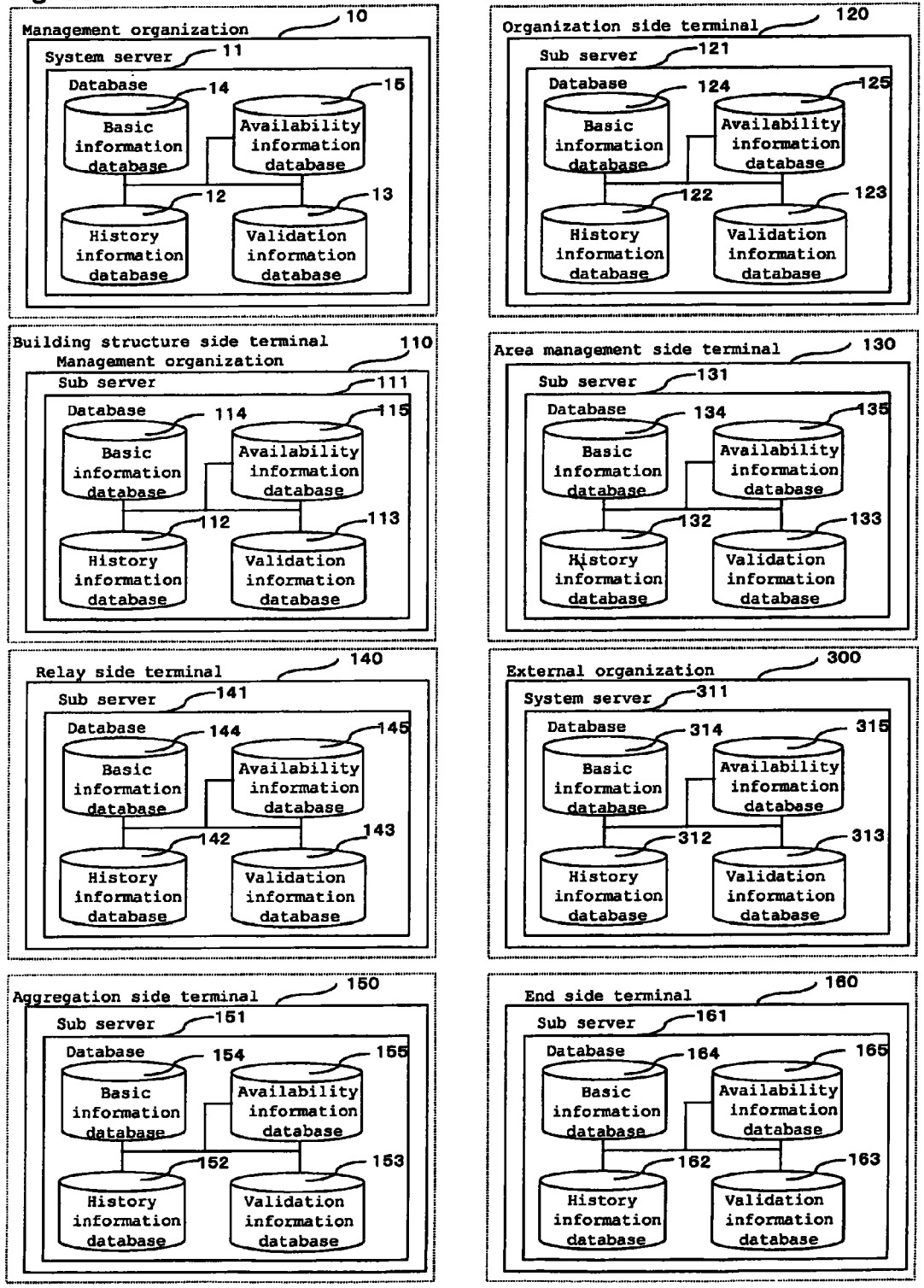
FIG. 10 is a figure showing the structure example of a first database of authentication system according to the embodiment of the present invention.
Figure 11:
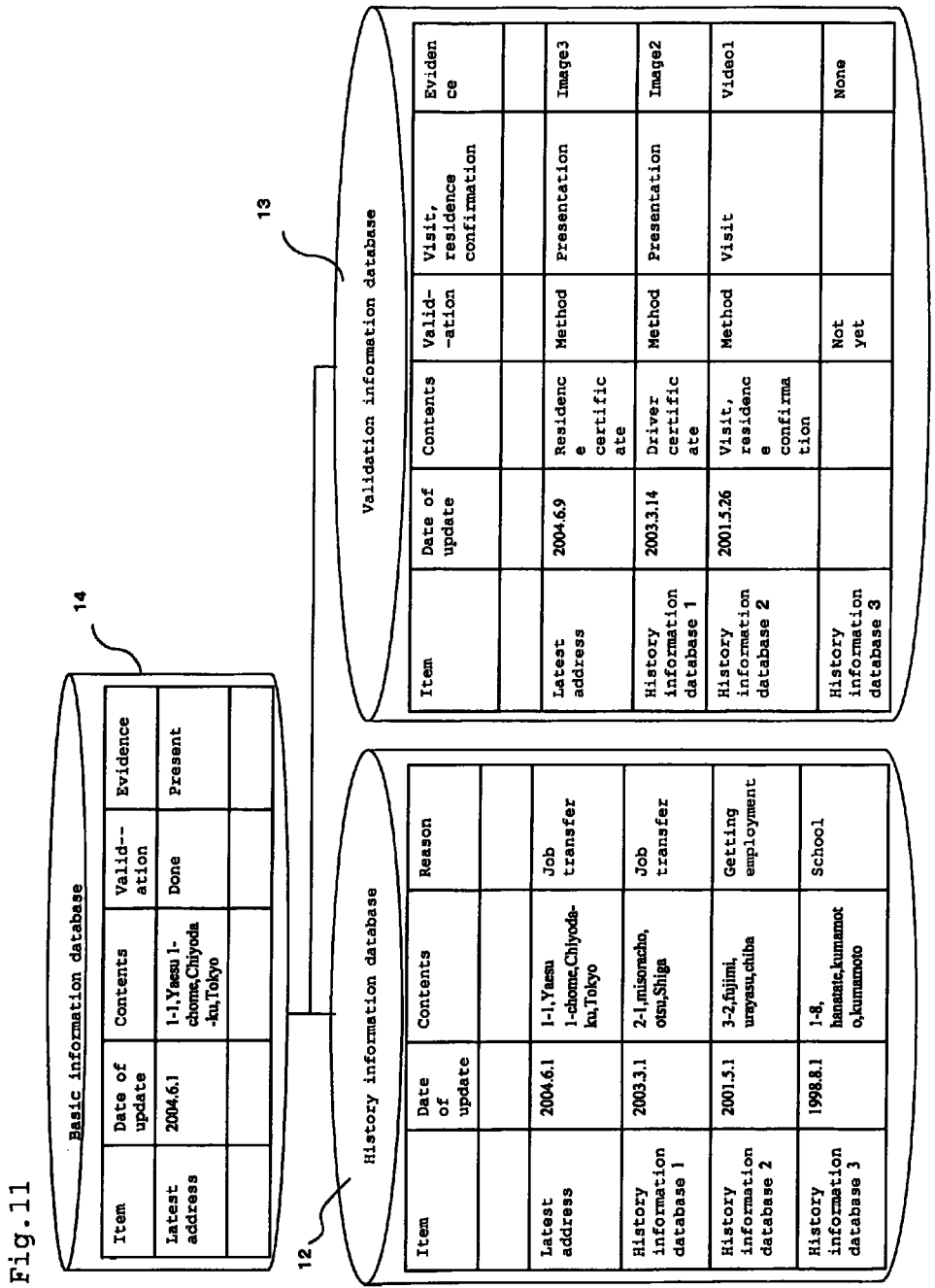
FIG. 11 is a figure showing an example of information installed and stored in the basic information DB.

1 Authentication server
2 Management server
3 Individual information input device
10, 10A, 10B Authentication system server
11, 111, 121, 131, 141, 151, 161, 311 Comprehensive DB
12, 112, 122, 132, 142, 152, 162, 312 History information DB
13, 113, 123, 133, 143, 153, 163, 313 Validation information DB
14, 114, 114a, 114b, 124, 134, 144, 154, 164, 314 Basic information DB
15, 115, 125, 135, 145, 155, 165, 315 Availability information DB 16, 116, 126, 136, 146, 156, 166, 316 Search information DB
17, 117, 127, 137, 147, 157, 167 Temporary storage DB
20 User terminal
30 Browse request side terminal
40 Registration request side terminal
50 Existence judgment request side terminal
60 Existence authentication request side terminal
70 Information rightfulness authentication request side terminal
80 Confirmation destination side terminal
110, 110A to 110Y, HOCK, 110HK, 110WT Building structure side terminal
120, 120E to 120G, 120N, 120CK, 120HK Organization side terminal
130 Area management side terminal
140 Relay side terminal
150, 150A to 150G, 150M, 150AT, 150CK, 150HK Aggregation side terminal
160, 160A to 160H, 160M, 160a to 160d, 160 Cc, 160Dd, 160Ee, 160HK, 160hK, 160HL, 160hL, 160CT, 160DT, 160W1 to 160W13 End side terminal
200 Communication line network
300, 300A to 300C External organization server
401 Own spatial information DB
402 Related spatial information DB
500 Information portable device
DB11, DB12, DB13, DB61 Database
  FIG. 1
1 Authentication server
2 Management server
3 Individual information input device
  FIG. 2
1 External organization server
2 System server
3 Database
4 Management organization
5 Communication line network
6 Aggregation side
7 Aggregation side terminal
8 Building structure side
9 Building structure side terminal
10 Organization side
11 Organization side terminal
12 Area management side
13 Area management side terminal
14 Relay side
15 Relay side terminal
16 End side
17 End side terminal
  FIG. 3
1 Most upper level terminal
2 Upper level terminal
3 Lower level terminal
4 Most lower level terminal
  FIG. 4
1 Building structure side terminal
  FIG. 5
1 Own spatial information database 401
2 Terminal number
3 Date and time of installation
4 Name of installer
5 Longitude
6 Latitude
7 Altitude
8 IHC Co, Ltd.
  Identification ID
9 East longitude
10 150 cm above the ground
11 Apartment 5-story made of reinforced concrete existing in 1-1, 1-chome, Maeno-cho, Itabashi-ku, Tokyo
  Popular name Apartment
12 Related spatial information database 402
13 Terminal
14 Prefecture
15 City
16 Town name
17 Chome
18 Address number
19 Sub address number
20 Terminal kind
21 Peculiar number
22 Elevator
23 Front entrance
24 No. 101 entrance
25 Aggregation type terminal
26 System server
  FIG. 6
1 Example Top view of first floor of home
2 Communication line network
3 Example Enlarged view of entrance door
4 Room inside
5 Outside
6 Door knob
7 Schematic structural view
  FIG. 7
1 Example Installation purposes
2 Principle
3 Exemption 1
4 Purpose and meaning Action
5 Management of home inside
  Authentication of family individual
6 Management of entrance key
  Recognition of entering the home
7 Management of room light
8 Authentication Yes or No
9 Unlocking and locking
10 Room light on
11 Emergency system
12 Power source management
13 Room light off
14 Locking
15 History data storage
16 Existence record
17 Data registration
  FIG. 8
1 Detailed identification ID
2 Terminal Prefecture City Town name Chome Address number Sub address number Terminal kind Peculiar number
3 Home entrance
  Elevator
  Front entrance
4 Simple identification ID
  FIG. 9
1 Terminal installation Position information display Example 1
2 Terminal number Date and time of installation Name of installer Longitude Latitude Altitude
3 IHC Co, Ltd.
  Identification ID
4 150 cm above the ground 5 Apartment 5-story made of reinforced concrete existing at 1-1, 1-chome, Maeno-cho, Itabashi-ku, Tokyo
  Popular name Apartment First floor
  Front entrance door Road side knob
6 JR Higashi-nihon Kanto Branch
7 Automatic ticket gate No. 7, Marunouchi Chuoguchi, Tokyo station existing at 1-1, 1-chome, Marunouchi, Chiyoda-ku, Tokyo
8 Individual authentication organization Identification ID
9 Road side knob, entrance door, first floor, 2-story house made of wood and plaster existing at 25-6, 3-chome, -machi, city, prefecture FIG. 10
1 Management organization
2 System server
3 Database
4 Basic information database
5 Availability information database
6 History information database
7 Validation information database
8 Building structure side terminal
9 Sub server
10 Organization side terminal
11 Area management side terminal
12 Relay side terminal
13 Aggregation side terminal
14 External organization
15 End side terminal FIG. 11
1 Basic information database
2 Item
3 Date of update
4 Contents
5 Validation
6 Evidence
7 Latest address
8 Done
9 Present
10 History information database
11 Reason
12 Job transfer
13 Getting employment
14 School
15 Validation information database
16 Residence certificate
17 Driver certificate
18 Visit, residence confirmation
19 Method
20 Not yet
21 Presentation
  Visit
22 Image 2
  Video 1
  None FIG. 12
1 Example
2 Identification result information Proceeding action
3 Cannot judge
4 Sending the unlocking information of electronic management lock
5 Sending the operation lock alarm information of the end side terminal 160
6 Requesting the action of information reading once again
7 Access to the electronic money management DB
8 Automatic report to the police FIG. 13
1 Basic information database
2 Item Date of update Contents
3 Validation
4 Evidence
5 Latest address
6 Done
7 Present
8 History information database
9 Reason
10 Job transfer
11 Validation information database
12 Method
13 Presentation
14 Image 3

Figure 14:
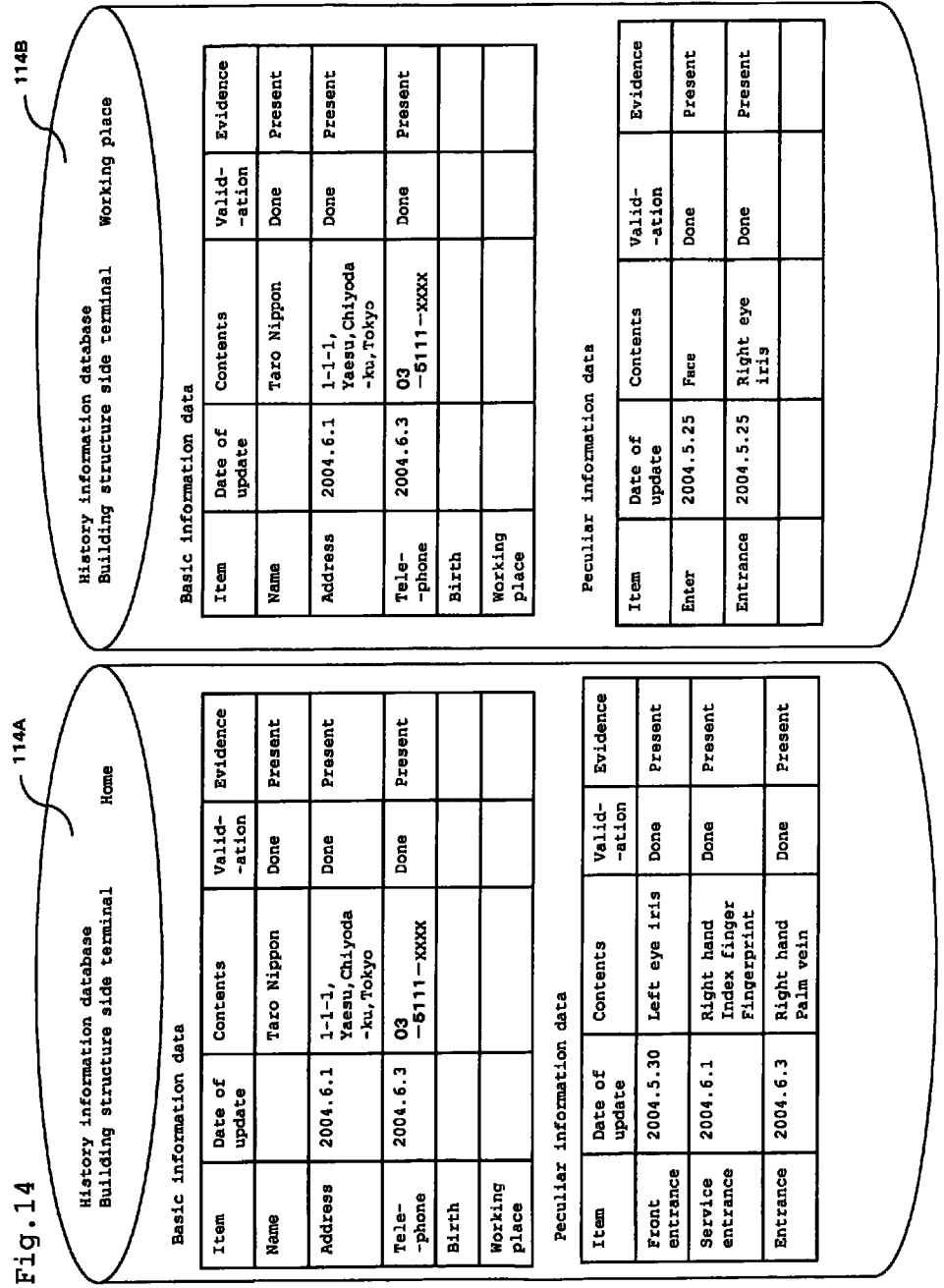
FIG. 14 is a figure showing data structure examples of databases installed in two different terminals according to the embodiment of the present invention.
Figure 15:
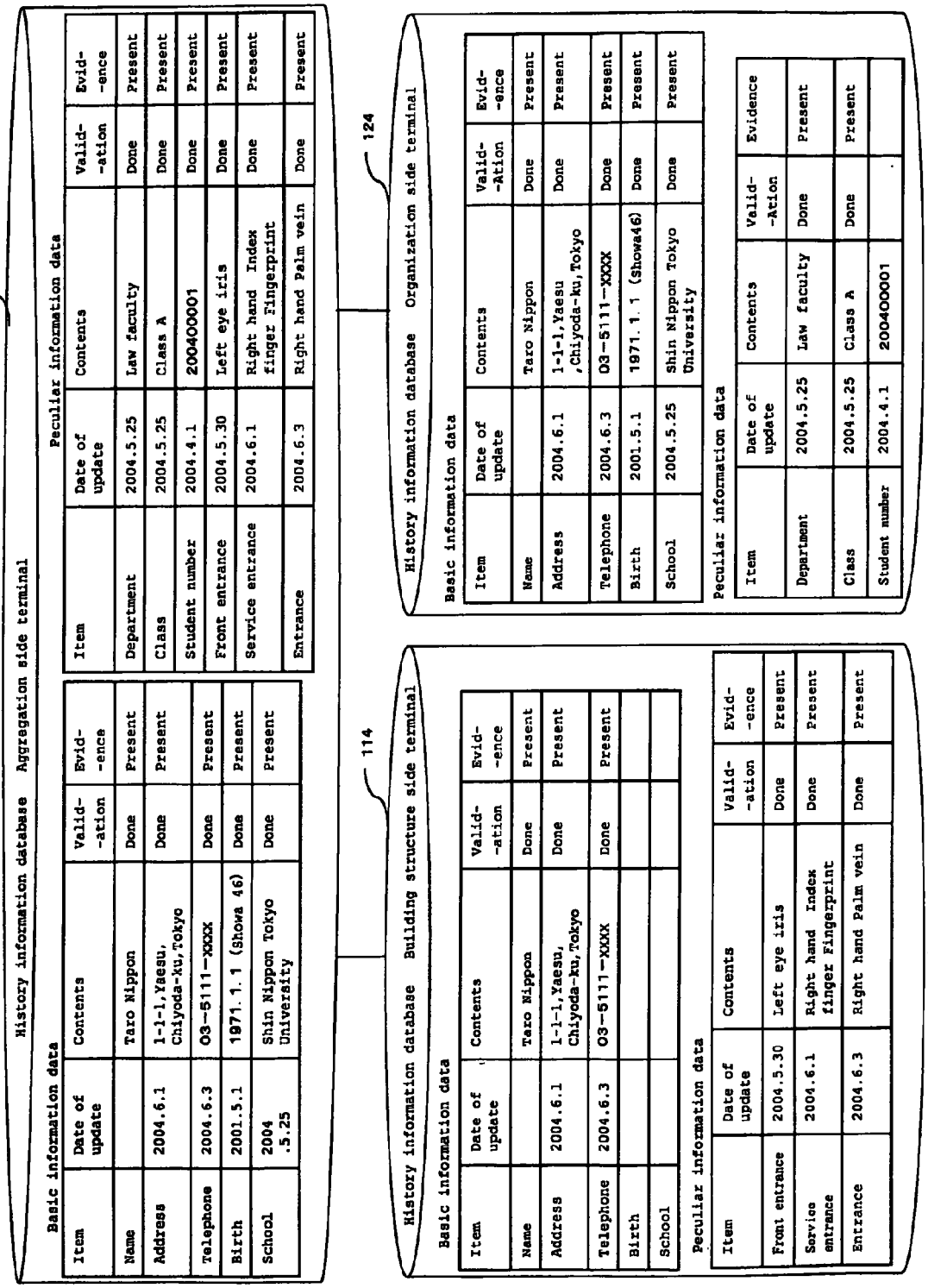
FIG. 15 is a figure showing data structure examples of databases installed in three different terminals according to the embodiment of the present invention.
Figure 16:
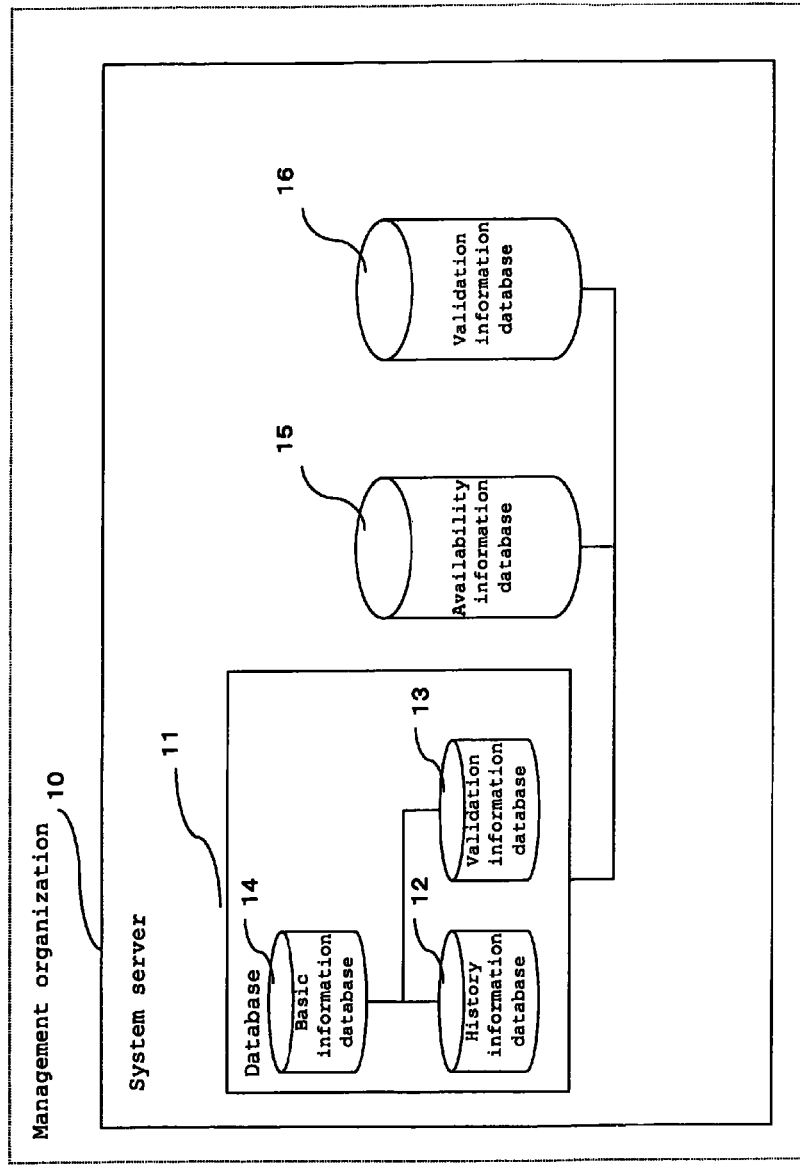
FIG. 16 is a figure showing the structure example of a second database of authentication system according to the embodiment of the present invention.
Figure 18:
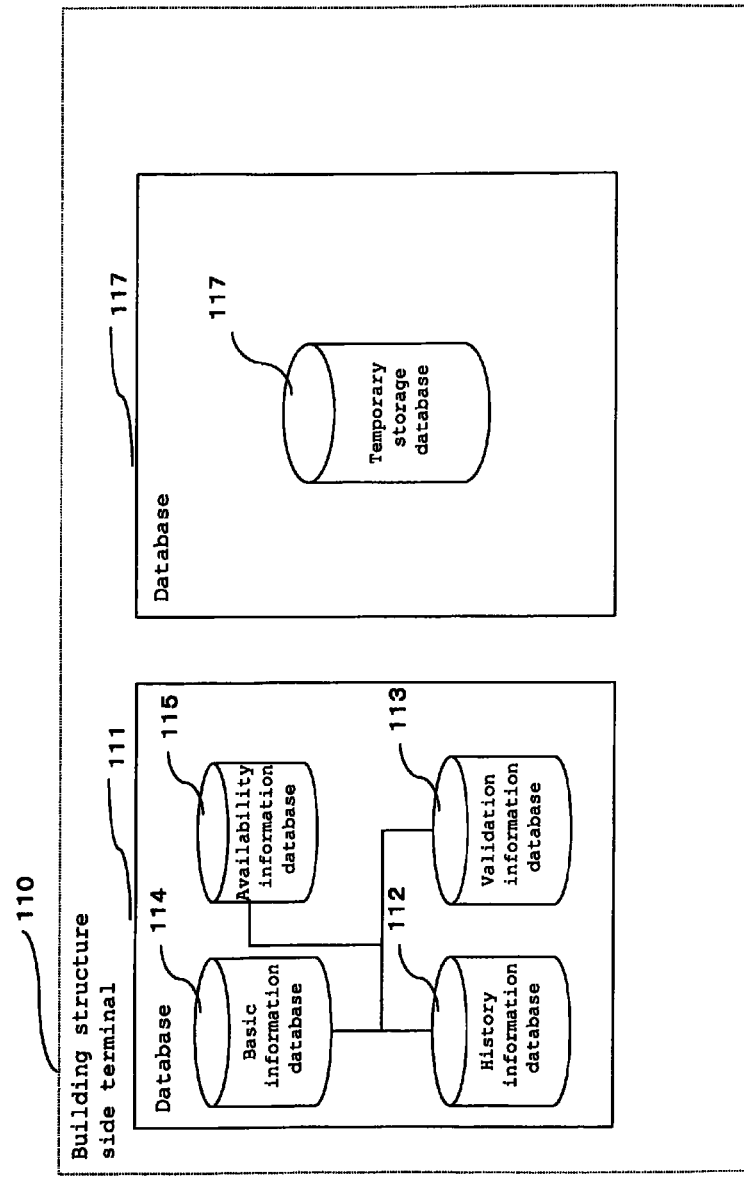
FIG. 18 is a figure showing the structure example of a third database of authentication system according to the embodiment of the present invention.
Figure 19:
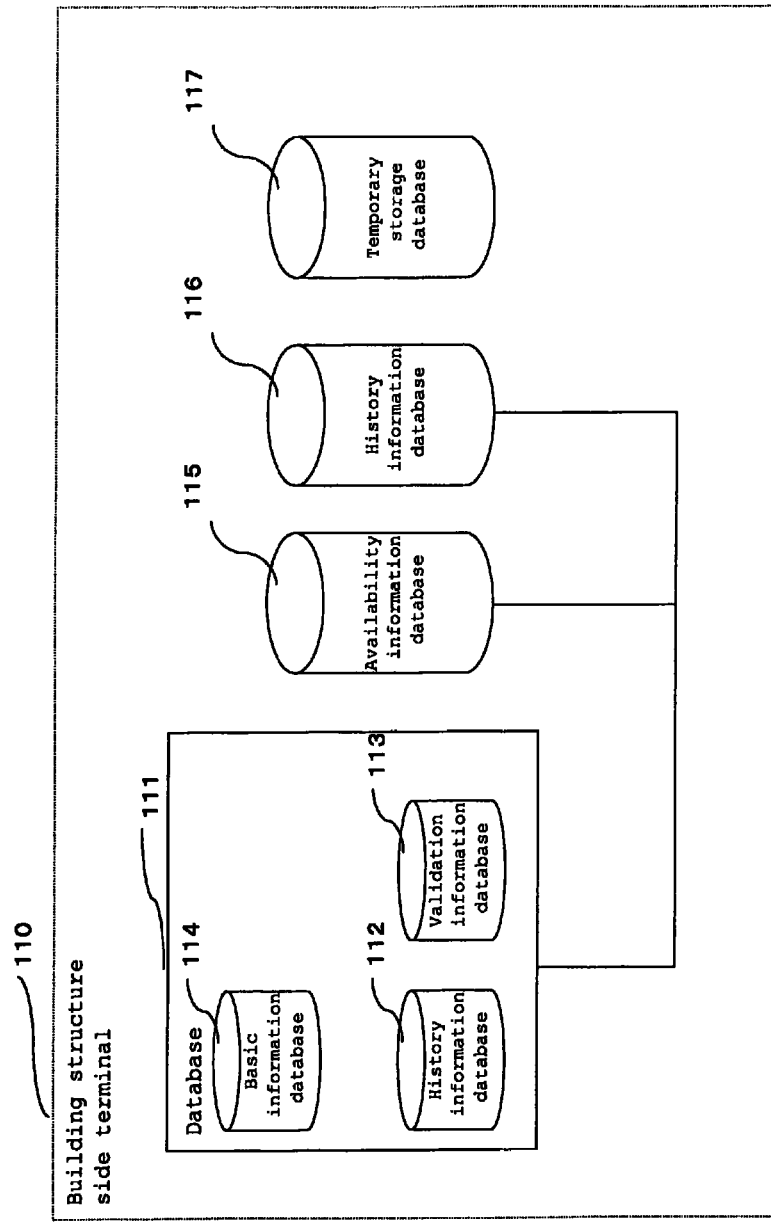
FIG. 19 is a figure showing the structure example of a fourth database of authentication system according to the embodiment of the present invention.
Figure 20:
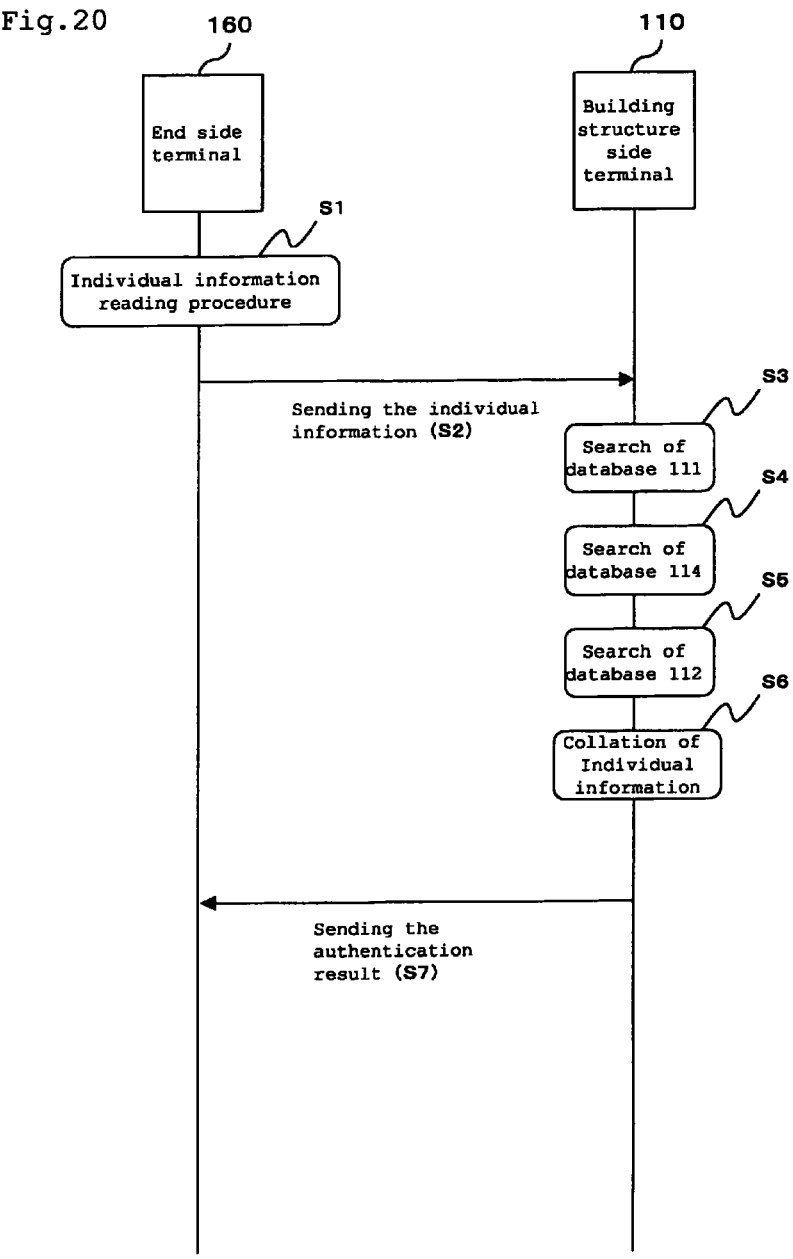
FIG. 20 is a sequence chart showing the flow of individual authentication action of the registered person by the authentication system according to the embodiment of the present invention.
Figure 21:
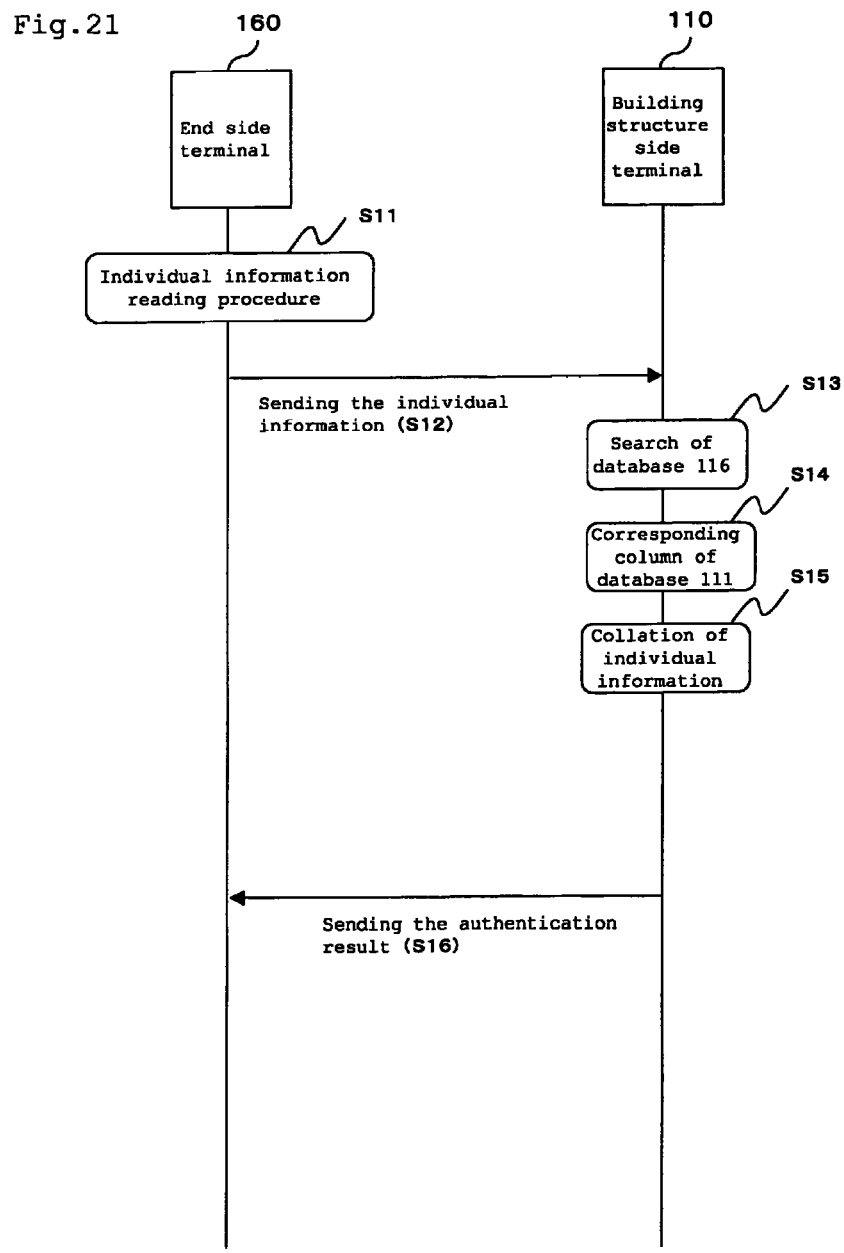
FIG. 21 is a sequence chart showing other flow of the individual authentication process of registered person by the authentication system according to the embodiment of the present invention.
Figure 22:
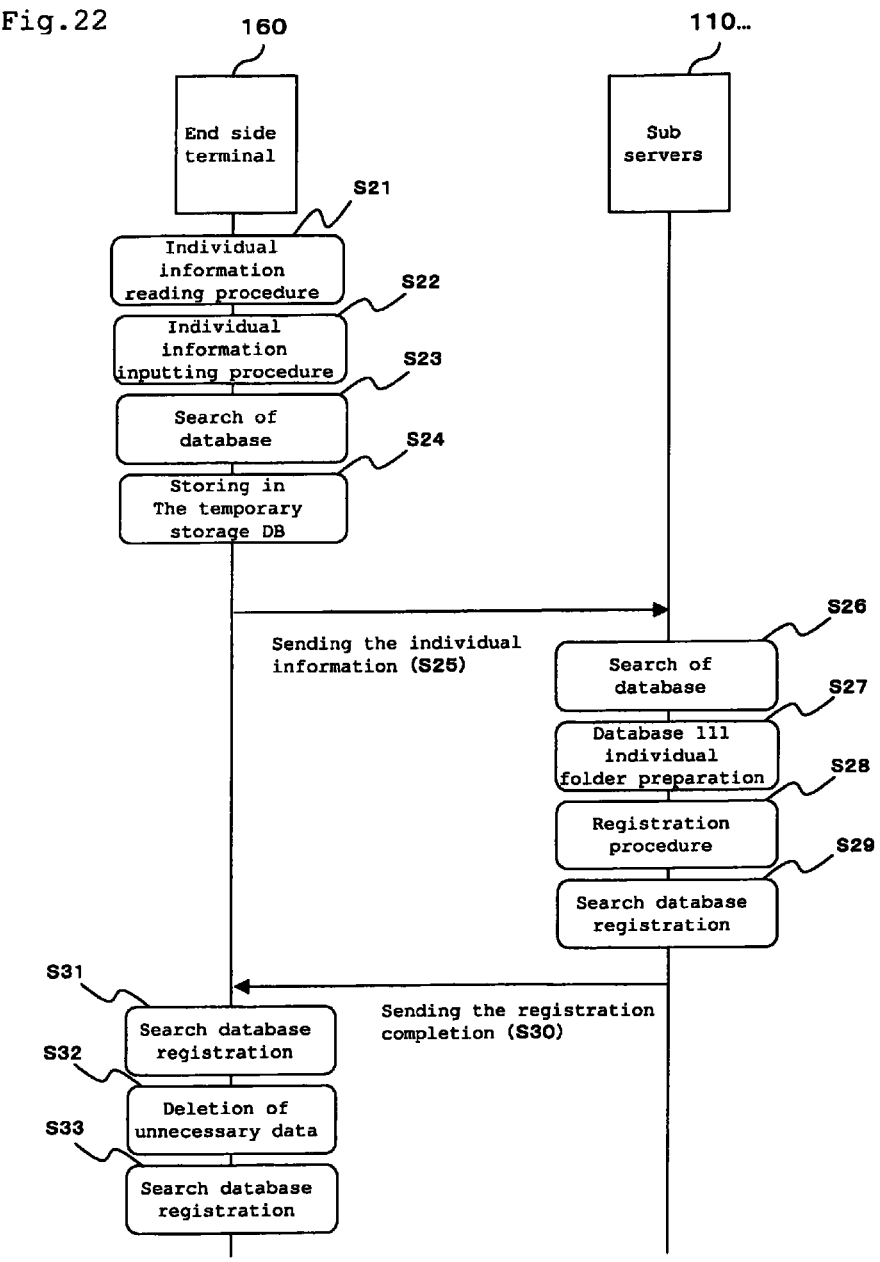
FIG. 22 is a sequence chart showing an action example of the authentication system when a person to be registered registers its own history information for the first time to the end side terminal and sub servers, in a first embodiment of the present invention.
Figure 23:
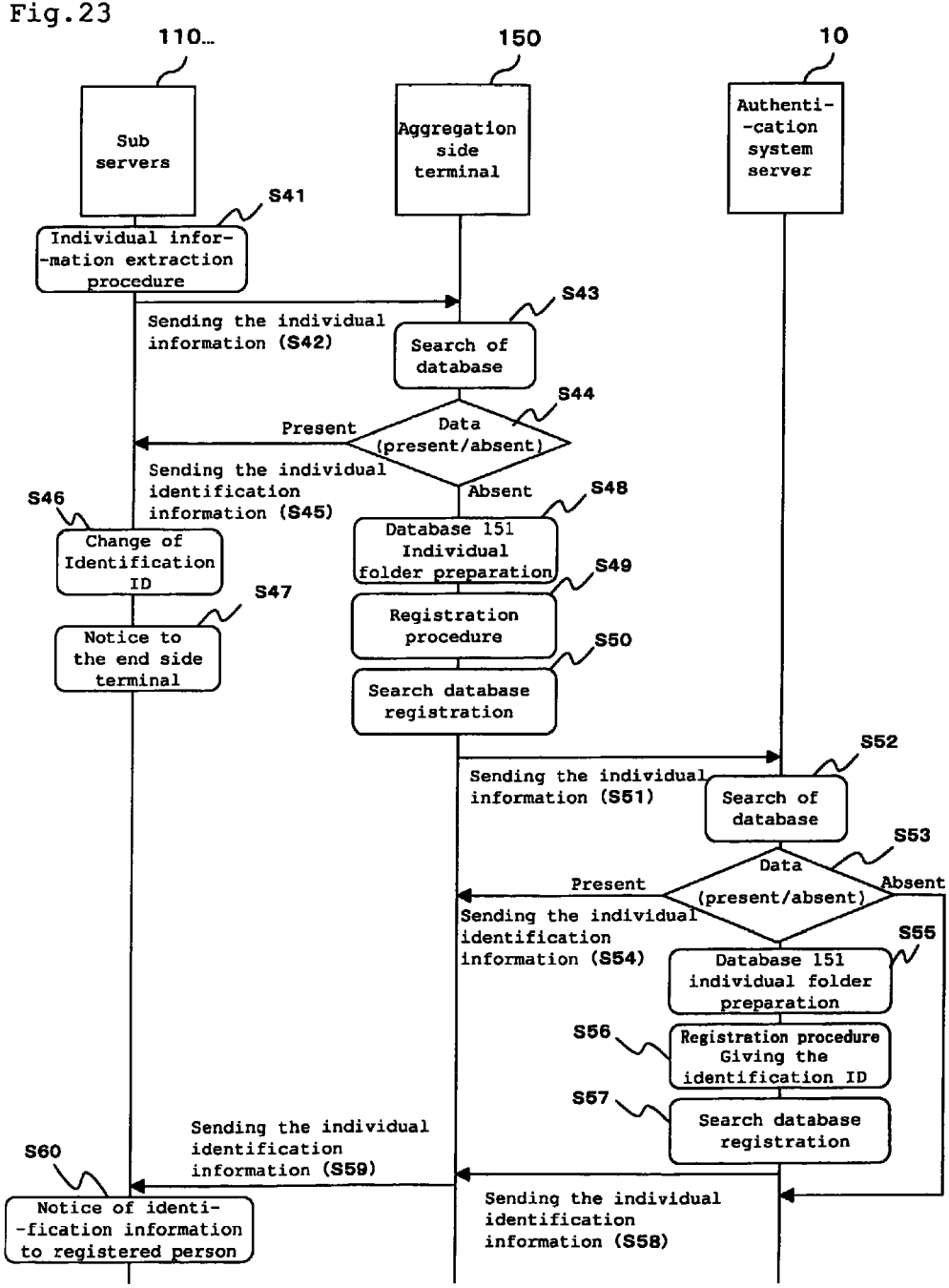
FIG. 23 is a sequence chart showing an action example at the moment when name identification processing is carried out in the present authentication system, after completion of the initial registration of the sub servers.
Figure 24:
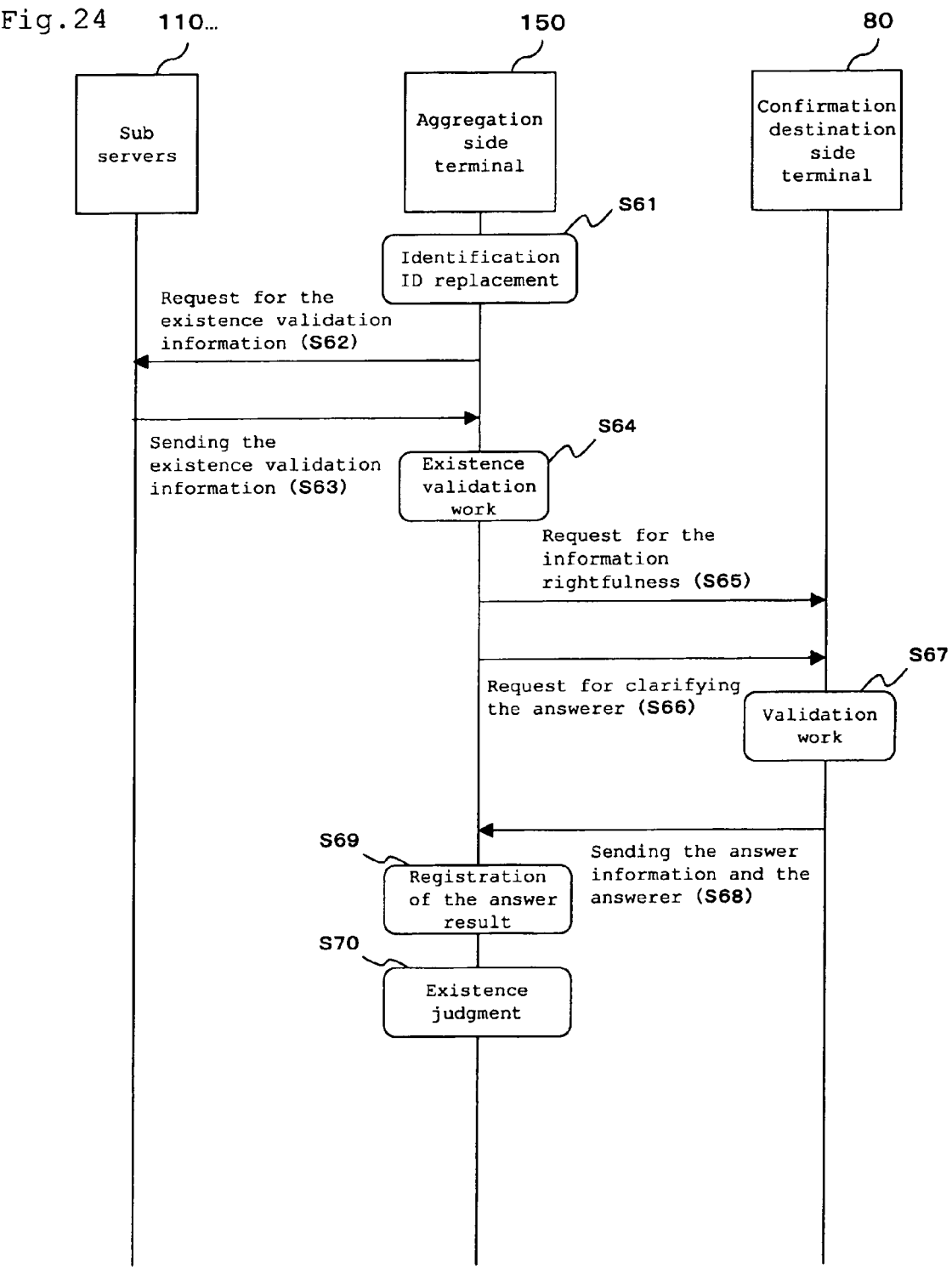
FIG. 24 is a sequence chart showing an action example of validation processing where in the first embodiment of the present invention, after the registered person registers its own individual information for the first time, whether the registered person individual is an existing person, and whether the registered information is true are verified.
Figure 25:
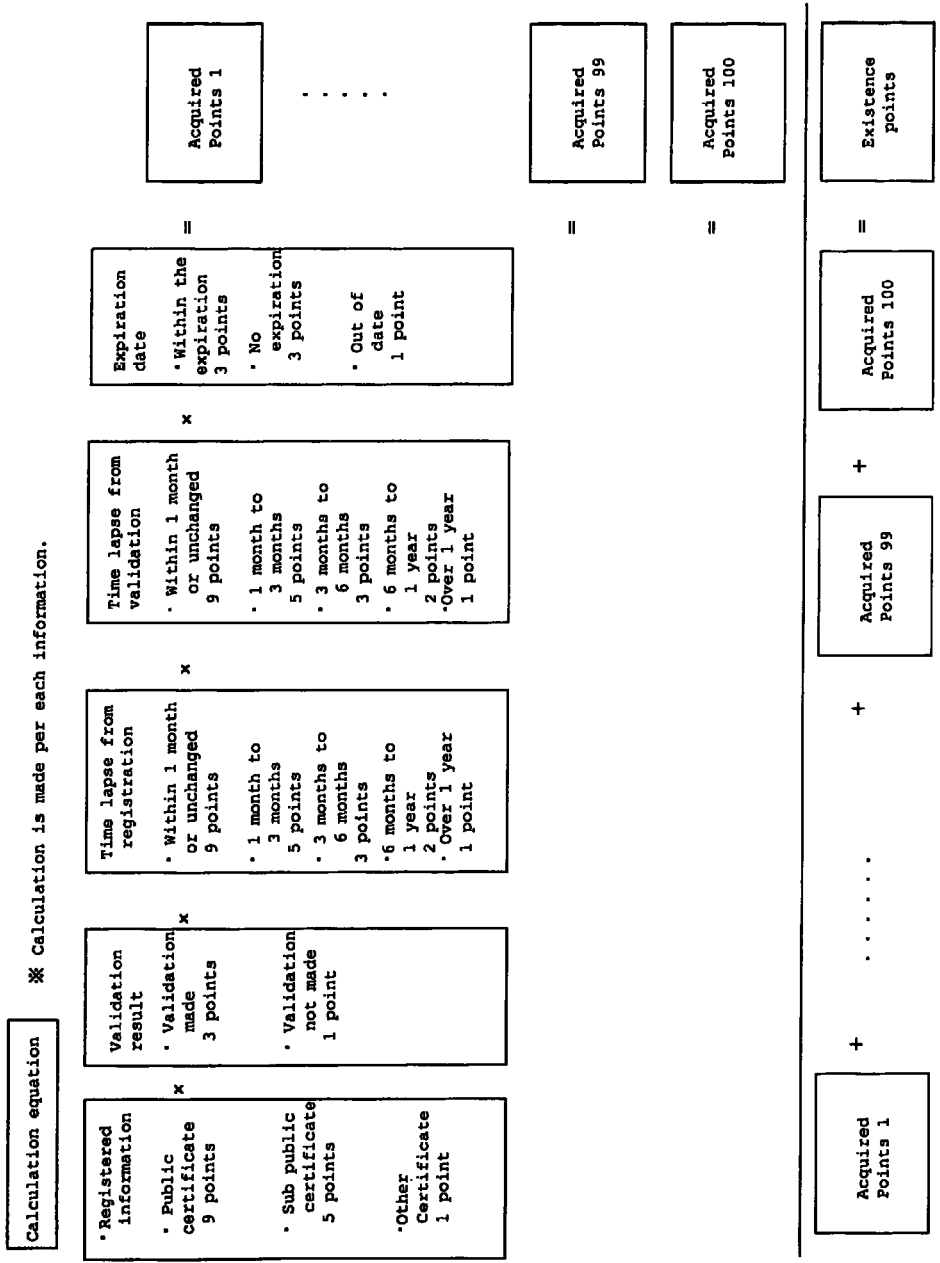
FIG. 25 is a figure showing an example of calculation method of existence points in the authentication system according to the first embodiment of the present invention.
Figure 26:
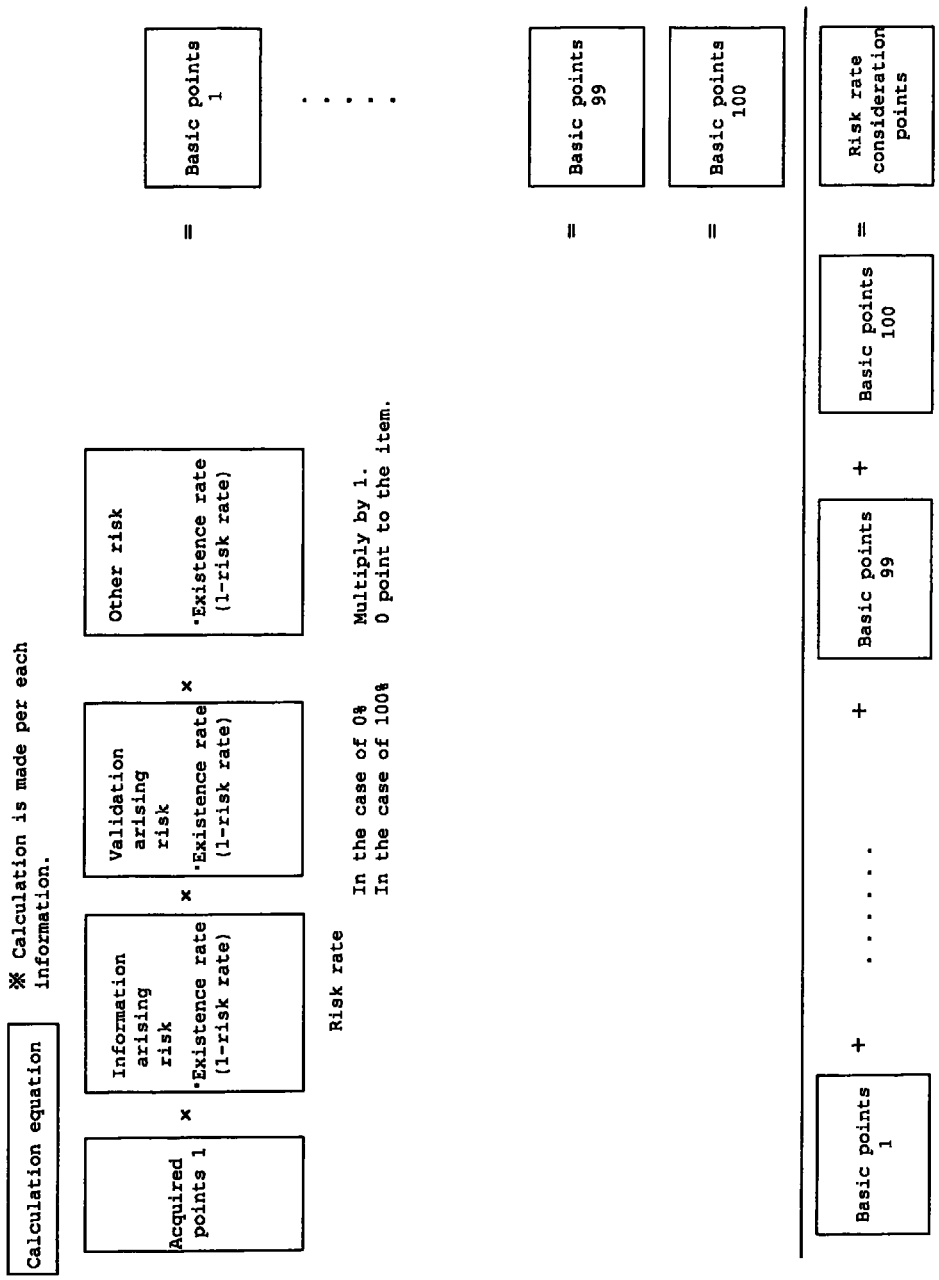
FIG. 26 is a figure showing an example of the calculation method of the risk rate consideration points by the authentication system according to the first embodiment of the present invention.
Figure 33:
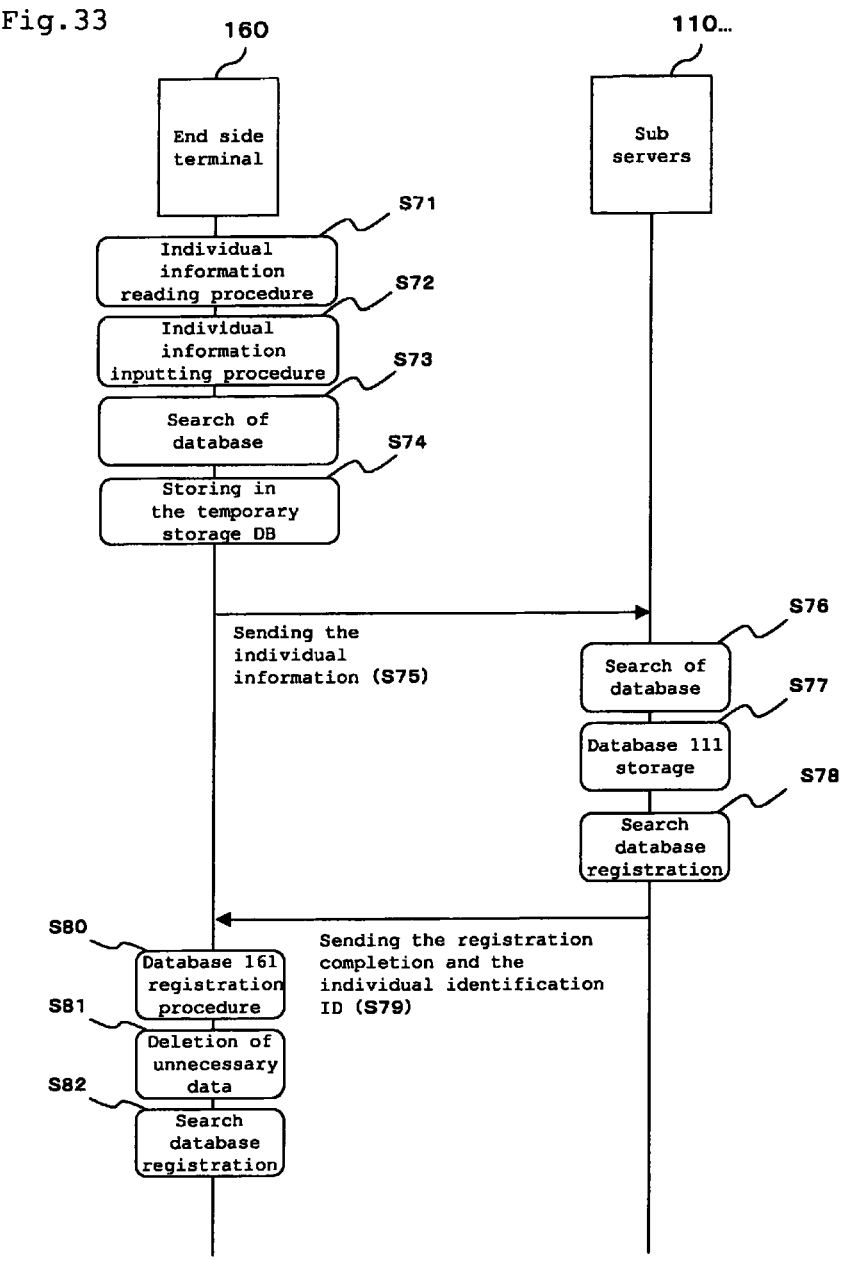
FIG. 33 is a sequence chart showing an action example of the authentication system when the registered person registers its own history information for the first time to other end side terminal than the terminal to which the registered person registered once, in the second embodiment of the present invention.
Figure 34:
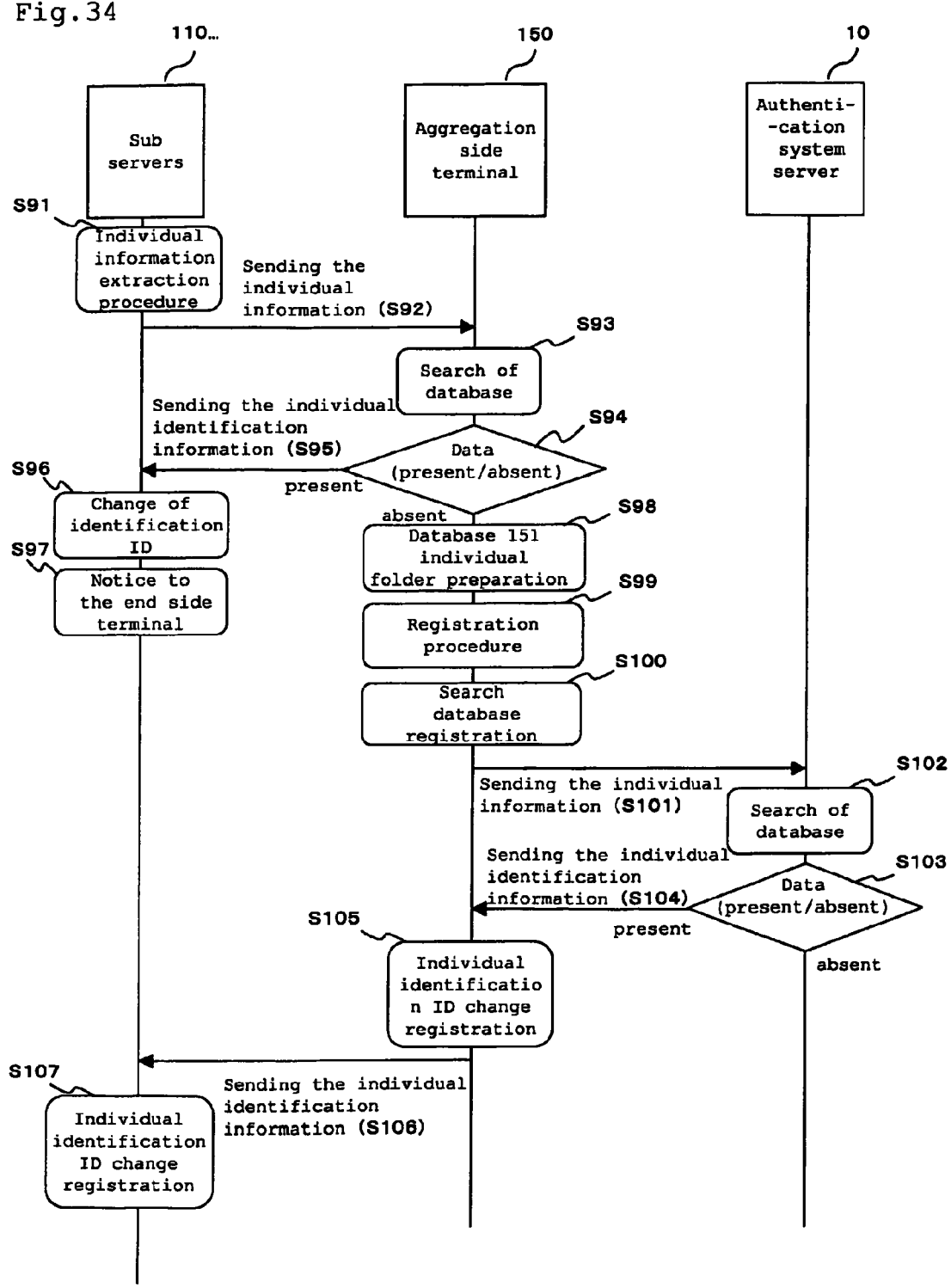
FIG. 34 is a sequence chart showing an action example of the authentication system when the registered person registers its own history information for the first time to an end side terminal structuring other unit than the unit to which the registered person registered, in the third embodiment of the present invention.
Figure 35:
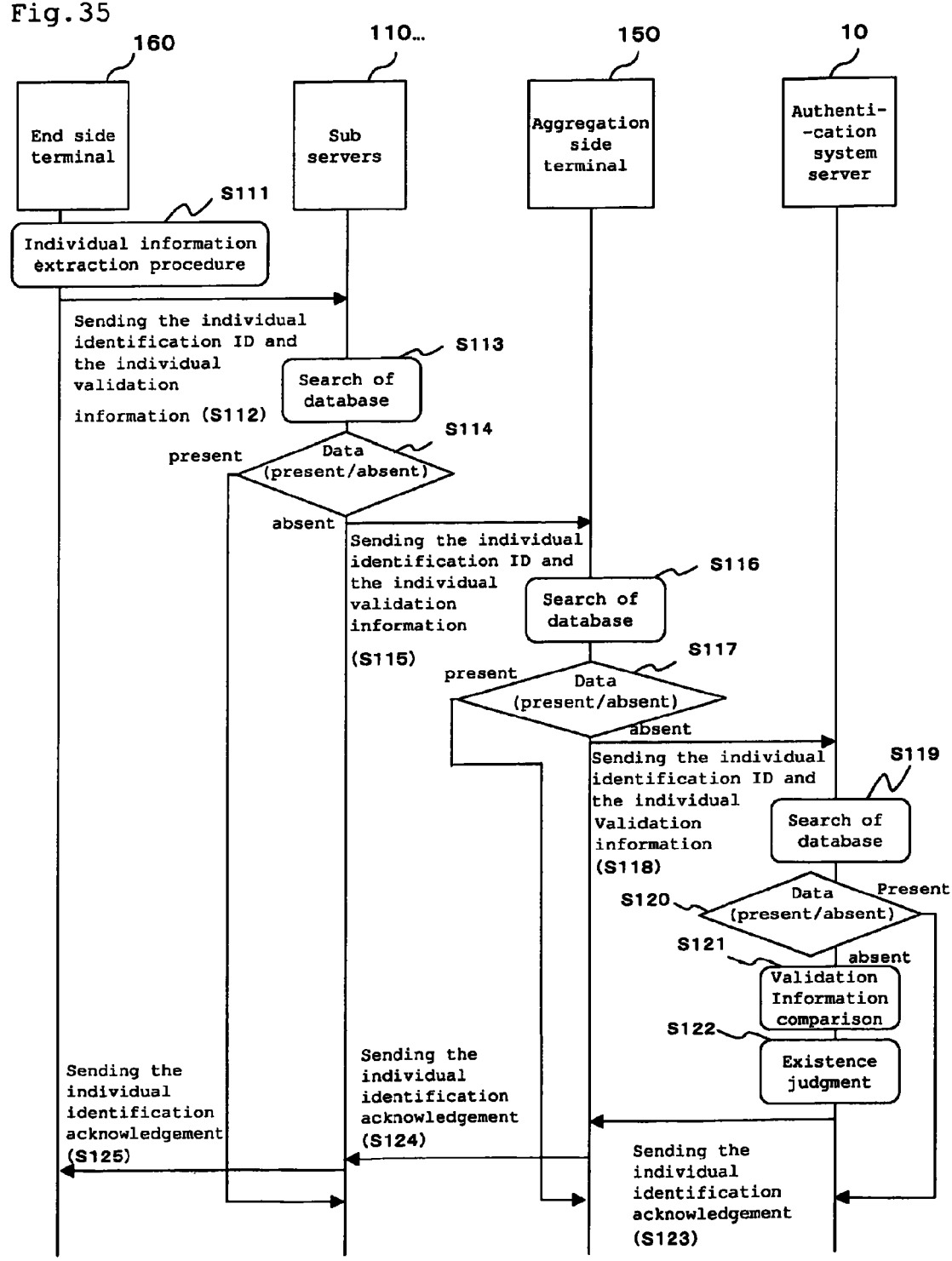
FIG. 35 is a sequence chart showing an action example of the authentication system when the registered person registers its own history information for the first time to an end side terminal structuring other unit than the unit to which the registered person registered, and the registered person individual recognizes its individual identification ID, in the fourth embodiment of the present invention.
Figure 36:
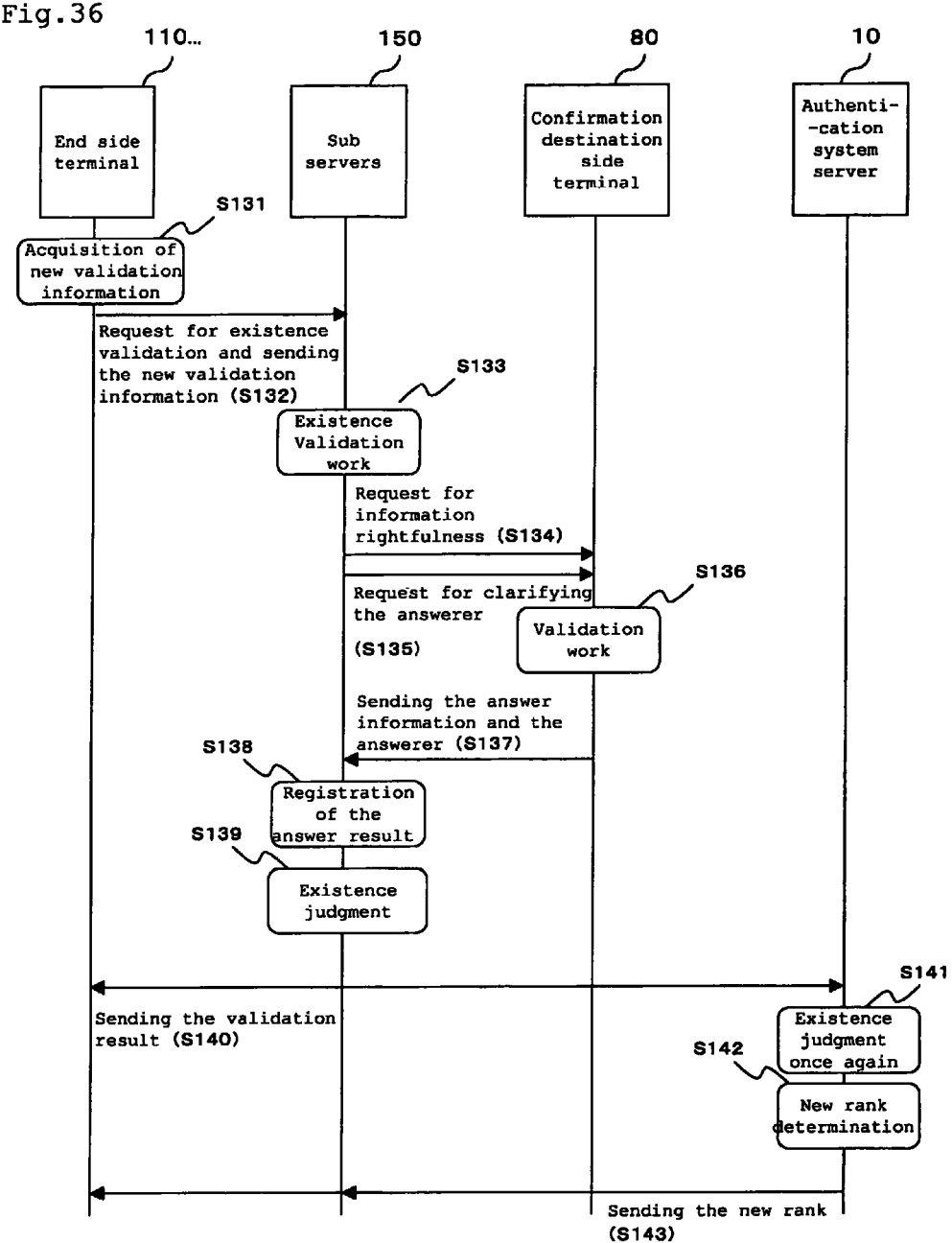
FIG. 36 is a sequence chart showing an action example to perform validation processing whether registered person individual is an existing person in optional time of use of the authentication system, and whether registered information is true or not, in a fifth embodiment of the present invention.
Figure 37:
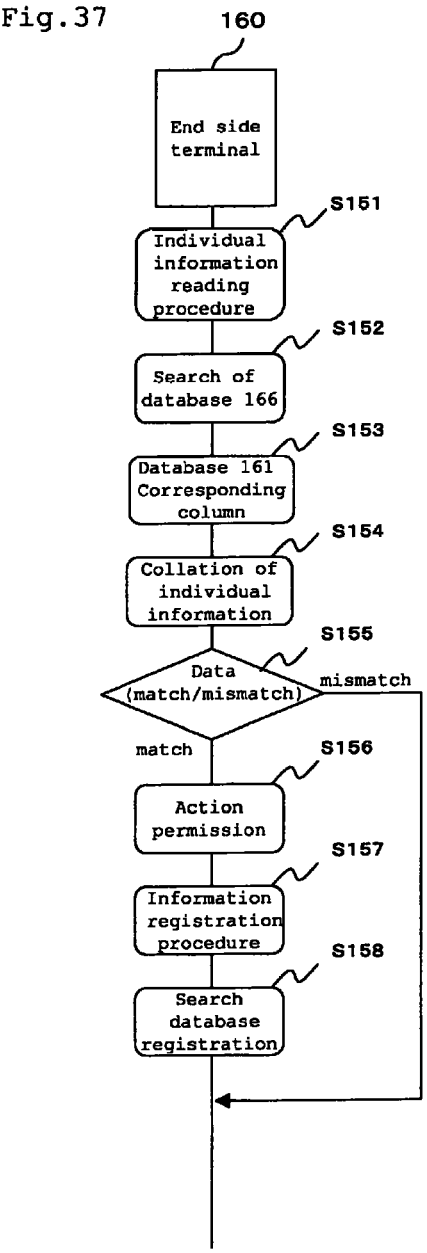
FIG. 37 is a sequence chart showing an action example of execution of authentication process where terminal to which individual information is input compares information in its own, and read or input information, and judges whether registered person individual is an existing person, or whether registered information is true, in a sixth embodiment of the present invention.
Figure 38:
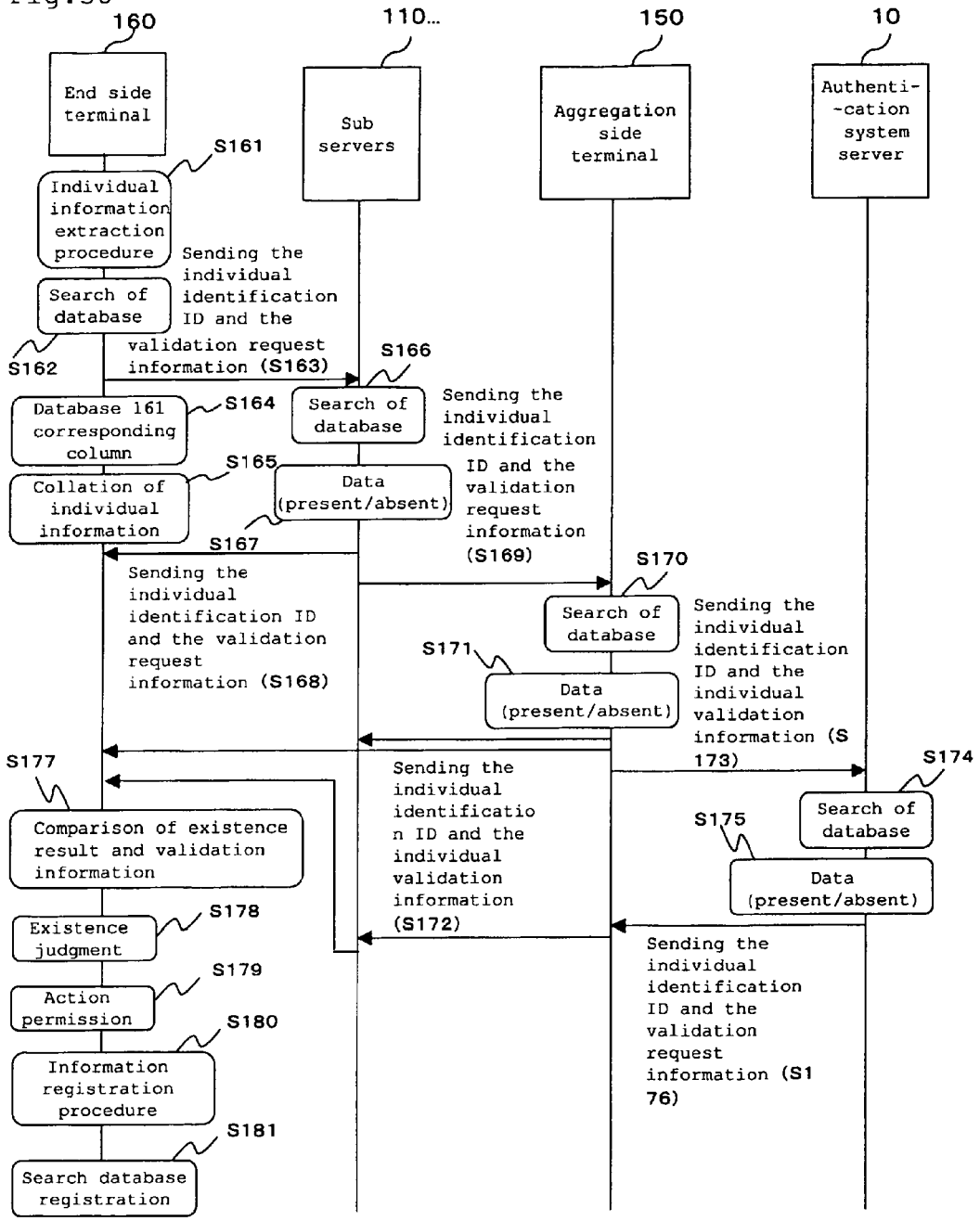
FIG. 38 is a sequence chart showing an action example of process execution of authentication where terminal to which individual information is input compares read or input information, existing information in its own, and information that other terminal in the authentication system has and judges whether registered person individual is an existing person, or whether registered information is true, and whether there is continuity of individual information and existence, in a seventh embodiment of the present invention.
Figure 39:
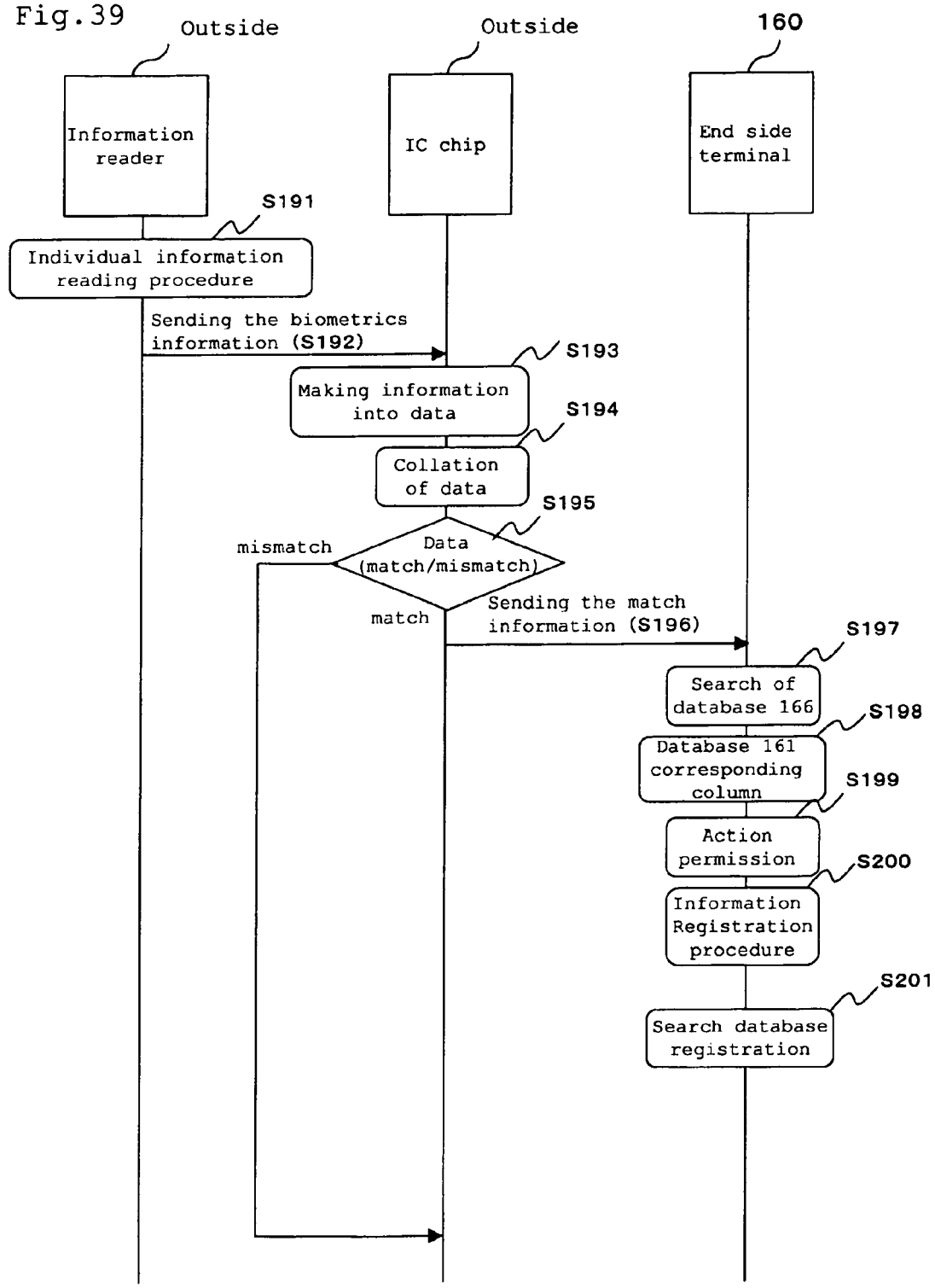
FIG. 39 is a sequence chart showing an action example where in an eighth embodiment of the present invention, reader of biometrics information reads biometrics information, but since it does not have a database, information is collated with database outside of the device, and information that registered person is identical person is sent, in an eighth embodiment of the present invention.
Figure 40:
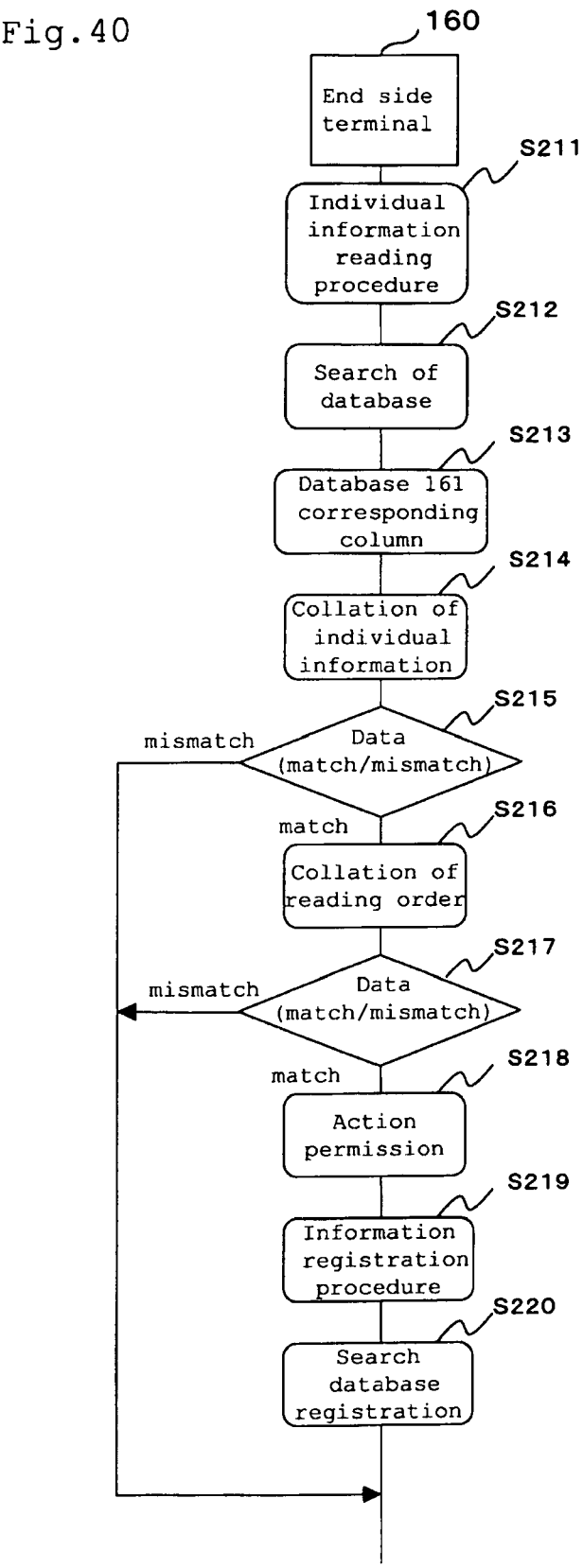
FIG. 40 is a sequence chart showing an action example of individual authentication where when terminal to which individual information is input collates information in its own, and read or input information and judges whether the registered person is an existing person, and whether registered information is true, in addition to collation of individual information, it is judged whether read or input sequence of one or plural information items registered beforehand to terminal is proper or not, in a ninth embodiment of the present invention.
Figure 41:
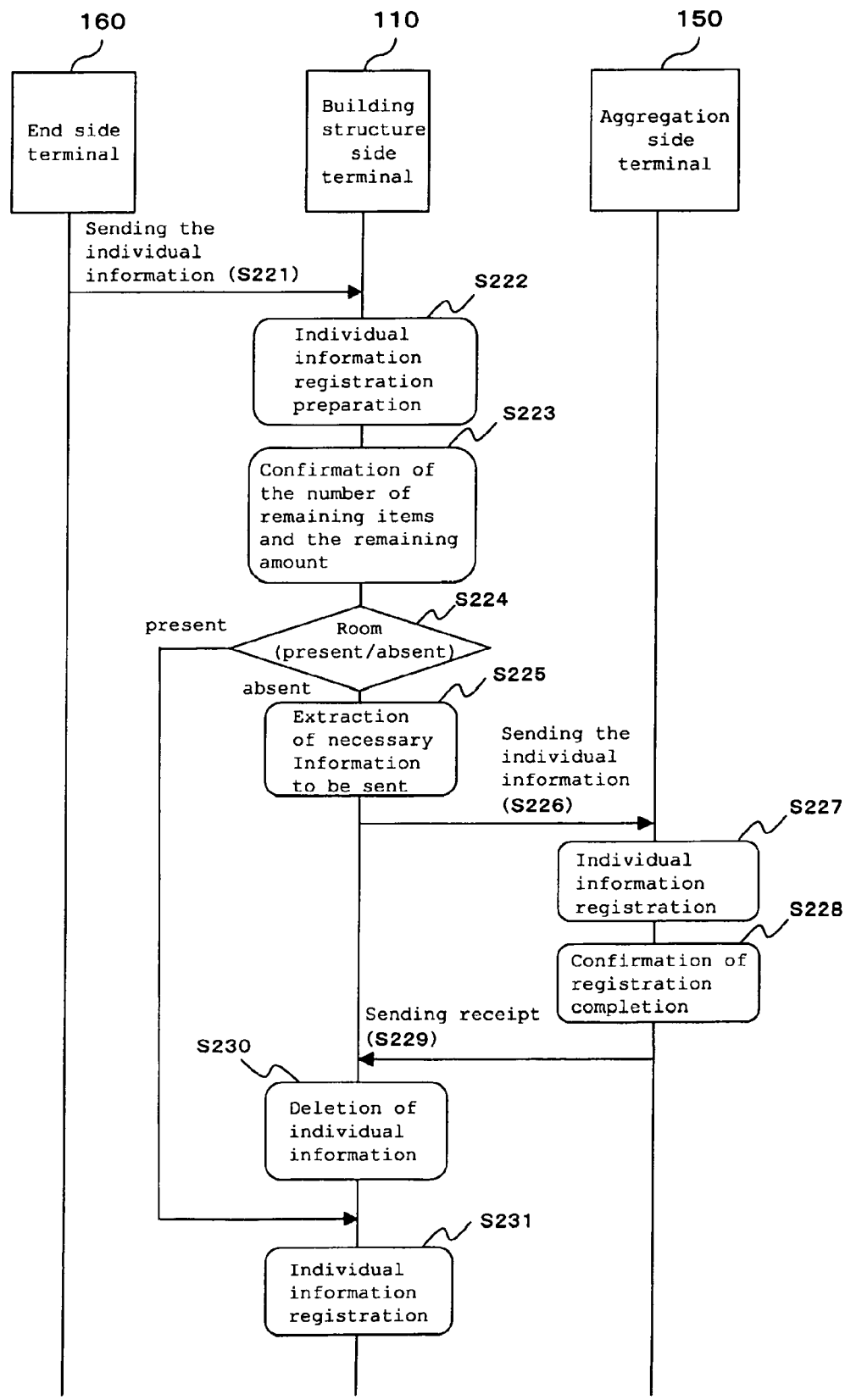
FIG. 41 is a sequence chart showing the flow of the above data transfer processing, in the authentication system according to a tenth embodiment of the present invention.
Figure 42:
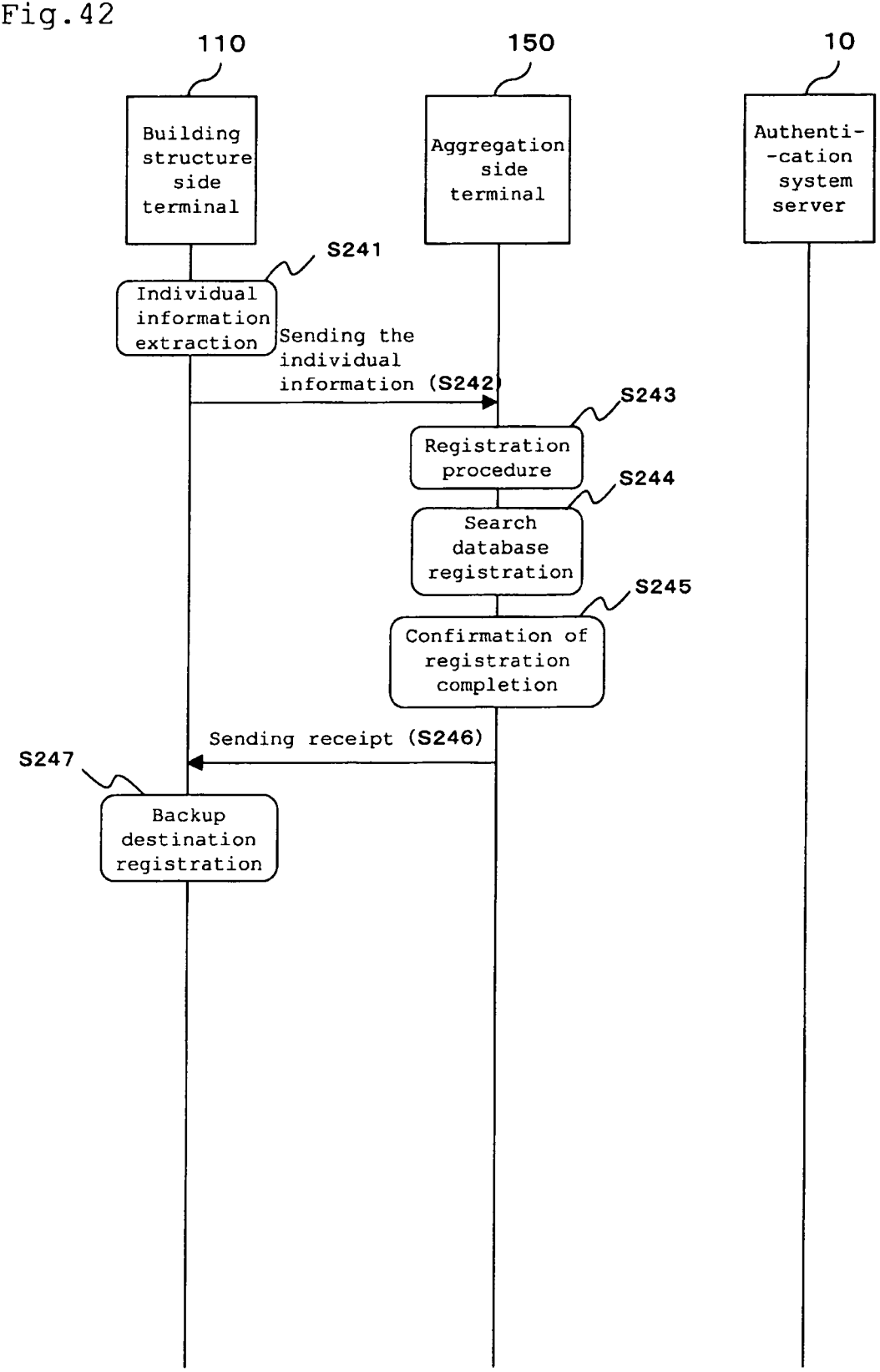
FIG. 42 is a sequence chart showing an action example where transfer process is carried out to transfer individual information that each terminal stores to its upper level terminal for backup in an eleventh embodiment of the embodiment.
Figure 43:
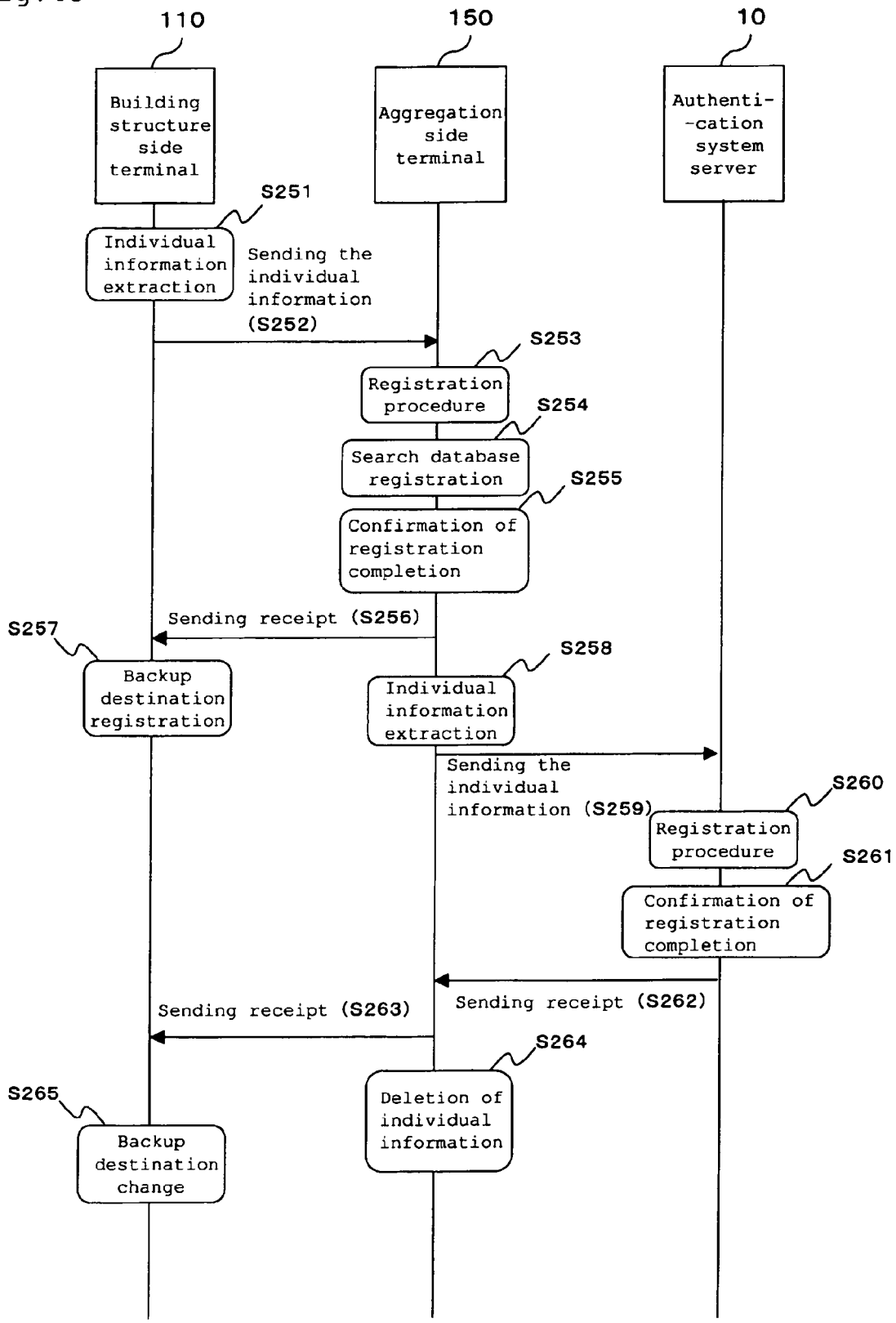
FIG. 43 is a sequence chart showing an action example where transfer process is carried out to transfer individual information that each terminal stores to the authentication system server 10 in a twelfth embodiment of the embodiment.
Figure 44:
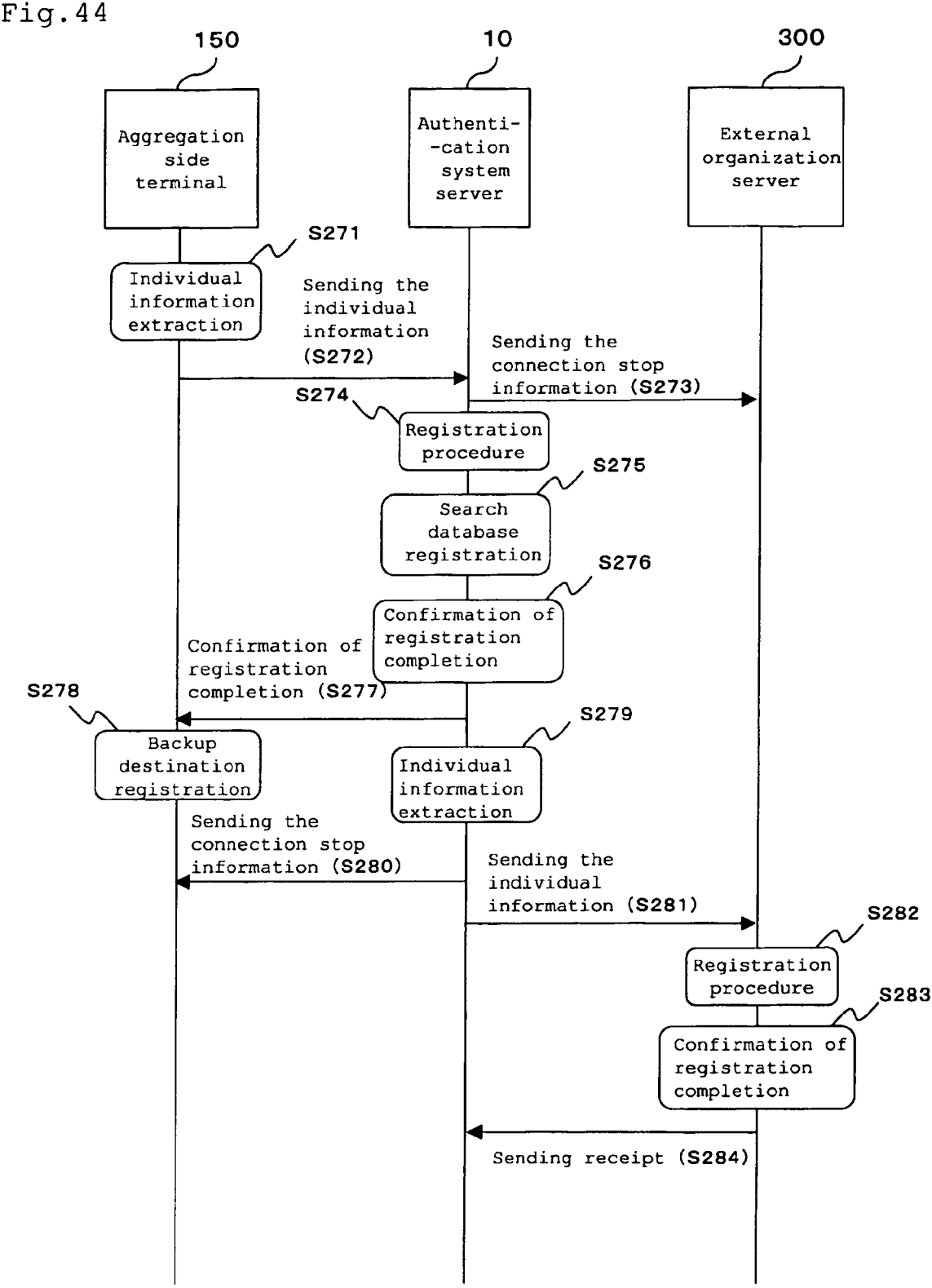
FIG. 44 is a sequence chart showing an action example where individual information that each terminal stores is transferred to the authentication system server 10, and further transferred to the external organization server 300 in a thirteenth embodiment of the embodiment.
Figure 45:
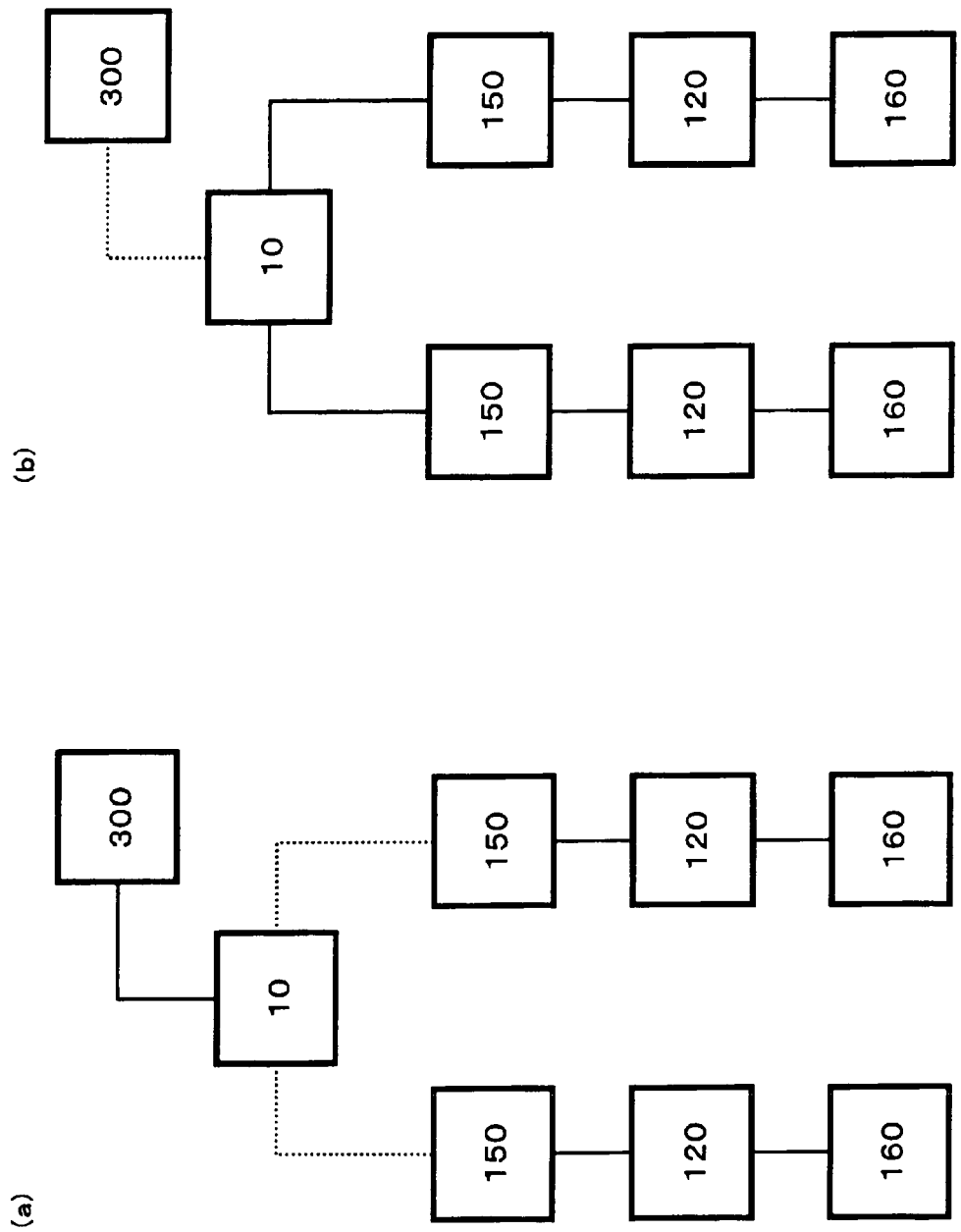
FIG. 45 (a) and FIG. 45 (b) are figures showing connection conditions between terminals and servers in the thirteenth embodiment, In the figures, the solid line means now in connection, and the dot line means connection released.
Figure 46:
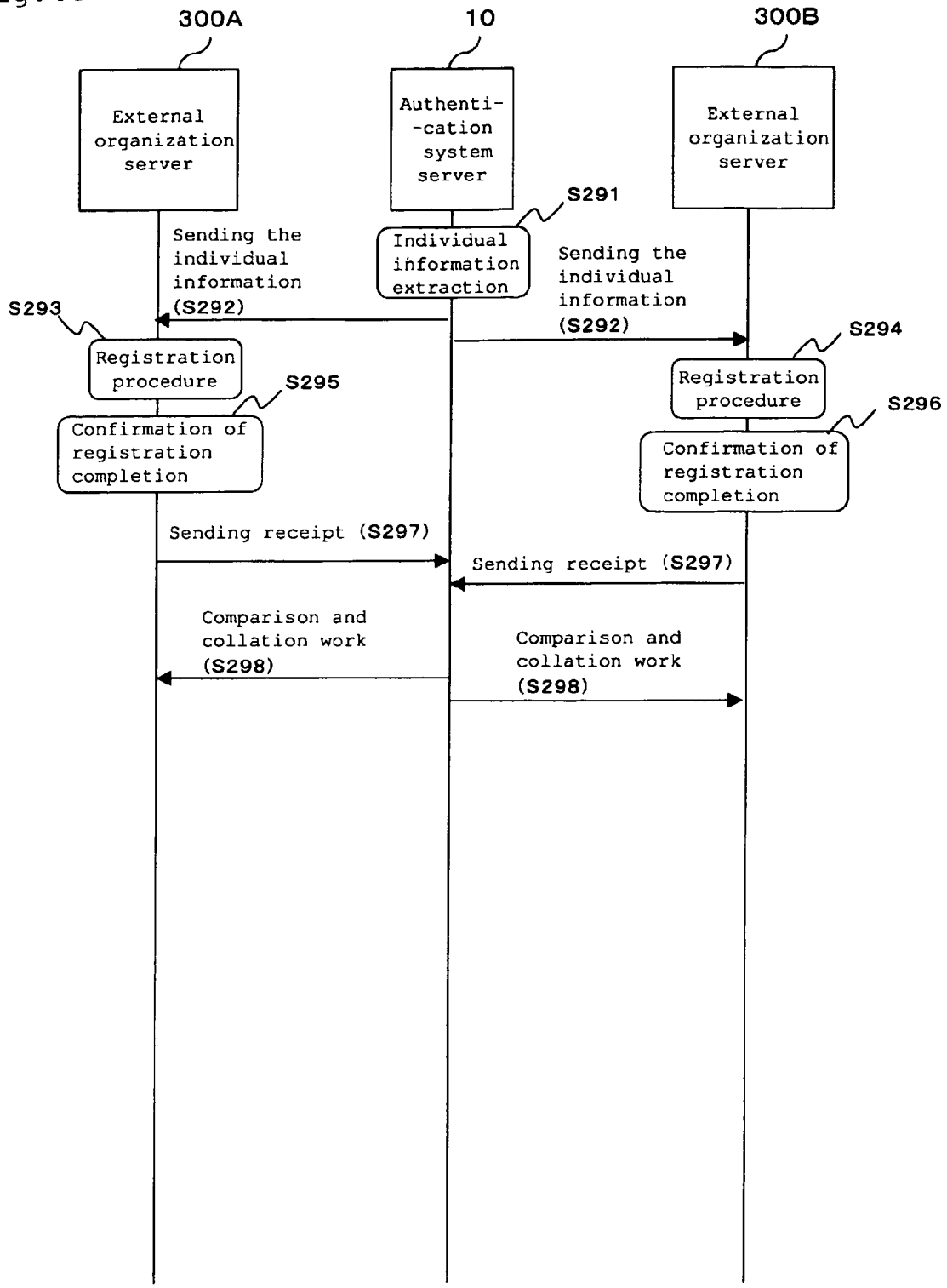
FIG. 46 is a sequence chart showing an action example where individual information that the authentication system server 10 is transferred to two external organization servers at the same time in a fourteenth embodiment of the embodiment.
Figure 47:
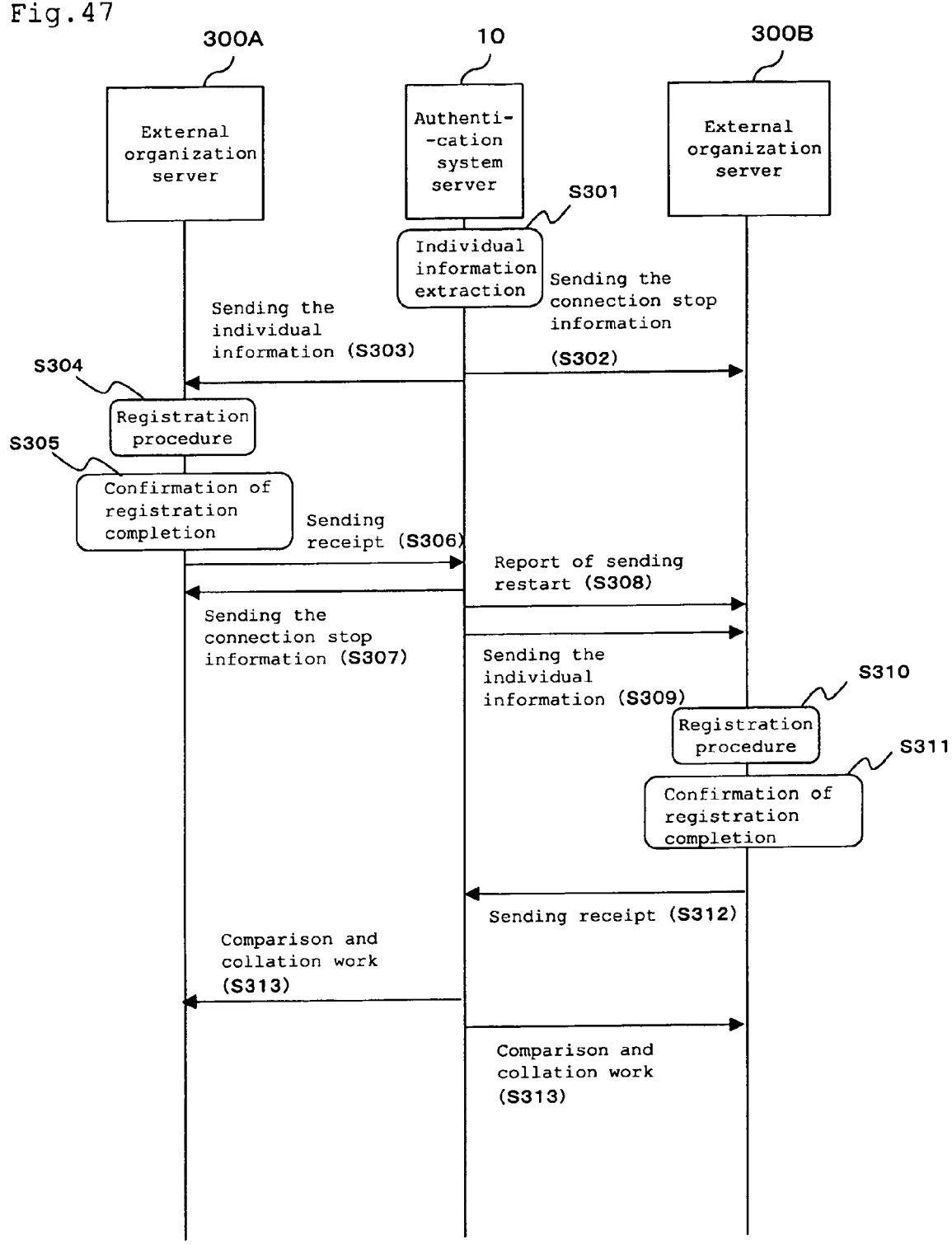
FIG. 47 is a sequence chart showing an action example where the authentication system server 10 alternately or separately backs up individual information stored in its own, to two external organization servers in a fifteenth embodiment of the embodiment.
Figure 52:
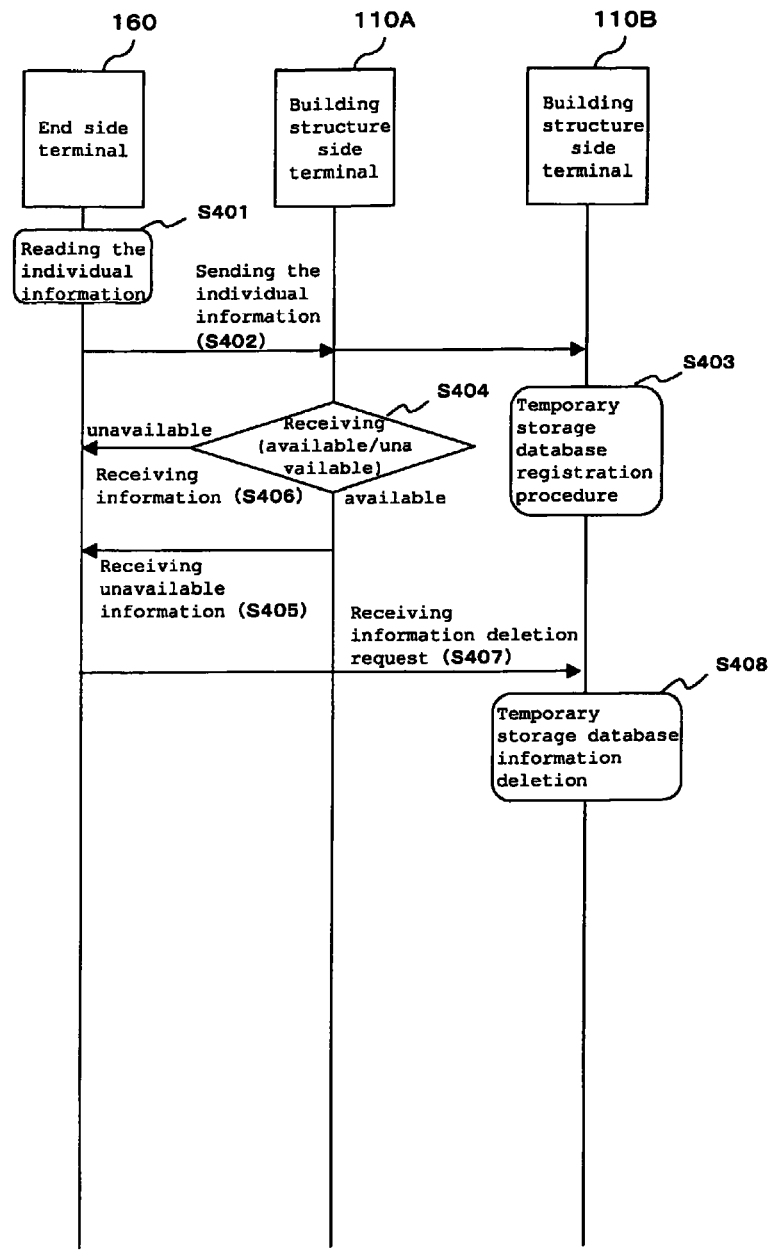
FIG. 52 is a sequence chart showing an action example where the building structure side terminal 110C connect communications to other terminals, in the eighteenth embodiment. In the present authentication system, each terminal has a function to automatically send information to plural portions.
Figure 53:
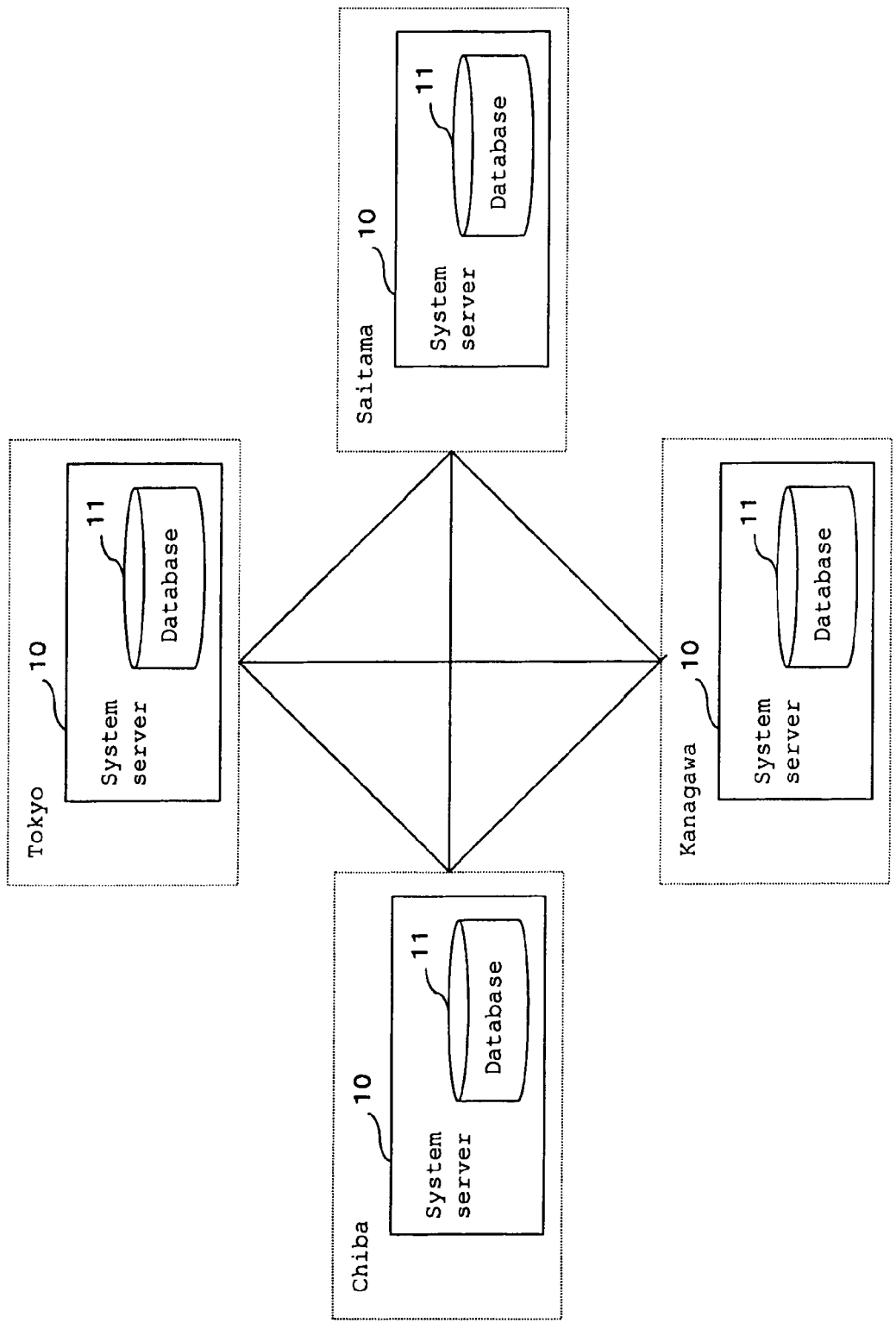
FIG. 53 is an image figure showing a network configuration of authentication system servers 10, in the authentication system according to a nineteenth embodiment of the present invention.
Figure 54:
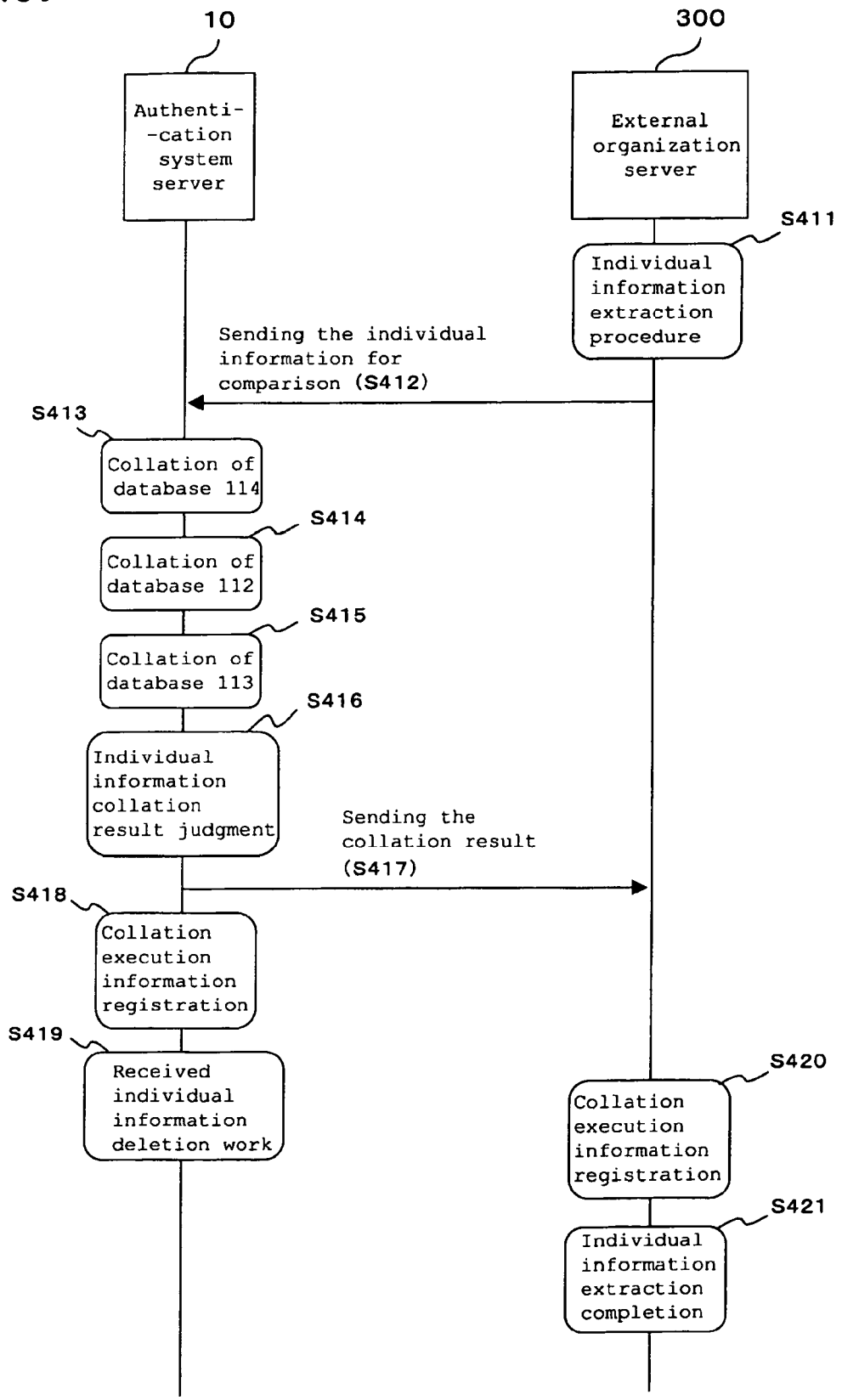
FIG. 54 is a sequence chart showing an action example where the authentication system server 10 and the external organization server 300 perform comparison collation processing of stored information at optional time, in a 20th embodiment.
Figure 55:
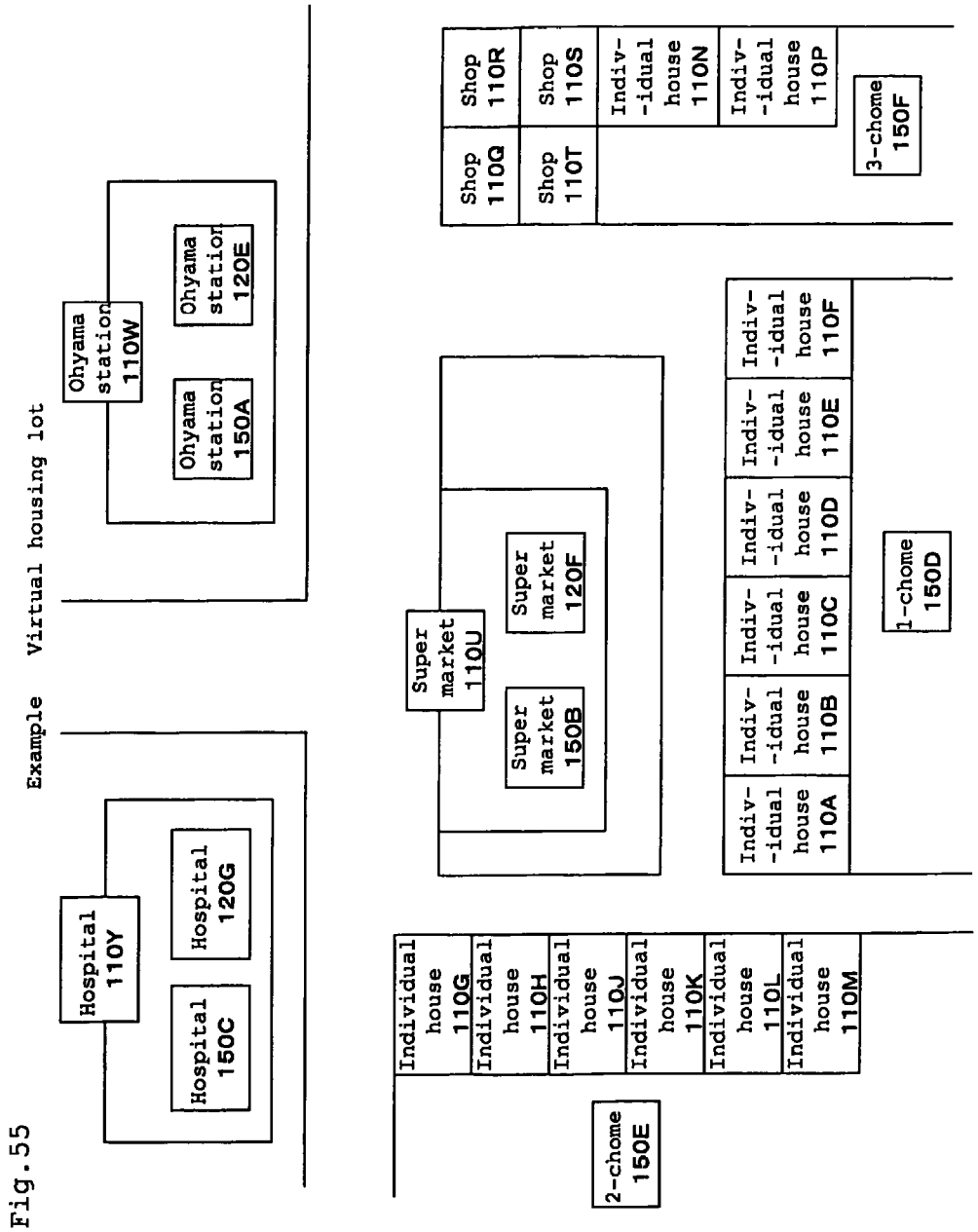
FIG. 55 is a figure showing an image around building structure.
Figure 56:
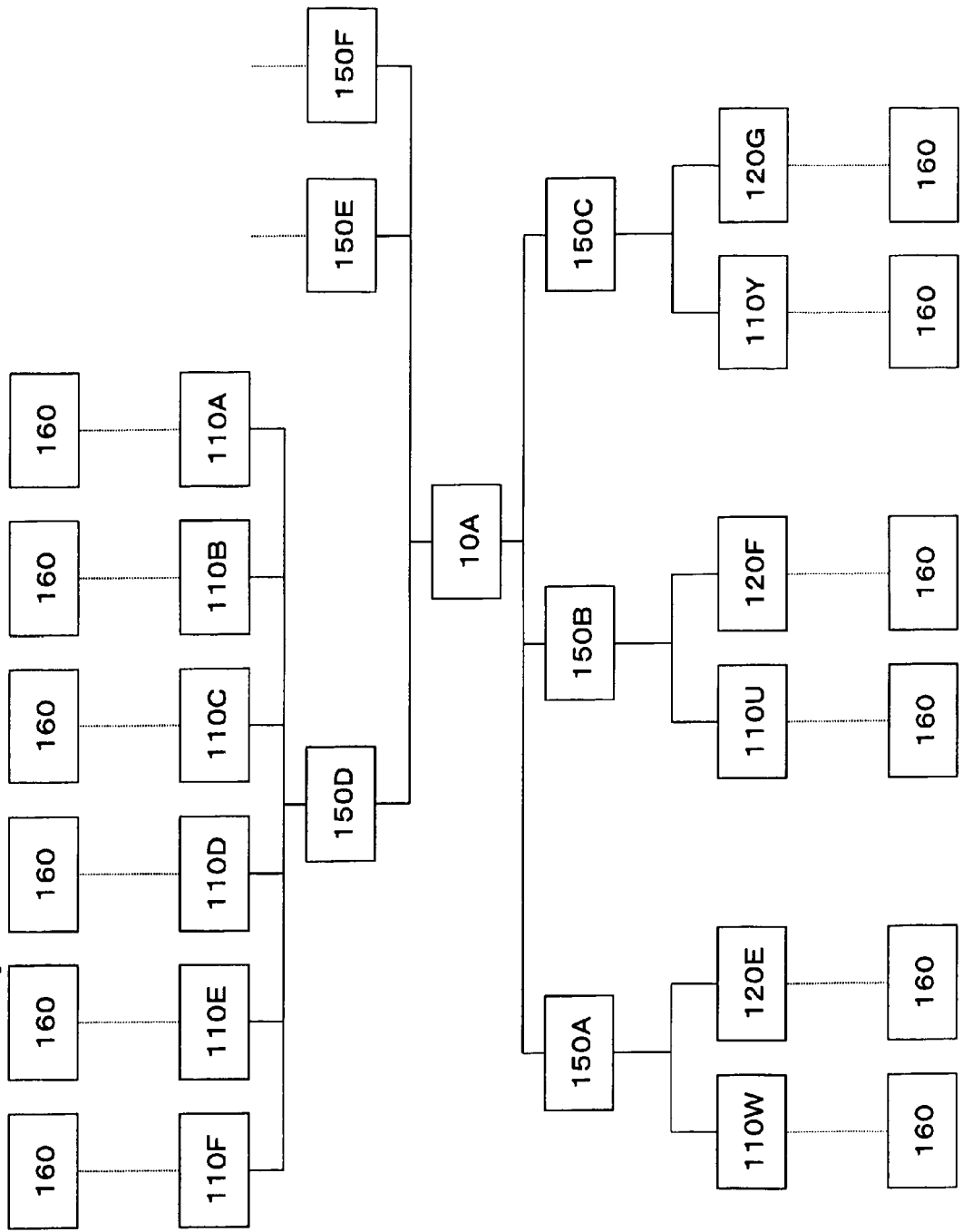
FIG. 56 is a figure showing an image of the terminal configuration of the present authentication system.
Figure 58:
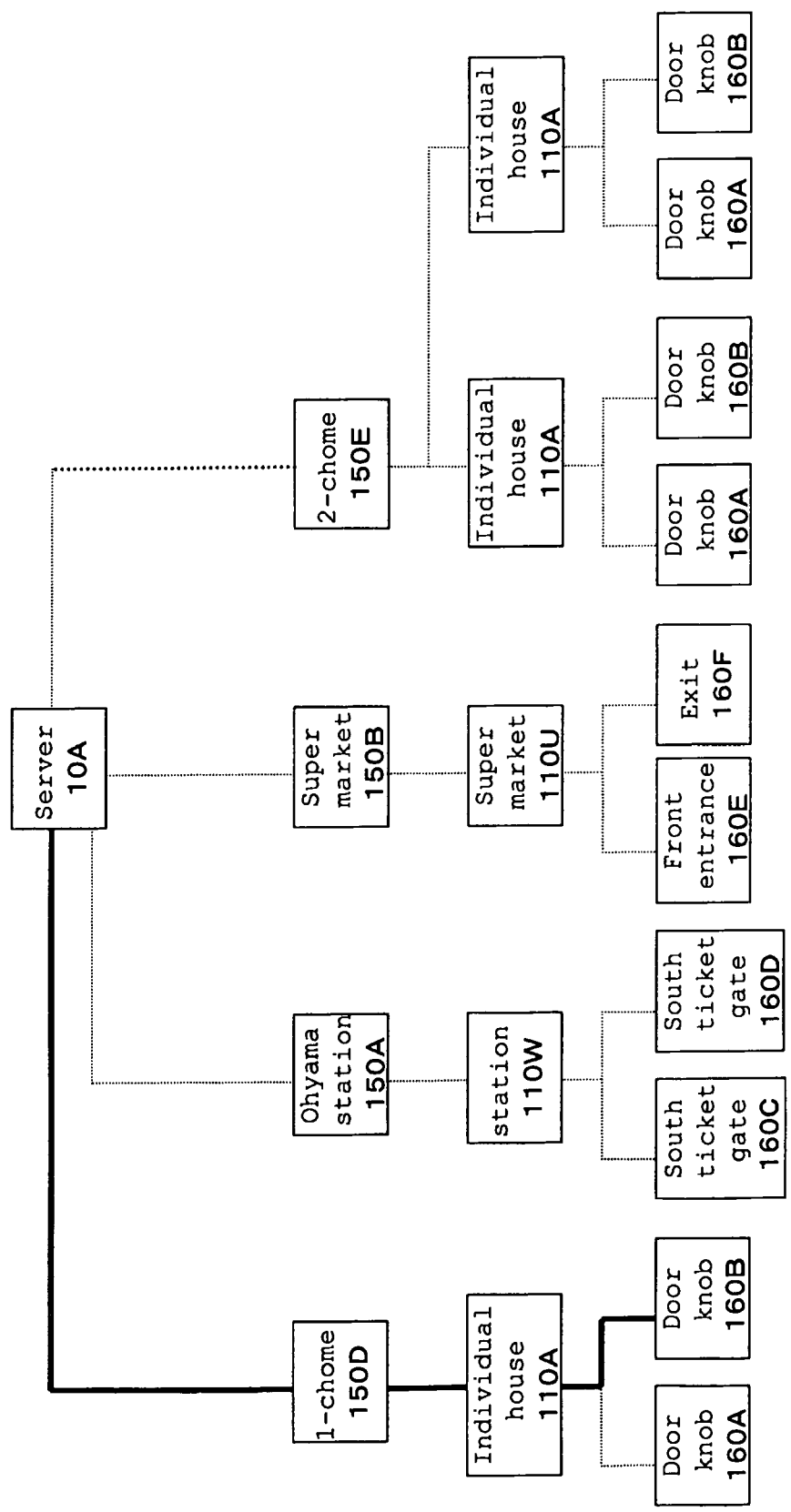
FIG. 58 is a figure showing a structure example of authentication system in daily activity range of the registered person, according to the present embodiment.
Figure 59:
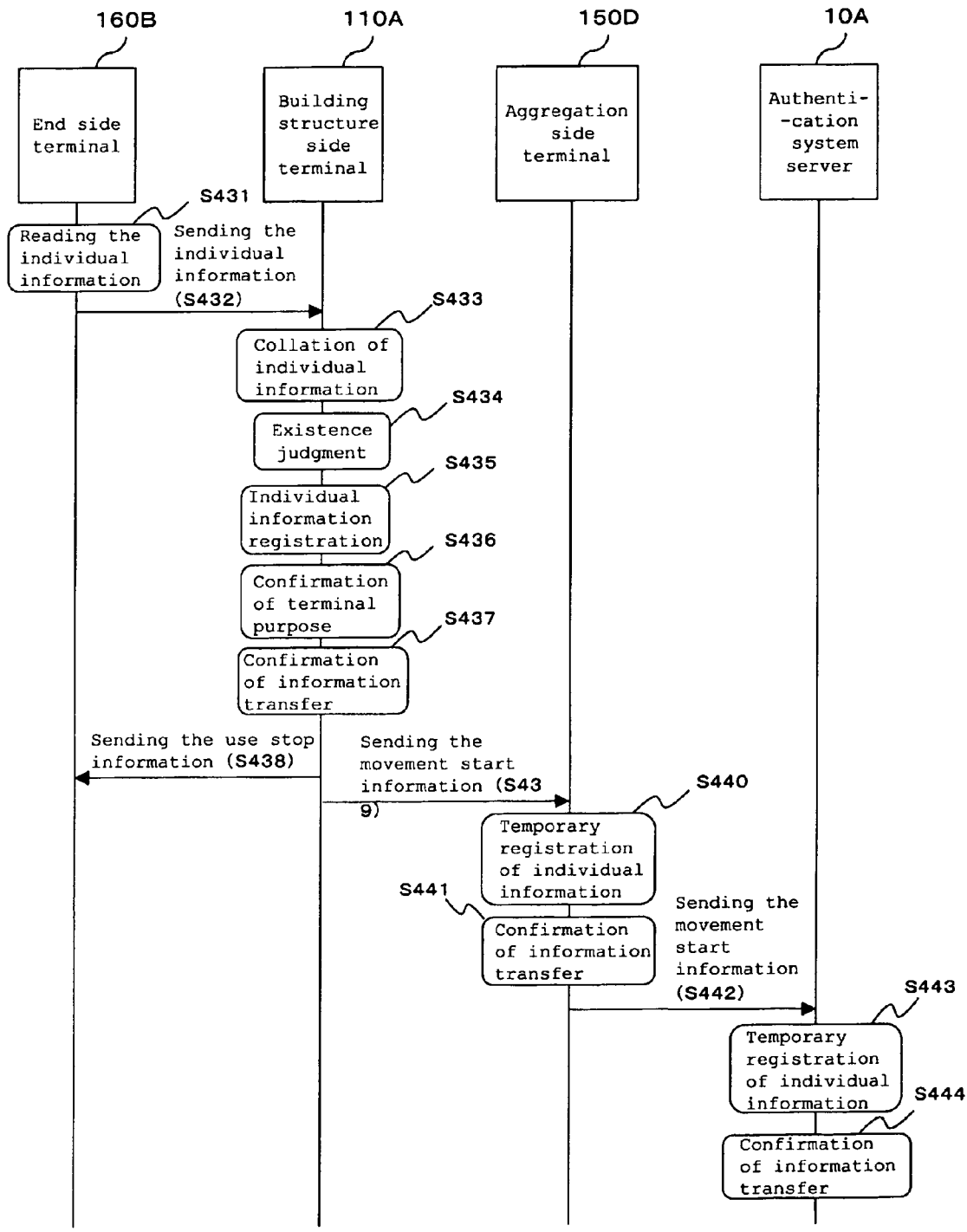
FIG. 59 is a sequence chart showing an action example when information use permission information is transferred from the building structure side terminal 110A to other terminal, in a 23rd embodiment of the present invention.
Figure 61:
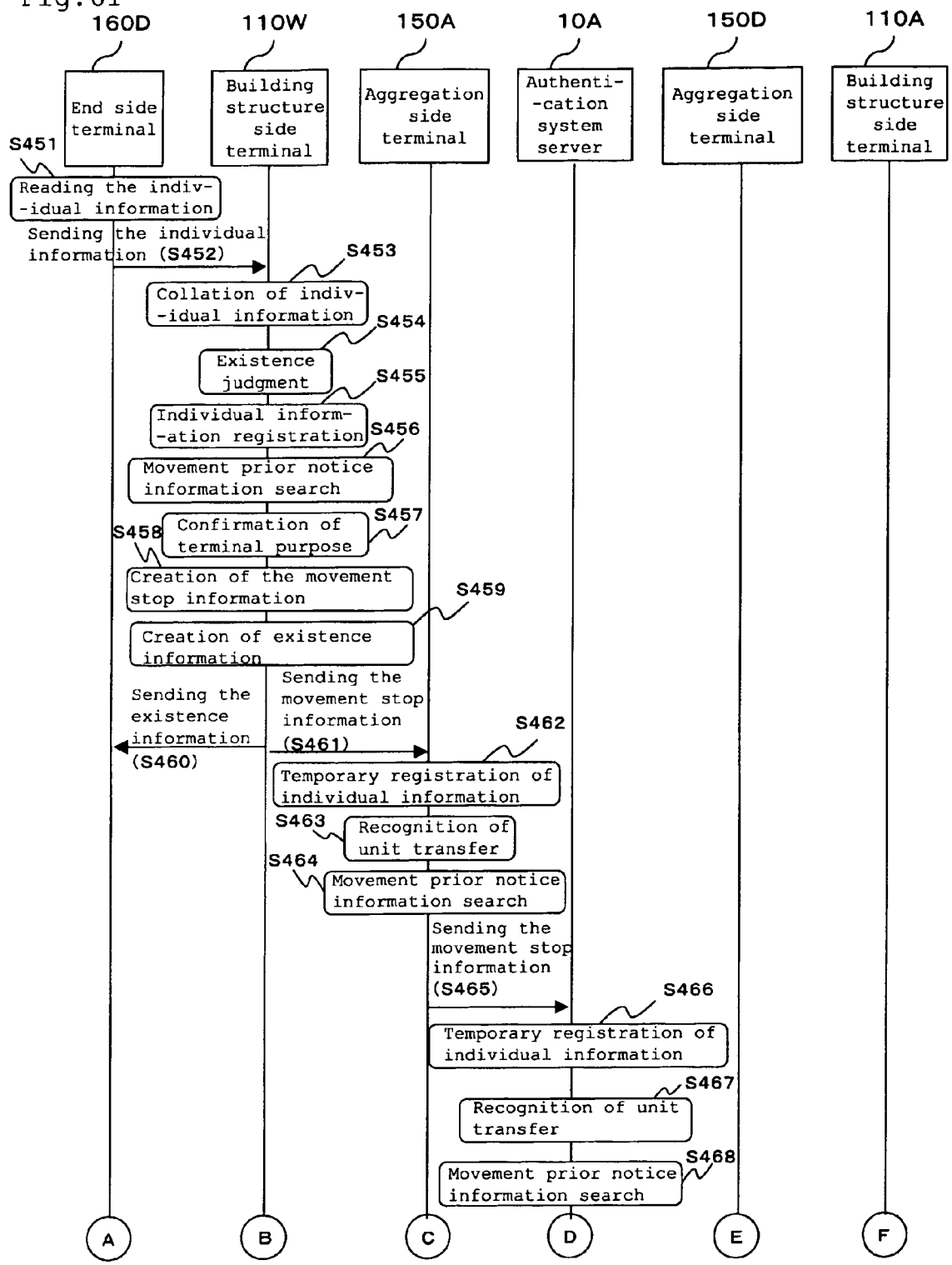
FIG. 61 is a sequence chart showing an action example when information use permission information is transferred from the building structure side terminal to the building structure side terminal, in a 24th embodiment of the present invention.
Figure 62:
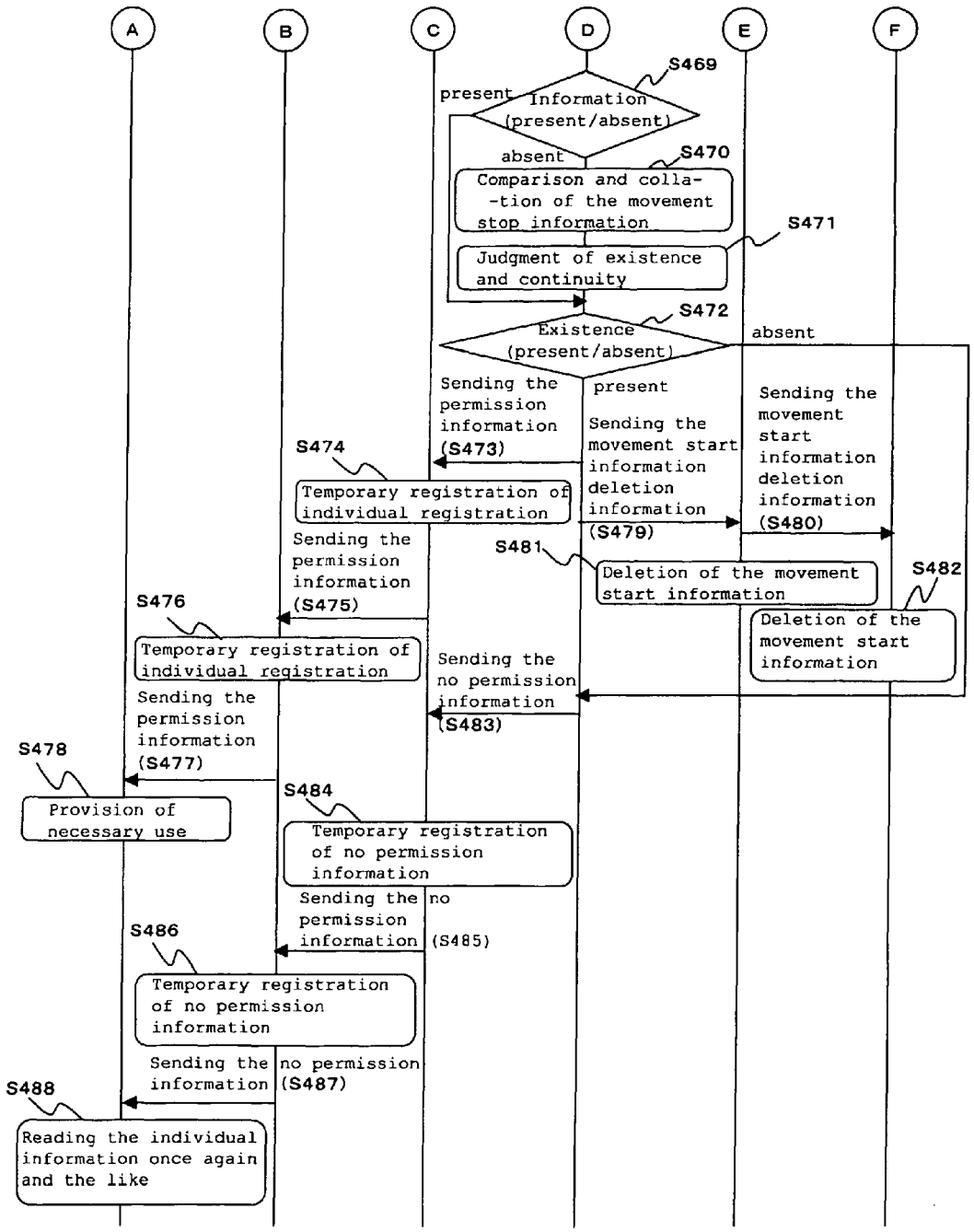
FIG. 62 is a sequence chart showing an action example when information use permission information is transferred from the building structure side terminal 110A to the building structure side terminal 110W, in the 24th embodiment of the present invention.
Figure 64:
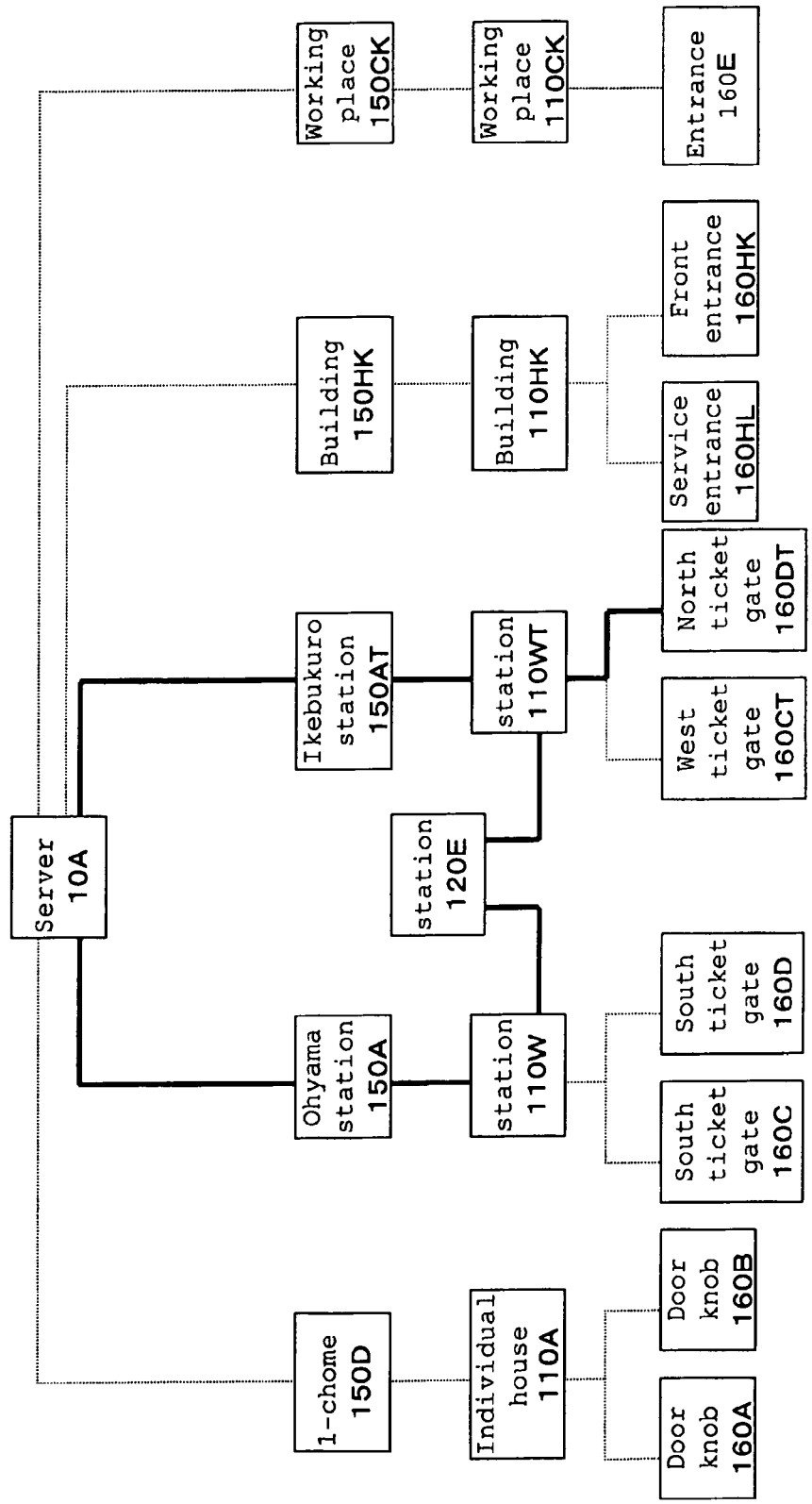
FIG. 64 is a figure showing a network structure example of servers and terminals configuring the authentication system.
Figure 65:
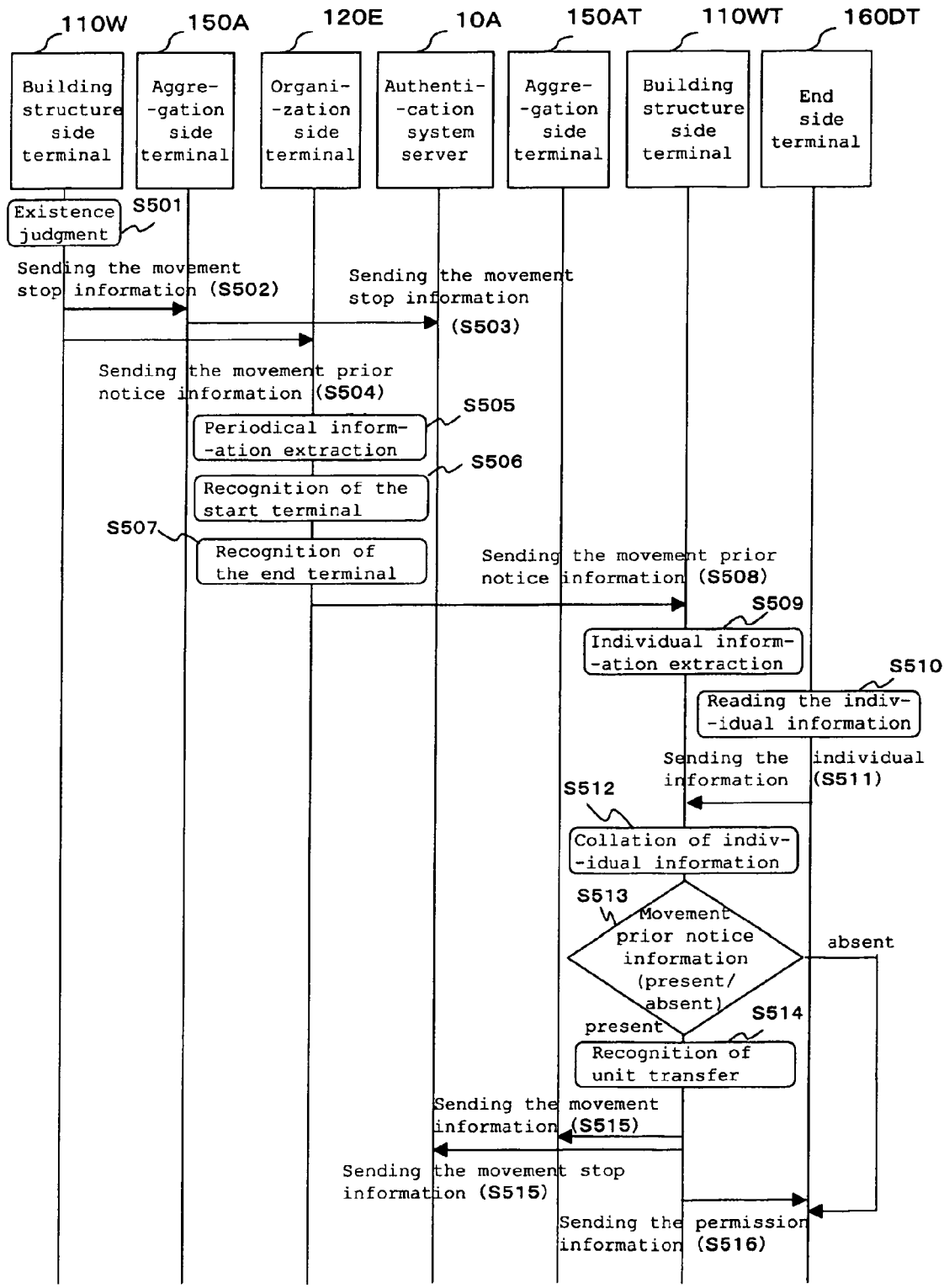
FIG. 65 is a sequence chart showing an action example when terminals used by registered person move from the building structure side terminal to the building structure side terminal, in a 25th embodiment of the present invention.
Figure 68:
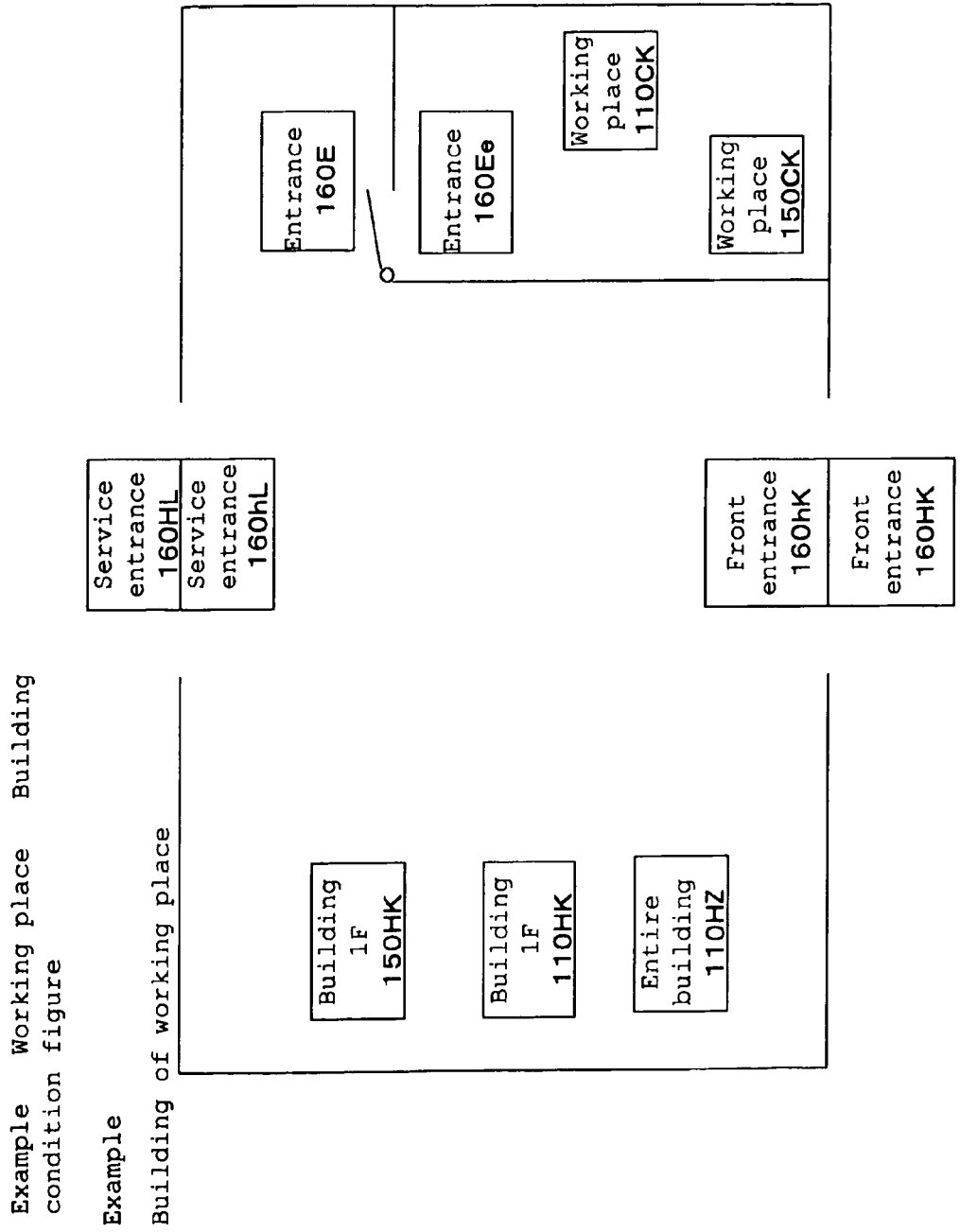
FIG. 68 is a figure showing an installation example of authentication systems around the place of registered person, in the authentication system according to the present embodiment.
Figure 69:
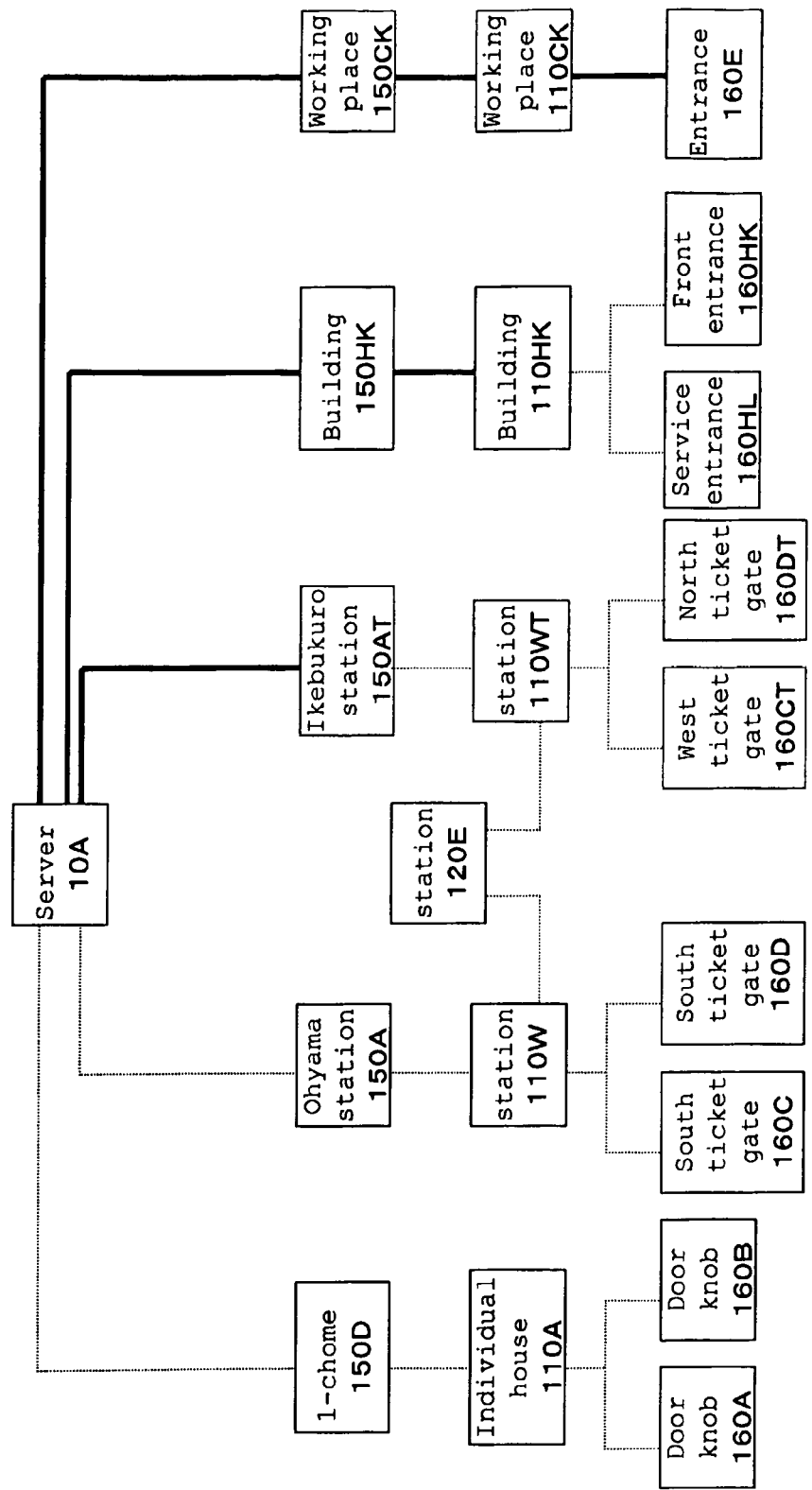
FIG. 69 is a figure showing a network structure example of servers and terminals configuring the authentication system.
Figure 71:
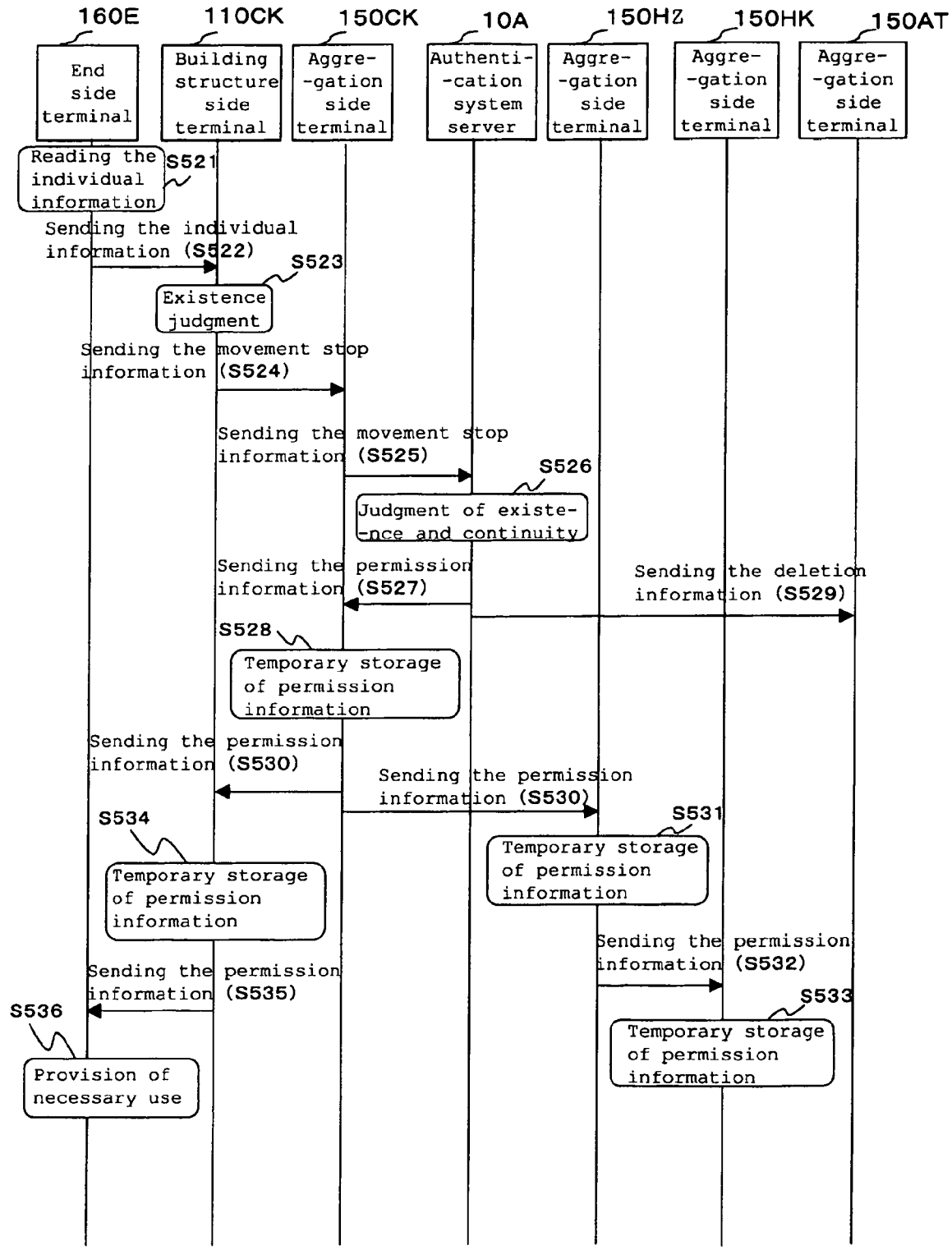
FIG. 71 is a sequence chart showing an action example when terminals used by the registered person move from the building structure side terminal to the building structure side terminal, in a 26th embodiment of the present invention.
Figure 72:
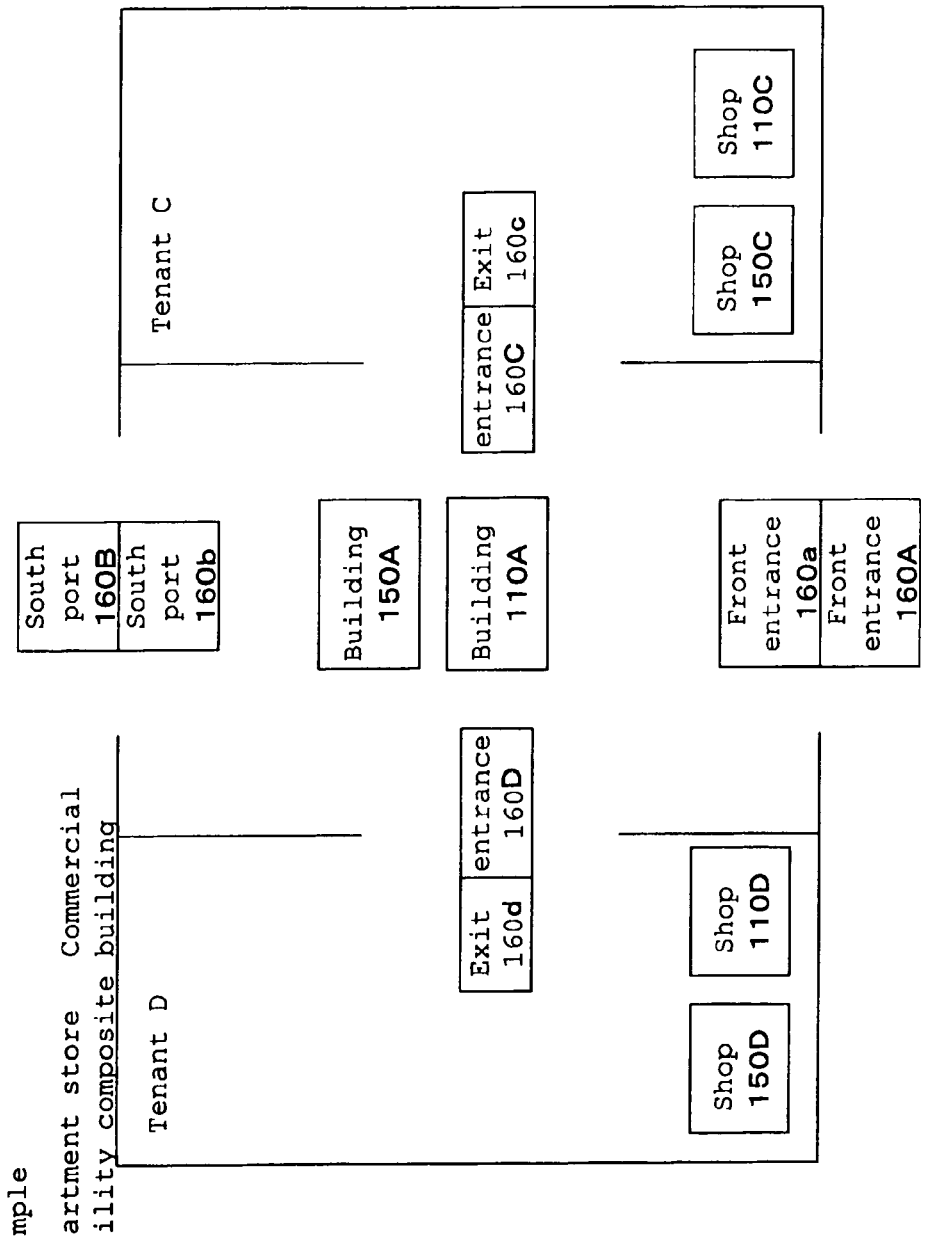
FIG. 72 is a figure showing an installation example of terminals when an authentication system is configured in a department store, in the present embodiment.
Figure 73:
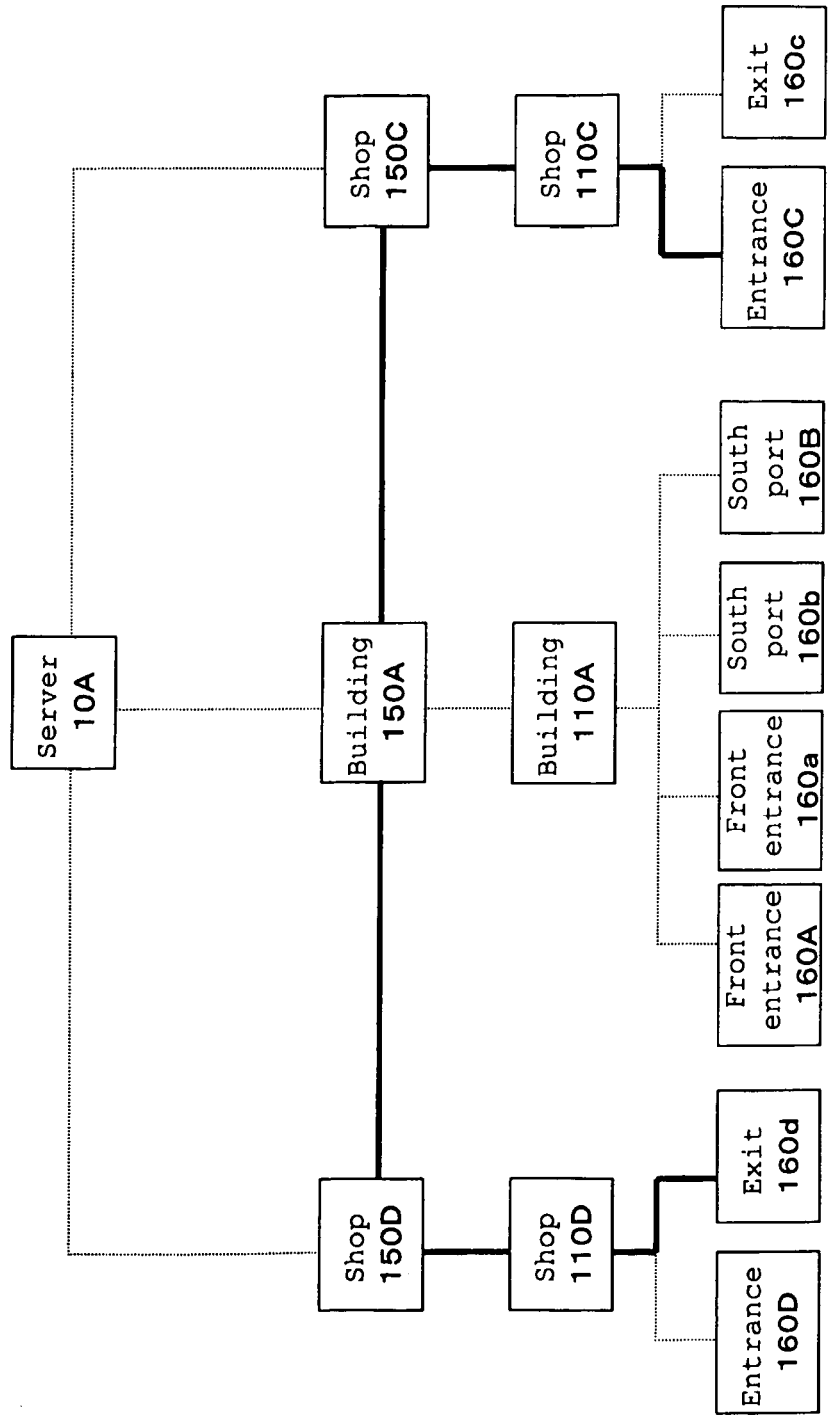
FIG. 73 is a figure showing a connection example of networks among terminals installed in the above department store.
Figure 74:
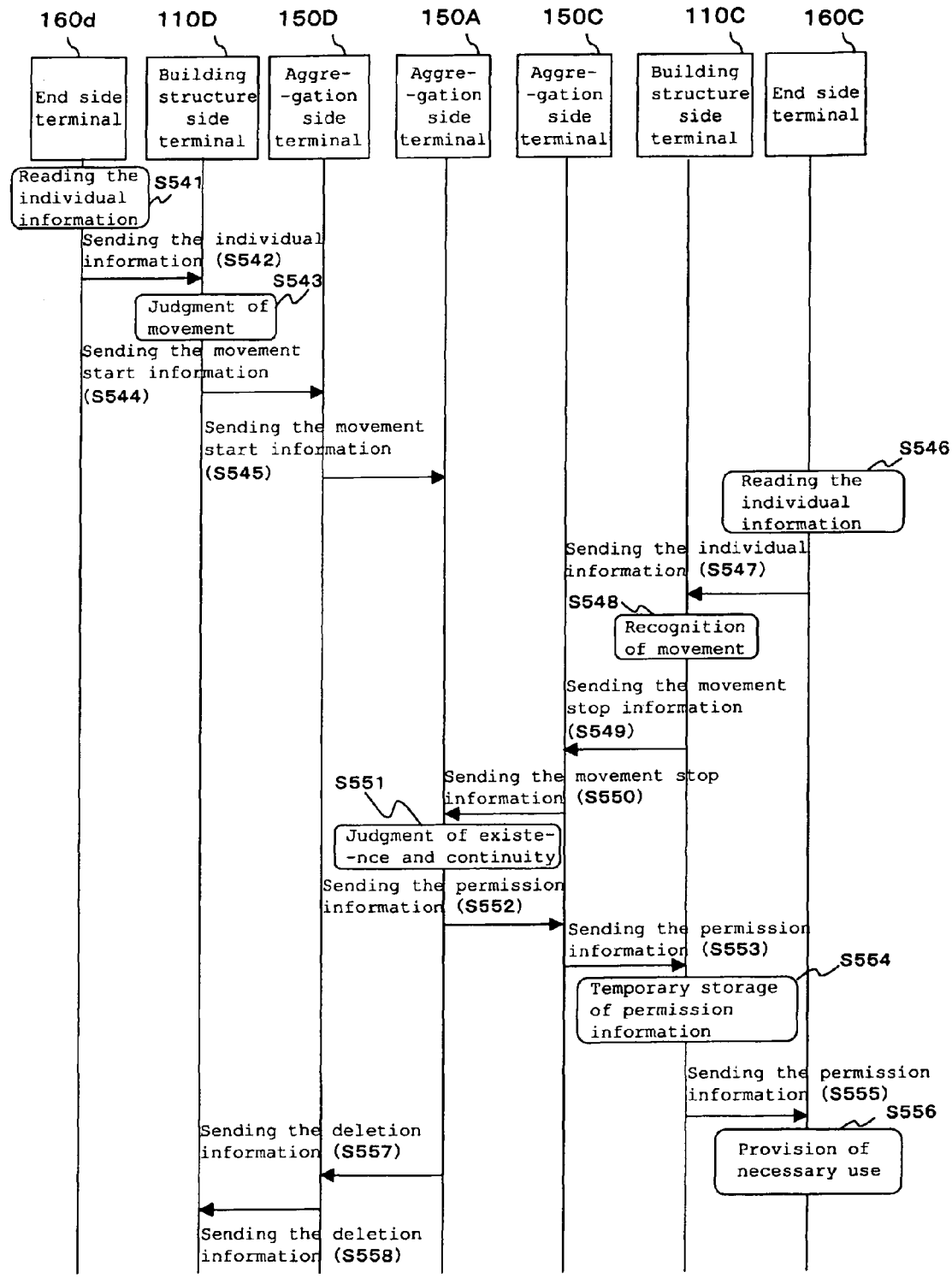
FIG. 74 is a sequence chart showing an action example where information is moved among units existing in the building that the aggregation side terminal manages, in a 27th embodiment.
Figure 75:
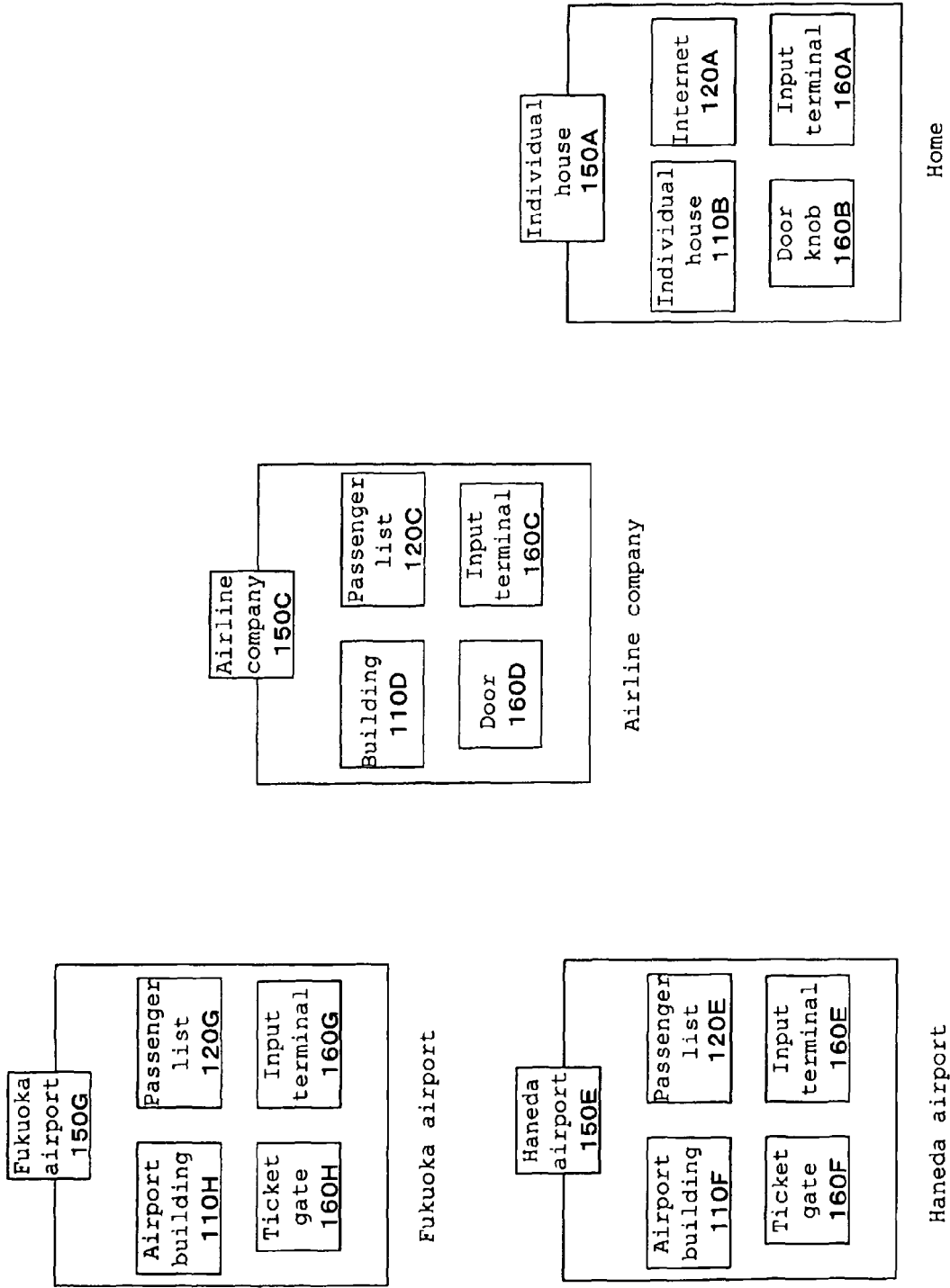
Figure 76:
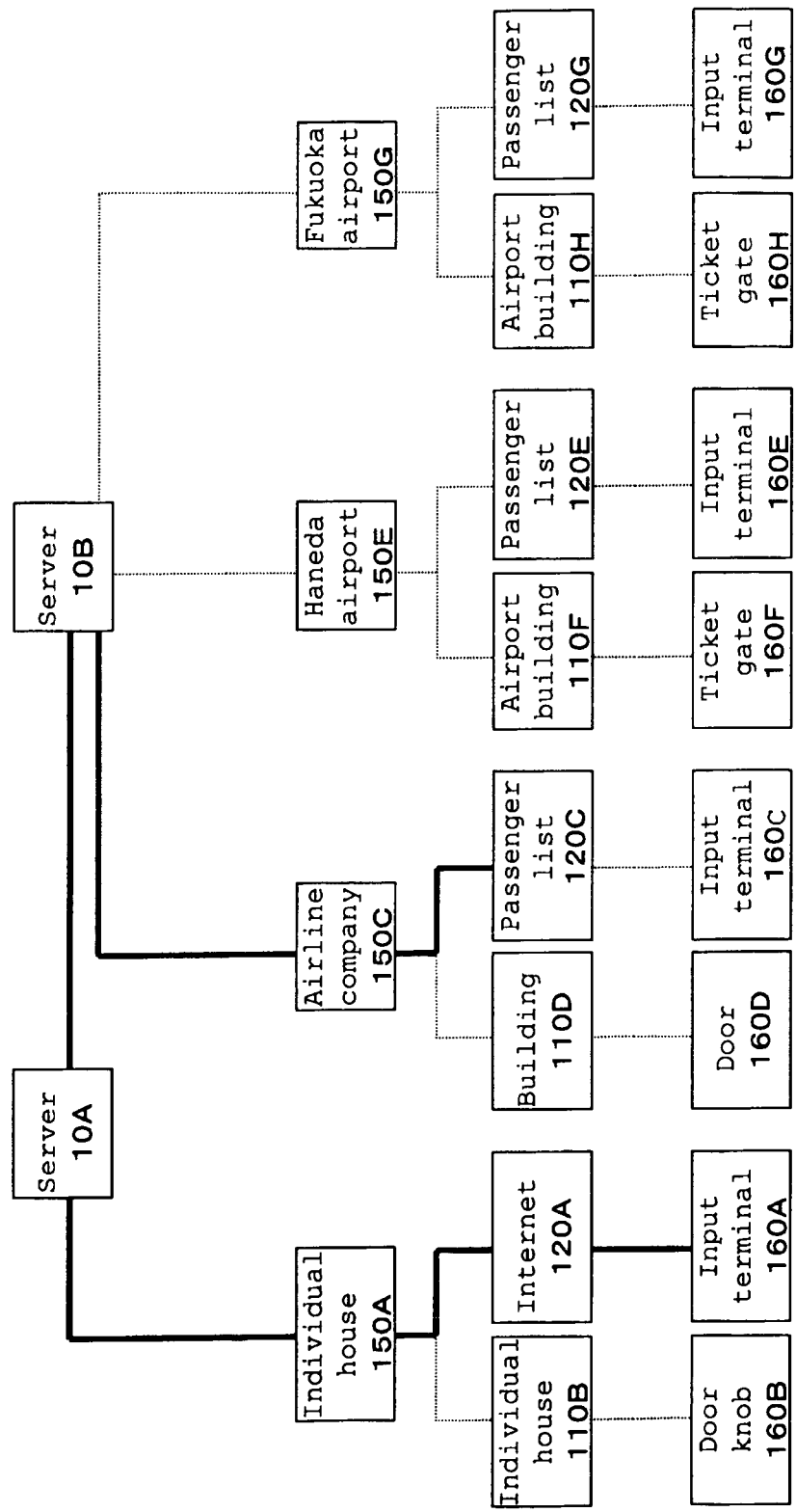
Figure 77:
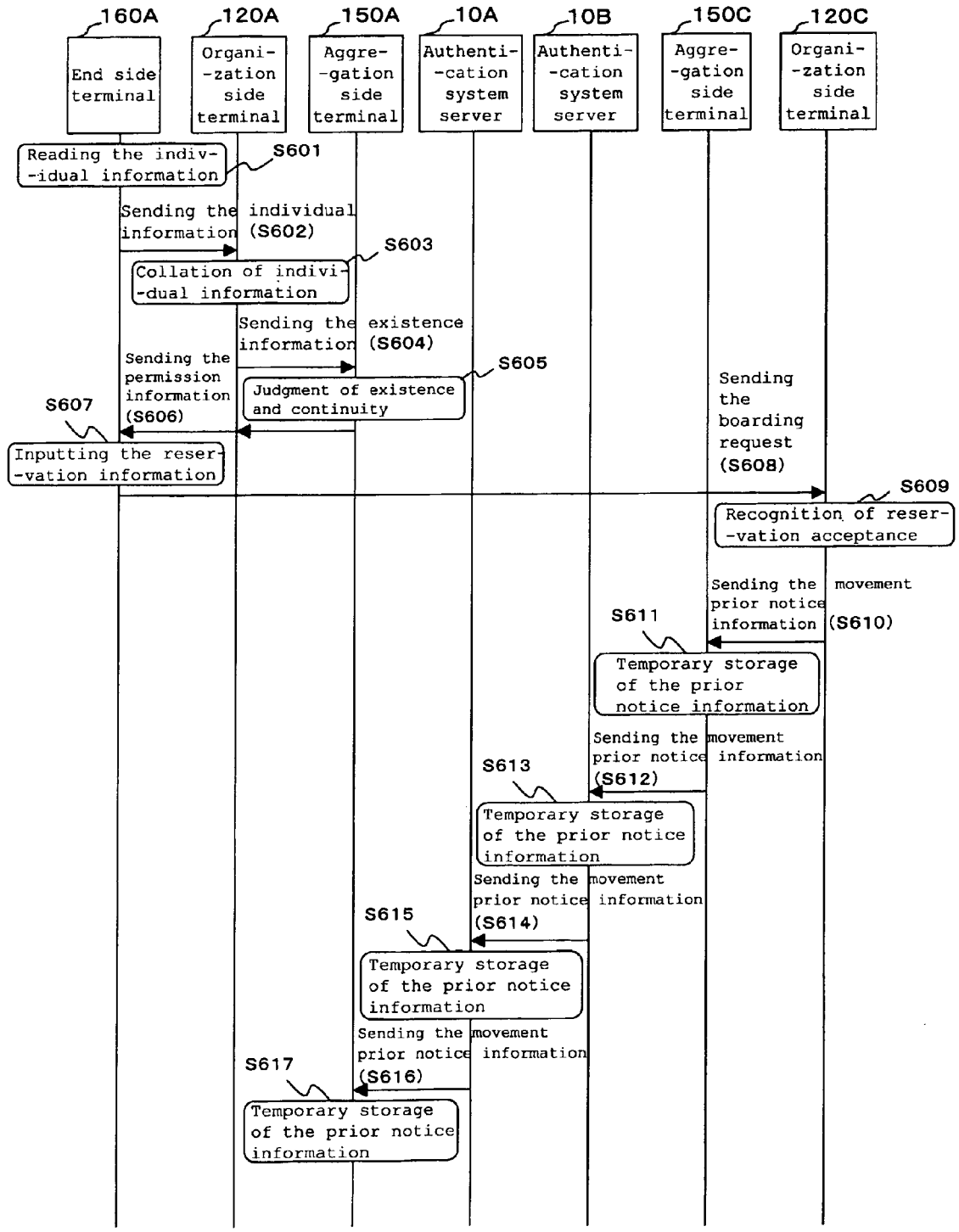
FIG. 77 is a sequence chart showing an action example where units used by registered person are changed when registered person individual moves along determined schedule, in a 28th embodiment of the present invention.
Figure 78:
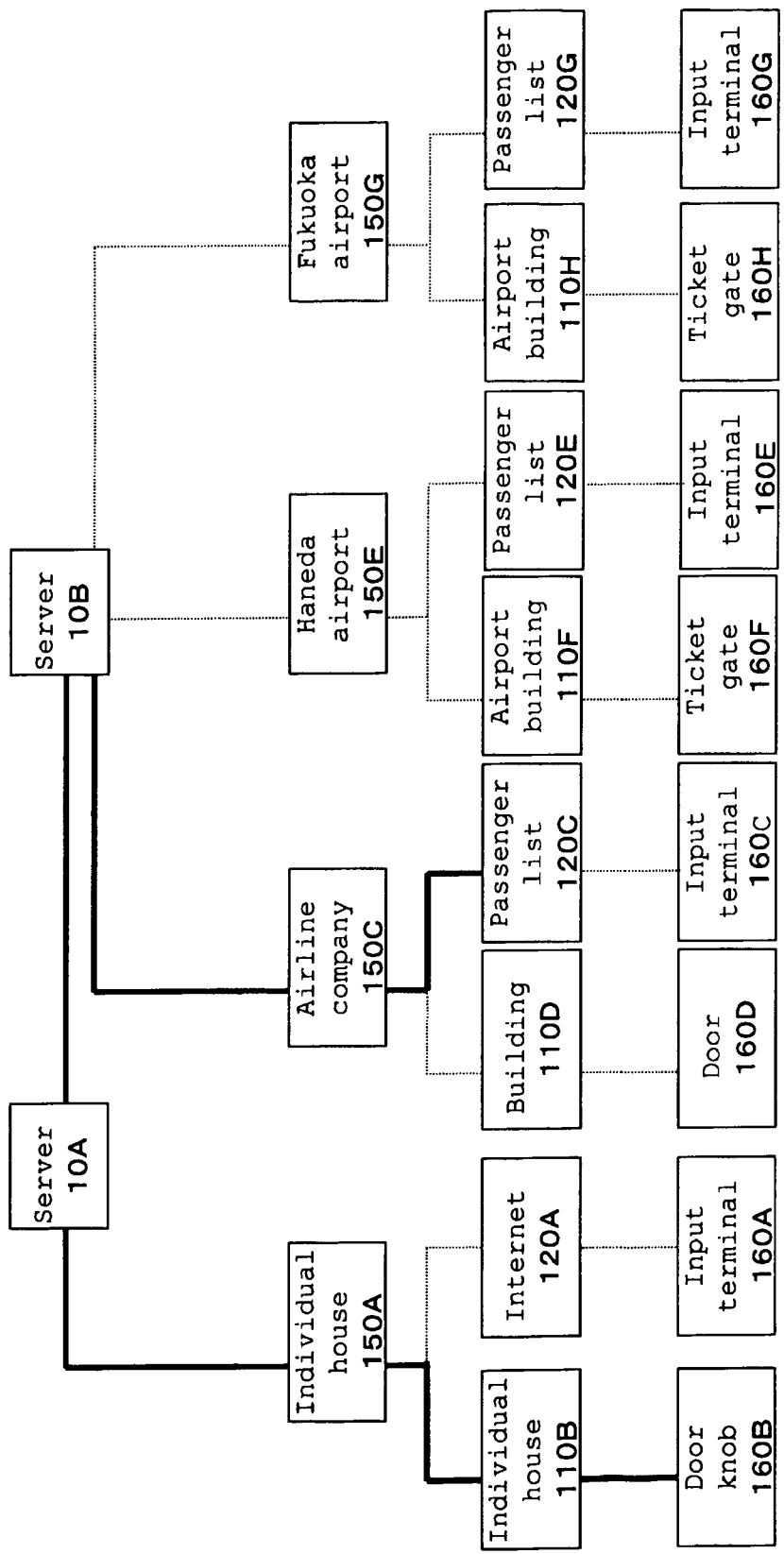
Figure 79:
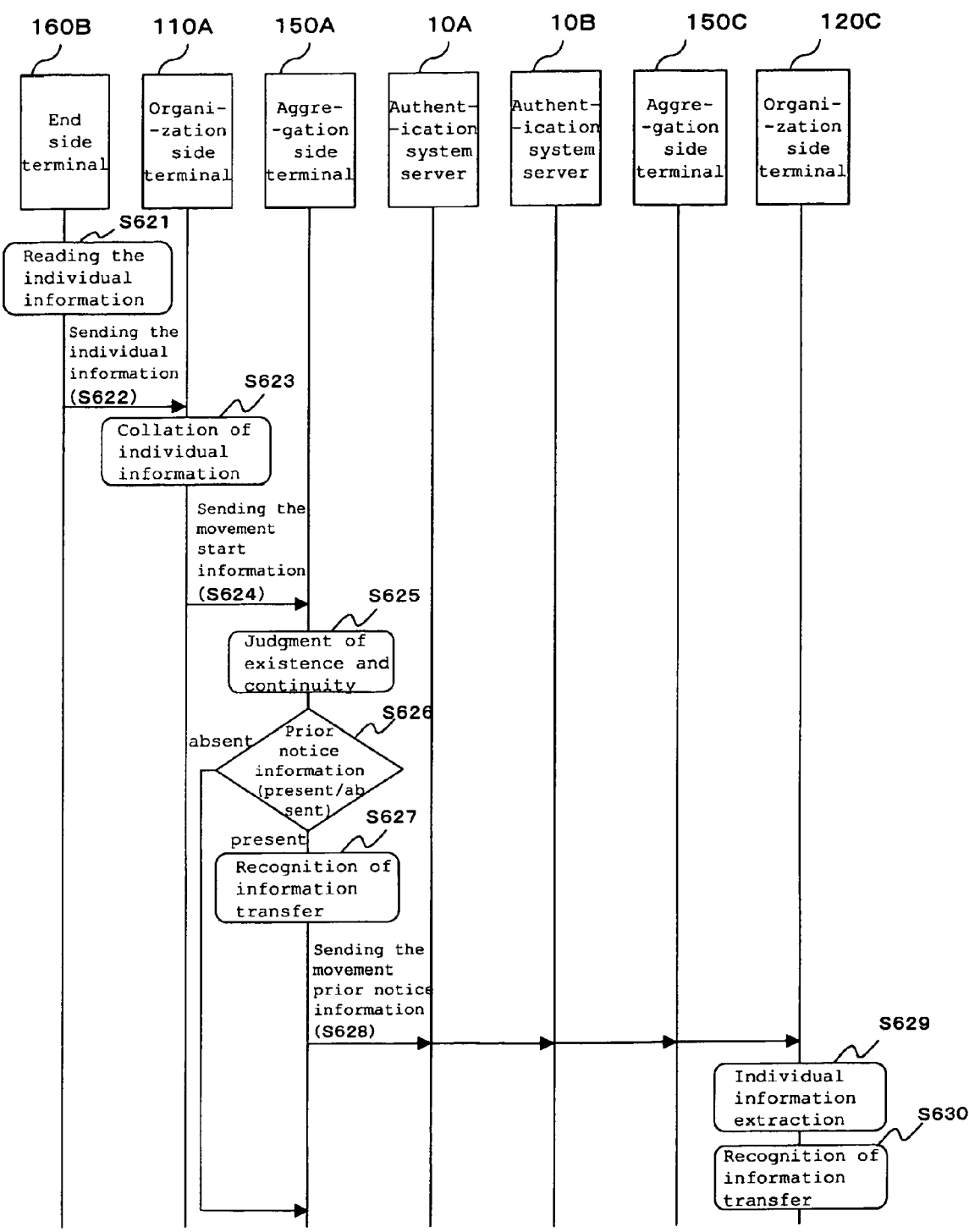
FIG. 79 is a sequence chart showing an action example where units used by registered person are changed when registered person individual moves along determined schedule, in a 29th embodiment of the present invention.
Figure 80:
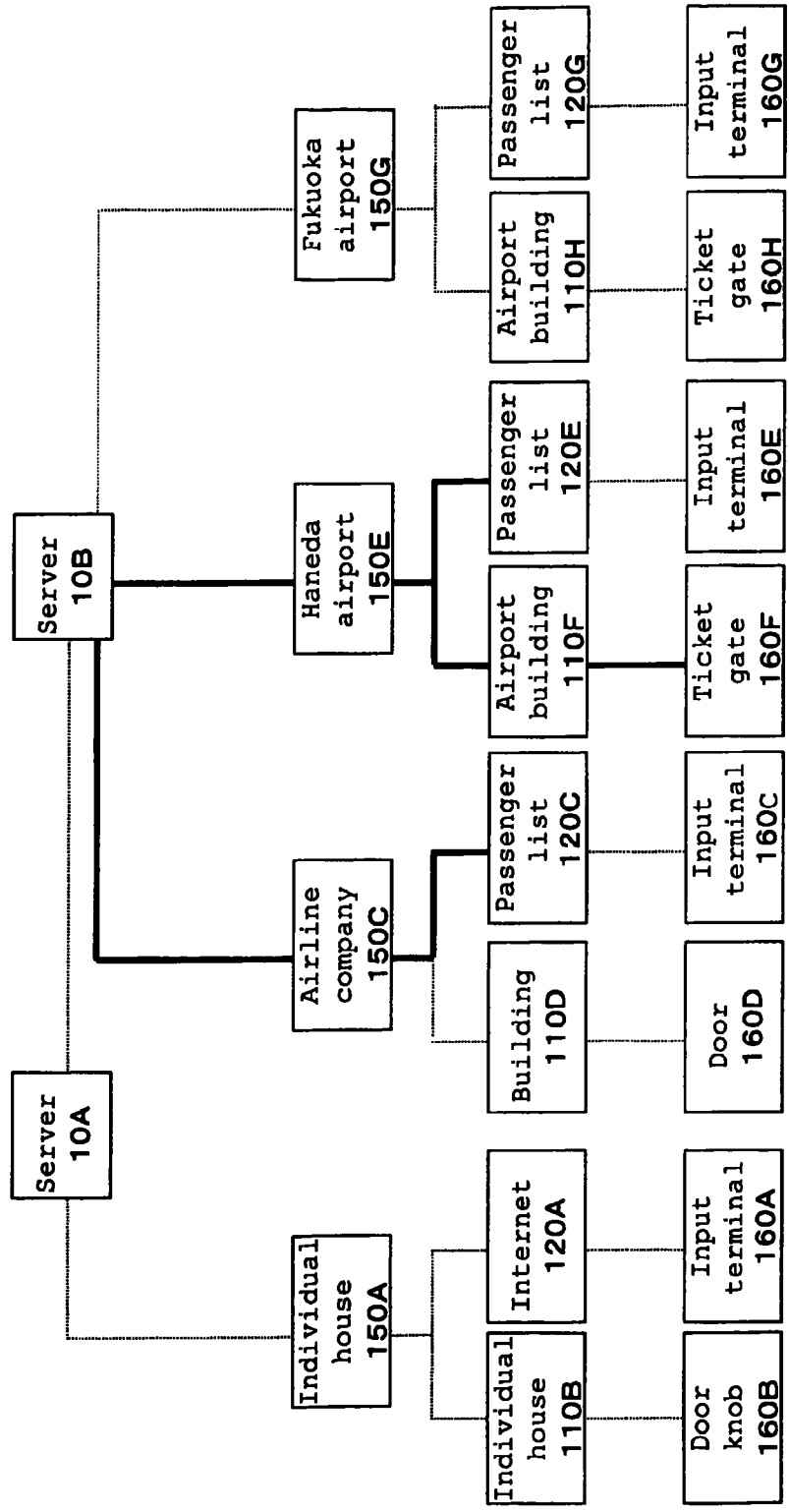
Figure 81:
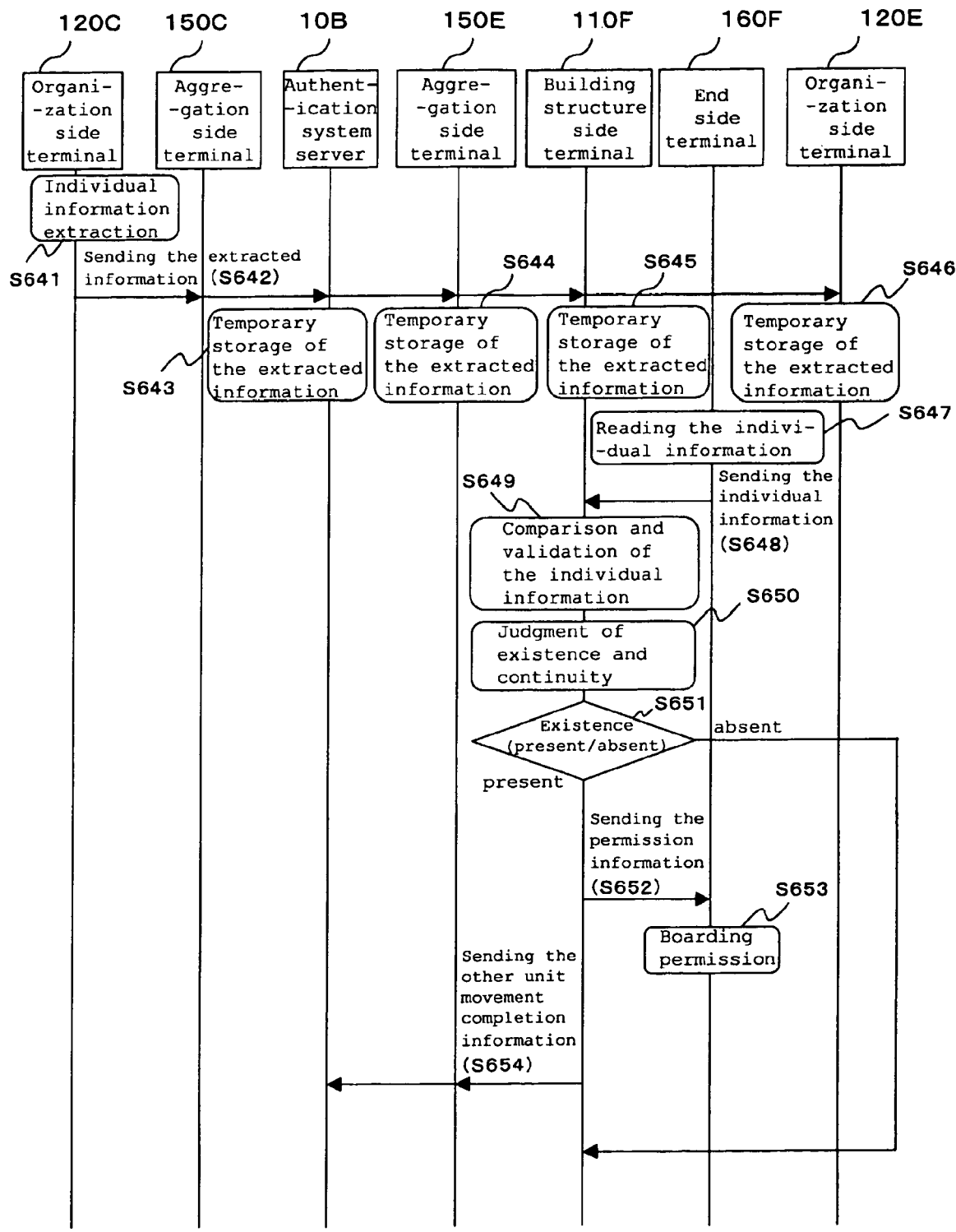
FIG. 81 is a sequence chart showing an action example where units used by registered person are changed when registered person individual moves along determined schedule, in a 30th embodiment of the present invention.
Figure 82:
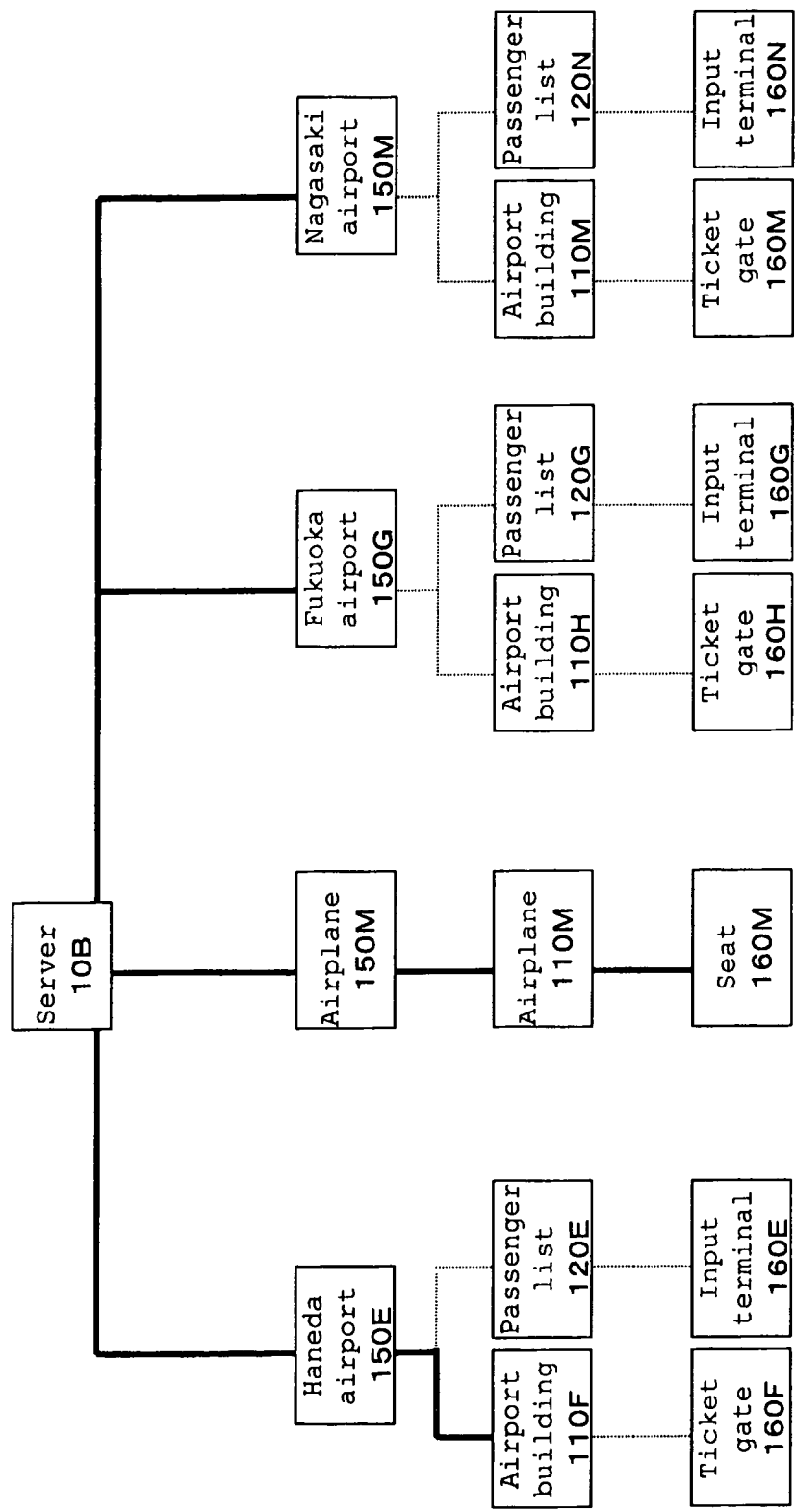
Figure 83:
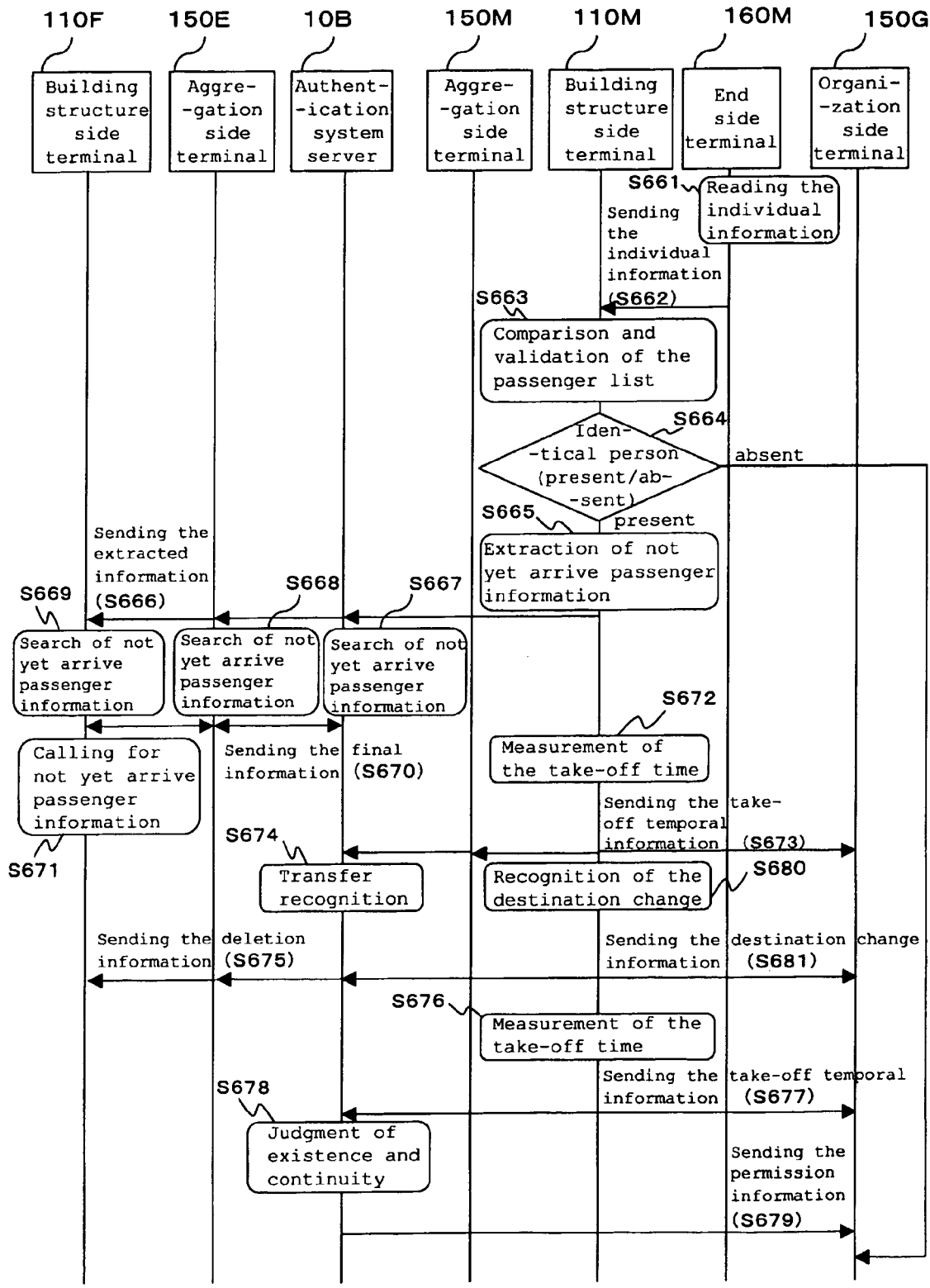
FIG. 83 is a sequence chart showing an action example where units used by registered person are changed when registered person individual moves along determined schedule, in a 31st embodiment of the present invention.
Figure 84:
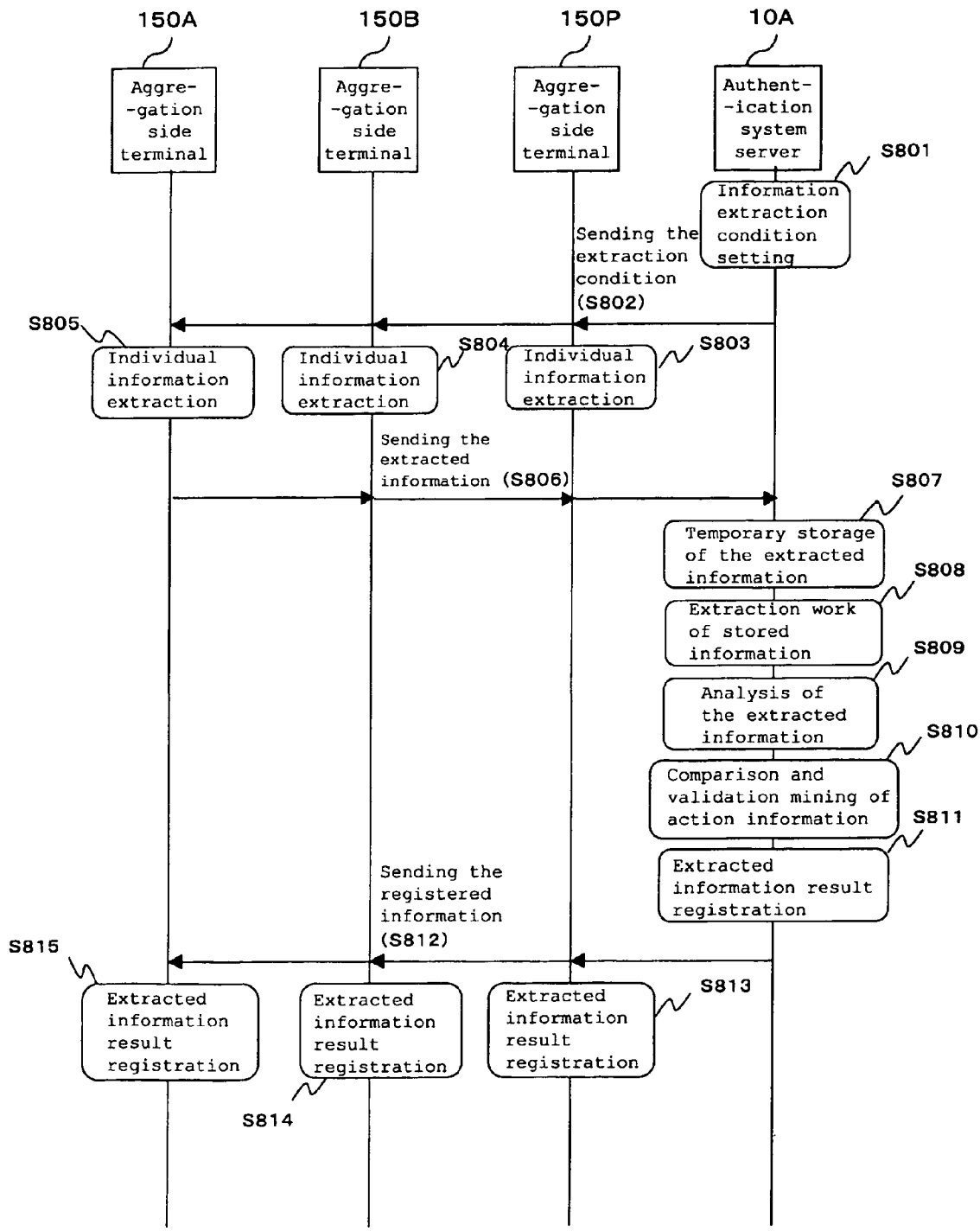
FIG. 84 is a sequence chart showing an action example where use terminal conditions are extracted from the history information of registered person individual and expected routes are calculated, in a 32nd embodiment of the present invention.
Figure 86:
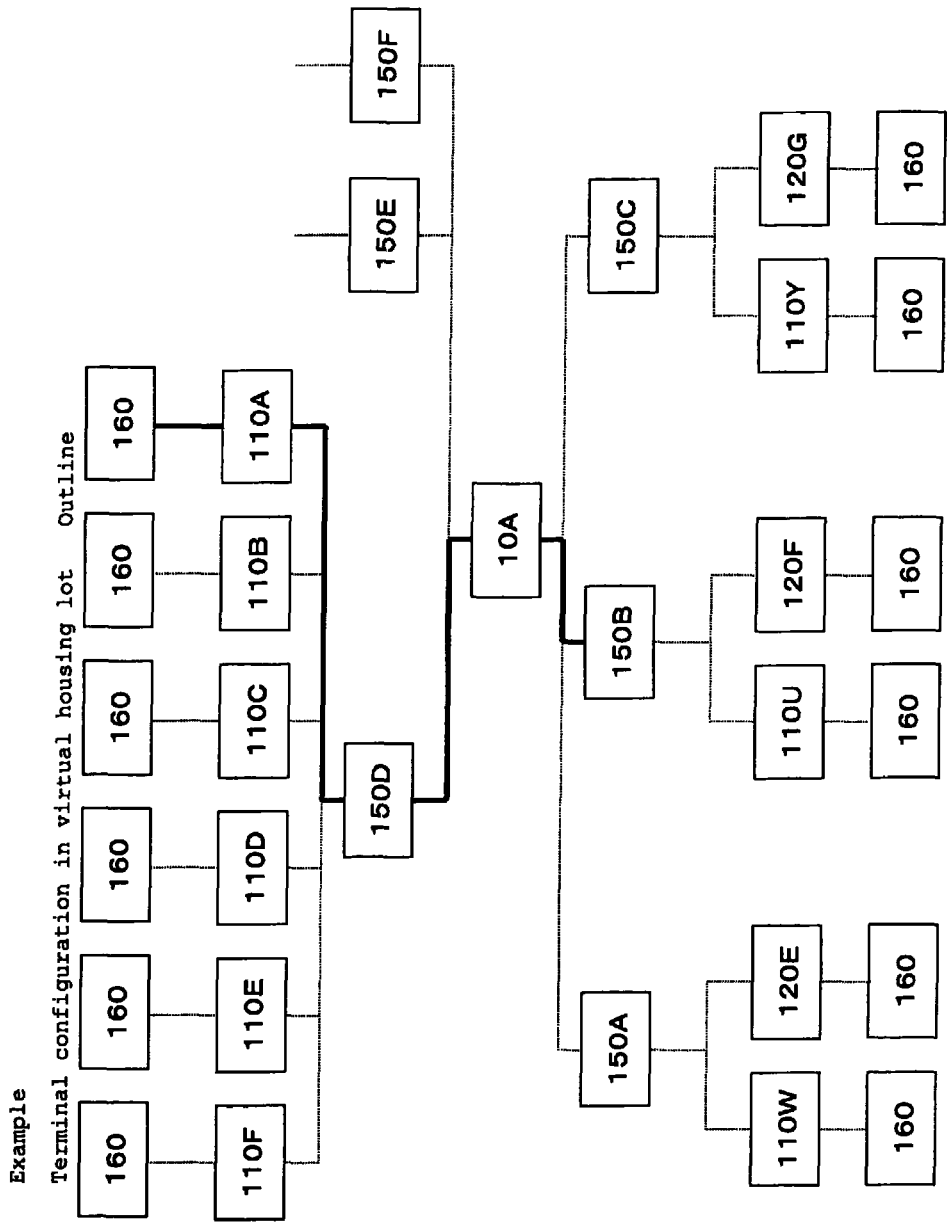
FIG. 86 is a figure showing an installation example of terminals and servers configuring authentication system around the home of registered person and the super market.
Figure 87:
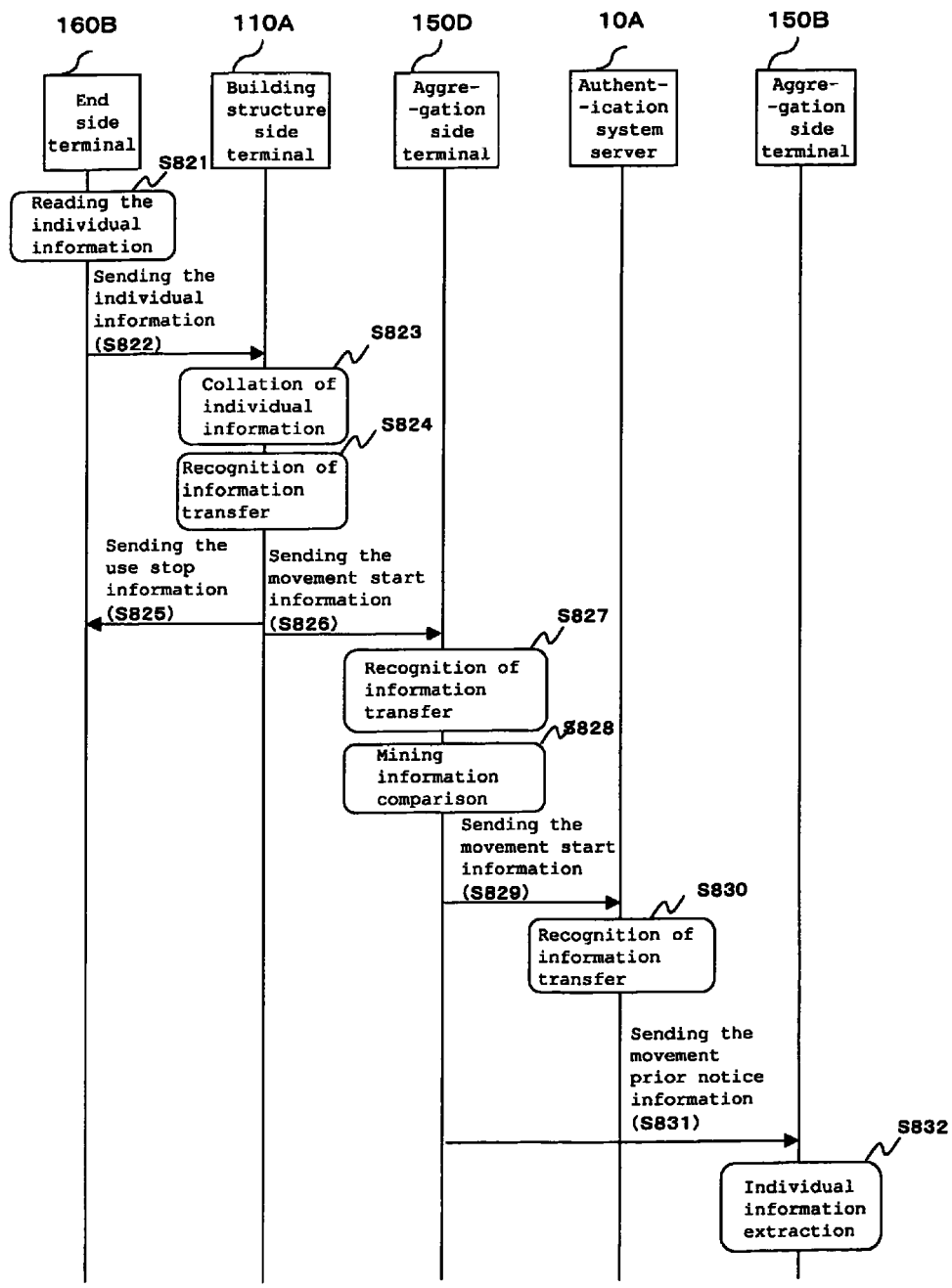
FIG. 87 is a sequence chart showing an action example where action pattern is forecasted from the mining information of registered person individual, and the movement related information is sent, in a 33rd embodiment of the present invention.
Figure 88:
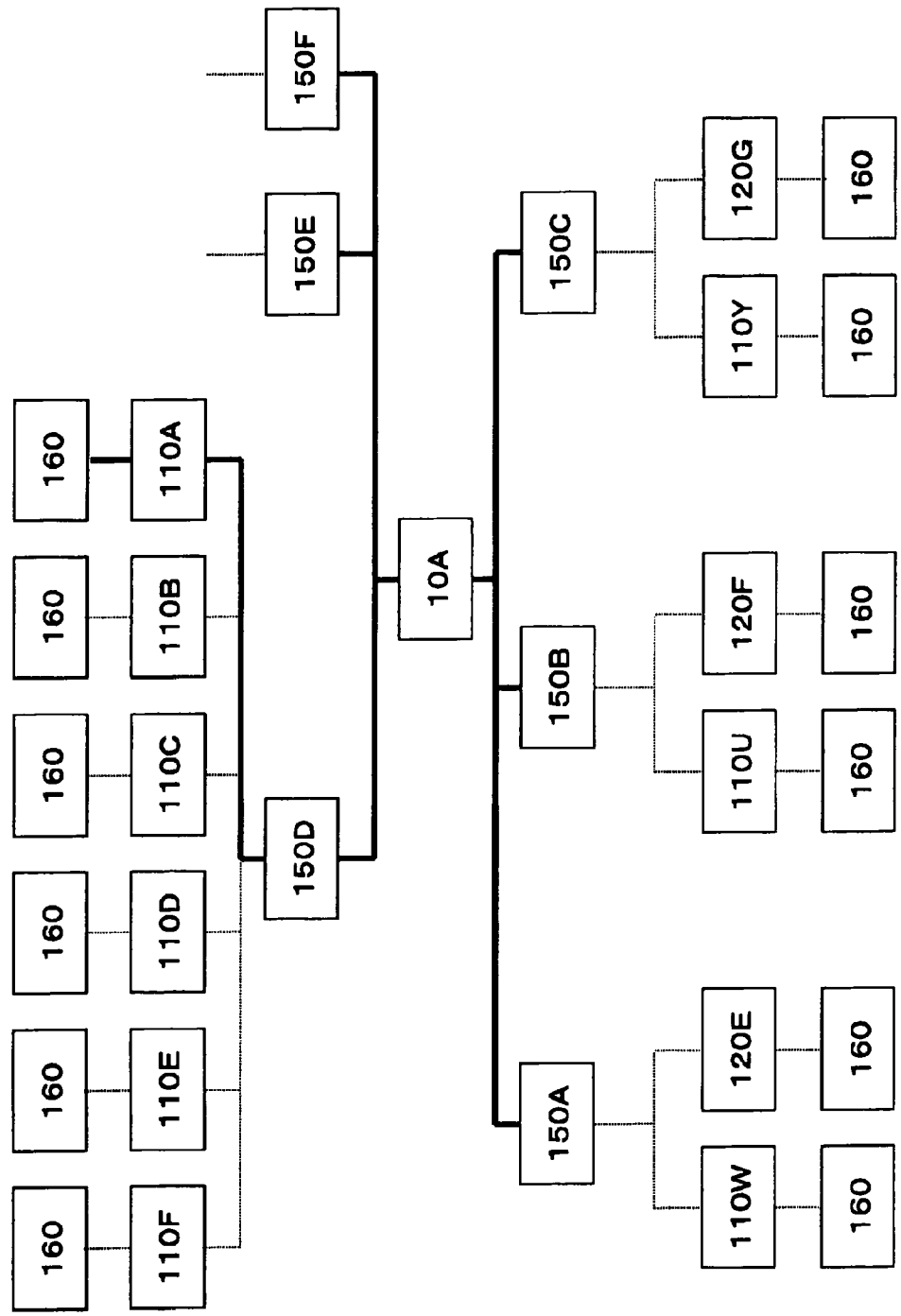
FIG. 88 is a figure showing an installation example of terminals and servers configuring authentication system around the home of registered person.
Figure 89:
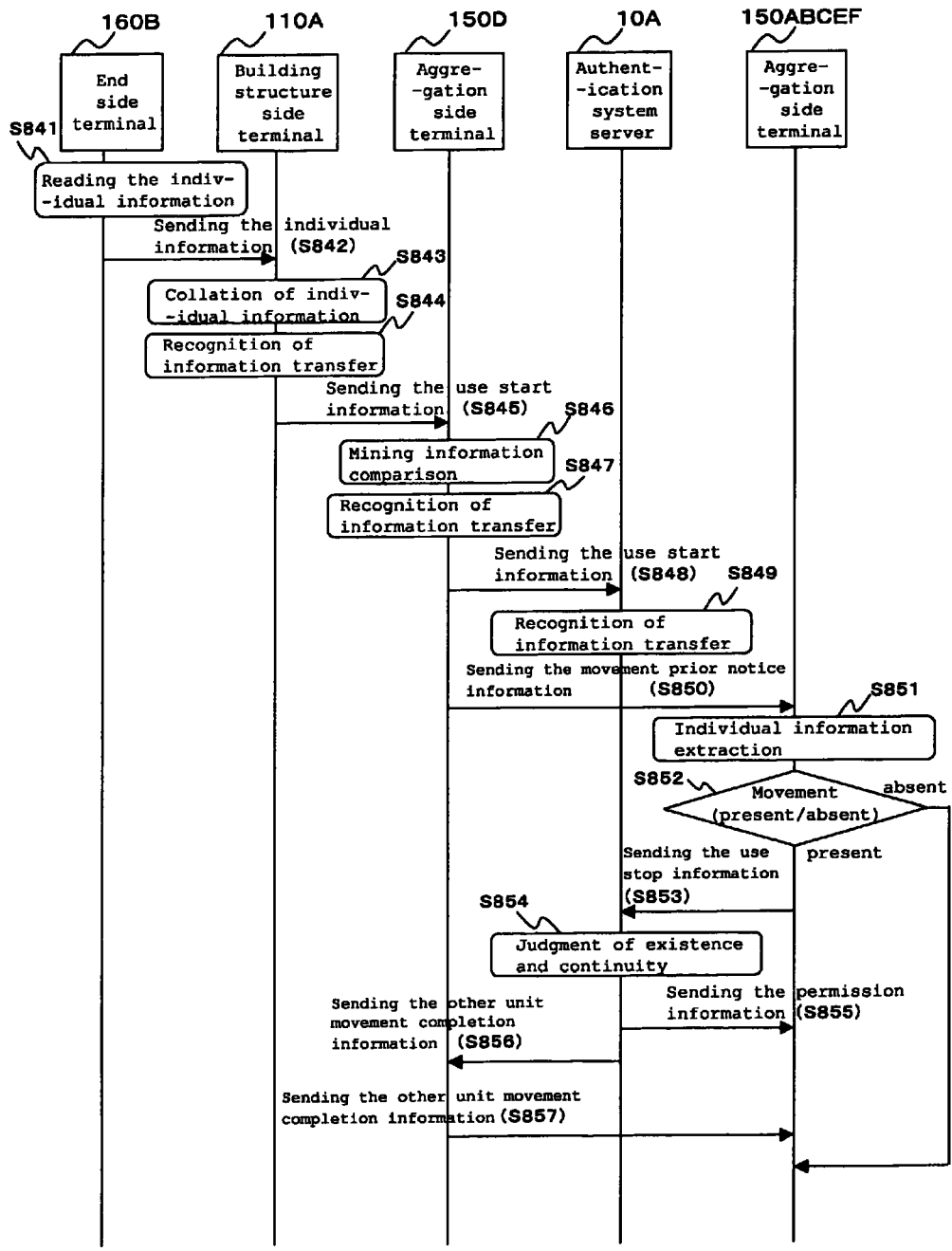
FIG. 89 is a sequence chart showing an action example where the movement related information is sent to the system inside, when action pattern cannot be forecasted from mining information of registered person individual, in a 34th embodiment of the present invention.
Figure 90:
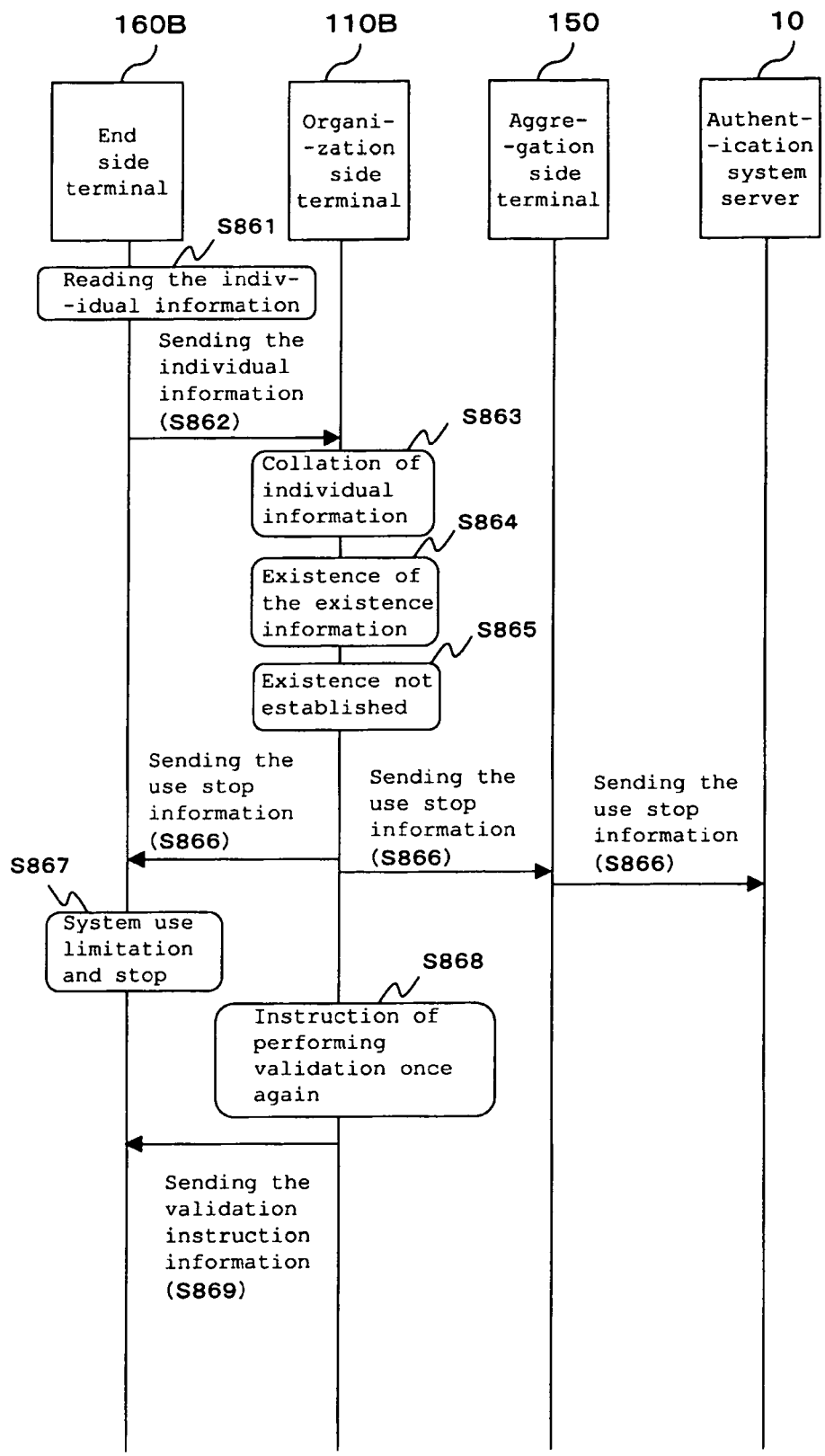
FIG. 90 is a sequence chart showing an action example where there is individual existence information at the working place, in a 35th embodiment of the present invention.
Figure 91:
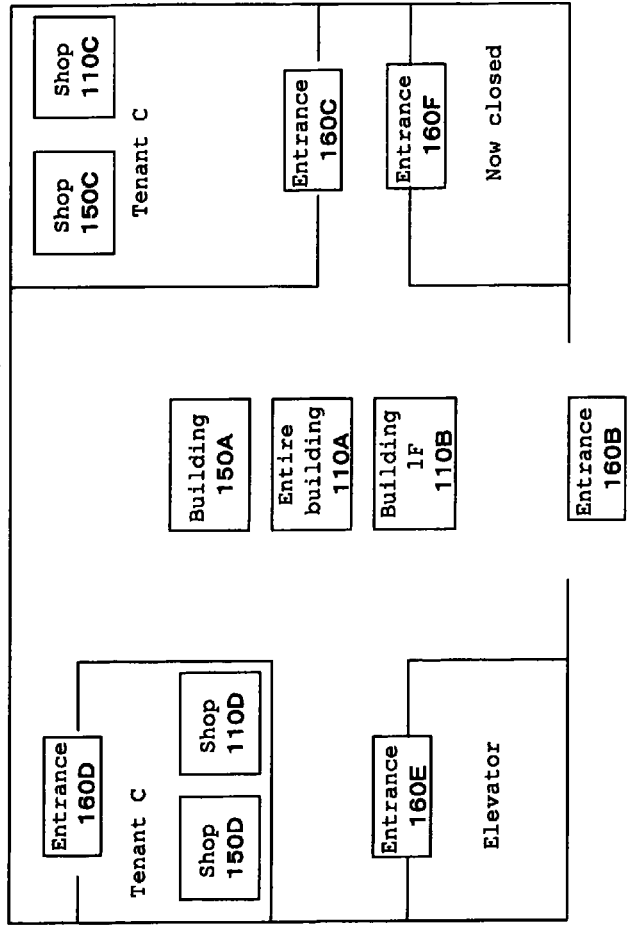
FIG. 91 is a figure showing an installation example of terminals and servers configuring authentication system in a department store.
Figure 92:
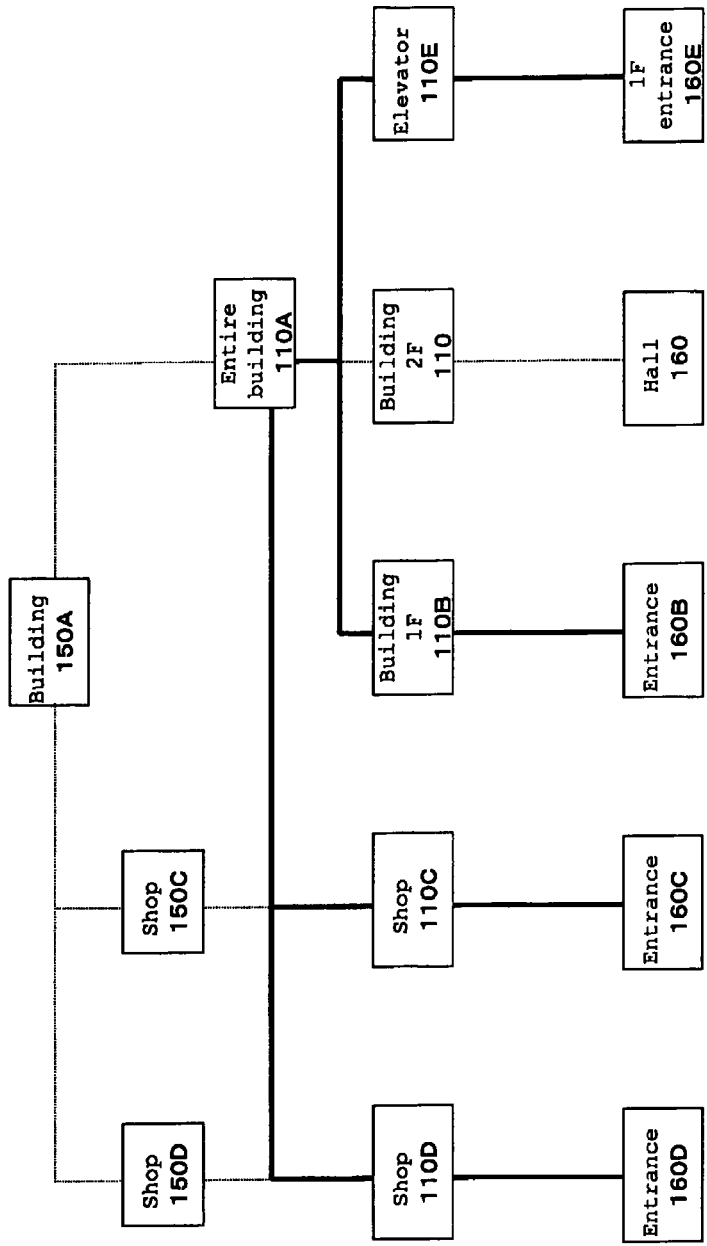
FIG. 92 is a figure showing a connection example of networks among terminals installed in this department store, in the present embodiment.
Figure 93:
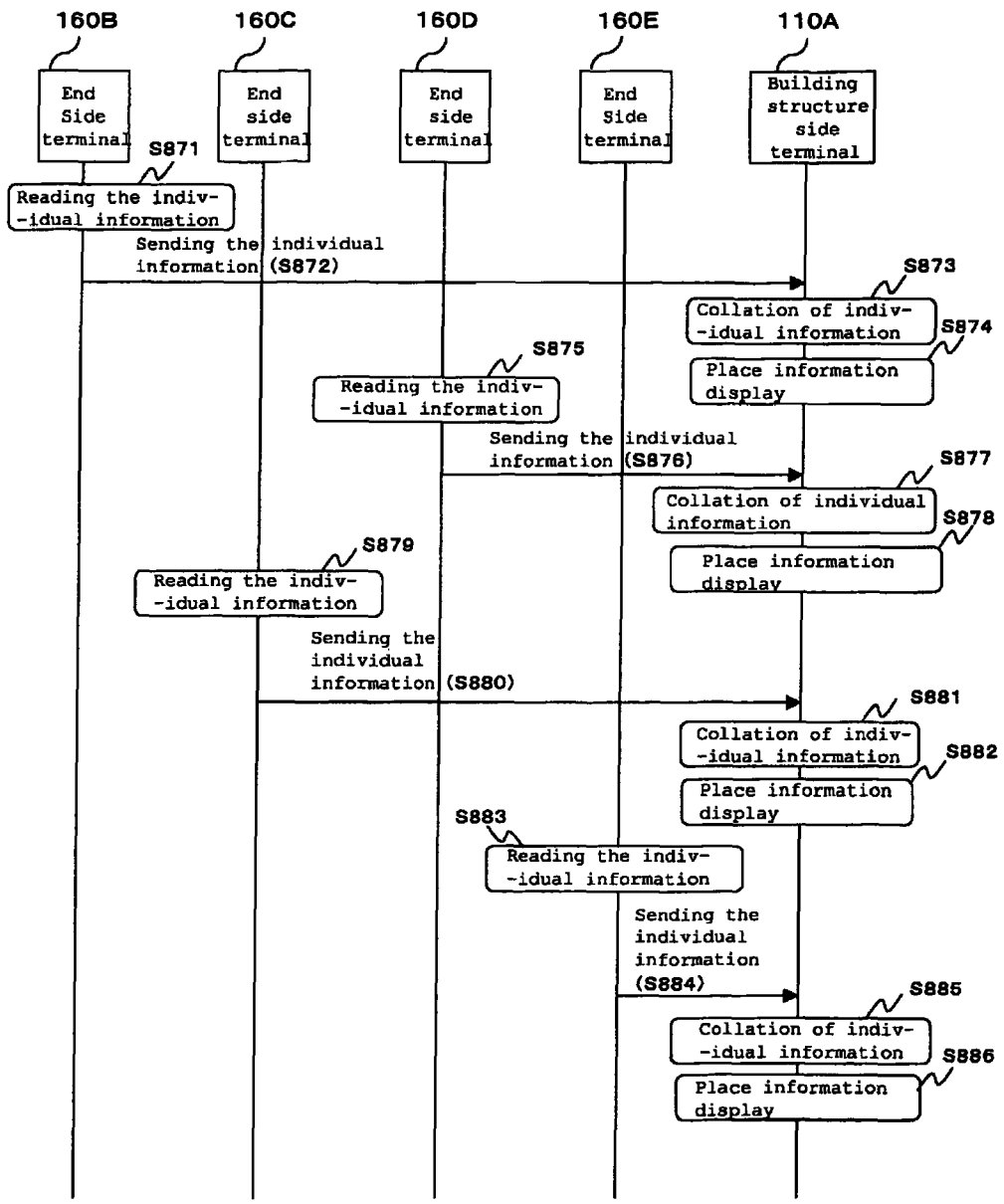
FIG. 93 is a sequence chart showing an action example of a system that, when registered person individual exists in the building, can confirm the existence, in a 36th embodiment of the present invention.
Figure 95:
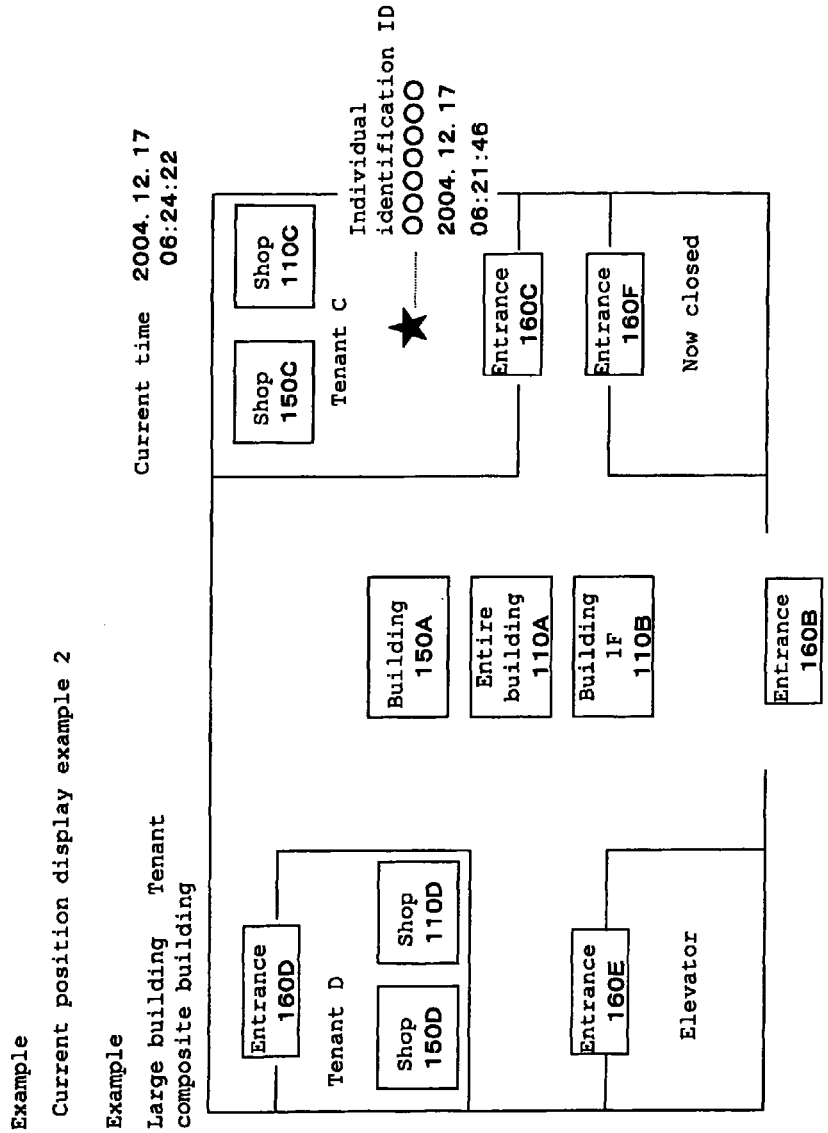
FIG. 95 is a figure showing another display example of the current position display file.5
Figure 96:
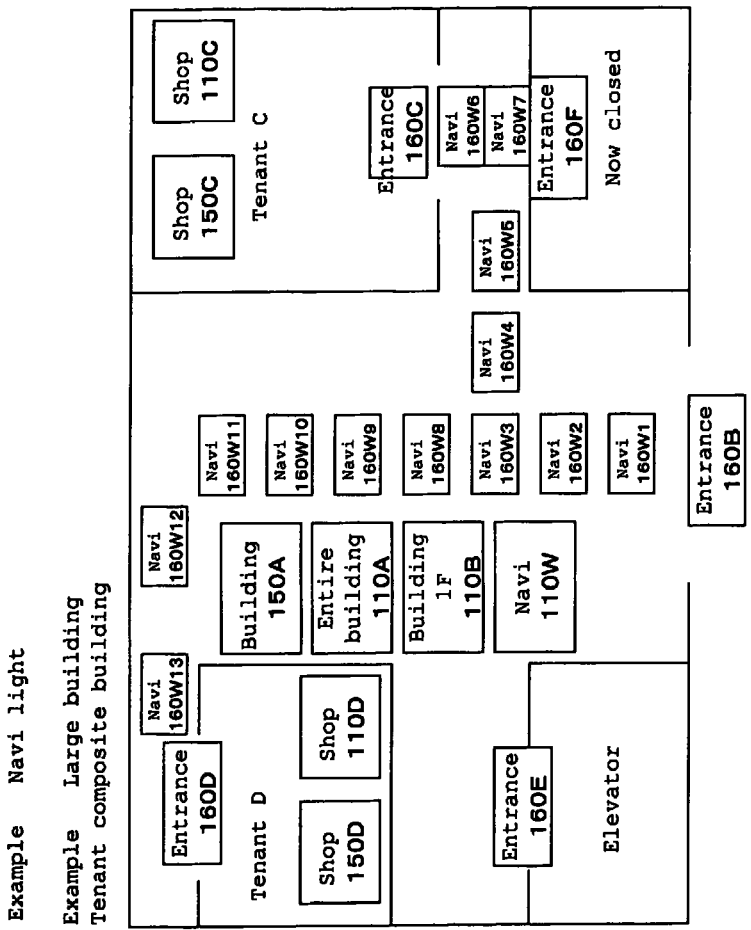
FIG. 96 is a figure showing an installation example of terminals and servers configuring authentication system in a department store, in the present embodiment.
Figure 97:
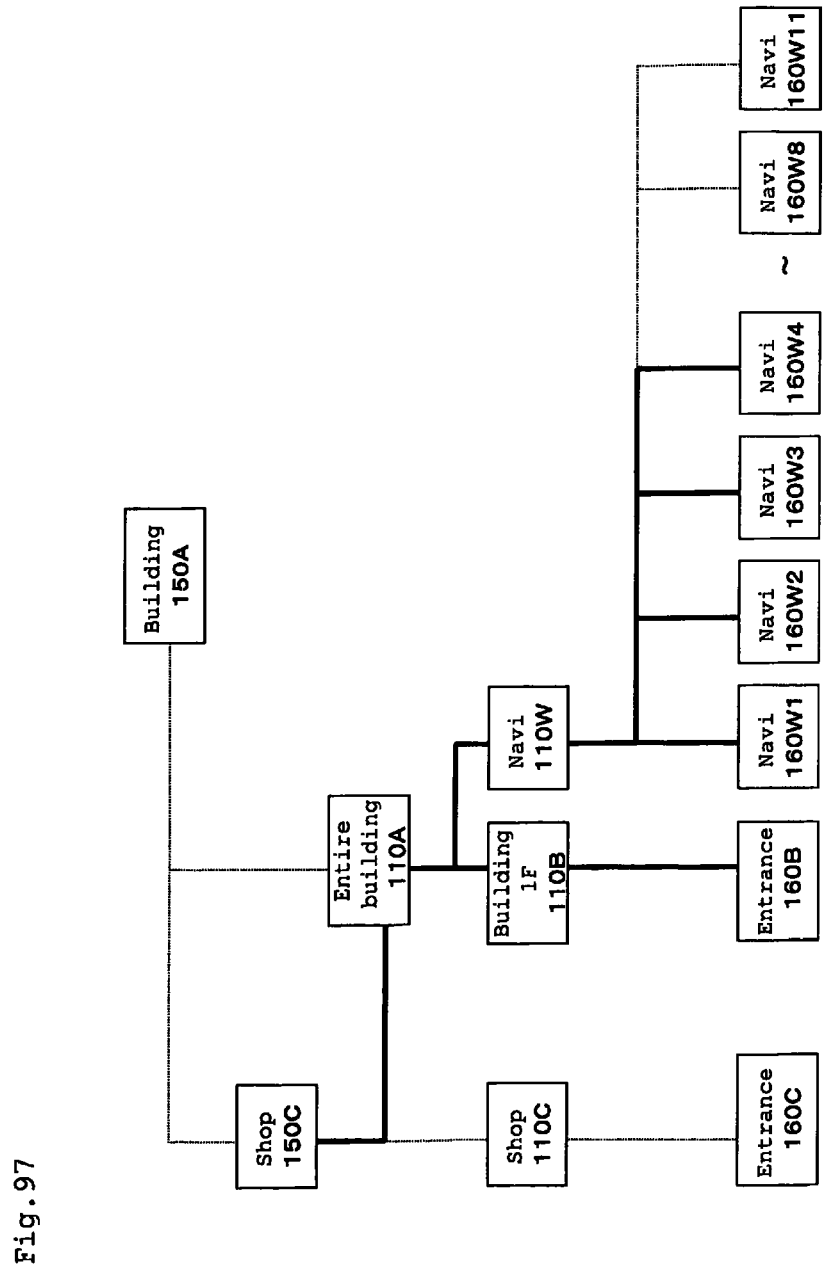
FIG. 97 is a figure showing a connection example of networks among terminals installed in this department store.
Figure 98:
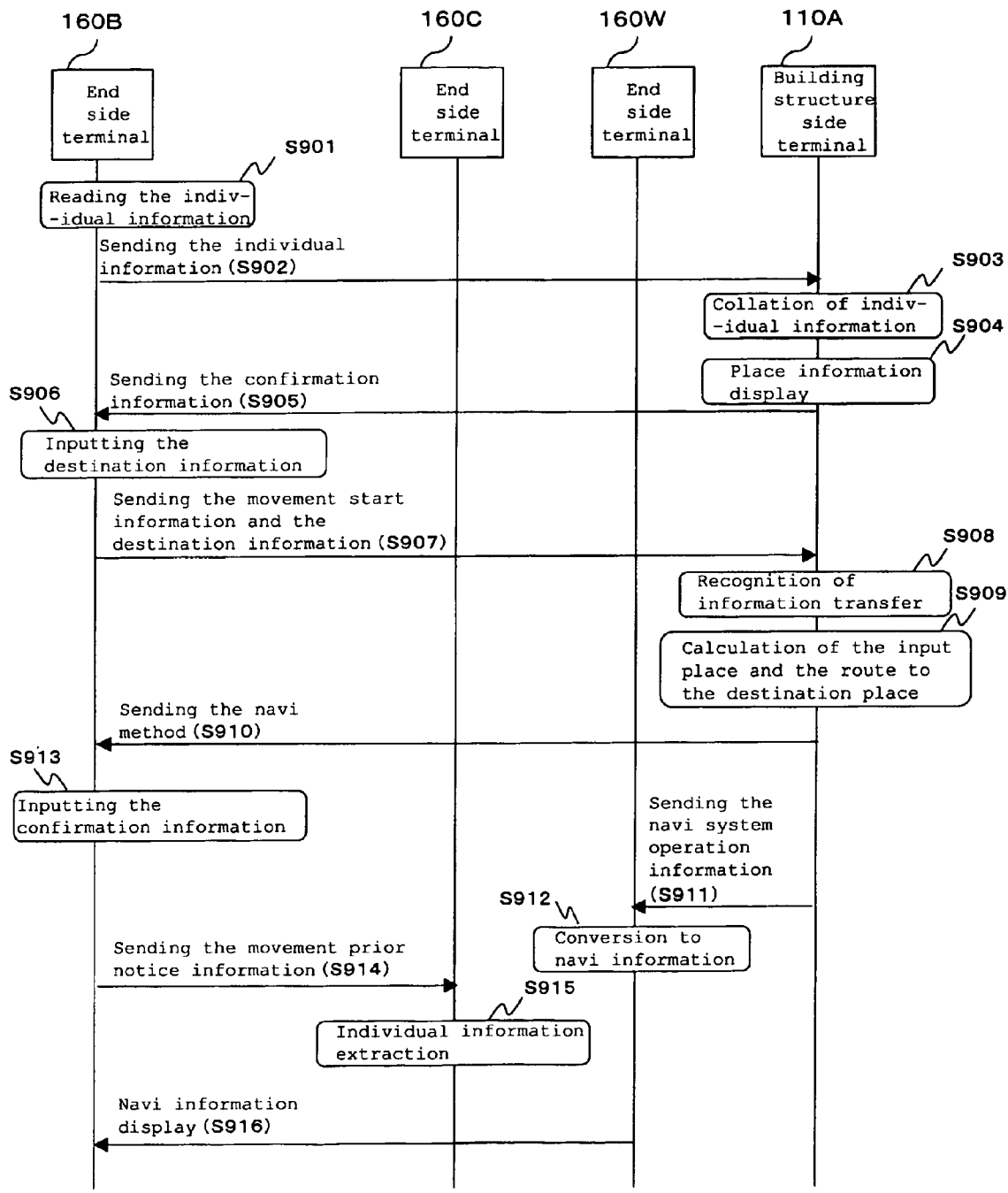
FIG. 98 is a sequence chart showing an action example of a system that, when registered person individual moves in the building, can navigate or confirm the movement places, in a 37th embodiment of the present invention.
Figure 99:
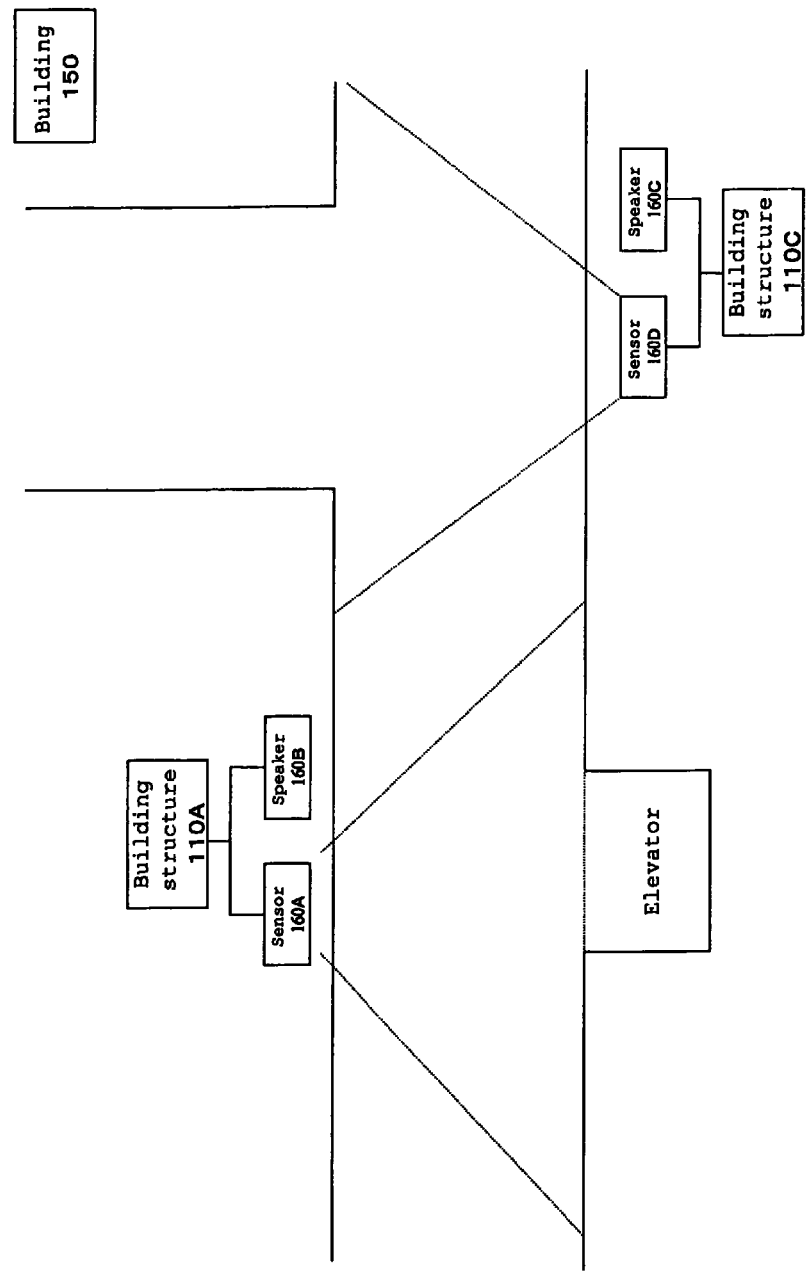
FIG. 99 is a figure showing an installation example of terminals of authentication system for explaining the navigation action of movement route to this registered person.
Figure 100:
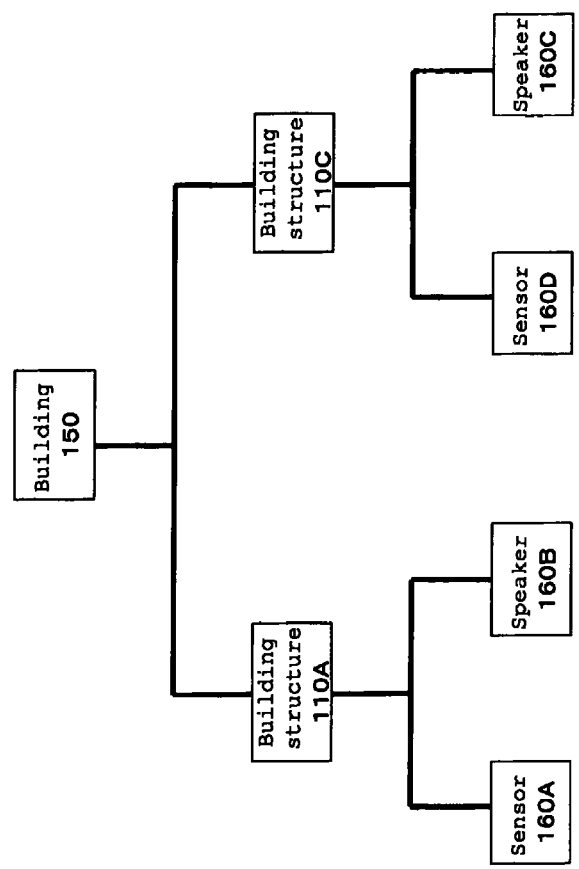
FIG. 100 is a figure showing an installation example of networks of terminals installed in this building, in the present embodiment.
Figure 101:
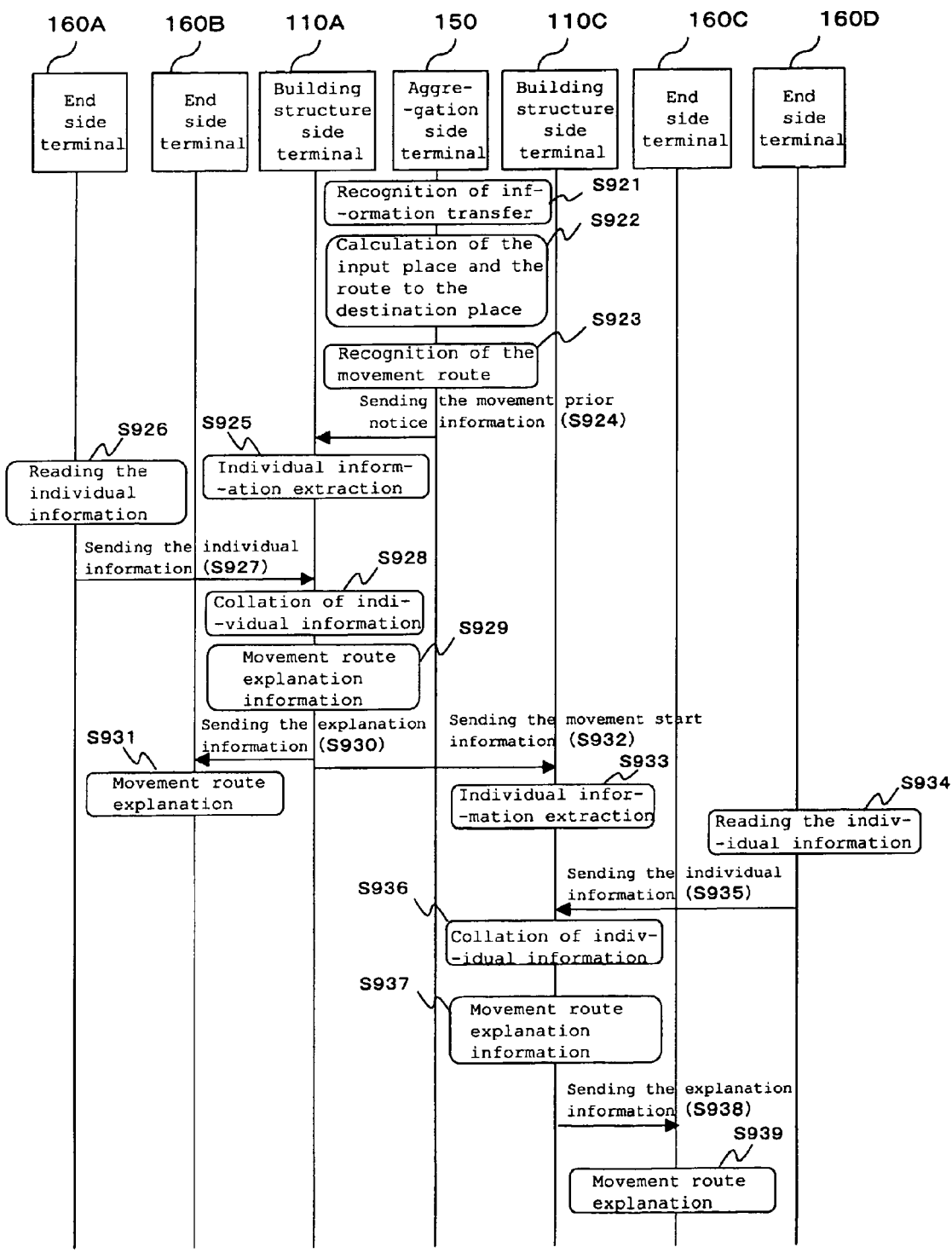
FIG. 101 is a sequence chart showing an action example of a system that, when registered person individual moves in the building, can navigate or confirm the movement place, in a 38th embodiment of the present invention.
Figure 102:
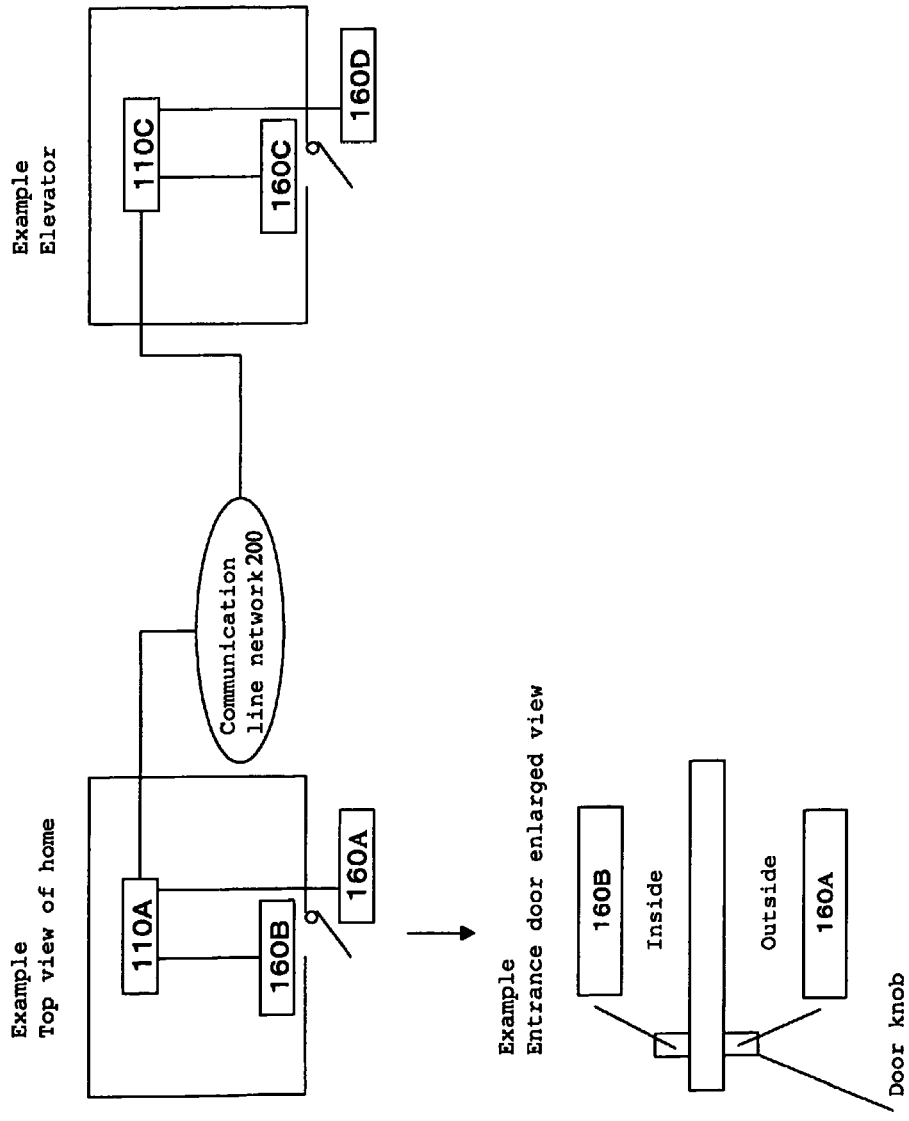
FIG. 102 is a figure showing an installation example of terminals of authentication system in apartment building, in the present embodiment.
Figure 103:
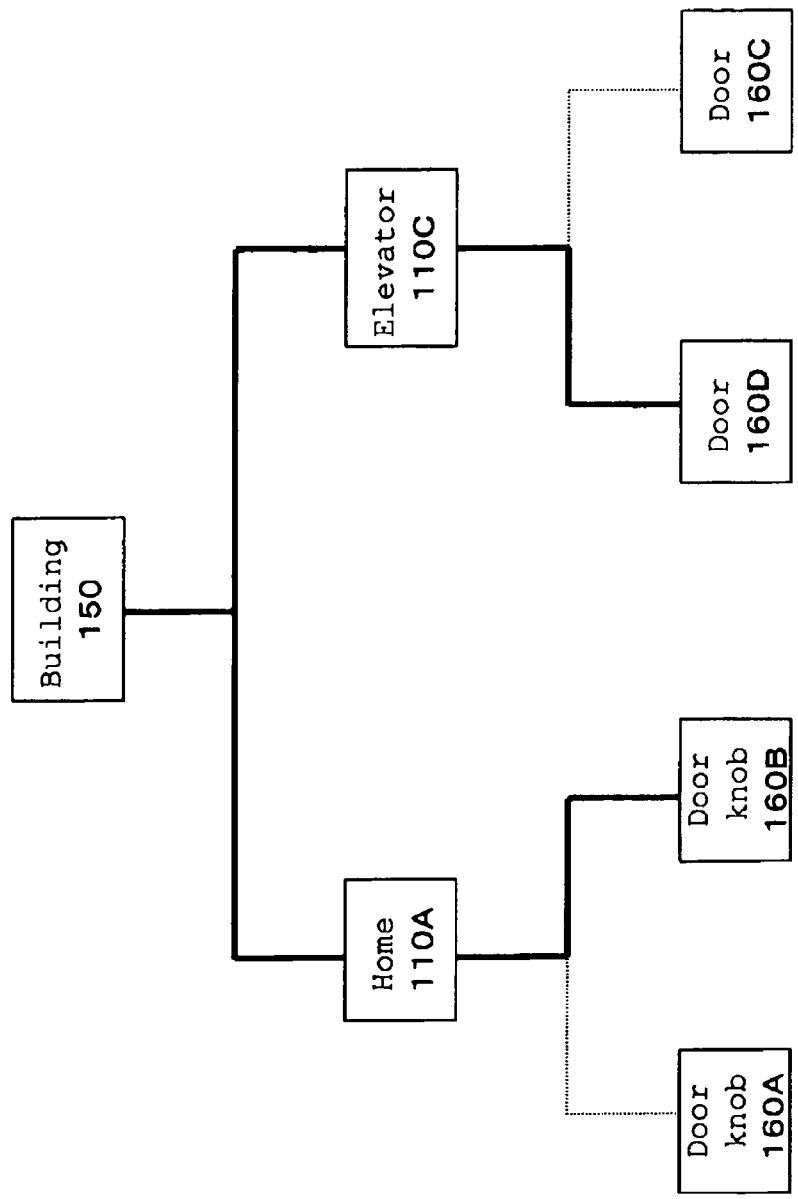
FIG. 103 is a figure showing a connection example of networks of terminals installed in this apartment building, in the present embodiment.
Figure 104:
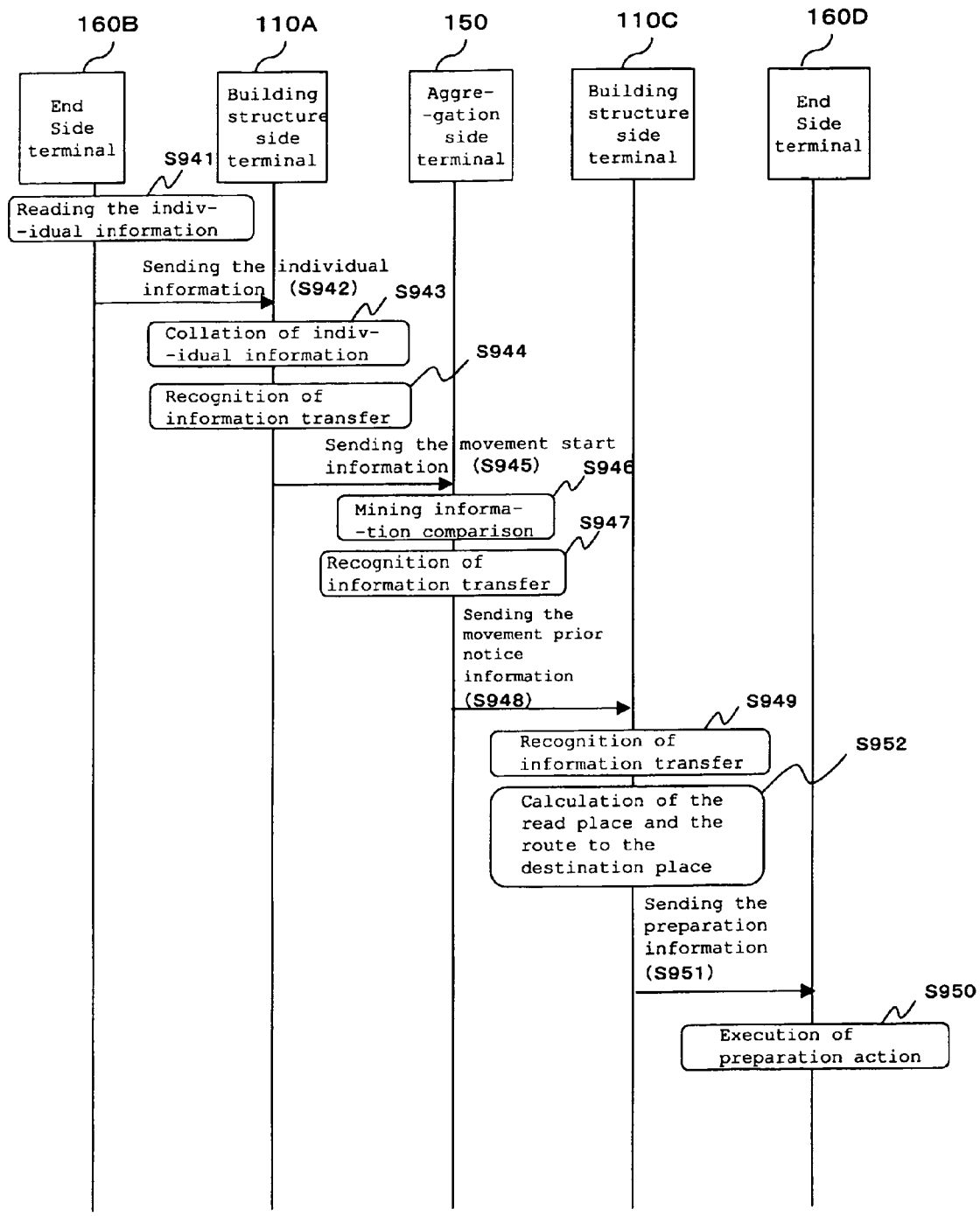
FIG. 104 is a sequence chart showing an action example of a system where, when registered person individual moves in the building, peripheral devices perform preparatory action according to the movement, in a 39th embodiment of the present invention.
Figure 105:
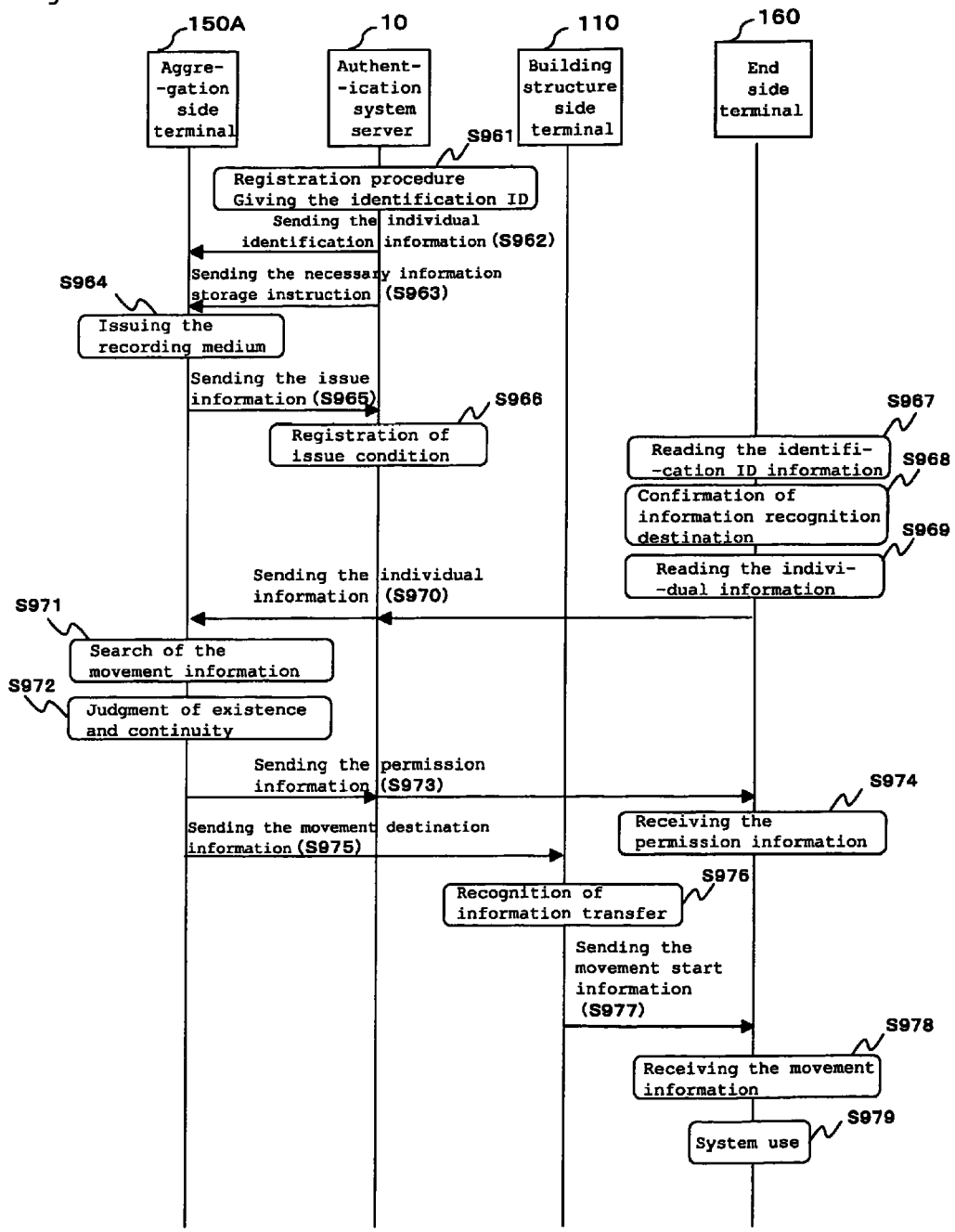
FIG. 105 is a sequence chart showing an action example of a system to secure the information continuity, at a place where registered person visits for the first time, in a 40th embodiment of the present invention.
Figure 107:
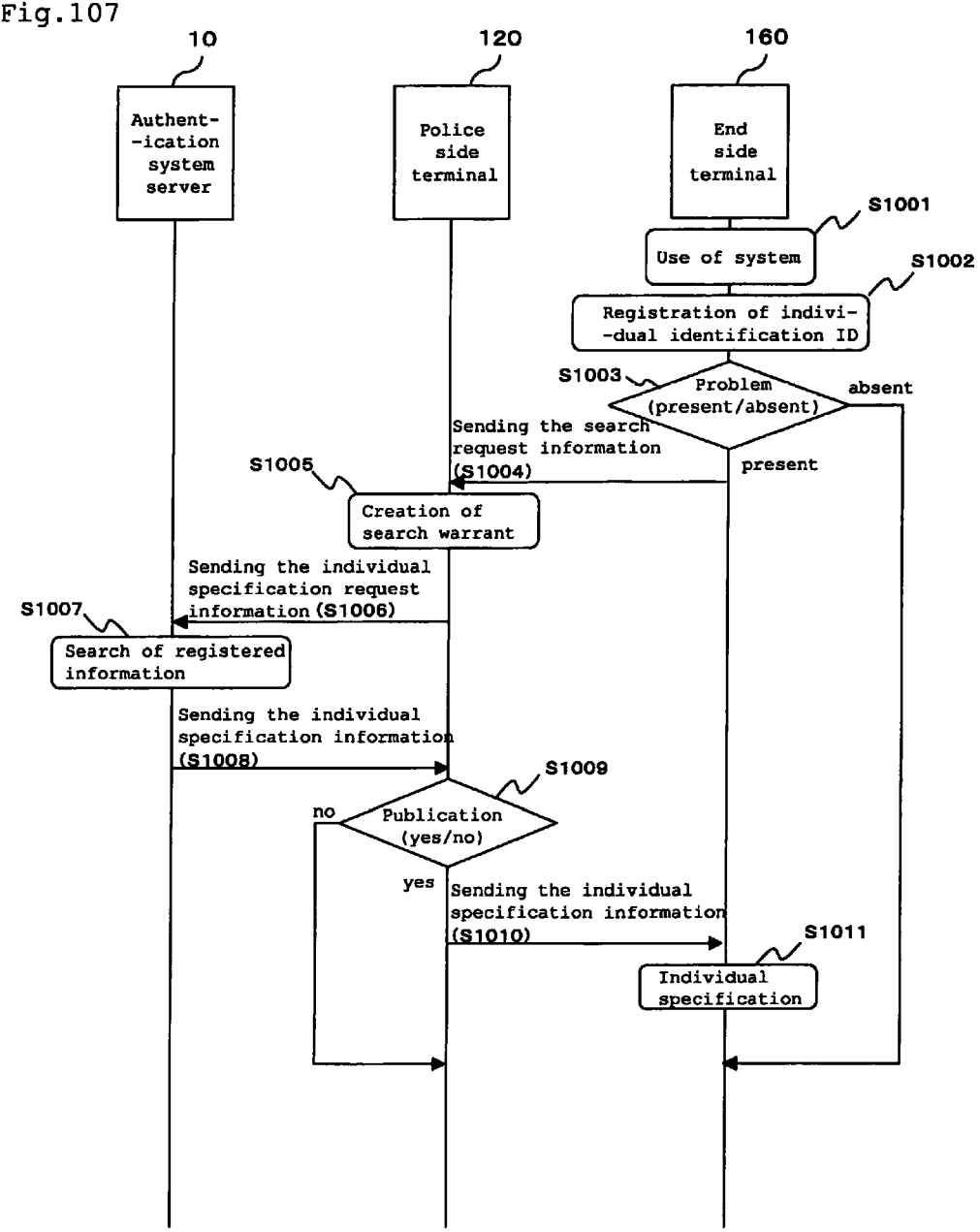
FIG. 107 is a sequence chart showing an action example of a system when the system is used while registered person individual is anonymous, in a 41st embodiment of the present invention.
Figure 108:
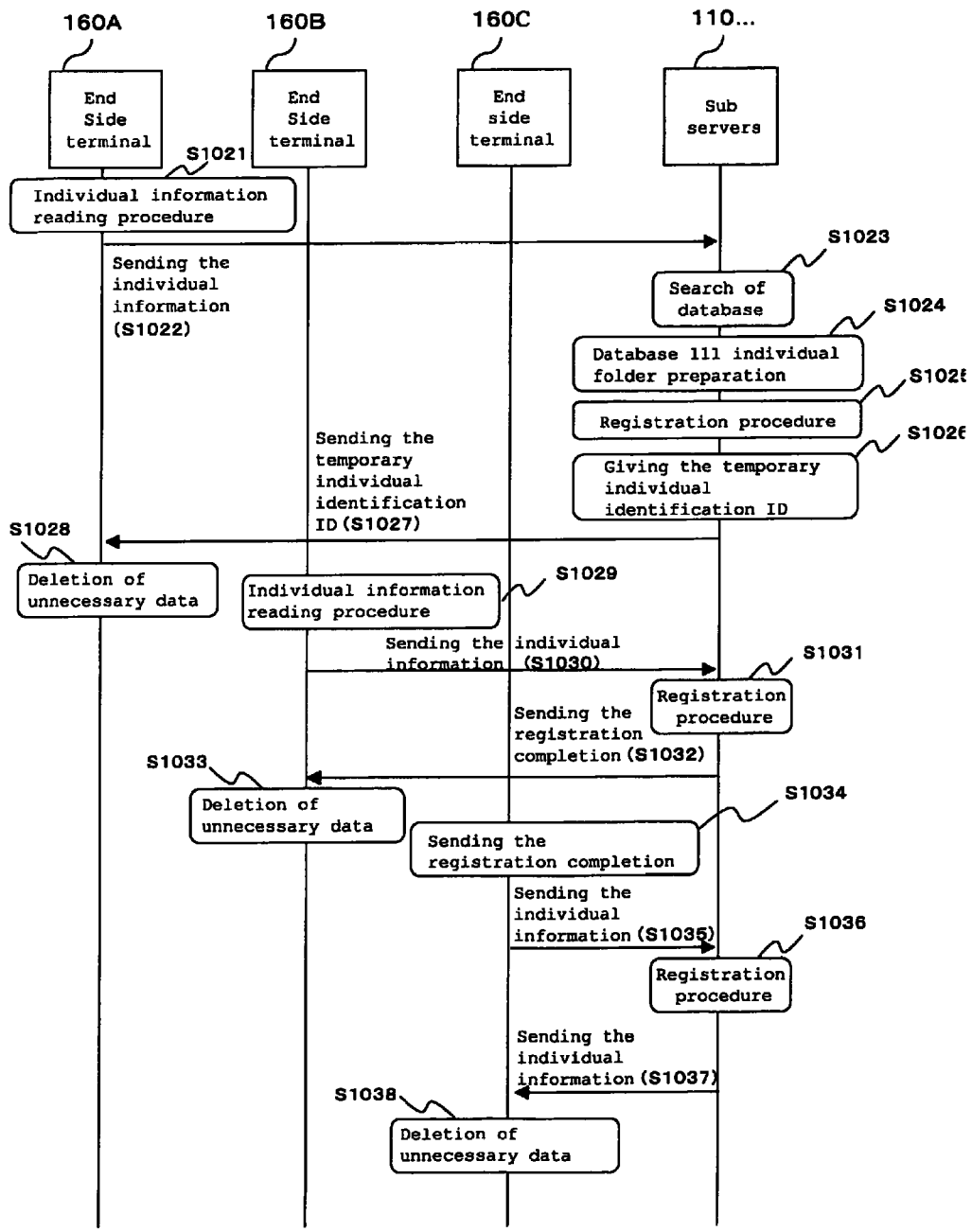
FIG. 108 is a sequence chart showing an action example of authentication system when registered person individual registers biometrics information of specified physical portions in plurality at the same time with different reading methods, in a 42nd embodiment of the present invention.
Figure 111:
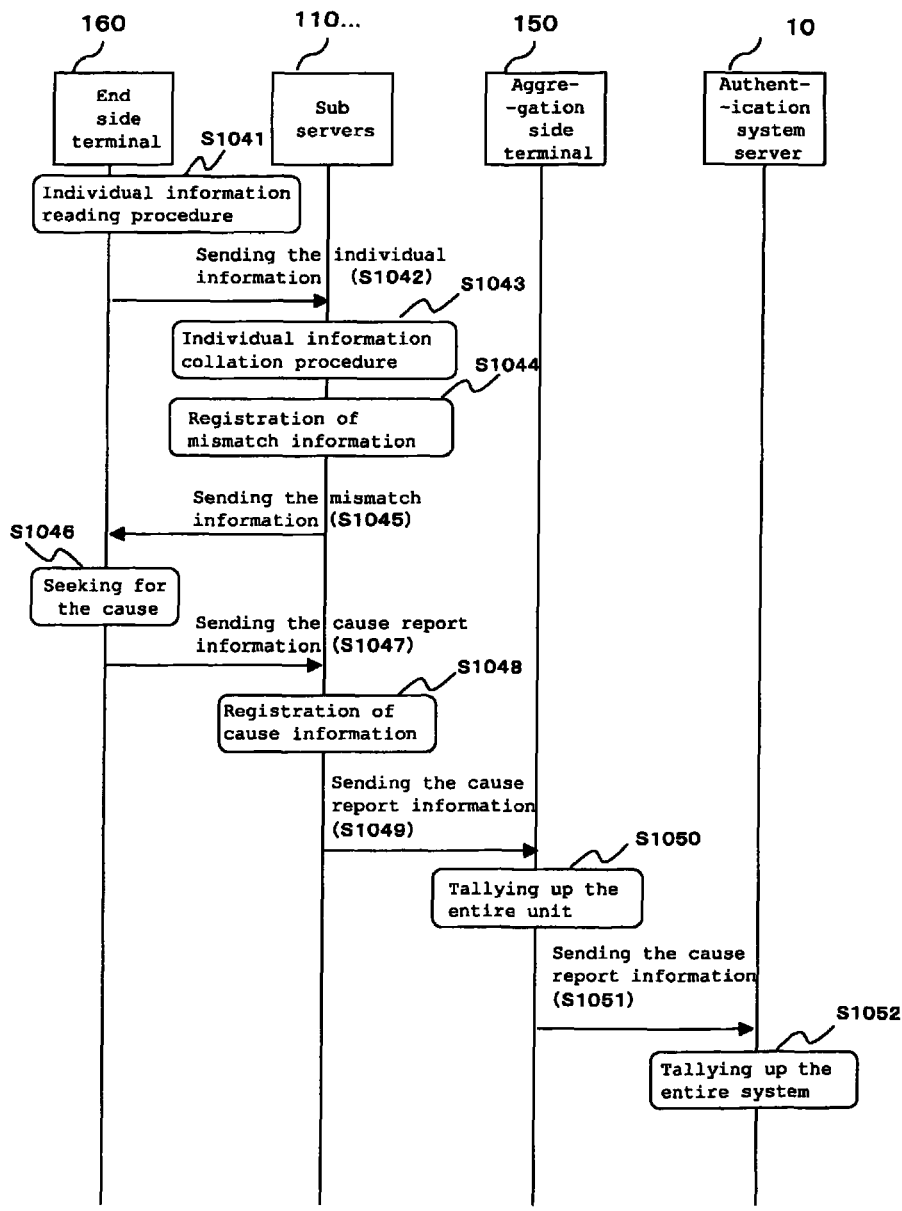
FIG. 111 is a sequence chart showing an action example to collect causes for mismatch, when the present authentication system is used, and there is mismatch in the collation of individual information and the validation of existence, in a 43rd embodiment of the present invention.
Figure 114:
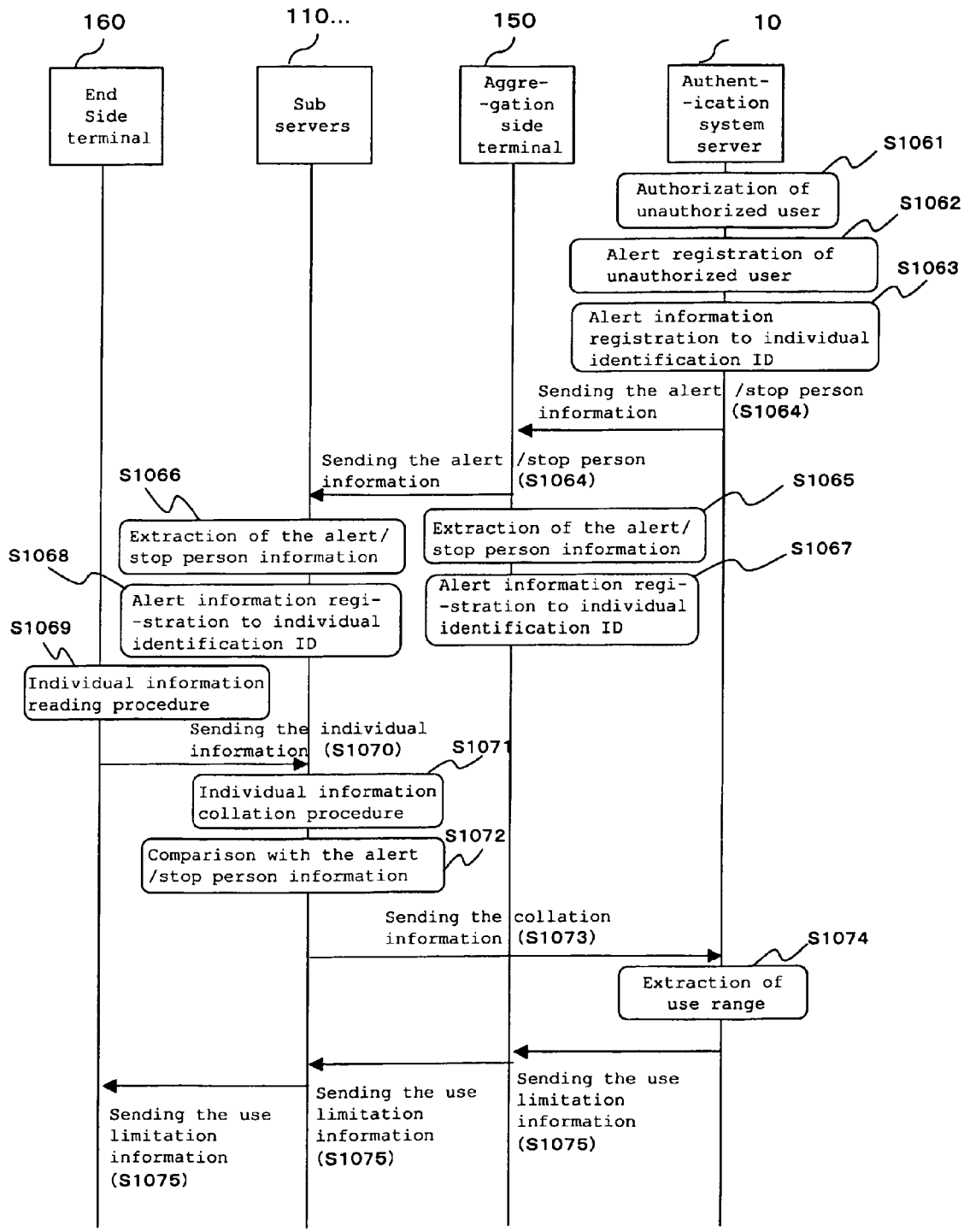
FIG. 114 is a sequence chart showing an action example of the system when it is found that registered person individual has committed unauthorized use of the present authentication system, and the use of the system is limited, in a 44th embodiment of the present invention.
Figure 115:
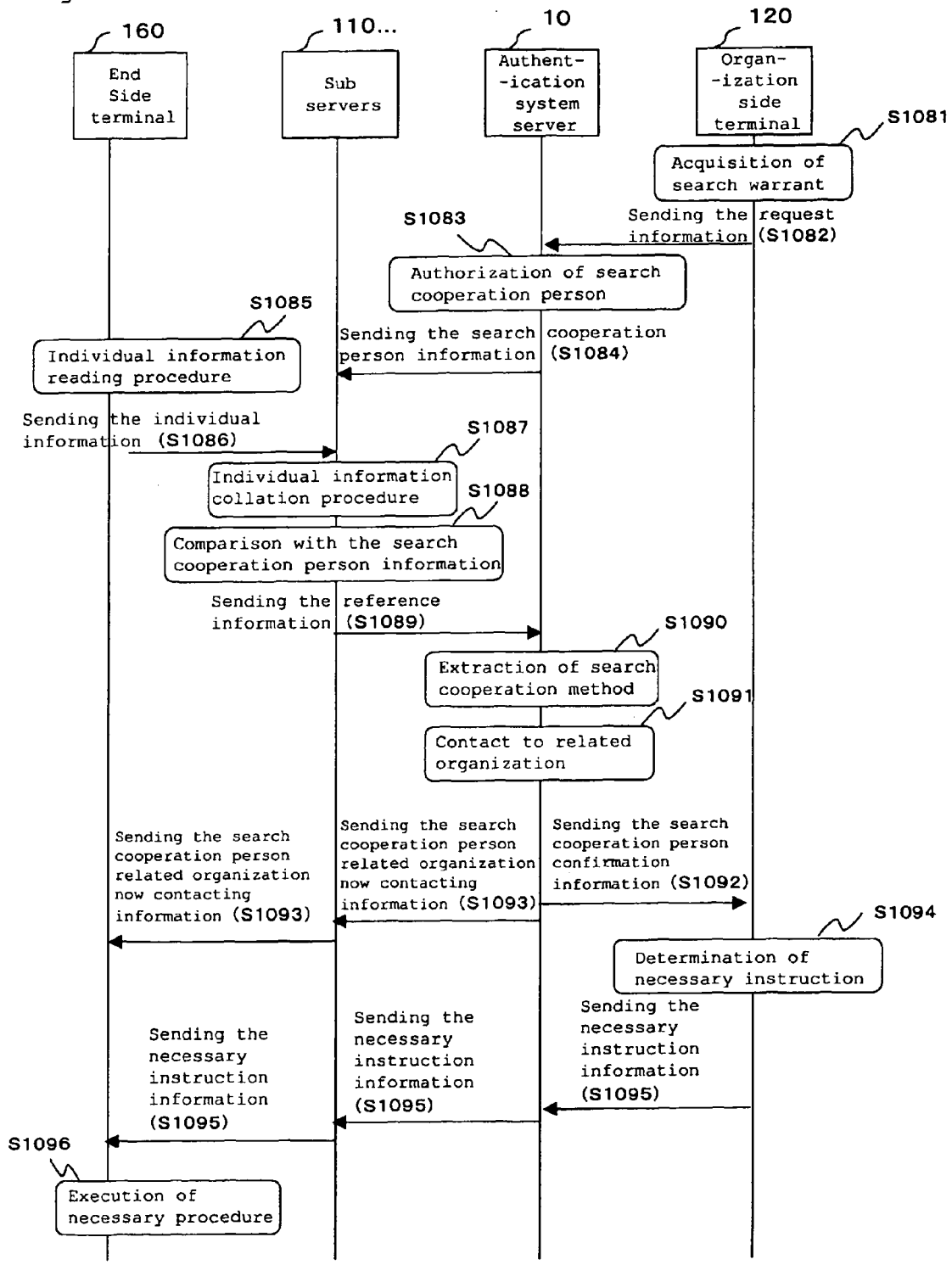
FIG. 115 is a sequence chart showing an action example of the system in the case when warning conditions are set to registered person individual in the present authentication system, a contact is made to related organization as soon as registered person individual is confirmed, in a 45th embodiment of the present invention.
Figure 116:
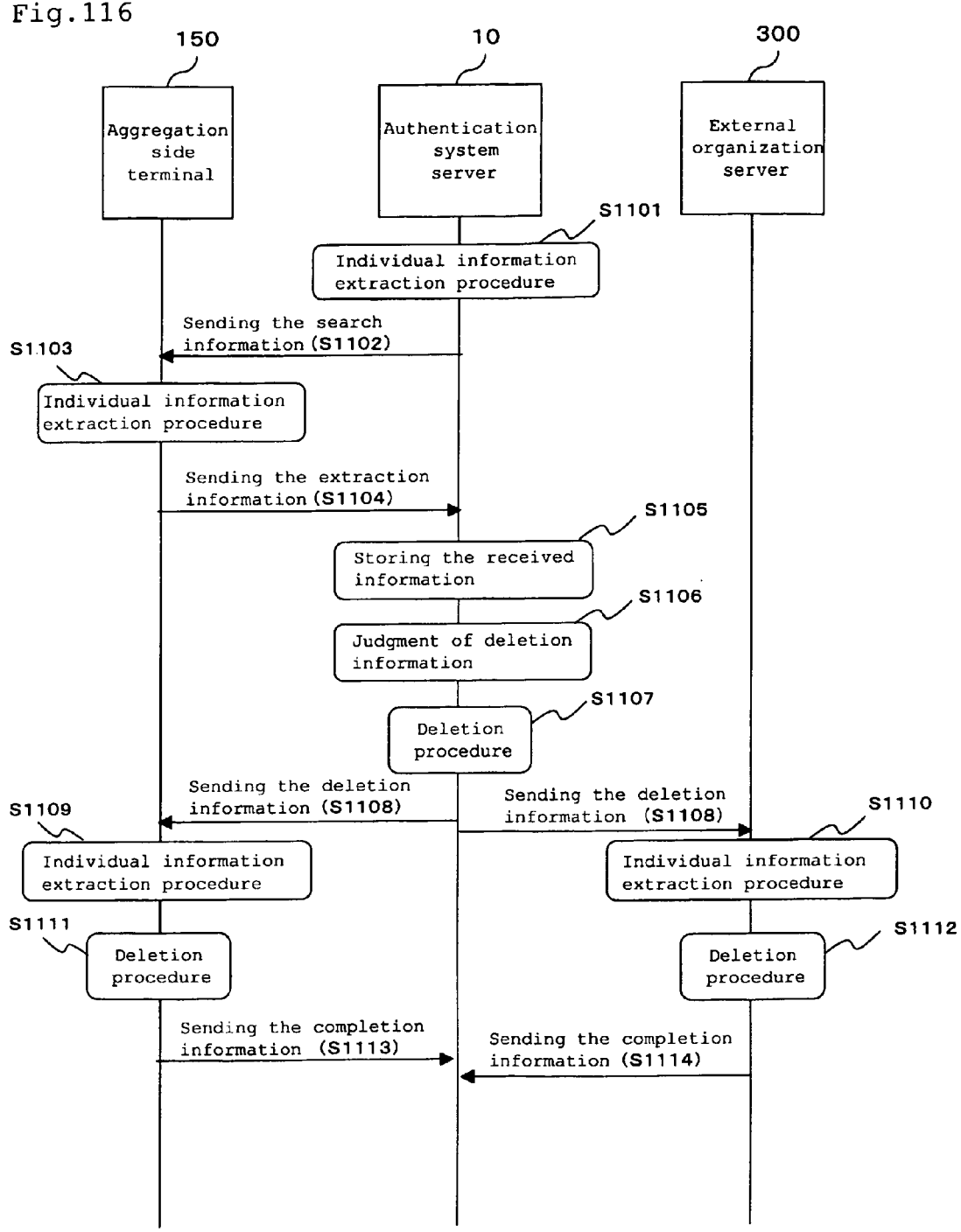
FIG. 116 is a sequence chart showing an action example of the system in the case when the authentication system server validates the storage period of individual information of registered person individual, and deletes information expiring of the storage period, in a 46th embodiment of the present invention.
Figure 117:
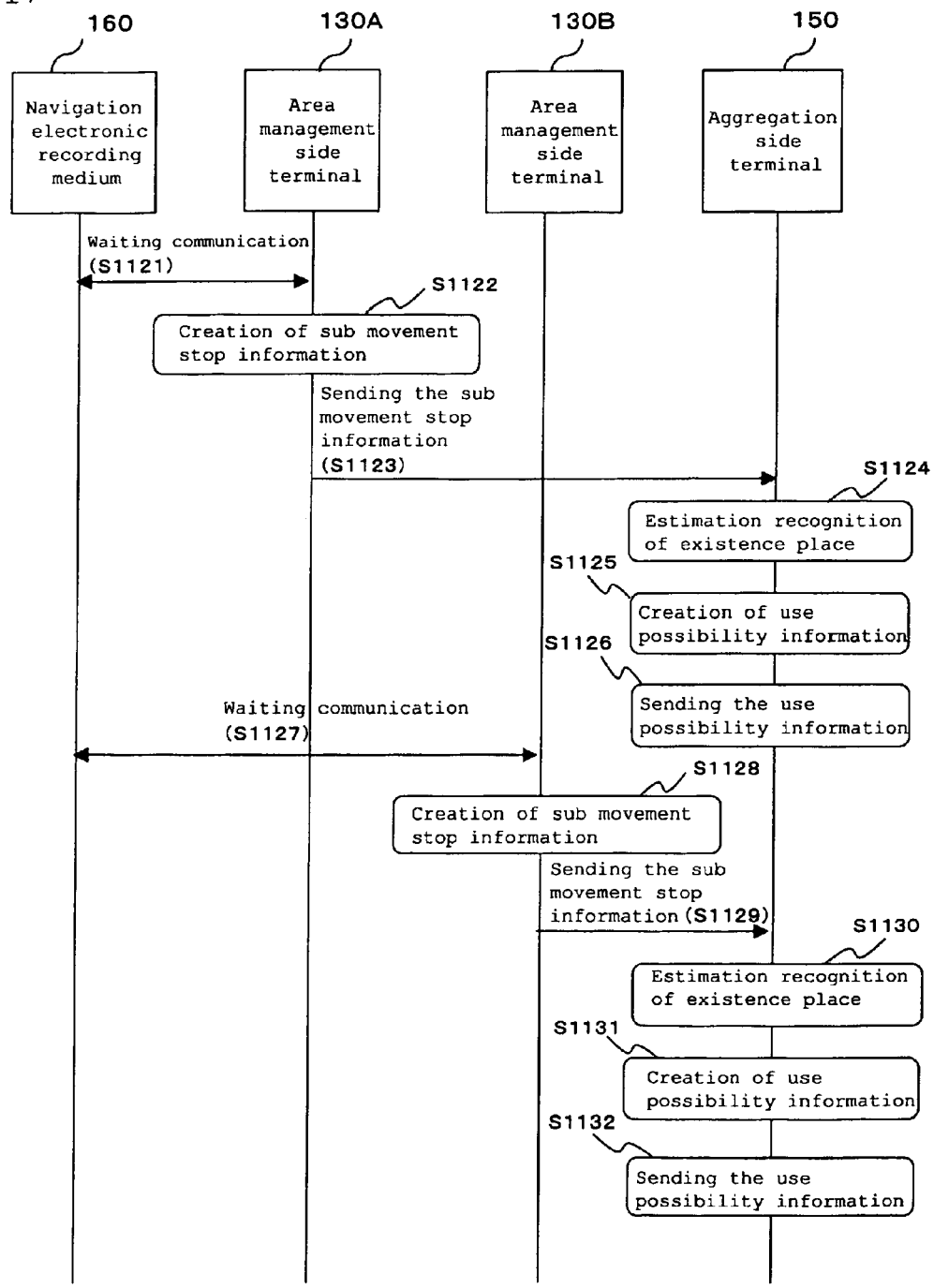
FIG. 117 is a sequence chart showing an action example of the system in the case when registered person individual uses a navigation electronic recording medium or an information portable device, and the transfer of units that registered person uses is subserved, in a 47th embodiment of the present invention. 7
Figure 118:
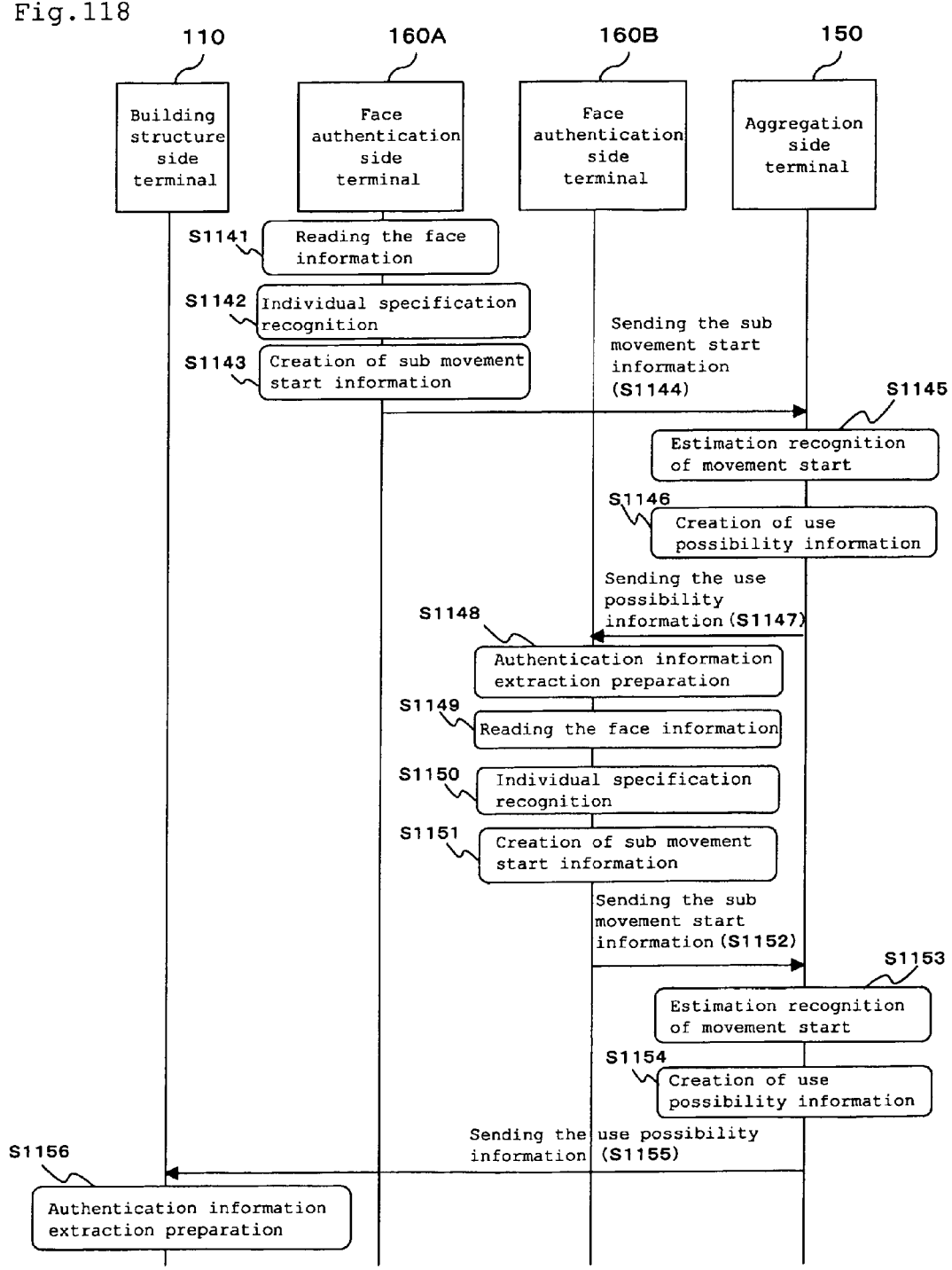
FIG. 118 is a sequence chart showing an action example of the system where registered person individual uses a face authentication system, and the transfer of units that registered person uses is subserved, in a 48th embodiment of the present invention.
Figure 119:
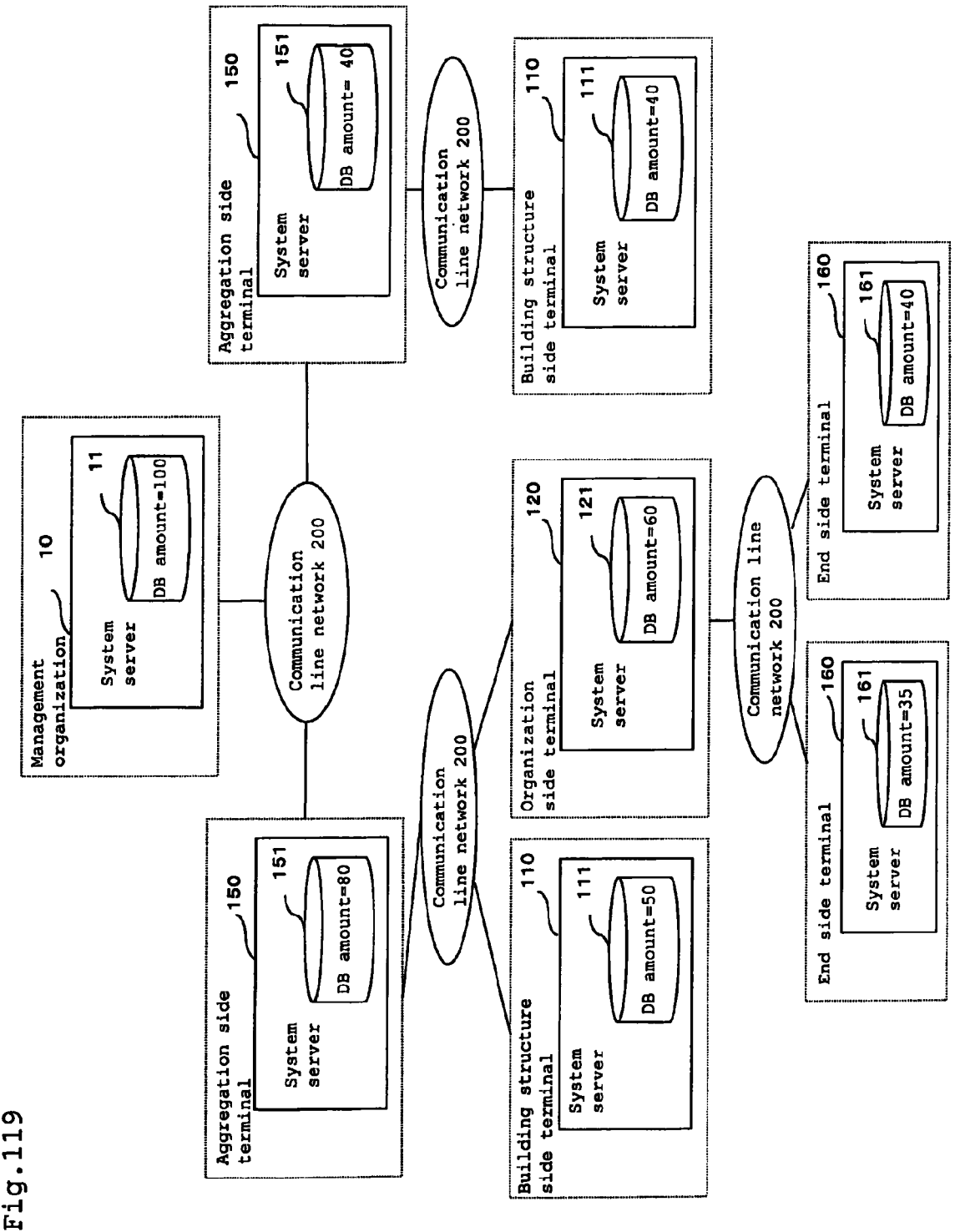
FIG. 119 is an image figure showing the information amounts of the comprehensive DBs as the embodiment of the present invention.
Figure 120:
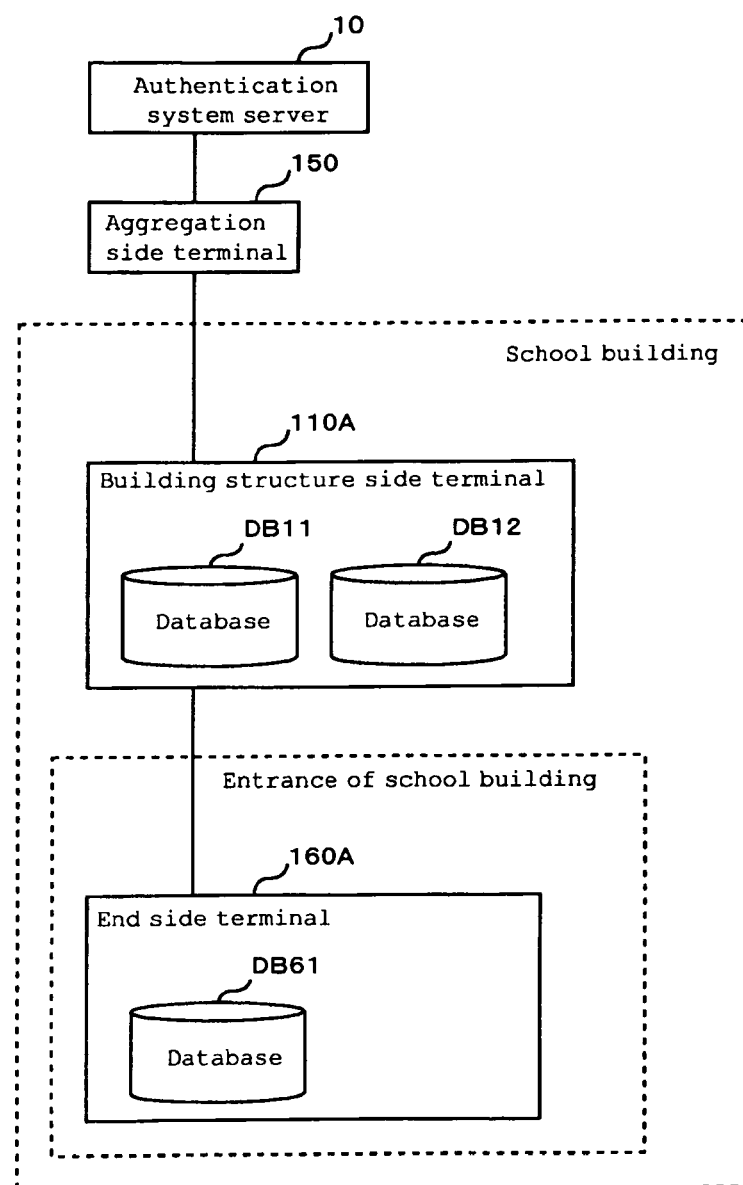
FIG. 120 is a figure showing the structure of the authentication system in a 50th embodiment of the present invention.
Figure 121:
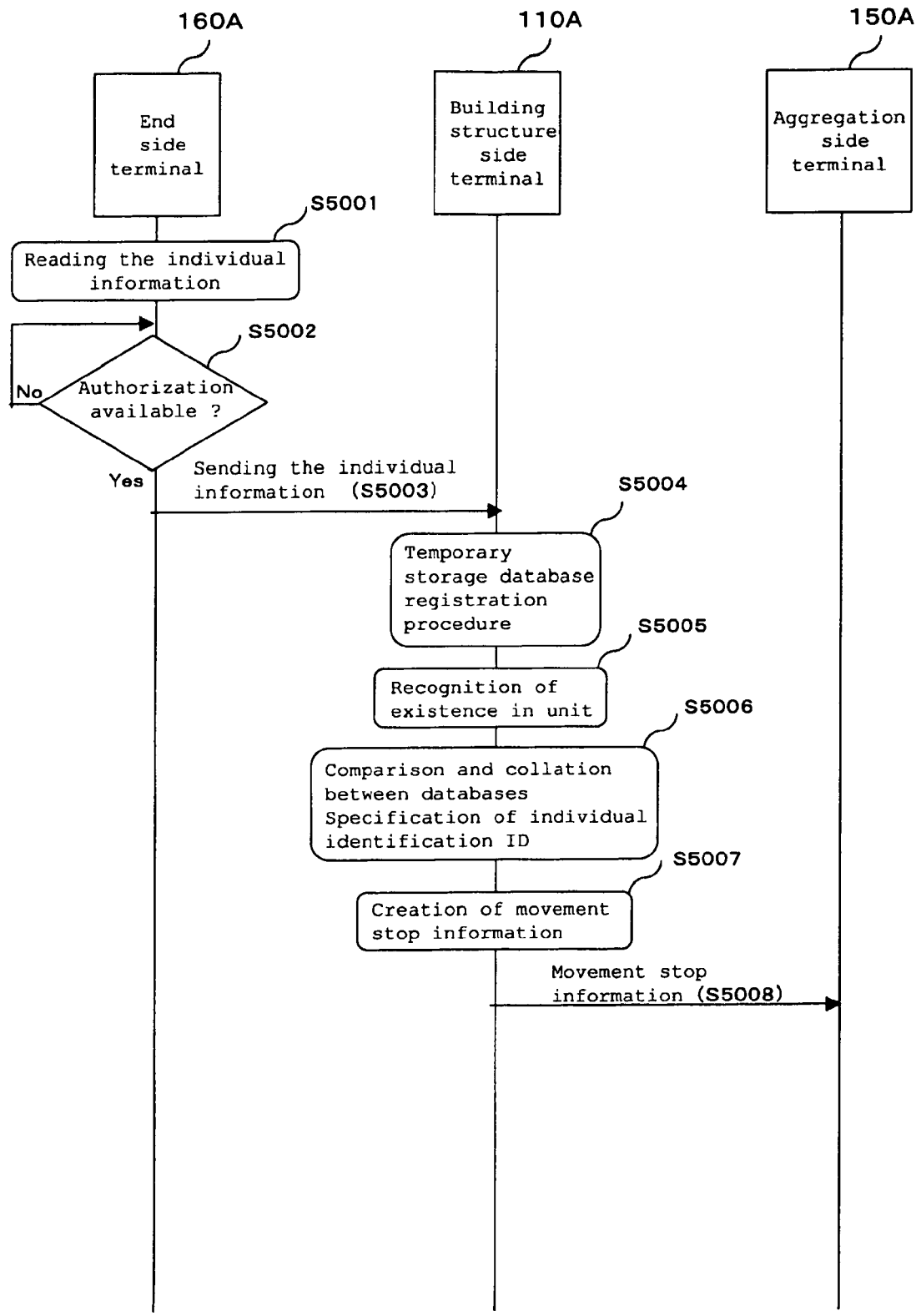
Figure 122:
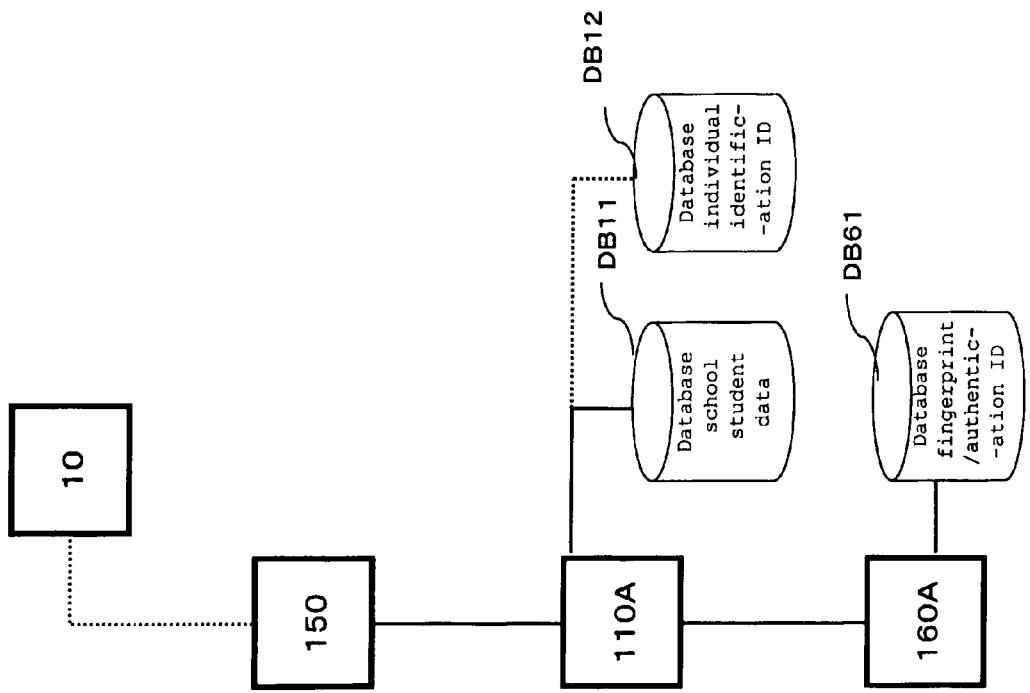
Figure 123:
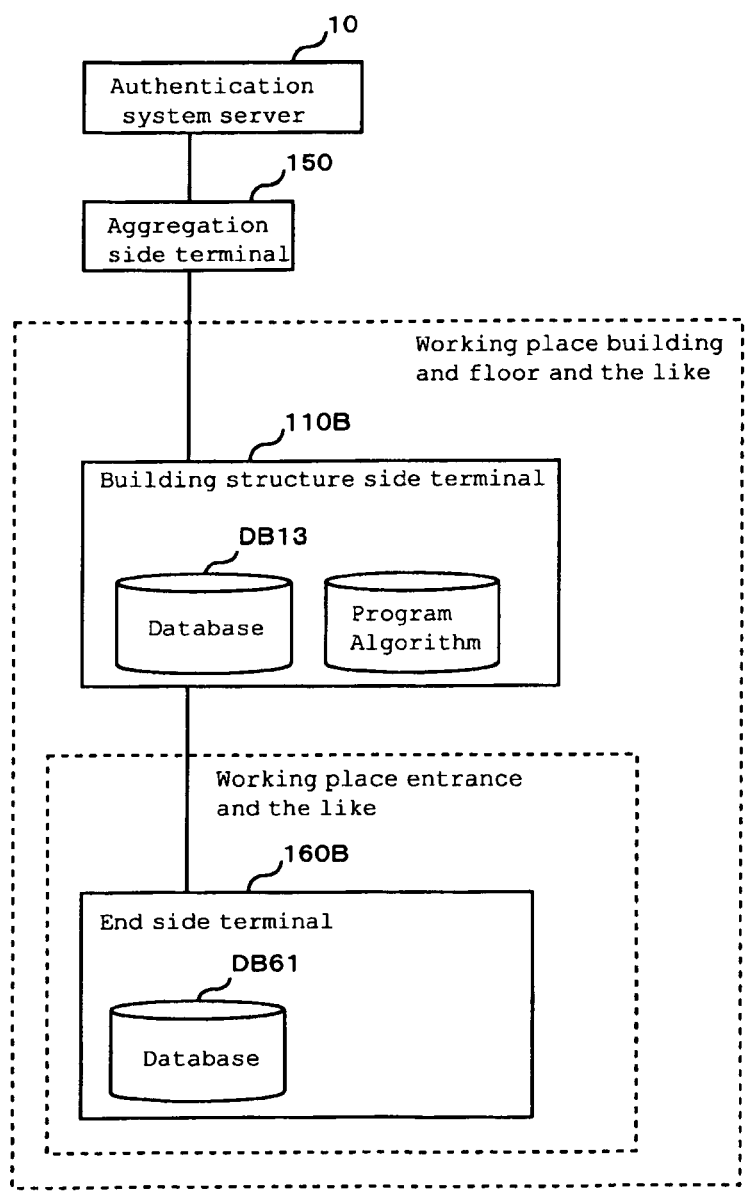
Figure 124:
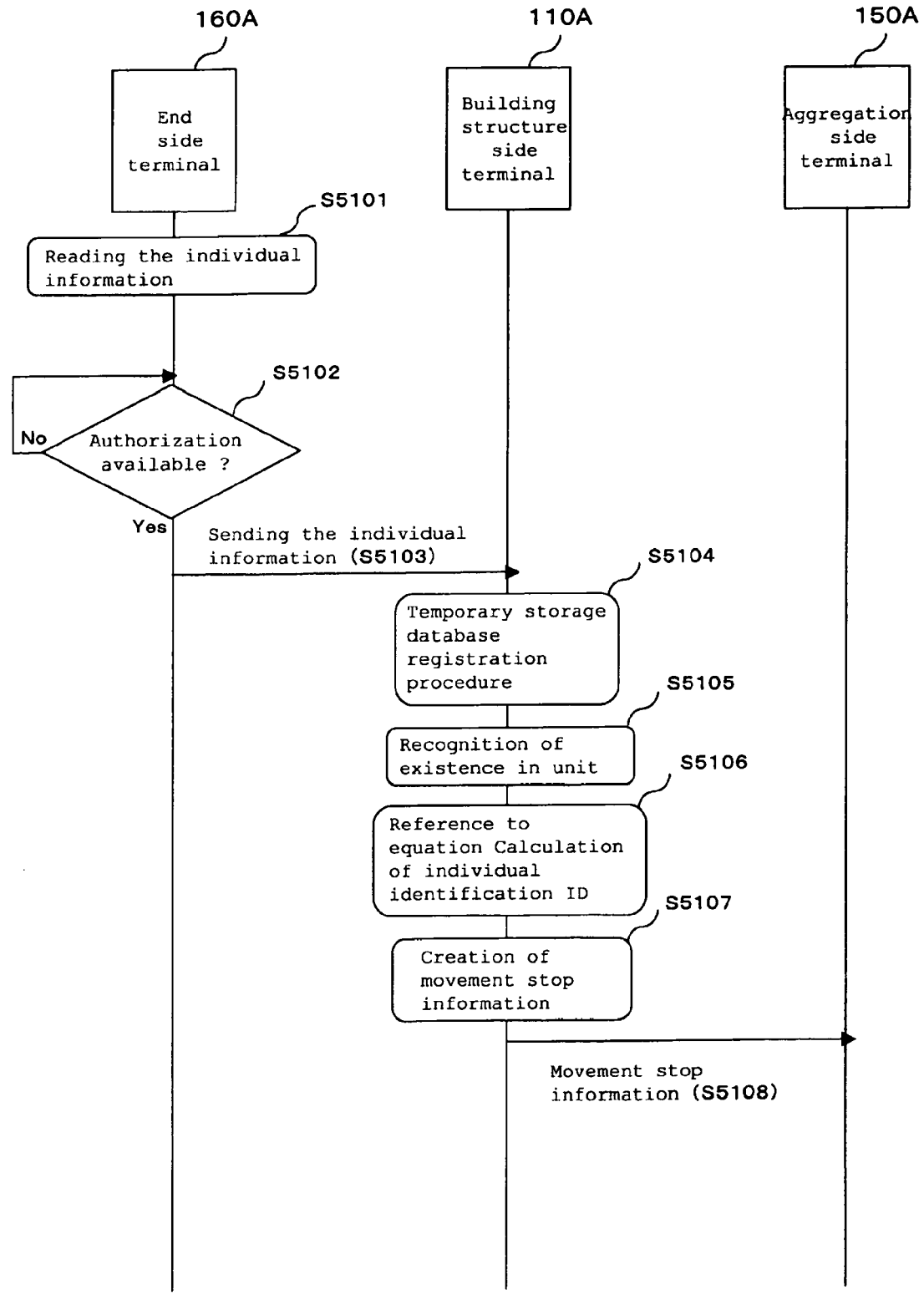
Figure 125:
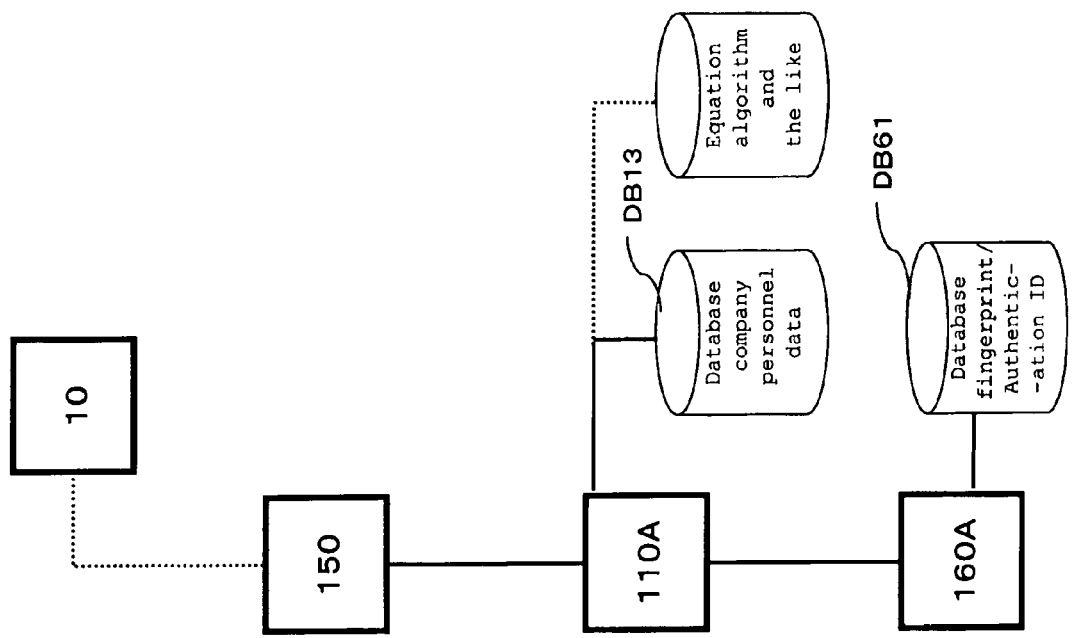
Figure 126:
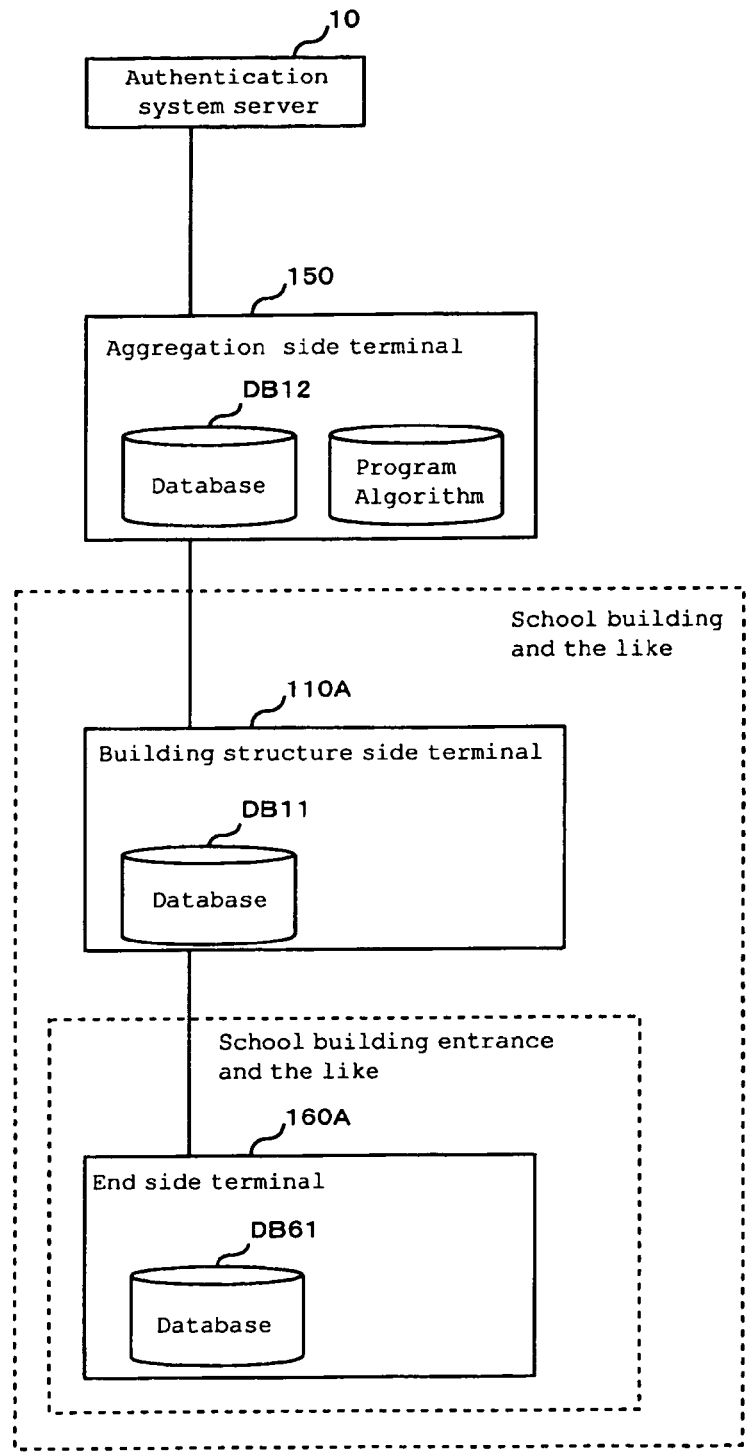
Figure 127:
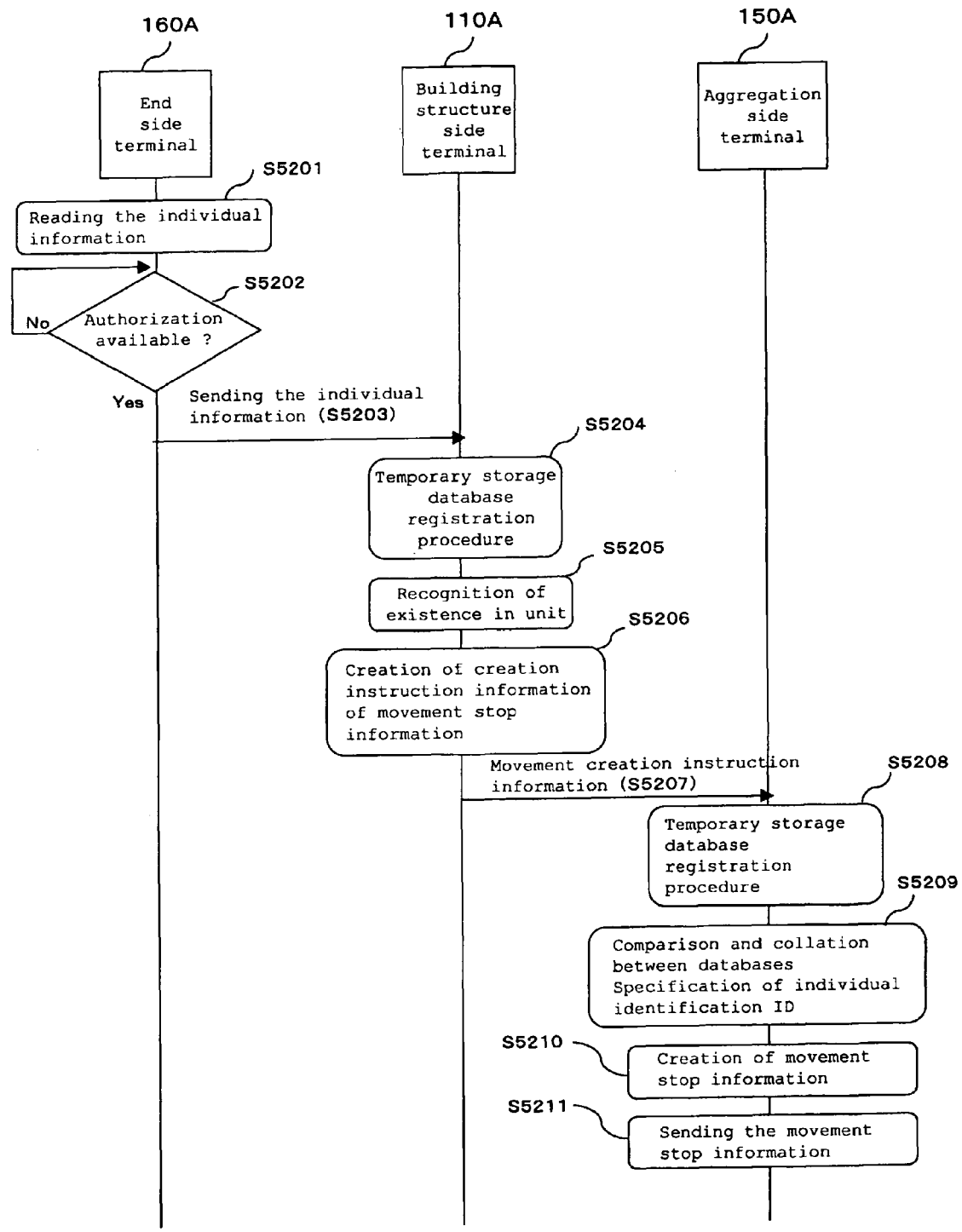

FIG. 14
1 History information database
  Building structure side terminal Home
2 Basic information data
3 Item Date of update Contents Validation Evidence
4 Name Address Telephone Birth Working place
5 Done Present
6 Peculiar information data
7 Front entrance Service entrance Entrance
8 Left eye iris
  Right hand Index finger Fingerprint
  Right hand Palm vein
9 Working place
10 Enter
  Entrance
11 Face
  Right eye iris FIG. 15
1 History information database Aggregation side terminal
2 Basic information data
3 Item Date of update Contents Validation Evidence
4 Name Address Telephone Birth School
5 Done Present
6 Peculiar information data
7 Department Class Student number Front entrance Service entrance Entrance
8 Law faculty
  Class A
9 Left eye iris
  Right hand Index finger Fingerprint
  Right hand Palm vein
10 Building structure side terminal
11 Organization side terminal FIG. 16
1 Management organization
2 System server
3 Database
4 Basic information database
5 History information database
6 Validation information database
7 Availability information database FIG. 17
1 Corresponding structure example
2 Database 116 display example
3 Individual identification ID Registered person name Information 1
4 Left eye iris
  Right eye iris
5 Right palm vein
6 Left palm vein 7 Right hand index finger
8 Left hand index finger
  FIG. 18
1 Building structure side terminal
2 Database
3 Basic information database
4 History information database
5 Availability information database
6 Validation information database
7 Temporary storage database
  FIG. 19
1 Building structure side terminal
2 Database
3 Basic information database
4 History information database
5 Validation information database
6 Availability information database
7 Temporary storage database
  FIG. 20
1 End side terminal
2 Building structure side terminal
3 Individual information reading procedure
4 Sending the individual information
5 Search of database 111
6 Collation of individual information
7 Sending the authentication result
  FIG. 21
1 End side terminal
2 Building structure side terminal
3 Individual information reading procedure
4 Sending the individual information
5 Search of database 116
6 Corresponding column of database 111
7 Collation of individual information
8 Sending the authentication result
  FIG. 22
1 End side terminal
2 Sub servers
3 Individual information reading procedure
4 Individual information inputting procedure
5 Search of database
6 Storing in the temporary storage DB
7 Sending the individual information
8 Database 111 individual folder preparation
9 Registration procedure
10 Search database registration
11 Sending the registration completion
12 Database 161 registration procedure
13 Deletion of unnecessary data
  FIG. 23
1 Sub servers
2 Aggregation side terminal
3 Authentication system server
4 Individual information extraction procedure
5 Sending the individual information
6 Search of database
7 Present
8 Data (present/absent)
9 Absent
10 Sending the individual identification information
11 Change of identification ID
12 Database 151 individual folder preparation
13 Notice to the end side terminal
14 Registration procedure
15 Search database registration
16 Registration procedure
  Giving the identification ID
17 Notice of identification information to registered person
  FIG. 24
1 Sub servers
2 Aggregation side terminal
3 Confirmation destination side terminal
4 Identification ID replacement
5 Request for the existence validation information
6 Sending the existence validation information
7 Existence validation work
8 Request for the information rightfulness
9 Request for clarifying the answerer
10 Validation work
11 Sending the answer information and the answerer
12 Registration of the answer result
13 Existence judgment
  FIG. 25
1 Calculation equation
2 Calculation is made per each information.
3 Registered information
  Public certificate 9 points
  Sub public certificate 5 points
  Other certificate 1 point
4 Validation result
  Validation made 3 points
  Validation not made 1 point
5 Time lapse from registration
  Within 1 month or unchanged 9 points
  1 month to 3 months 5 points
  3 months to 6 months 3 points
  6 months to 1 year 2 points
  Over 1 year 1 point
6 Time lapse from validation
  Within 1 month or unchanged 9 points
  1 month to 3 months 5 points
  3 months to 6 months 3 points
  6 months to 1 year 2 points
  Over 1 year 1 point
7 Expiration date
  Within the expiration 3 points
  No expiration 3 points
  Out of date 1 point
8 Acquired points
9 Existence points
  FIG. 26
1 Calculation equation
2 Calculation is made per each information.
3 Acquired points
4 Information arising risk
5 Existence rate (1-risk rate)
6 Validation arising risk
7 Other risk
8 Risk rate
  In the case of 0% Multiply by 1.
  In the case of 100% 0 point to the item.
9 Basic points
10 Risk rate consideration points
  FIG. 27
1 Calculation equation
2 Calculation is made per each information.
3 Equation 2
4 Acquired points
5 Information arising risk
6 Validation arising risk
  Only witness 7 Other risk
8 Basic points
   FIG. 28
1 Calculation equation
2 Calculation is made per each information.
3 Basic points
4 Trust evaluation degree
5 Trust evaluation consideration points
   FIG. 29
1 Equation 3
2 The above basic points
3 Basic point
4 Trust evaluation degree
5 Lawyer
6 Trust evaluation consideration points
7 Teacher
8 Company colleague (large company)
9 Friend
   FIG. 30
1 Calculation equation actual example
2 Calculation is made per each information.
3 Tally result
4 First unit
5 Last unit
6 Certain period (6 months)
7 Previous period (45 days)
8 Monday AM
9 120 times
10 Equation 4
11 Validation base mining rate
12 Objective destination mining rate
13 Mining rate
14 Existence rate
15 Number of addition=3 pieces
   FIG. 31
1 Example Existence rate and use function
2 Principle Concrete example
3 Existence rate Meaning Action Overseas travel
   Financial field
4 Individual identification Recognition
5 Existence determination
6 Fear with existence
6 Concern with existence
7 Individual identification Unavailable
8 All OK
9 Partial limitation
10 Partial permission
11 All NG
12 Without passport
   Automatic entry process at boarding gate
13 Automatic entry process at immigration
14 With passport
15 Electronic money
   Electronic credit Without signature
16 Cash
   Credit card
   FIG. 32
1 Example Existence rate and use function
2 Existence rate Basic number Identification Transmission time
   FIG. 33
1 End side terminal
2 Sub servers
3 Individual information reading procedure
4 Individual information inputting procedure
5 Search of database
6 Storing in the temporary storage DB 7 Sending the individual information
8 Database 111 storage
9 Search database registration
10 Sending the registration completion and the individual identification ID
11 Database 161 registration procedure
12 Deletion of unnecessary data
   FIG. 34
1 Sub servers
2 Aggregation side terminal
3 Authentication system server
4 Individual information extraction procedure
5 Sending the individual information
6 Search of database
7 Sending the individual identification information
8 Data (present/absent)
9 Change of identification ID
10 Database 151 individual folder preparation
11 Notice to the end side terminal
12 Registration procedure
13 Search database registration
14 Individual identification ID change registration
   FIG. 35
1 End side terminal
2 Sub servers
3 Aggregation side terminal
4 Authentication system server
5 Individual information extraction procedure
6 Sending the individual identification ID and the individual validation information
7 Search of database
8 Data (present/absent)
9 Validation information comparison
10 Existence judgment
11 Sending the individual identification acknowledgement
   FIG. 36
1 End side terminal
2 Sub servers
3 Confirmation destination side terminal
4 Authentication system server
5 Acquisition of new validation information
6 Request for existence validation and sending the new validation information
7 Existence validation work
8 Request for information rightfulness
9 Request for clarifying the answerer
10 Validation work
11 Sending the answer information and the answerer
12 Registration of the answer result
13 Existence judgment
14 Sending the validation result
15 Existence judgment once again
16 New rank determination
17 Sending the new rank
   FIG. 37
1 End side terminal
2 Individual information reading procedure
3 Search of database
4 Database 161 corresponding column
5 Collation of individual information
6 Data (match/mismatch)
7 Action permission
8 Information registration procedure
9 Search database registration
   FIG. 38
1 End side terminal
2 Sub servers 3 Aggregation side terminal
4 Authentication system server
5 Individual information extraction procedure
6 Search of database
7 Sending the individual identification ID and the validation request information
8 Database 161 corresponding column
9 Data (present/absent)
10 Collation of individual information
11 Sending the individual identification ID and the individual validation information
12 Comparison of existence result and validation information
13 Existence judgment
14 Action permission
15 Information registration procedure
16 Search database registration
   FIG. 39
1 Outside
2 Information reader
3 IC chip
4 End side terminal
5 Individual information reading procedure
6 Sending the biometrics information
7 Making information into data
8 Collation of data
9 Data (match/mismatch)
10 Sending the match information
11 Search of database
12 Database 161 corresponding column
14 Action permission
15 Information registration procedure
16 Search database registration
   FIG. 40
1 End side terminal
2 Individual information reading procedure
3 Search of database
4 Database 161 corresponding column
5 Collation of individual information
6 Data (match/mismatch)
7 Collation of reading order
8 Action permission
9 Information registration procedure
10 Search database registration
   FIG. 41
1 End side terminal
2 Building structure side terminal
3 Aggregation side terminal
4 Sending the individual information
5 Individual information registration preparation
6 Confirmation of the number of remaining items and the remaining amount
7 Room (present/absent)
8 Extraction of necessary information to be sent
9 Individual information registration
10 Confirmation of registration completion
11 Sending receipt
12 Deletion of individual information
   FIG. 42
1 Building structure side terminal
2 Aggregation side terminal
3 Authentication system server
4 Individual information extraction
5 Sending the individual information
6 Registration procedure
7 Search database registration
8 Confirmation of registration completion
9 Sending receipt
10 Backup destination registration
   FIG. 43
1 Building structure side terminal
2 Aggregation side terminal
3 Authentication system server
4 Individual information extraction
5 Sending the individual information
6 Registration procedure
7 Search database registration
8 Confirmation of registration completion
9 Sending receipt
10 Backup destination registration
11 Registration procedure
12 Backup destination change
13 Deletion of individual information
   FIG. 44
1 Aggregation side terminal
2 Authentication system server
3 External organization server
4 Individual information extraction
5 Sending the individual information
6 Sending the connection stop information
7 Registration procedure
8 Search database registration
9 Confirmation of registration completion
10 Sending receipt
11 Backup destination registration
   FIG. 46
1 External organization server
2 Authentication system server
3 External organization server
4 Individual information extraction
5 Sending the individual information
6 Registration procedure
7 Confirmation of registration completion
8 Sending receipt
9 Comparison and collation work
   FIG. 47
1 External organization server
2 Authentication system server
3 External organization server
4 Individual information extraction
5 Sending the connection stop information
6 Sending the individual information
7 Registration procedure
8 Confirmation of registration completion
9 Sending receipt
10 Report of sending restart
11 Comparison and collation work
   FIG. 48
1 External organization server
2 Authentication system server
3 Individual information extraction
4 Sending the connection stop information
5 Sending the individual information
6 Registration procedure
7 Confirmation of registration completion
8 Sending receipt
9 Comparison and collation work
   FIG. 49
1 Example Connection terminal List
2 Example Case of terminal
3 Access terminal Address Terminal name
4 Highest priority
   Next priority
5 Emergency FIG. 50
1 Building structure side terminal
2 Organization side terminal
3 Aggregation side terminal
4 Individual information extraction
5 Sending the individual information
6 Receiving (available/unavailable)
FIG. 51
1 Example Connection terminal List
2 Example Case of terminal
3 Access terminal Address Terminal name
4 Highest priority
  Reflection
  Next priority
5 Emergency
FIG. 52
1 End side terminal
2 Building structure side terminal
3 Reading the individual information
4 Sending the individual information
5 Receiving unavailable information
6 Receiving (available/unavailable)
7 Temporary storage database registration procedure
8 Receiving information
9 Receiving information deletion request
10 Temporary storage database information deletion
FIG. 53
1 System server
2 Database
FIG. 54
1 Authentication system server
2 External organization server
3 Individual information extraction procedure
4 Sending the individual information for comparison
5 Collation of database
6 Individual information collation result judgment
7 Sending the collation result
8 Collation execution information registration
9 Received individual information deletion work
10 Individual information extraction completion
FIG. 55
1 Example Virtual housing lot
2 Hospital
3 Ohyama station
4 2-chome
5 Individual house
6 Super market
7 Shop
FIG. 56
1 Example Terminal configuration in virtual housing lot Outline
FIG. 58
1 Server
2 1-chome
3 Ohyama station
4 Super market
5 Individual house
6 Door knob
7 South ticket gate
8 Front entrance
9 Exit
FIG. 59
1 End side terminal
2 Building structure side terminal
3 Aggregation side terminal
4 Authentication system server
3 Reading the individual information
4 Sending the individual information
5 Collation of individual information
6 Existence judgment
7 Individual information registration
8 Confirmation of terminal purpose
9 Confirmation of information transfer
10 Sending the use stop information
11 Sending the movement start information
12 Temporary registration of individual information
FIG. 60
1 Server
2 1-chome
3 Ohyama station
4 Super market
5 Individual house
6 Door knob
7 South ticket gate
8 Front entrance
9 Exit
10 Example Top view of the nearest station
11 Example North ticket gate
12 Communication line network
FIG. 61
1 End side terminal
2 Building structure side terminal
3 Aggregation side terminal
4 Authentication system server
5 Reading the individual information
6 Sending the individual information
7 Collation of individual information
8 Existence judgment
9 Individual information registration
10 Movement prior notice information search
11 Confirmation of terminal purpose
12 Creation of the movement stop information
13 Creation of existence information
14 Sending the existence information
15 Sending the movement stop information
16 Temporary registration of individual information
17 Recognition of unit transfer
FIG. 62
1 Information (present/absent)
2 Comparison and collation of the movement stop information
3 Judgment of existence and continuity
4 Existence (present/absent)
5 Sending the permission information
6 Sending the movement start information deletion information
7 Temporary registration of individual registration
8 Deletion of the movement start information
9 Provision of necessary use
10 Sending the no permission information
11 Temporary registration of no permission information
12 Reading the individual information once again and the like
FIG. 63
1 Example Virtual commutation image
2 Server
3 Ohyama station
4 1-chome
5 Individual house
6 Ikebukuro station
7 Building
8 Working place
FIG. 64
1 Server
2 1-chome 3 Ohyama station
4 Ikebukuro station
5 Building
6 Working place
7 Individual house
8 Door knob
9 South ticket gate
10 West ticket gate
11 North ticket gate
12 Service entrance
13 Front entrance
14 Entrance
　FIG. 65
1 Building structure side terminal
2 Aggregation side terminal
3 Organization side terminal
4 Authentication system server
5 End side terminal
6 Existence judgment
7 Sending the movement stop information
8 Sending the movement prior notice information
9 Periodical information extraction
10 Recognition of the start terminal
11 Recognition of the end terminal
12 Individual information extraction
13 Reading the individual information
14 Sending the individual information
15 Collation of individual information
16 Movement prior notice information (present/absent)
17 Recognition of unit transfer
18 Sending the movement information
19 Sending the permission information
　FIG. 66
1 Example Commutation ticket information List
2 Example Commutation ticket information
3 Access terminal Address
4 Individual identification ID
　Main terminal
　Commutation area main terminal side
　Commutation area sub terminal side
　Ride available period
　Individual confirmation information
　Bank account
5 Start
6 Other
7 Right eye iris
8 Bank Branch
9 Period
10 Left index finger fingerprint
　FIG. 67
1 Example Station terminal List
2 Station name Aggregation side terminal Ticket gate name
　Building structure side terminal End side terminal
3 North port
4 West port
5 Compatibility
6 South port
　FIG. 68
1 Example Working place Building condition figure
2 Example Building of working place
3 Service entrance
4 Building 1F
5 Entire building
6 Entrance
7 Working place
8 Front entrance FIG. 69
1 Server
2 1-chome
3 Ohyama station
4 Ikebukuro station
5 Building
6 Working place
7 Individual house
8 Door knob
9 South ticket gate
10 West ticket gate
11 North ticket gate
12 Service entrance
13 Front entrance
14 Entrance
　FIG. 70
1 Example Inclusion relation List
2 Large building Building Base unit
3 Terminal name Aggregation side terminal Connection terminal
　Installation place Building structure side terminal
　End side terminal
4 Component unit 1F entrance
5 Working place
6 1F lobby
7 Elevator No. 1
8 2F corridor
9 Roof
10 Front entrance door outside
11 Front entrance door inside
12 Service entrance door outside
13 Service entrance door inside
14 Entrance door outside
15 Shaped portion
　FIG. 71
1 End side terminal
2 Building structure side terminal
3 Aggregation side terminal
4 Authentication system server
5 Reading the individual information
6 Sending the individual information
7 Existence judgment
8 Sending the movement stop information
9 Judgment of existence and continuity
10 Sending the permission information
11 Sending the deletion information
12 Temporary storage of permission information
13 Provision of necessary use
　FIG. 72
1 Example Department store Building condition figure
2 Example Department store Commercial facility composite building
3 Tenant D
4 South port
5 Building
6 Exit
7 Shop
8 Front entrance
　FIG. 73
1 Server
2 Shop
3 Building
4 Entrance
5 Exit
6 Front entrance
7 South port FIG. 74
1 End side terminal
2 Building structure side terminal
3 Aggregation side terminal
4 Reading the individual information
5 Sending the individual information
6 Judgment of movement
7 Sending the movement start information
8 Recognition of movement
9 Sending the movement stop information
10 Judgment of existence and continuity
11 Sending the permission information
12 Temporary storage of permission information
13 Sending the deletion information
14 Provision of necessary use
FIG. 75
1 Fukuoka airport
2 Airport building
3 Passenger list
4 Ticket gate
5 Input terminal
6 Airline company
7 Building
8 Door
9 Haneda airport
10 Individual house
11 Internet
12 Door knob
13 Home
FIG. 76
1 Server
2 Individual house
3 Airline company
4 Haneda airport
5 Fukuoka airport
6 Internet
7 Building
8 Passenger list
9 Airport building
10 Door knob
11 Input terminal
12 Door
13 Ticket gate
FIG. 77
1 End side terminal
2 Organization side terminal
3 Aggregation side terminal
4 Authentication system server
5 Reading the individual information
6 Sending the individual information
7 Collation of individual information
8 Sending the existence information
9 Judgment of existence and continuity
10 Sending the permission information
11 Inputting the reservation information
12 Sending the boarding request
13 Recognition of reservation acceptance
14 Sending the movement prior notice information
15 Temporary storage of the prior notice information
FIG. 78
1 Server
2 Individual house
3 Airline company
4 Haneda airport
5 Fukuoka airport
6 Internet
7 Building
8 Passenger list
9 Airport building
10 Door knob
11 Input terminal
12 Door
13 Ticket gate
FIG. 79
1 End side terminal
2 Organization side terminal
3 Aggregation side terminal
4 Authentication system server
5 Reading the individual information
6 Sending the individual information
7 Collation of individual information
8 Sending the movement start information
9 Judgment of existence and continuity
10 Prior notice information (present/absent)
11 Recognition of information transfer
12 Sending the movement prior notice information
13 Individual information extraction
14 Recognition of information transfer
FIG. 80
1 Server
2 Individual house
3 Airline company
4 Haneda airport
5 Fukuoka airport
6 Internet
7 Building
8 Passenger list
9 Airport building
10 Door knob
11 Input terminal
12 Door
13 Ticket gate
FIG. 81
1 Organization side terminal
2 Aggregation side terminal
3 Authentication system server
4 Building structure side terminal
5 End side terminal
6 Individual information extraction
7 Sending the extracted information
8 Temporary storage of the extracted information
9 Reading the individual information
10 Sending the individual information
11 Comparison and validation of the individual information
12 Judgment of existence and continuity
13 Existence (present/absent)
14 Sending the permission information
15 Sending the other unit movement completion information
16 Boarding permission
FIG. 82
1 Server
2 Haneda airport
3 Airplane
4 Fukuoka airport
5 Nagasaki airport
6 Airport building
7 Passenger list
8 Ticket gate
9 Input terminal
10 Seat
FIG. 83
1 Building structure side terminal
2 Aggregation side terminal
3 Authentication system server 4 End side terminal
5 Organization side terminal
6 Reading the individual information
7 Sending the individual information
8 Comparison and validation of the passenger list
9 Identical person (present/absent)
10 Extraction of not yet arrive passenger information
11 Sending the extracted information
12 Search of not yet arrive passenger information
13 Calling for not yet arrive passenger information
14 Sending the final information
15 Measurement of the take-off time
16 Sending the take-off temporal information
17 Recognition of the destination change
18 Transfer recognition
19 Sending the deletion information
20 Sending the destination change information
21 Measurement of the take-off time
22 Sending the take-off temporal information
23 Judgment of existence and continuity
24 Sending the permission information
 FIG. 84
1 Aggregation side terminal
2 Authentication system server
3 Information extraction condition setting
4 Sending the extraction condition
5 Individual information extraction
6 Sending the extracted information
7 Temporary storage of the extracted information
8 Extraction work of stored information
9 Analysis of the extracted information
10 Comparison and validation mining of action information
11 Extracted information result registration
12 Sending the registered information
 FIG. 85
1 Example Data mining
2 First unit
3 Last unit
4 Accumulation within period
5 Contents
6 Monday AM
7 150 times
8 Commutation
9 Business destination
10 Welcoming and sending off
11 Hospital
12 School
13 Travel
 FIG. 86
1 Example Terminal configuration in virtual housing lot Outline
 FIG. 87
1 End side terminal
2 Building structure side terminal
3 Aggregation side terminal
4 Authentication system server
1 Reading the individual information
2 Sending the individual information
3 Collation of individual information
4 Recognition of information transfer
5 Sending the use stop information
6 Sending the movement start information
7 Mining information comparison
8 Sending the movement prior notice information
9 Individual information extraction
 FIG. 88
1 Example Terminal configuration in virtual housing lot Outline
 FIG. 89
1 End side terminal
2 Building structure side terminal
3 Aggregation side terminal
4 Authentication system server
1 Reading the individual information
2 Sending the individual information
3 Collation of individual information
4 Recognition of information transfer
5 Sending the use start information
6 Mining information comparison
7 Sending the movement prior notice information
8 Individual information extraction
9 Movement (present/absent)
10 Sending the use stop information
11 Judgment of existence and continuity
12 Sending the permission information
13 Sending the other unit movement completion information
 FIG. 90
1 End side terminal
2 Organization side terminal
3 Aggregation side terminal
4 Authentication system server
5 Reading the individual information
6 Sending the individual information
7 Collation of individual information
8 Existence of the existence information
9 Existence not established
10 Sending the use stop information
11 System use limitation and stop
12 Instruction of performing validation once again
13 Sending the validation instruction information
 FIG. 91
1 Example Large building Building structure condition figure
2 Example Large building Tenant composite building
3 Entrance
4 Shop
5 Entrance
6 Elevator
7 Building
8 Entire building
9 Building 1F
10 Tenant C
11 Now closed
 FIG. 92
1 Building
2 Shop
3 Entire building
4 Building 1F
5 Elevator
6 Entrance
7 Hall
8 1F entrance
 FIG. 93
1 End side terminal
2 Building structure side terminal
3 Reading the individual information
4 Sending the individual information
5 Collation of individual information
6 Place information display
7 Sending the individual information
 FIG. 94
1 Example Current position display example 1
2 Individual identification ID Update time
Confirmation unit terminal name
Contents
3 Building 1F
4 Entrance
5 Tenant D
6 Elevator inside
  FIG. 95
1 Example Current position display example 2
2 Example Large building Tenant composite building
3 Current time
4 Entrance
5 Tenant D
6 Shop
7 Elevator
8 Building
9 Entire building
10 Building 1F
11 Individual identification ID
12 Now closed
  FIG. 96
1 Example Navi light
2 Example Large building Tenant composite building
3 Entrance
4 Tenant D
5 Shop
6 Elevator
7 Navi
8 Building
9 Entire building
10 Building 1F
11 Now closed
  FIG. 97
1 Building
2 Shop
3 Entire building
4 Building 1F
5 Navi
6 Entrance
  FIG. 98
1 End side terminal
2 Building structure side terminal
3 Reading the individual information
4 Sending the individual information
5 Collation of individual information
6 Place information display
7 Sending the confirmation information
8 Inputting the destination information
9 Sending the movement start information and the destination information
10 Recognition of information transfer
11 Calculation of the input place and the route to the destination place
12 Sending the navi method
13 Sending the navi system operation information
14 Sending the movement prior notice information
15 Conversion to navi information
16 Individual information extraction
17 Navi information display
  FIG. 99
1 Building
2 Building structure
3 Sensor
4 Speaker
5 Elevator FIG. 100
1 Building
2 Building structure
3 Sensor
4 Speaker
  FIG. 101
1 End side terminal
2 Building structure side terminal
3 Aggregation side terminal
4 Recognition of information transfer
5 Calculation of the input place and the route to the destination place
6 Recognition of the movement route
7 Sending the movement prior notice information
8 Individual information extraction
9 Reading the individual information
10 Sending the individual information
11 Collation of individual information
12 Movement route explanation information
13 Sending the explanation information
14 Movement route explanation
  FIG. 102
1 Example Top view of home
2 Communication line network
3 Example Elevator
4 Example Entrance door enlarged view
5 Inside
6 Outside
7 Door knob
  FIG. 103
1 Building
2 Home
3 Elevator
4 Door knob
5 Door
  FIG. 104
1 End side terminal
2 Building structure side terminal
3 Aggregation side terminal
4 Reading the individual information
5 Sending the individual information
6 Collation of individual information
7 Recognition of information transfer
8 Sending the movement start information
9 Mining information comparison
10 Sending the movement prior notice information
11 Calculation of the read place and the route to the destination place
12 Sending the preparation information
13 Execution of preparation action
  FIG. 105
1 Aggregation side terminal
2 Authentication system server
3 Building structure side terminal
4 End side terminal
5 Registration procedure
  Giving the identification ID
6 Sending the individual identification information
7 Sending the necessary information storage instruction
8 Issuing the recording medium
9 Sending the issue information
10 Registration of issue condition
11 Reading the identification ID information
12 Confirmation of information recognition destination
13 Reading the individual information
14 Sending the individual information
15 Search of the movement information 16 Judgment of existence and continuity
17 Sending the permission information
18 Sending the movement destination information
19 Receiving the permission information
20 Recognition of information transfer
21 Sending the movement start information
22 Receiving the movement information
23 System use
   FIG. 106
1 Example Completion notice information
2 Individual identification ID
   Main unit
   Date and time of storage
   Information portable device
   Electronic recording medium
   Operator of procedure
   Place of procedure
   Other
3 Name
   Type
   Product number
4 Cell phone
5 IC chip
6 In
   FIG. 107
1 Authentication system server
2 Police side terminal
3 End side terminal
4 Use of system
5 Registration of individual identification ID
6 Problem (present/absent)
7 Sending the search request information
8 Creation of search warrant
9 Sending the individual specification request information
10 Search of registered information
11 Sending the individual specification information
12 Publication (yes/no)
13 Individual specification
   FIG. 108
1 End side terminal
2 Sub servers
3 Individual information reading procedure
4 Sending the individual information
5 Search of database
6 Database 111 individual folder preparation
7 Registration procedure
8 Giving the temporary individual identification ID
9 Sending the temporary individual identification ID
10 Deletion of unnecessary data
11 Individual information reading procedure
12 Sending the individual information
13 Registration procedure
14 Sending the registration completion
15 Registration procedure
   FIG. 109
1 Example Biometrics information Reference table
2 Item Objective code
3 Right thumb fingerprint
   Right index finger fingerprint
   Right eye iris
   Right palm vein
   Voice pattern
4 Company A
   FIG. 110
1 Example Mismatch information
2 Individual identification ID
   Base unit
   Date and time of occurrence
   Date and time of judgment
   Mismatch reason
   Use purpose
   User individual identification ID
   Checker individual identification ID
   Cause
   Re-validation
   Date of report
   Remarks
   Other
3 Read information insufficient
4 Electronic money payment
5 User's finger was wet.
6 No problem
7 It rained, and the finger used to hold an umbrella
   FIG. 111
1 End side terminal
2 Sub servers
3 Aggregation side terminal
4 Authentication system server
5 Individual information reading procedure
6 Sending the individual information
7 Individual information collation procedure
8 Registration of mismatch information
9 Sending the mismatch information
10 Seeking for the cause
11 Sending the cause report information
12 Registration of cause information
13 Tallying up the entire unit
14 Tallying up the entire system
   FIG. 112
1 Example Use limited person registration slip
2 Use limited person individual identification ID
   Date of authorization
   Date of release
   Reason for limitation
   Limited contents
   Base unit
   Re-validation
   Date of report
   Remarks
   Other
3 System use limitation
   System use stop
4 Acquiring other's information by spoofing
   Electronic money, without ticket
   None
5 No problem
6 Limitation until
7 Incident number: criminal action
   FIG. 113
1 Example Use limitation standard table
2 Action contents
   Unauthorized access
   Data change
   Data fabrication
   Data theft
   Spoofing
   Creation and spread of computer virus
   Net fraud
   Extreme slander action
3 Limitation/stop division
4 Stop
5 Limitation
6 Period 7 1 year after authorization
8 6 months after authorization
  FIG. 114
1 End side terminal
2 Sub servers
3 Aggregation side terminal
4 Authentication system server
5 Authorization of unauthorized user
6 Alert registration of unauthorized user
7 Alert information registration to individual identification ID
8 Sending the alert/stop person information
9 Extraction of the alert/stop person information
10 Alert information registration to individual identification ID
11 Individual information reading procedure
12 Sending the individual information
13 Individual information collation procedure
14 Comparison with the alert/stop person information
15 Sending the collation information
16 Extraction of use range
17 Sending the use limitation information
  FIG. 115
1 End side terminal
2 Sub servers
3 Authentication system server
4 Organization side terminal
5 Acquisition of search warrant
6 Sending the request information
7 Authorization of search cooperation person
8 Sending the search cooperation person information
9 Individual information reading procedure
10 Sending the individual information
11 Individual information collation procedure
12 Comparison with the search cooperation person information
13 Sending the reference information
14 Extraction of search cooperation method
15 Contact to related organization
16 Sending the search cooperation person confirmation information
17 Sending the search cooperation person related organization now contacting information
18 Sending the necessary instruction information
19 Determination of necessary instruction
20 Execution of necessary procedure
  FIG. 116
1 Aggregation side terminal
2 Authentication system server
3 External organization server
4 Individual information extraction procedure
5 Sending the search information
6 Sending the extraction information
7 Storing the received information
8 Judgment of deletion information
9 Deletion procedure
10 Sending the deletion information
11 Sending the completion information
  FIG. 117
1 Navigation electronic recording medium
2 Area management side terminal
3 Aggregation side terminal
4 Waiting communication
5 Creation of sub movement stop information
6 Sending the sub movement stop information
7 Estimation recognition of existence place
8 Creation of use possibility information
9 Sending the use possibility information
  FIG. 118
1 Building structure side terminal
2 Face authentication side terminal
3 Aggregation side terminal
4 Reading the face information
5 Individual specification recognition
6 Creation of sub movement start information
7 Sending the sub movement start information
8 Estimation recognition of movement start
9 Creation of use possibility information
10 Sending the use possibility information
11 Authentication information extraction preparation
12 Authentication information extraction preparation
  FIG. 119
1 Management organization
2 System server
3 DB amount
4 Aggregation side terminal
5 Communication line network
6 Building structure side terminal
7 Organization side terminal
8 End side terminal
  FIG. 120
1 Authentication system server
2 Aggregation side terminal
3 School building
4 Building structure side terminal
5 Database
6 Entrance of school building
7 End side terminal
  FIG. 121
1 End side terminal
2 Building structure side terminal
3 Aggregation side terminal
4 Reading the individual information
5 Authorization available?
6 Sending the individual information
7 Temporary storage database registration procedure
8 Recognition of existence in unit
9 Comparison and collation between databases
  Specification of individual identification ID
10 Creation of movement stop information
11 Movement stop information
  FIG. 122
1 Database school student data
2 Database individual identification ID
3 Database fingerprint/authentication ID
  FIG. 123
1 Authentication system server
2 Aggregation side terminal
3 Working place building and floor and the like
4 Building structure side terminal
5 Database
6 Program
  Algorithm
7 Working place entrance and the like
8 End side terminal
  FIG. 124
1 End side terminal
2 Building structure side terminal
3 Aggregation side terminal
4 Reading the individual information
5 Authorization available?
6 Sending the individual information
7 Temporary storage database registration procedure
8 Recognition of existence in unit 9 Reference to equation
　　Calculation of individual identification ID
10 Creation of movement stop information
11 Movement stop information
　　FIG. 125
1 Database company personnel data
2 Equation algorithm and the like
3 Database fingerprint/authentication ID
　　FIG. 126
1 Authentication system server
2 Aggregation side terminal
3 Database
4 Program
　　Algorithm
5 School building and the like
6 Building structure side terminal
7 School building entrance and the like
8 End side terminal
　　FIG. 127
1 End side terminal
2 Building structure side terminal
3 Aggregation side terminal
4 Reading the individual information
5 Authorization available?
6 Sending the individual information
7 Temporary storage database registration procedure
8 Recognition of existence in unit
9 Creation of creation instruction information of movement stop information
10 Movement creation instruction information
11 Comparison and collation between databases
　　Specification of individual identification ID
12 Creation of movement stop information
13 Sending the movement stop information
　　FIG. 128
1 Database individual identification ID
2 Database school student data
3 Database fingerprint/authentication ID
4 Equation algorithm and the like
5 Database company personnel data
　　FIG. 129
1 Authentication system server
2 Area management side terminal
3 Financial organization (bank)
4 Organization side terminal
5 Branch or head office
6 Building structure side terminal
7 ATM and the like
8 End side terminal
9 Information portable device
　　FIG. 130
1 End side terminal
2 Building structure side terminal
3 Organization side terminal
4 Aggregation side terminal
5 Authentication system server
6 Selection of transaction request bank
7 Creation of transaction request bank information
8 Reading the navigation electronic recording medium
9 Recognition of information reference destination
10 Reading the individual information
11 Input of withdrawal amount
12 Sending the individual information
13 Temporary storage of information
14 Collation of individual information
15 Extraction of transaction information and the like
16 Sending the movement information confirmation information
17 Search of movement information
18 Sending the movement information presence or absence and the like
　　FIG. 131
1 End side terminal
2 Building structure side terminal
3 Organization side terminal
4 Aggregation side terminal
5 Authentication system server
6 Movement information present?
7 Existence and the like present?
8 To FIG. 132
9 Creation of the movement stop information and the financial transaction permission information
10 Transaction available?
11 Sending the movement stop information and the like
12 Storage of the movement stop information
13 Sending the payment permission and the like
14 Sending the no permission information and the like
15 Cash payment
16 Storage of the movement stop information
17 Sending the payment no permission
18 Monitor display
　　FIG. 132
1 End side terminal
2 Building structure side terminal
3 Organization side terminal
4 Aggregation side terminal
5 Authentication system server
6 Movement information present?
7 Existence and the like present
8 Creation of transaction prohibition information
9 Sending the transaction prohibition information
10 Monitor display
11 Recognition of information reference destination
12 Sending the movement information confirmation information
13 Existence recognition?
14 Movement information sending request to other terminal
　　FIG. 133
1 Itabashi ikku
2 Around home
3 Around station
4 Around hospital
5 Home
6 Station
7 Hospital
8 Reflection
9 Emergency
　　FIG. 134
1 End side terminal
2 Building structure side terminal
3 Aggregation side terminal
4 Reading the individual information
5 Sending the individual information and the like
6 Recognition of going out
7 Creation of movement start information
8 Sending the movement start information
9 Temporary storage of information
10 Sending the confirmation signal
11 Sending the response signal
12 Connection OK?
13 Connectable terminal registration FIG. 135
1 End side terminal
2 Building structure side terminal
3 Aggregation side terminal
4 Area management side terminal
5 Authentication information storage confirmation
6 Comparison and collation of individual information
7 Execution of individual authentication
8 Sending the safety information FIG. 136
1 Example Home End side terminal 160A Connection list
2 Access terminal Address Terminal name
3 Top priority
  Reflection
  Next
4 Emergency FIG. 137
1 End side terminal
2 Building structure side terminal
3 Aggregation side terminal
4 Area management side terminal
5 Receiving the disaster information
6 Recognition of emergency mode
7 Sending the storage transfer information and the like
8 Connection OK?
9 Individual authentication preparation
10 Confirmation of connection terminal operation

What is claimed is:

1. An authentication system for improving accuracy of authentication of a registered person, said authentication system comprising:
   a plurality of processing units, wherein each said processing unit comprises at least one information input device, each said information input device being configured with
      a module for inputting individual information or automatically detecting said individual information for specifying individuals of registered people,
      a module for recognizing temporal information at which said individual information is inputted or detected,
      a module for storing spatial information corresponding to a spatial position of a device of said individual and,
      a module for recognizing spatial information corresponding to a presence of said information input device;
   a management server for managing said plurality of processing units as a network-configuring unit and being provided in communication with said information input devices; and
   an authentication server configured with a module for performing an authentication of at least one of said registered people based upon said individual information,
   wherein said authentication server is in communication with and manages said plurality of processing units;
   wherein said individual information is input or read by said information input devices within at least one of said plurality of processing units,
   wherein said authentication server, upon receiving said individual information, said temporal information, and said spatial information from said management server, compares said received spatial information and said received temporal information with stored spatial information and stored temporal information from past authentication processing,
   wherein, if said received spatial information and said received temporal information are consistent with said stored spatial information and said stored temporal information for a registered person, said authentication server determines that said registered person is present in a spatial region where said unit is located, and
   wherein, in an event that movement outside of said spatial region is not confirmed after said determination, if said individual information of said registered person through a second one of said information input devices within a second said processing unit is recognized, when the information input devices within said processing unit are configured with a module for providing a predetermined service to said registered person, said authentication server restricts said module for providing said service in said information input device.

2. The authentication system according to claim 1, wherein said information input devices further send said spatial information and said temporal information showing a time at which said individual information is input or detected to said authentication server via said management server,
   wherein said authentication server, upon receiving said spatial information and said temporal information from a plurality of said information input devices, calculates information showing a time required for movement between said information input devices on a basis of said spatial information, and calculates an input or detect time interval of said individual information on a basis of said temporal information, and
   wherein when said time interval is shorter than said time required for movement, said authentication server determines that an unauthorized act has been performed during said input or detection of said individual information.

3. The authentication system according to claim 1, wherein said authentication server is equipped with a database for managing said individual information, and said authentication server, upon receiving individual information input into or detected by said information input devices by said registered person from said information input devices, collates said received individual information and said individual information in said database provided in said authentication server itself, and upon determining a match between said individual information and said individual information in said database, performs a specified action.

4. The authentication system according to claim 1, wherein said information input devices are equipped with a database for managing said individual information, and when said individual information is input or detected from said registered person, for collating said input or detected individual information with individual information in said database configured in said input devices, and upon determining a match between said individual information and said individual information in said database, perform a specified action.

5. The authentication system according to claim 1, wherein said authentication server, upon receiving individual information of said registered person, information showing movement destinations of said registered person, and said spatial information of said info nation input device through which said individual information has been input or detected, forecasts a transfer route of said registered person on a basis of said received information, and transmits control information for performing an execution preparation of a specified action to one of said information input devices located on or near said forecasted transfer route.

6. The authentication system according to claim 5, wherein at least one of said information input devices, upon receiving said control information for performing an execution preparation, performs a guiding action up to said movement destination using at least one of a sound, a character, or an image.

7. The authentication system according to claim 5, wherein said authentication server, upon receiving said individual information transmitted from at least one of said information input devices located outside said forecasted transfer route, transmits control information for limiting or prohibiting said specified action to at least one other of said information input device.

8. The authentication system according to claim 1, wherein said management server manages said information input devices collectively as one of a building structure, a transfer means, a facility, a region or an organization.

9. The authentication system according to claim 1, wherein said authentication server or said management server, after recognizing that said registered person is present in a spatial region where said unit is positioned, does not recognizes that said registered person has moved outside said spatial region, and, upon receiving said individual information from said infatuation input device installed in said spatial region, determines a success of said authentication and transmits permission information for permitting execution of a financial transaction or a settlement transaction, to said information input device.

10. The authentication system according to claim 1, wherein said authentication server or said management server, after recognizing that said registered person is present in a spatial region where said unit is positioned, does not recognizes that said registered person has moved outside said spatial region, and, upon receiving said individual information from said information input device installed in said spatial region, determines a success of said authentication and transmits information for recognizing a public identification card to said information input device.

11. The authentication system according to claim 1, wherein said authentication server or said management server identifies local identification IDs used in a limited organization, and individual identification IDs for specifying said registered person used in said authentication system.

12. The authentication system according to claim 1, wherein, in a case of a temporal disconnection of a network connection in said authentication system, said information input devices send a signal to check whether said network connection is available to said authentication server, said management server and said information input devices that have been connectable with a user's device and establish said network connection with said authentication server, said management server or said information input devices with which said connection is available.

13. The authentication system according to claim 12, wherein said information input devices store list information showing said authentication server, said management server, or said information input devices that are connectable with said user's device, and said list information shows connection priority order, and wherein said information input devices, in a case of a temporal disconnection of said network connection in said authentication system, transmit a signal to check said network connection in accordance with said priority order and establish said network connection.

14. The authentication system according to claim 1, wherein said management server and said information input devices have a preset order of destinations for said received information, and at failure of transmitting said received information, said management server or said information input device transmits said received information to a second one of said destinations.

15. An authentication system for improving accuracy of authentication of a registered person, said system comprising:

a plurality of processing units, wherein each said processing unit comprises information input devices, each one of said information input devices being equipped with a module for inputting individual information and automatically reading individual information for specifying individuals of registered people, a module for recognizing time information at which said individual information is inputted or read, a module for storing space information corresponding to a spatial position of an installation of said input device, and a module for recognizing said space information in which said information input device is located, and a management server for managing said information input devices as a network-configuring unit, and an authentication server, in communication with the said plurality of units, equipped with a module for performing an authentication of at least one of said registered people based upon said individual information, wherein said authentication server manages said plurality of processing units and is in communication with said plurality of units, wherein said individual information is input or read by said information input devices within at least one said unit, wherein said authentication server, on receiving said input or said read individual information, said time information, and said space information via said management server, compares said received space information and said received time information with stored space information and stored time information from past authentication processing, wherein, if said space information and said time information are consistent with said stored space information and said stored time information for a registered person, said authentication server determines that said registered person has been moved from a first location where a first said unit is disposed to a second location where a second said unit is disposed, and wherein, in a case that said inputting or reading of said individual information through said information input devices occurs within said unit before movement of said registered person, when said information input devices are equipped with a module for providing a predetermined service to said registered person, said authentication server is capable of stopping or limiting said module for providing said predetermined service in said information input devices.

16. The authentication system according to claim 15, wherein said information input devices further send said spatial information and said temporal information showing a time at which said individual information is input or detected to said authentication server via said management server, wherein said authentication server, upon receiving said spatial information and said temporal information from a plurality of said information input devices, calculates information showing a time required for movement between said information input devices on a basis of said spatial information, and calculates an input or detect time interval of said individual information on a basis of said temporal information, and wherein when said time interval is shorter than said time required for movement, said authentication server determines that an unauthorized act has been performed during said input or detection of said individual information.

17. The authentication system according to claim 15, wherein said authentication server is equipped with a database for managing said individual information, and said authentication server, upon receiving individual information input into or detected by said information input devices by said registered person from said information input devices, collates said received individual information and said individual information in said database provided in said authentication server itself, and upon determining a match between said individual information and said individual information in said database, performs a specified action.

18. The authentication system according to claim 15, wherein said information input devices are equipped with a database for managing said individual information, and when said individual information is input or detected from said registered person, for collating said input or detected individual information with individual information in said database configured in said input devices, and upon determining a match between said individual information and said individual information in said database, perform a specified action.

19. The authentication system according to claim 15, wherein said authentication server, upon receiving individual information of said registered person, information showing movement destinations of said registered person, and said spatial information of said information input device through which said individual information has been input or detected, forecasts a transfer route of said registered person on a basis of said received information, and transmits control information for performing an execution preparation of a specified action to one of said information input devices located on or near said forecasted transfer route.

20. The authentication system according to claim 19, wherein at least one of said information input devices, upon receiving said control information for performing an execution preparation, performs a guiding action up to said movement destination using at least one of a sound, a character, or an image.

21. The authentication system according to claim 19, wherein said authentication server, upon receiving said individual information transmitted from at least one of said information input devices located outside said forecasted transfer route, transmits control information for limiting or prohibiting said specified action to at least one other of said information input device.

22. The authentication system according to claim 15, wherein said management server manages said information input devices collectively as one of a building structure, a transfer means, a facility, a region or an organization.

23. The authentication system according to claim 15, wherein said authentication server or said management server identifies local identification IDs used in a limited organization, and individual identification IDs for specifying said registered person used in said authentication system.

24. The authentication system according to claim 15, wherein, in a case of a temporal disconnection of a network connection in said authentication system, said information input devices send a signal to check whether said network connection is available to said authentication server, said management server and said information input devices that have been connectable with a user's device and establish said network connection with said authentication server, said management server or said information input devices with which said connection is available.

25. The authentication system according to claim 24, wherein said information input devices store list information showing said authentication server, said management server, or said information input devices that are connectable with said user's device, and said list information shows connection priority order, and wherein said information input devices, in a case of a temporal disconnection of said network connection in said authentication system, transmit a signal to check said network connection in accordance with said priority order and establish said network connection.

26. The authentication system according to claim 15, wherein said management server and said information input devices have a preset order of destinations for said received information, and at failure of transmitting said received information, said management server or said information input device transmits said received information to a second one of said destinations.

* * * * *